(12) United States Patent
Karow

(10) Patent No.: US 12,435,142 B2
(45) Date of Patent: Oct. 7, 2025

(54) ANTI-CTLA4 ANTIBODIES AND METHODS OF USE THEREOF

(71) Applicant: Xilio Development, Inc., Waltham, MA (US)

(72) Inventor: Margaret Karow, Waltham, MA (US)

(73) Assignee: Xilio Development, Inc., Waltham, MA (US)

( * ) Notice: Subject to any disclaimer, the term of this patent is extended or adjusted under 35 U.S.C. 154(b) by 1137 days.

(21) Appl. No.: 17/417,244

(22) PCT Filed: Dec. 26, 2019

(86) PCT No.: PCT/US2019/068548
§ 371 (c)(1),
(2) Date: Jun. 22, 2021

(87) PCT Pub. No.: WO2020/139926
PCT Pub. Date: Jul. 2, 2020

(65) Prior Publication Data
US 2022/0064301 A1 Mar. 3, 2022

Related U.S. Application Data

(60) Provisional application No. 62/785,111, filed on Dec. 26, 2018.

(51) Int. Cl.
| | | |
|---|---|---|
| *C07K 16/28* | (2006.01) | |
| *A61K 39/00* | (2006.01) | |
| *A61K 47/68* | (2017.01) | |
| *A61P 35/00* | (2006.01) | |

(52) U.S. Cl.
CPC ...... *C07K 16/2818* (2013.01); *A61K 47/6849* (2017.08); *A61P 35/00* (2018.01); *A61K 2039/505* (2013.01); *C07K 2317/24* (2013.01); *C07K 2317/31* (2013.01); *C07K 2317/40* (2013.01); *C07K 2317/52* (2013.01); *C07K 2317/55* (2013.01); *C07K 2317/565* (2013.01); *C07K 2317/72* (2013.01); *C07K 2317/732* (2013.01); *C07K 2317/76* (2013.01); *C07K 2317/92* (2013.01); *C07K 2319/50* (2013.01)

(58) Field of Classification Search
CPC . A61K 47/6849; A61P 35/00; C07K 2317/40; C07K 2317/732
See application file for complete search history.

(56) References Cited

U.S. PATENT DOCUMENTS

| | | |
|---|---|---|
| 5,859,205 A | 1/1999 | Adair et al. |
| 6,051,227 A | 4/2000 | Allison et al. |
| 7,452,535 B2 | 11/2008 | Davis et al. |
| 7,465,446 B2 | 12/2008 | Lowy et al. |
| 7,744,875 B2 | 6/2010 | Lowy et al. |
| 8,475,790 B2 | 7/2013 | Jure-Kunkel et al. |
| 8,518,404 B2 | 8/2013 | Daugherty et al. |
| 8,993,524 B2 | 3/2015 | Bedi et al. |
| 9,562,073 B2 | 2/2017 | Moore et al. |
| 9,944,689 B2 | 4/2018 | Wang et al. |
| 10,167,337 B2 | 1/2019 | Allison et al. |
| 10,174,113 B2 | 1/2019 | Yang et al. |
| 10,196,445 B1 | 2/2019 | Engelhardt et al. |
| 10,463,686 B2 | 11/2019 | Agrawal et al. |
| 10,842,743 B2 | 11/2020 | Roth et al. |
| 10,842,763 B2 | 11/2020 | Slusher et al. |
| 10,869,926 B2 | 12/2020 | Zhou et al. |
| 11,078,281 B2 | 8/2021 | Wang et al. |
| 11,643,463 B2 | 5/2023 | Wang et al. |
| 2009/0215991 A1 | 8/2009 | Lazar et al. |
| 2010/0189651 A1 | 7/2010 | Stagliano et al. |
| 2014/0212422 A1 | 7/2014 | Korman et al. |
| 2014/0255313 A1 | 9/2014 | Vasiljeva et al. |
| 2015/0104409 A1 | 4/2015 | Hanson et al. |
| 2016/0145355 A1 | 5/2016 | Saha et al. |
| 2016/0347848 A1 | 12/2016 | Hammond et al. |
| 2016/0368989 A1 | 12/2016 | Dijk et al. |
| 2018/0086828 A1 | 3/2018 | Van Berkel et al. |
| 2019/0055321 A1 | 2/2019 | Krystek et al. |
| 2019/0076452 A1 | 3/2019 | Rios-Doria et al. |
| 2019/0169245 A1 | 6/2019 | Williams et al. |
| 2019/0241660 A1 | 8/2019 | Giroir et al. |
| 2019/0241662 A1 | 8/2019 | Luo et al. |
| 2019/0241886 A1 | 8/2019 | Du et al. |
| 2019/0292599 A1 | 9/2019 | Liu et al. |
| 2019/0300606 A1 | 10/2019 | Woods et al. |
| 2019/0300967 A1 | 10/2019 | Bachireddy et al. |
| 2019/0352398 A1 | 11/2019 | Allison et al. |
| 2019/0359714 A1 | 11/2019 | Tipton et al. |

(Continued)

FOREIGN PATENT DOCUMENTS

| | | |
|---|---|---|
| CN | 1328571 A | 12/2001 |
| CN | 101146553 A | 3/2008 |

(Continued)

OTHER PUBLICATIONS

Janeway Jr et al. (Immunology, 3rd Edition, Garland Publishing Inc., pp. 3:1-3:11) (Year: 1997).*
Briney et al. (Commonality despite exceptional diversity in baseline human antibody repertoire. Nature. 566:393-399) (Year: 2019).*
Almagro, Juan C., et al., "Humanization of antibodies", Frontiers in Bioscience, vol. 13, 2008, pp. 1619-1633, (15 pages).
Altshuler, E, et al., "Preparation of Recombinant Antibodies and Methods for Increasing Their Affinity", Advances in Biological Chemistry, vol. 50, 2010, pp. 203-258, English Translation (4 pages).

(Continued)

*Primary Examiner* — Janet L Andres
(74) *Attorney, Agent, or Firm* — Proskauer Rose LLP

(57) ABSTRACT

The invention provides anti-CTLA4 binding proteins (e.g., antibodies, bispecific antibodies, and chimeric receptors) and their use in treating and preventing cancer, as well as compositions and kits comprising the anti-CTLA4 binding proteins.

16 Claims, 25 Drawing Sheets

Specification includes a Sequence Listing.

(56) References Cited

U.S. PATENT DOCUMENTS

| | | |
|---|---|---|
| 2019/0382490 A1 | 12/2019 | Loffredo et al. |
| 2020/0055937 A1 | 2/2020 | Calzone et al. |
| 2020/0115451 A1 | 4/2020 | Homet Moreno et al. |
| 2020/0148771 A1 | 5/2020 | Baeuerle et al. |
| 2020/0206346 A1 | 7/2020 | Li et al. |
| 2020/0255524 A1 | 8/2020 | Bonivi et al. |
| 2020/0277377 A1 | 9/2020 | Wang et al. |
| 2020/0405890 A1 | 12/2020 | Vasiljeva et al. |
| 2021/0023151 A1 | 1/2021 | Deng et al. |
| 2021/0032344 A1 | 2/2021 | Bhagavatheeswaran et al. |
| 2021/0040177 A1 | 2/2021 | Roberts |
| 2021/0047410 A1 | 2/2021 | Liu et al. |
| 2022/0306743 A1 | 9/2022 | O'neil et al. |

FOREIGN PATENT DOCUMENTS

| | | | |
|---|---|---|---|
| CN | 101287492 A | 10/2008 | |
| CN | 102766210 A | 11/2012 | |
| CN | 103547595 A | 1/2014 | |
| CN | 104292334 A | 1/2015 | |
| CN | 105296433 A | 2/2016 | |
| CN | 108948194 A | 12/2018 | |
| EP | 2418278 A2 | 2/2012 | |
| EP | 2734232 B1 | 11/2017 | |
| WO | 0037504 A2 | 6/2000 | |
| WO | 0114424 A2 | 3/2001 | |
| WO | 2006101692 A1 | 9/2006 | |
| WO | 2010081173 A2 | 7/2010 | |
| WO | 2012120125 A1 | 9/2012 | |
| WO | 2016015675 A1 | 2/2016 | |
| WO | WO 2016130986 A1 | 8/2016 | |
| WO | 2016185016 A1 | 11/2016 | |
| WO | WO 2016196237 A1 | 12/2016 | |
| WO | WO 2017157964 A1 | 9/2017 | |
| WO | WO-2017220990 A1 * | 12/2017 | ......... A61K 38/2013 |
| WO | 2018106862 A1 | 6/2018 | |
| WO | WO 2018222711 A2 | 6/2018 | |
| WO | WO 2018148555 A1 | 8/2018 | |
| WO | WO 2018156802 A1 | 8/2018 | |
| WO | 2018218076 A1 | 11/2018 | |
| WO | WO 2018209701 A1 | 11/2018 | |
| WO | WO 2019018841 A2 | 1/2019 | |
| WO | 2019075468 A1 | 4/2019 | |
| WO | WO 2019094352 A1 | 5/2019 | |
| WO | WO 2019/148444 A1 | 8/2019 | |
| WO | WO 2019/148445 A1 | 8/2019 | |
| WO | WO 2019183036 A1 | 9/2019 | |
| WO | WO 2019243471 A1 | 12/2019 | |
| WO | WO 2020007368 A1 | 1/2020 | |
| WO | WO 2020024932 A1 | 2/2020 | |
| WO | 2020057610 A1 | 3/2020 | |
| WO | WO 2020061526 A1 | 3/2020 | |
| WO | 2020092155 A1 | 5/2020 | |
| WO | 2020139920 A2 | 7/2020 | |
| WO | WO 2020214748 A1 | 10/2020 | |
| WO | WO 2020252349 A1 | 12/2020 | |
| WO | WO 2020252358 A1 | 12/2020 | |
| WO | WO 2021062323 A1 | 4/2021 | |
| WO | WO 2021064188 A1 | 4/2021 | |
| WO | 2022187272 A1 | 9/2022 | |

OTHER PUBLICATIONS

Casset, Florence, et al., "A peptide mimetic of an anti-CD4 monoclonal antibody by rational design", Biochemical and Biophysical Research Communications, vol. 307, No. 1, Jul. 18, 2003, pp. 198-205, DOI: 10.1016/s0006-291x(03)01131-8, (8 pages).

Chen, Ching, et al., "Enhancement and destruction of antibody function by somatic mutation: unequal occurrence is controlled by V gene combinatorial associations", The EMBO Journal, vol. 14, No. 12, 1995, pp. 2784-2794, DOI: 10.1002/j.1460-2075.1995.tb07278.x, (11 pages).

Coico, R., et al., "Immunology", Textbook, Moscow, Publishing Center Academy, 2008, pp. 61-62, English Translation (6 pages).

Donaldson, Joshua M., et al., "Design and development of masked therapeutic antibodies to limit off-target effects: Application to anti-EGFR antibodies", Cancer Biology & Therapy, vol. 8, No. 22, 2009, pp. 2147-2152, DOI: 10.4161/cbt.8.22.9765, (7 pages).

Gutierrez, Martin, et al., "Anti-CTLA-4 probody BMS-986249 alone or in combination with nivolumab in patients with advanced cancers: Initial phase I results", Journal of Clinical Oncology, vol. 38, No. 15 Suppl., pp. 3058-3058, DOI: 10.1200/JCO.2020.38.15_suppl.3058, (4 pages).

International Search Report for PCT/US2022/018376 dated Jun. 20, 2022 (5 pages).

Jenkins, Kurt, et al., "Tumor-activated Anti-CTLA-4 Monoclonal Antibody, XTX101, Demonstrates Monotherapy and Anti-PD-1 Combination Benefit in Preclinical Models", Xilio Therapeutics, Poster Presentation, May 12, 2021, retrieved on Jun. 9, 2022 from URL: https://xiliotx.com/wp-content/uploads/2021/09/2021-NYAS_XTX101-Poster.pdf, (1 page).

Jenkins, Kurt, et al., "Tumor-activated Fc-engineered Anti-CTLA-4 Monoclonal Antibody, XTX101, Demonstrates Tumor-selective PD and Efficacy in Preclinical Models", Xilio Therapeutics, Poster Presentation, Nov. 13, 2020, retrieved on Jun. 9, 2022 from URL: https://xiliotx.com/wp-content/uploads/2021/09/2020-SITC_XTX101-Poster.pdf, (1 page).

Kussie, Paul H., et al., "A single engineered amino acid substitution changes antibody fine specificity", The Journal of Immunology, vol. 152, No. 1, Jan. 1994, pp. 146-152, DOI: 10.4049/jimmunol.152.1.146 (8 pages).

Lazar, Greg A., et al., "Engineered antibody Fc variants with enhanced effector function", Proceedings of the National Academy of Science, vol. 103, No. 11, 2006, pp. 4005-4010, DOI: 10.1073/pnas.0508123103, (6 pages).

MacCallum, Robert M., et al., "Antibody-antigen Interactions: Contact Analysis and Binding Site Topography", Journal of Molecular Biology, vol. 262, No. 5, Oct. 11, 1996, pp. 732-745, DOI: 10.1006/jmbi.1996.0548, (14 pages).

Matsui, Toshihiro, et al., "Autoantibodies to T Cell Costimulatory Molecules in Systemic Autoimmune Diseases", The Journal of Immunology, vol. 162, No. 7, Apr. 1, 1999, pp. 4328-4335, DOI: 10.4049/jimmunol.162.7.4328, (9 pages).

Oroudjev, Emin, et al., "Maytansinoid-Antibody Conjugates Induce Mitotic Arrest by Suppressing Microtubule Dynamic Instability", Molecular Cancer Therapeutics, vol. 9, No. 10, 2010, pp. 2700-2713, Doi: 10.1158/1535-7163.MCT-10-0645, (14 pages).

Padlan, Eduardo A., et al., "Anatomy of the antibody molecule", Molecular Immunology, vol. 31, No. 3, Feb. 1994, pp. 169-217, DOI: 10.1016/0161-5890(94)90001-9, (49 pages).

Padlan, Eduardo A., et al., "Structure of an antibody-antigen complex: crystal structure of the HyHEL-10 Fab-lysozyme complex", PNAS USA, vol. 86, No. 15, 1989, pp. 5938-5942, DOI: 10.1073/pnas.86.15.5938, (5 pages).

Paul, William E., "Fundamental Immunology", Third Edition, 1993, pp. 292-295, (6 pages).

Polu, Krishna R., et al., "Probody therapeutics for targeting antibodies to diseased tissue", Expert Opinion on Biological Therapy, vol. 14, No. 8, Aug. 1, 2014, pp. 1049-1053, DOI: 10.1517/14712598.2014.920814, (6 pages).

Portolano, S., et al., "Lack of promiscuity in autoantigen-specific H and L chain combinations as revealed by human H and L chain "roulette"", The Journal of Immunology, vol. 150, No. 3, Feb. 1, 1993, pp. 880-887, DOI: 10.4049/jimmunol.150.3.880, (9 pages).

Postow, Michael A., et al., "Immune Checkpoint Blockade in Cancer Therapy", Journal of Clinical Oncology, vol. 33, No. 17, 2015, pp. 1974-1982, DOI: 10.1200/JCO.2014.59.4358, (10 pages).

Queen, Cary, et al., "A humanized antibody that binds to the interleukin 2 receptor", PNAS USA, vol. 86, No. 24, Dec. 1989, pp. 10029-10033, DOI: 10.1073/pnas.86.24.1002, (5 pages).

Reichmann, Lutz, et al., "Reshaping human antibodies for therapy", Nature, vol. 332, 1988, pp. 323-327, DOI: 10.1038/332323a0 (5 pages).

(56) References Cited

OTHER PUBLICATIONS

Rudikoff, Stuart, et al., "Single amino acid substitution altering antigen-binding specificity", Proceedings of the National Academy of Sciences USA, Immunology, vol. 79, Mar. 1982, pp. 1979-1983 (5 pages).
Snyder, Alexandra, et al., "Genetic Basis for Clinical Response to CTLA-4 Blockade in Melanoma", The New England Journal of Medicine, vol. 371, No. 23, 2014, pp. 2189-2199, DOI: 10.1056/NEJMoa1406498, (11 pages).
Bakacs, Tibor, and Jitendra N Mehrishi. "Anti-CTLA-4 therapy may have mechanisms similar to those occurring in inherited human CTLA4 haploinsufficiency." Immunobiology vol. 220,5 (2015): 624-5. doi:10.1016/j.imbio.2014.11.019.
Brown et al. "Tolerance of single, but not multiple, amino acid replacements in antibody VH CDR 2: a means of minimizing B cell wastage from somatic hypermutation" J. Immuno. May 1996, 3285-91. (Year: 1996).
Carbonnel, Franck et al. "Inflammatory bowel disease and cancer response due to anti-CTLA-4: is it in the flora?. " Seminars in immunopathology vol. 39,3 (2017): 327-331. doi:10.1007/s00281-016-0613-x.
Dondelinger et al., "Understanding the Significance and Implications of Antibody Numbering and Antigen-Binding Surface/Residue Definition", Frontiers In Immunology, vol. 9, Oct. 16, 2018 (Oct. 16, 2018), p. 1-15.
Edwards et al., "The remarkable flexibility of the human antibody repertoire; isolation of over one thousand different antibodies to a single protein", BLyS. J Mol Biol. Nov. 14, 2003;334(1): 103-18. (Year: 2003).
Goel et al., "Plasticity within the antigen-combining site may manifest as molecular mimicry in the humoral immune response", J Immunol. Dec. 15, 2004; 173(12):7358-67. (Year: 2004).
International Search Report and Written Opinion for PCT/CN2017/085134, dated Feb. 23, 2018.
International Search Report and Written Opinion for PCT/US2019/068548, dated Jun. 23, 2020.
Kanyavuz et al., "Breaking the law: unconventional strategies for antibody diversification", Nat Rev Immunol. Jun. 2019; 19(6):355-368. (Year: 2019).
Kirkwood et al., "Phase II trial of tremelimumab (CP-675,206) in patients with advanced refractory or relapsed melanoma," Clin Cancer Res 16(3):1042-1048 (2010). (Year: 2010).
Korman et al. "Tumor Immunotherapy: Preclinical and Clinical Activity of anti-CTLA4 Antibodies", Current Opinion in Investigational Drugs, 6:582-591, 2005.
Lloyd et al., "Modelling the human immune response: performance of a 1011 human antibody repertoire against a broad panel of therapeutically relevant antigens", Protein Eng Des Sel. Mar. 2009;22(3):159-68. (Year: 2009).
Ng Tang, Derek et al. "Increased frequency of Icos+ CD4 T cells as a pharmacodynamic biomarker for anti-CTLA-4 therapy." Cancer immunology research vol. 1,4 (2013): 229-34. doi:10.1158/2326-6066.CIR-13-0020.
Prieto et al., "CTLA-4 blockade with ipilimumab: long-term follow-up of 177 patients with metastatic melanoma", Clin Cancer Res 18 (7):2039-2047 (2012). (Year: 2012).
Quezada et al. "Blockade of CTLA-4 on both effector and regulatory T cell compartments contributes to the antitumor activity of anti-CTLA-4 antibodies", Journal of Experimental Medicine, 206(8):1717-1725, 2009.
Selby et al. "Anti-CTLA-4 Antibodies of IgG2a Isotype Enhance Antitumor Activity through Reduction of Intratumoral Regulatory T Cells", Cancer Immunology Research, 1(1):32-42, 2013.
Simmons, Andrew D et al. "Local secretion of anti-CTLA-4 enhances the therapeutic efficacy of a cancer immunotherapy with reduced evidence of systemic autoimmunity." Cancer immunology, immunotherapy : CII vol. 57,8 (2008): 1263-70. doi:10.1007/s00262-008-0451-3.
Sun et al. "Concurrent decrease in IL-10 with development of immune-related adverse events in a patient treated with anti-CTLA-4 therapy." Cancer immunity vol. 8 9. May 27, 2008.
Vajdos et al. "Comprehensive functional maps of the antigen-binding site of an anti-ErbB2 antibody obtained with shotgun scanning mutagenesis", J. Mol. Biol. Jul. 5, 2002, 320(2):415-28. (Year: 2002).
Vandenborre et al. "Interaction of CTLA-4 (CD152) with CD80 or CD86 inhibits human T-cell activation. Immunology", Nov. 1999;98(3):413-21. (Year: 1999).
Weber et al. "Phase I/II Study of Ipilimumab for Patients with Metastatic Melanoma", Journal of Clinical Oncology, 26: 5950-5956, 2008.
Wolchok et al. "Nivolumab plus Ipilimumab in Advanced Melanoma", The New England Journal of Medicine, 369:122-133, 2013.
Cancer Prevention Overview (PDQ)—Patient Version; https://www.canver.gov/about-cancer/causes-prevention/patient-prevention-overview-pdq#top (13 pages).
Almagro, Juan C. et al., "Progress and Challenges in the Design and Clinical Development of Antibodies for Cancer Therapy", Frontiers in Immunology, vol. 8, Article 1751 (Jan. 2018) (19 pages).
Gershoni, Jonathan M. et al., "Epitope Mapping—The First Step in Developing Epitope-Based Vaccines", Biodrugs 21 (3): 145-156 (2007) 1173-8804/07/0003-0145 (12 pages).
Lee, Ki Won et al., "Molecular targets of phytochemicals for cancer prevention", Nature Reviews—Cancer, vol. 11, pp. 211-218 (Mar. 2011) (8 pages).
Sela-Culang et al., "Structural basis of antibody-antigen recognition", Frontiers in Immunology, vol. 4, Article 302 (Oct. 2013) doi:10.3389/fimmu.2013.00302 (13 pages).
Zhu, Tongbo et al., "Cytokines Promote Adequate Activation of T Cells", Medical Immunology, Chengdu Sichuan University Press, p. 142, Feb. 28, 2017 (4 pages).
Zou, Shengquan, "Biliary Tract Tumor Surgery", People's Military Medical Press, Jan. 31, 2011 (5 pages) (English translation).

\* cited by examiner

| Channel | Sample | ka (1/(M*s)) | kd (1/s) | $K_D$ | $Chi^2$ |
|---|---|---|---|---|---|
| Ch1 | Ipilimumab-Fab | 3.33e+5 | 9.51e-3 | 28.6 nM | 1.97 |
| Ch1 | Antibody 2-Fab | 3.63e+5 | 2.26e-4 | 0.623 nM | 2.30 |

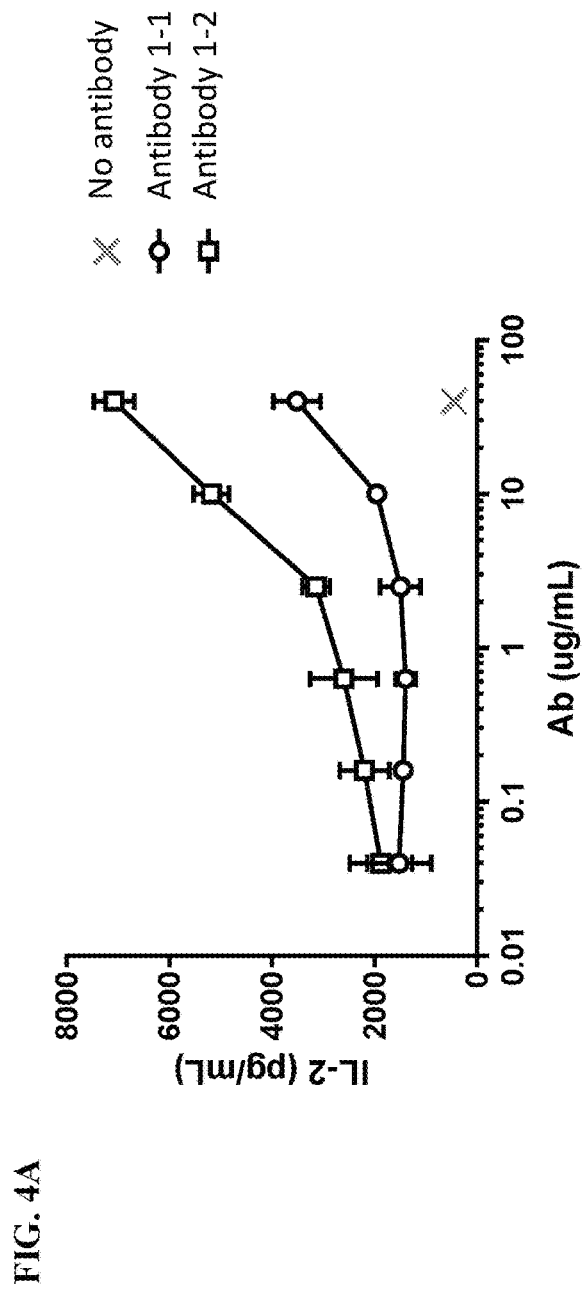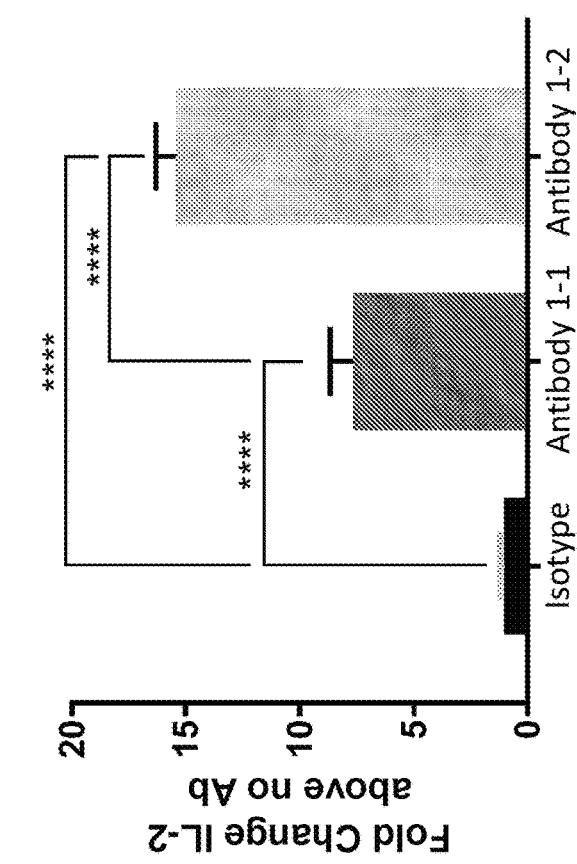
FIG. 4A
FIG. 4B

ANTI-CTLA4 ANTIBODIES AND METHODS OF USE THEREOF

CROSS-REFERENCE TO RELATED APPLICATIONS

This application is a 35 U.S.C. § 371 National Stage Application of International Application No. PCT/US19/68548, filed on Dec. 26, 2019, which claims priority from U.S. provisional application 62/785,111, filed Dec. 26, 2018, the content of which is incorporated by reference in its entirety.

SUBMISSION OF SEQUENCE LISTING ON ASCII TEXT FILE

The content of the following submission on ASCII text file is incorporated herein by reference in its entirety: a computer readable form (CRF) of the Sequence Listing (file name: 737762002540.txt, date recorded: Dec. 23, 2019, size: 39.5 KB).

FIELD OF THE INVENTION

This invention relates to anti-cytotoxic T-lymphocyte-associated protein 4 (CTLA4) binding proteins (e.g., anti-CTLA4 antibodies) and methods related to use of the same.

BACKGROUND OF THE INVENTION

Cancer is the second leading cause of death in the United States, accounting for more deaths than the next five leading causes (chronic respiratory disease, stroke, accidents, Alzheimer's disease and diabetes). While great strides have been made especially with targeted therapies, there remains a great deal of work to do in this space. Immunotherapy and a branch of this field, immuno-oncology, is creating viable and exciting therapeutic options for treating malignancies. Specifically, it is now recognized that one hallmark of cancer is immune evasion and significant efforts have identified targets and developed therapies to these targets to reactivate the immune system to recognize and treat cancer. In fact, the anti-cytotoxic T-lymphocyte-associated protein 4 (CTLA4) antibody, ipilimumab, has led to long-term survival of patients suffering from stage III/IV malignant melanoma. Ipilimumab is an immune checkpoint antagonist that interrupts the inhibition of T cells by blocking CTLA4, and may lead to the depletion of T Regulatory cells (Treg) (Korman, A., et al., 2005. Tumor immunotherapy: preclinical and clinical activity of anti-CTLA4 antibodies. Current Opinion in Investigational Drugs 6:582-591; Quezada et al., J. Exp. Med., 206 (8): 1717-1725, 2009; Selby et al. Cancer Immunol Res., 1 (1);32-42, 2013. Unfortunately, ipilimumab causes generalized (not tumor-specific) activation of T-cell dependent immune responses that leads to immune-related adverse effects which can be life-threatening and are often dose and treatment duration-limiting (Weber, J. S., et al., 2008. Phase I/II study of ipilimumab for patients with metastatic melanoma. Journal of Clinical Oncology 26:5950-5956). These include enterocolitis, dermatitis, hypophysitis, uveitis, hepatitis, nephritis and death. Enterocolitis is the most common major toxicity (affecting approximately 20% of patients). The severe safety risks related to immune-mediated adverse reactions prompted the FDA to approve ipilimumab with a Risk Evaluation and Mitigation Strategy (REMS). Recently, coadministration of ipilimumab and a second immune checkpoint modulator targeting PD1 (e.g., nivolumab) has been shown to significantly increase efficacy of immunotherapy of melanoma when compared to ipilimumab alone. This gain, however, was associated with increased frequencies of grade 3/4 adverse effects, which affected more than 50% of patients receiving combination treatment (Wolchok, J. D., et al. 2013. Nivolumab plus Ipilimumab in Advanced Melanoma. N Engl J Med).

These findings illustrate the need for developing anti-CTLA4 protein therapeutics that effectively target tumors without the side effects associated with certain anti-CTLA4 antibodies such as ipilimumab. Provided herein are anti-CTLA binding proteins, compositions thereof and methods of use thereof for addressing this need.

All references cited herein, including patent applications, patent publications, and scientific literature, are herein incorporated by reference in their entirety, as if each individual reference were specifically and individually indicated to be incorporated by reference.

SUMMARY OF THE INVENTION

Provided herein are anti-cytotoxic T-lymphocyte-associated protein 4 (CTLA4) binding proteins, compositions comprising thereof, and methods of using the same.

Provided herein are anti-CTLA4 antibodies or antigen-binding fragment thereof comprising a light chain variable (VL) domain and a heavy chain variable (VH) domain, wherein: the VL domain comprises a CDR-L1 comprising the amino acid sequence of SEQ ID NO: 1, a CDR-L2 comprising the amino acid sequence of SEQ ID NO: 2, and a CDR-L3 comprising the amino acid sequence of SEQ ID NO: 3; and/or the VH domain comprises a CDR-H1 comprising the amino acid sequence of SEQ ID NO: 4, a CDR-H2 comprising the amino acid sequence of SEQ ID NO: 5, and a CDR-H3 comprising the amino acid sequence of SEQ ID NO: 6; or the VL domain comprises a CDR-L1 comprising the amino acid sequence of SEQ ID NO: 13, a CDR-L2 comprising the amino acid sequence of SEQ ID NO: 14, and a CDR-L3 comprising the amino acid sequence of SEQ ID NO: 15; and/or the VH domain comprises a CDR-H1 comprising the amino acid sequence of SEQ ID NO: 16, a CDR-H2 comprising the amino acid sequence of SEQ ID NO: 17, and a CDR-H3 comprising the amino acid sequence of SEQ ID NO: 18; or the VL domain comprises a CDR-L1 comprising the amino acid sequence of SEQ ID NO: 7, a CDR-L2 comprising the amino acid sequence of SEQ ID NO: 8, and a CDR-L3 comprising the amino acid sequence of SEQ ID NO: 9; and/or the VH domain comprises a CDR-H1 comprising the amino acid sequence of SEQ ID NO: 10, a CDR-H2 comprising the amino acid sequence of SEQ ID NO: 11, and a CDR-H3 comprising the amino acid sequence of SEQ ID NO: 12; or the VL domain comprises a CDR-L1 comprising the amino acid sequence of SEQ ID NO: 19, a CDR-L2 comprising the amino acid sequence of SEQ ID NO: 20, and a CDR-L3 comprising the amino acid sequence of SEQ ID NO: 21; and/or the VH domain comprises a CDR-H1 comprising the amino acid sequence of SEQ ID NO: 22, a CDR-H2 comprising the amino acid sequence of SEQ ID NO: 23, and a CDR-H3 comprising the amino acid sequence of SEQ ID NO: 24.

Provided herein are anti-CTLA4 antibodies or antigen-binding fragment thereof comprising a light chain variable (VL) domain and a heavy chain variable (VH) domain, wherein the VL domain comprises a CDR-L1 comprising the amino acid sequence of SEQ ID NO: 1, a CDR-L2 comprising the amino acid sequence of SEQ ID NO: 2, and a CDR-L3 comprising the amino acid sequence of SEQ ID NO: 3; and/or the VH domain comprises a CDR-H1 comprising the amino acid sequence of SEQ ID NO: 4, a CDR-H2 comprising the amino acid sequence of SEQ ID NO: 5, and a CDR-H3 comprising the amino acid sequence of SEQ ID NO: 6.

Provided herein are anti-CTLA4 antibodies or antigen-binding fragment thereof comprising a light chain variable (VL) domain and a heavy chain variable (VH) domain, wherein the VL domain comprises a CDR-L1 comprising the amino acid sequence of SEQ ID NO: 13, a CDR-L2 comprising the amino acid sequence of SEQ ID NO: 14, and a CDR-L3 comprising the amino acid sequence of SEQ ID NO: 15; and/or the VH domain comprises a CDR-H1 comprising the amino acid sequence of SEQ ID NO: 16, a CDR-H2 comprising the amino acid sequence of SEQ ID NO: 17, and a CDR-H3 comprising the amino acid sequence of SEQ ID NO: 18.

Provided herein are anti-CTLA4 antibodies or antigen-binding fragment thereof comprising a light chain variable (VL) domain and a heavy chain variable (VH) domain, wherein the VL domain comprises a CDR-L1 comprising the amino acid sequence of SEQ ID NO: 7, a CDR-L2 comprising the amino acid sequence of SEQ ID NO: 8, and a CDR-L3 comprising the amino acid sequence of SEQ ID NO: 9; and/or the VH domain comprises a CDR-H1 comprising the amino acid sequence of SEQ ID NO: 10, a CDR-H2 comprising the amino acid sequence of SEQ ID NO: 11, and a CDR-H3 comprising the amino acid sequence of SEQ ID NO: 12.

Provided herein are anti-CTLA4 antibodies or antigen-binding fragment thereof comprising a light chain variable (VL) domain and a heavy chain variable (VH) domain, wherein the VL domain comprises a CDR-L1 comprising the amino acid sequence of SEQ ID NO: 19, a CDR-L2 comprising the amino acid sequence of SEQ ID NO: 20, and a CDR-L3 comprising the amino acid sequence of SEQ ID NO: 21; and/or the VH domain comprises a CDR-H1 comprising the amino acid sequence of SEQ ID NO: 22, a CDR-H2 comprising the amino acid sequence of SEQ ID NO: 23, and a CDR-H3 comprising the amino acid sequence of SEQ ID NO: 24.

In some of any of the provided of the provided embodiments, the VL domain comprises an amino acid sequence that has at least about 90% sequence identity to the amino acid sequence of SEQ ID NO: 25, and the VH domain comprises an amino acid sequence that has at least about 90% sequence identity to the amino acid sequence of SEQ ID NO: 26; or the VL domain comprises an amino acid sequence that has at least about 90% sequence identity to the amino acid sequence of SEQ ID NO: 30, and the VH domain comprises an amino acid sequence that has at least about 90% sequence identity to the amino acid sequence of SEQ ID NO: 31.

In some of any of the provided embodiments, the VL domain comprises an amino acid sequence that has at least about 90% sequence identity to the amino acid sequence of SEQ ID NO: 25, and the VH domain comprises an amino acid sequence that has at least about 90% sequence identity to the amino acid sequence of SEQ ID NO: 26. In some of any of the provided embodiments, the VL domain comprises an amino acid sequence that has at least about 90% sequence identity to the amino acid sequence of SEQ ID NO: 30, and the VH domain comprises an amino acid sequence that has at least about 90% sequence identity to the amino acid sequence of SEQ ID NO: 31.

In some of any of the provided embodiments, the VL domain comprises the amino acid sequence of SEQ ID NO: 25, and the VH domain comprises the amino acid sequence of SEQ ID NO: 26; or the VL domain comprises the amino acid sequence of SEQ ID NO: 30, and the VH domain comprises the amino acid sequence of SEQ ID NO: 31.

Provided herein are anti-CTLA4 antibodies or antigen-binding fragment thereof comprising a light chain variable (VL) domain and a heavy chain variable (VH) domain, wherein: the VL domain comprises the amino acid sequence of SEQ ID NO: 25 and/or the VH domain comprises the amino acid sequence of SEQ ID NO: 26; or the VL domain comprises the amino acid sequence of SEQ ID NO: 30 and/or the VH domain comprises the amino acid sequence of SEQ ID NO: 31.

In some of any of the provided embodiments, the VL domain comprises the amino acid sequence of SEQ ID NO: 25, and the VH domain comprises the amino acid sequence of SEQ ID NO: 26. In some of any of the provided embodiments, the VL domain comprises the amino acid sequence of SEQ ID NO: 30, and the VH domain comprises the amino acid sequence of SEQ ID NO: 31.

In some of any of the provided embodiments, the antibody or antigen-binding fragment thereof comprises a heavy chain constant domain (CH). In some of any of the provided embodiments, the antibody or antigen-binding fragment thereof comprises a CH sequence selected from the group consisting of SEQ ID NOS: 35-38. In some of any of the provided embodiments, the CH comprises amino acid substitutions S239D or I332E or both, wherein the amino acid residues are numbered according to the EU index as in Kabat. In some of any of the provided embodiments, the antibody or antigen-binding fragment thereof comprises a CH sequence of SEQ ID NO: 38.

In some of any embodiments, the antibody or antigen-binding fragment thereof comprises a light chain constant domain (CL). In some of any embodiments, the antibody or antigen-binding fragment thereof comprises a CL sequence of SEQ ID NO:39.

In some of any embodiments, the light chain comprises the amino acid sequence of SEQ ID NO: 27, and the heavy chain comprises the amino acid sequence of SEQ ID NO: 29; or the light chain comprises the amino acid sequence of SEQ ID NO: 32, and the heavy chain comprises the amino acid sequence of SEQ ID NO: 34.

Provided herein are anti-CTLA4 antibodies or antigen-binding fragment thereof comprising a light chain comprising the amino acid sequence of SEQ ID NO: 27 and a heavy chain comprising the amino acid sequence of SEQ ID NO: 29.

Provided herein are anti-CTLA4 antibodies or antigen-binding fragment thereof comprising a light chain comprising the amino acid sequence of SEQ ID NO: 32 and a heavy chain comprising the amino acid sequence of SEQ ID NO: 34.

In some of any embodiments, the antibody or antigen-binding fragment thereof is afucosylated or fucose-deficient.

In some of any embodiments, the anti-CTLA4 antibody or antigen-binding fragment thereof is conjugated to an agent. In some of any embodiments, the agent is an inhibitor of tubulin polymerization, a DNA damaging agent, or a DNA synthesis inhibitor. In some of any embodiments, the agent is a maytansinoid, an auristatin, a pyrrolobenzodiazepine (PBD) dimer, a calicheamicin, a duocarmycin, a indolinobenzodiazepine dimer, or exatecan derivative Dxd.

Provided herein are bispecific antibodies or an antigen-binding fragment thereof, comprising a light chain and a heavy chain of a first pair that specifically binds to CTLA4; a light chain and a heavy chain of a second pair that specifically binds to an antigen; wherein the light chain of the first pair comprises a VL domain, and the heavy chain of the first pair comprises a VH domain and wherein: the VL domain comprises a CDR-L1 comprising the amino acid sequence of SEQ ID NO: 1, a CDR-L2 comprising the amino acid sequence of SEQ ID NO: 2, and a CDR-L3 comprising the amino acid sequence of SEQ ID NO: 3; and/or the VH domain comprises a CDR-H1 comprising the amino acid sequence of SEQ ID NO: 4, a CDR-H2 comprising the amino acid sequence of SEQ ID NO: 5, and a CDR-H3 comprising the amino acid sequence of SEQ ID NO: 6; or the VL domain comprises a CDR-L1 comprising the amino acid sequence of SEQ ID NO: 13, a CDR-L2 comprising the amino acid sequence of SEQ ID NO: 14, and a CDR-L3 comprising the amino acid sequence of SEQ ID NO: 15; and/or the VH domain comprises a CDR-H1 comprising the amino acid sequence of SEQ ID NO: 16, a CDR-H2 comprising the amino acid sequence of SEQ ID NO: 17, and a CDR-H3 comprising the amino acid sequence of SEQ ID NO: 18; or the VL domain comprises a CDR-L1 comprising the amino acid sequence of SEQ ID NO: 7, a CDR-L2 comprising the amino acid sequence of SEQ ID NO: 8, and a CDR-L3 comprising the amino acid sequence of SEQ ID NO: 9; and/or the VH domain comprises a CDR-H1 comprising the amino acid sequence of SEQ ID NO: 10, a CDR-H2 comprising the amino acid sequence of SEQ ID NO: 11, and a CDR-H3 comprising the amino acid sequence of SEQ ID NO: 12; or the VL domain comprises a CDR-L1 comprising the amino acid sequence of SEQ ID NO: 19, a CDR-L2 comprising the amino acid sequence of SEQ ID NO: 20, and a CDR-L3 comprising the amino acid sequence of SEQ ID NO: 21; and/or the VH domain comprises a CDR-H1 comprising the amino acid sequence of SEQ ID NO: 22, a CDR-H2 comprising the amino acid sequence of SEQ ID NO: 23, and a CDR-H3 comprising the amino acid sequence of SEQ ID NO: 24.

Provided herein are bispecific antibodies or an antigen-binding fragment thereof, comprising a light chain and a heavy chain of a first pair that specifically binds to CTLA4; a light chain and a heavy chain of a second pair that specifically binds to an antigen; wherein the light chain of the first pair comprises a VL domain, and the heavy chain of the first pair comprises a VH domain and wherein the VL domain comprises a CDR-L1 comprising the amino acid sequence of SEQ ID NO: 1, a CDR-L2 comprising the amino acid sequence of SEQ ID NO: 2, and a CDR-L3 comprising the amino acid sequence of SEQ ID NO: 3; and/or the VH domain comprises a CDR-H1 comprising the amino acid sequence of SEQ ID NO: 4, a CDR-H2 comprising the amino acid sequence of SEQ ID NO: 5, and a CDR-H3 comprising the amino acid sequence of SEQ ID NO: 6.

Provided herein are bispecific antibodies or an antigen-binding fragment thereof, comprising a light chain and a heavy chain of a first pair that specifically binds to CTLA4; a light chain and a heavy chain of a second pair that specifically binds to an antigen; wherein the light chain of the first pair comprises a VL domain, and the heavy chain of the first pair comprises a VH domain and wherein the VL domain comprises a CDR-L1 comprising the amino acid sequence of SEQ ID NO: 13, a CDR-L2 comprising the amino acid sequence of SEQ ID NO: 14, and a CDR-L3 comprising the amino acid sequence of SEQ ID NO: 15; and/or the VH domain comprises a CDR-H1 comprising the amino acid sequence of SEQ ID NO: 16, a CDR-H2 comprising the amino acid sequence of SEQ ID NO: 17, and a CDR-H3 comprising the amino acid sequence of SEQ ID NO: 18.

Provided herein are bispecific antibodies or an antigen-binding fragment thereof, comprising a light chain and a heavy chain of a first pair that specifically binds to CTLA4; a light chain and a heavy chain of a second pair that specifically binds to an antigen; wherein the light chain of the first pair comprises a VL domain, and the heavy chain of the first pair comprises a VH domain and wherein the VL domain comprises a CDR-L1 comprising the amino acid sequence of SEQ ID NO: 7, a CDR-L2 comprising the amino acid sequence of SEQ ID NO: 8, and a CDR-L3 comprising the amino acid sequence of SEQ ID NO: 9; and/or the VH domain comprises a CDR-H1 comprising the amino acid sequence of SEQ ID NO: 10, a CDR-H2 comprising the amino acid sequence of SEQ ID NO: 11, and a CDR-H3 comprising the amino acid sequence of SEQ ID NO: 12.

Provided herein are bispecific antibodies or an antigen-binding fragment thereof, comprising a light chain and a heavy chain of a first pair that specifically binds to CTLA4; a light chain and a heavy chain of a second pair that specifically binds to an antigen; wherein the light chain of the first pair comprises a VL domain, and the heavy chain of the first pair comprises a VH domain and wherein the VL domain comprises a CDR-L1 comprising the amino acid sequence of SEQ ID NO: 19, a CDR-L2 comprising the amino acid sequence of SEQ ID NO: 20, and a CDR-L3 comprising the amino acid sequence of SEQ ID NO: 21; and/or the VH domain comprises a CDR-H1 comprising the amino acid sequence of SEQ ID NO: 22, a CDR-H2 comprising the amino acid sequence of SEQ ID NO: 23, and a CDR-H3 comprising the amino acid sequence of SEQ ID NO: 24.

In some of any embodiments, the VL domain comprises an amino acid sequence that has at least about 90% sequence identity to the amino acid sequence of SEQ ID NO: 25, and the VH domain comprises an amino acid sequence that has at least about 90% sequence identity to the amino acid sequence of SEQ ID NO: 26; or the VL domain comprises an amino acid sequence that has at least about 90% sequence identity to the amino acid sequence of SEQ ID NO: 30, and the VH domain comprises an amino acid sequence that has at least about 90% sequence identity to the amino acid sequence of SEQ ID NO: 31.

Provided herein are bispecific antibodies or an antigen-binding fragment thereof, comprising a light chain and a heavy chain of a first pair that specifically binds to CTLA4; a light chain and a heavy chain of a second pair that specifically binds to an antigen; wherein the light chain of the first pair comprises a VL domain, and the heavy chain of the first pair comprises a VH domain and wherein: the VL domain comprises the amino acid sequence of SEQ ID NO: 25 and/or the VH domain comprises the amino acid sequence of SEQ ID NO: 26; or the VL domain comprises the amino acid sequence of SEQ ID NO: 30 and/or the VH domain comprises the amino acid sequence of SEQ ID NO: 31.

In some of any embodiments, the VL domain comprises the amino acid sequence of SEQ ID NO: 25, and the VH domain comprises the amino acid sequence of SEQ ID NO: 26; or the VL domain comprises the amino acid sequence of SEQ ID NO: 30, and the VH domain comprises the amino acid sequence of SEQ ID NO: 31.

In some of any embodiments, the bispecific antibody or antigen-binding fragment thereof comprises a heavy chain constant domain (CH). In some of any embodiments, the bispecific antibody or antigen-binding fragment thereof comprises a CH sequence selected from the group consisting of SEQ ID NOS: 35-38. In some of any embodiments, the CH comprises amino acid substitutions S239D or I332E or both, wherein the amino acid residues are numbered according to the EU index as in Kabat. In some of any embodiments, the bispecific antibody or antigen-binding fragment thereof comprises a CH sequence of SEQ ID NO: 38.

In some of any embodiments, the bispecific antibody or antigen-binding fragment thereof comprises a light chain constant domain (CL). In some of any embodiments, the bispecific antibody or antigen-binding fragment thereof comprises a CL sequence of SEQ ID NO: 39.

In some of any embodiments, the light chain comprises the amino acid sequence of SEQ ID NO: 27, and the heavy chain comprises the amino acid sequence of SEQ ID NO: 29; or the light chain comprises the amino acid sequence of SEQ ID NO: 32, and the heavy chain comprises the amino acid sequence of SEQ ID NO: 34.

Provided herein are bispecific antibodies or an antigen-binding fragment thereof, comprising a light chain and a heavy chain of a first pair that specifically binds to CTLA4; a light chain and a heavy chain of a second pair that specifically binds to an antigen; wherein the first pair comprises a light chain comprising the amino acid sequence of SEQ ID NO: 27 and a heavy chain comprising the amino acid sequence of SEQ ID NO: 29.

Provided herein are bispecific antibodies or an antigen-binding fragment thereof, comprising a light chain and a heavy chain of a first pair that specifically binds to CTLA4; a light chain and a heavy chain of a second pair that specifically binds to an antigen; wherein the first pair comprises a light chain comprising the amino acid sequence of SEQ ID NO: 32 and a heavy chain comprising the amino acid sequence of SEQ ID NO: 34.

In some of any embodiments, the bispecific antibody or antigen-binding fragment thereof is afucosylated or fucose-deficient.

In some of any embodiments, the bispecific antibody or antigen-binding fragment thereof is conjugated to an agent. In some of any embodiments, the agent is an inhibitor of tubulin polymerization, a DNA damaging agent, or a DNA synthesis inhibitor. In some of any embodiments, the agent is a maytansinoid, an auristatin, a pyrrolobenzodiazepine (PBD) dimer, a calicheamicin, a duocarmycin, a indolinobenzodiazepine dimer, or exatecan derivative Dxd.

Also provided herein are nucleic acids encoding any of the provided anti-CTLA4 antibody or antigen-binding fragment thereof or any of the provided bispecific antibody or antigen-binding fragment thereof.

Also provided are vectors comprising any of the nucleic acids provided herein.

Also provided are host cells comprising any of the provided anti-CTLA4 antibody or antigen-binding fragment thereof, any of the provided bispecific antibody or antigen-binding fragment thereof, or any of the nucleic acids provided herein.

In some of any such embodiments, the host cell is capable of producing an antibody or antigen-binding fragment thereof that is afucosylated or fucose-deficient. In some of any such embodiments, the host cell has an alpha1,6-fucosyltransferase (Fut8) knockout. In some of any such embodiments, the host cell overexpresses β1,4-N-acetylglycosminyltransferase III (GnT-III). In some of any such embodiments, the host cell overexpresses Golgi μ-mannosidase I (ManII).

Also provided are methods of producing an antibody or antigen-binding fragment thereof, that involve culturing any of the provided host cells under conditions that produce the antibody or antigen-binding fragment thereof.

Also provided are methods of producing an afucosylated or fucose-deficient antibody or antigen-binding fragment thereof, that involve culturing any of the provided host cells under conditions that produce the antibody or antigen-binding fragment thereof.

In some of any such embodiments, the methods also involve recovering the antibody or antigen-binding fragment thereof produced by the host cell.

Also provided are antibodies or antigen-binding fragment thereof produced by any of the methods of producing antibodies or antigen-binding fragment thereof provided herein.

Also provided are compositions comprising any of the provided anti-CTLA4 antibody or antigen-binding fragment thereof, any of the provided bispecific antibody or antigen-binding fragment thereof or any of the provided antibody or antigen-binding fragment thereof.

Also provided are pharmaceutical compositions comprising any of the provided anti-CTLA4 antibody or antigen-binding fragment thereof, any of the provided bispecific antibody or antigen-binding fragment thereof or any of the provided antibody or antigen-binding fragment thereof and a pharmaceutically acceptable carrier.

Also provided are pharmaceutical compositions comprising any of the provided anti-CTLA4 antibody or antigen-binding fragment thereof, any of the provided bispecific antibody or antigen-binding fragment thereof or any of the provided antibody or antigen-binding fragment thereof and a pharmaceutically acceptable carrier, for use in treating or preventing a neoplastic disease in a subject.

Also provided are uses of a pharmaceutical composition comprising any of the provided anti-CTLA4 antibody or antigen-binding fragment thereof, any of the provided bispecific antibody or antigen-binding fragment thereof or any of the provided antibody or antigen-binding fragment thereof and a pharmaceutically acceptable carrier, in the manufacture of a medicament for treating or preventing a neoplastic disease in a subject.

Also provided are kits comprising any of the provided anti-CTLA4 antibody or antigen-binding fragment thereof, any of the provided bispecific antibody or antigen-binding fragment thereof or any of the provided antibody or antigen-binding fragment thereof.

Also provided are method of treating or preventing a neoplastic disease in a subject, the method involving administering to a subject an effective amount any of the provided anti-CTLA4 antibody or antigen-binding fragment thereof, any of the provided bispecific antibody or antigen-binding fragment thereof, any of the provided antibody or antigen-binding fragment thereof or any of the provided compositions.

It is to be understood that one, some, or all of the properties of the various embodiments described herein may be combined to form other embodiments of the present invention. These and other aspects of the invention will become apparent to one of skill in the art. These and other embodiments of the invention are further described by the detailed description that follows.

BRIEF DESCRIPTION OF THE DRAWINGS

FIG. 1A shows the binding of forms of Antibody 1 (Antibody 1-1 and Antibody 1-2) to human CTLA4-Fc across a range of antibody concentrations, which demonstrated similar binding among the antibodies shown. FIG. 1B shows the binding of forms of Antibody 2 (Antibody 2-1, Antibody 2-2, Antibody 2-3, Antibody 2-4, and Antibody 2-5) to human CTLA4-Fc across a range of antibody concentrations, which demonstrated similar binding among the antibodies shown.

FIGS. 4A-4D are graphs depicting IL-2 levels (pg/mL) (FIGS. 4A and 4C) or fold changes in IL-2 levels (FIGS. 4B and 4D) as determined using a Staphylococcal enterotoxin B (SEB) assay, for Antibody 1 and Antibody 2. Antibody 1 (Antibody 1-1 and 1-2) (FIGS. 4A and 4B) and Antibody 2 (Antibody 2-1, Antibody 2-2, Antibody 2-3, Antibody 2-4, and Antibody 2-5) (FIGS. 4C and 4D) were tested for their ability to promote IL-2 production from peripheral mononuclear cells using an SEB assay. All tested forms of Antibody 1 and Antibody 2 demonstrated the ability to increase IL-2 levels as compared to a no-antibody control (FIGS. 4A and 4C).

FIG. 7A (group average) and FIG. 7B (individual mice) shows tumor volume ($mm^3$) over time for mice injected with Antibody 2-6, ipilimumab, or an afucosylated form of ipilimumab (ipilimumab-aFuc); FIG. 7C (20 μg), FIG. 7D (7 μg) and FIG. 7E (2 μg) show a comparison of tumor volume ($mm^3$) over time at each dose of the different antibodies.

DETAILED DESCRIPTION

Figure 1A:
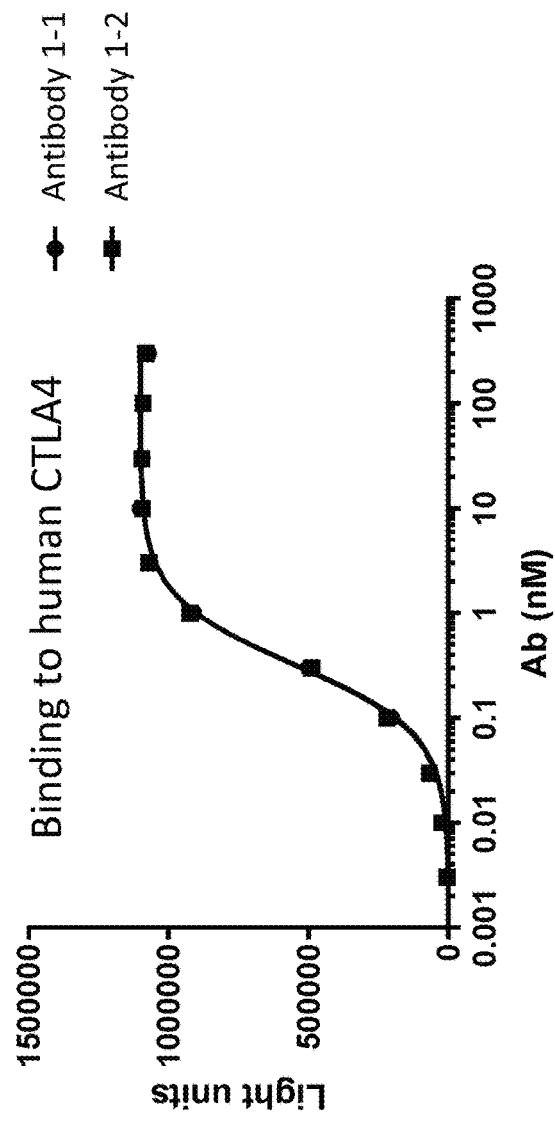
FIGS. 1A-1B are graphs showing the binding of anti-CTLA4 antibodies to human CTLA4-Fc across a range of antibody concentrations.

Therapeutics such as checkpoint inhibitors demonstrates unprecedented responses in cancer but their use is limited by immune-related adverse events (irAEs) and other toxicities (e.g., hypophysitis). Provided herein are protein therapeutics that bind CTLA4, for example in a tumor microenvironment, to achieve increased durable response rates and improved safety profiles. Improved binding affinity, increased functional activity such as ADCC, and other advantages as described herein of the provided CTLA4-binding proteins, such as antibodies, bispecific antibodies or antigen-binding fragments thereof, can lead to improved response to the therapy and improved safety profiles, such as reducing or minimizing adverse events that can be associated with certain immunotherapies.

I. Definitions.

Before describing the invention in detail, it is to be understood that this invention is not limited to particular compositions or biological systems, which can, of course, vary. It is also to be understood that the terminology used herein is for the purpose of describing particular embodiments only, and is not intended to be limiting. As used in this specification and the appended claims, the singular forms "a", "an" and "the" include plural referents unless the content clearly dictates otherwise. Thus, for example, reference to "an antibody" optionally includes a combination of two or more such antibodies, and the like.

The term "about" as used herein refers to the usual error range for the respective value readily known to the skilled person in this technical field. Reference to "about" a value or parameter herein includes (and describes) embodiments that are directed to that value or parameter per se.

It is understood that aspects and embodiments of the invention described herein include "comprising," "consisting," and "consisting essentially of" aspects and embodiments.

The term "antibody" includes polyclonal antibodies, monoclonal antibodies (including full length antibodies which have an immunoglobulin Fc region), antibody compositions with polyepitopic specificity, multispecific antibodies (e.g., bispecific antibodies, diabodies, and single-chain molecules, as well as antibody fragments (e.g., Fab, F(ab')2, and Fv). The term "immunoglobulin" (Ig) is used interchangeably with "antibody" herein.

The basic 4-chain antibody unit is a heterotetrameric glycoprotein composed of two identical light (L) chains and two identical heavy (H) chains. An IgM antibody consists of 5 of the basic heterotetramer units along with an additional polypeptide called a J chain, and contains 10 antigen binding sites, while IgA antibodies comprise from 2-5 of the basic 4-chain units which can polymerize to form polyvalent assemblages in combination with the J chain. In the case of IgGs, the 4-chain unit is generally about 150,000 daltons. Each L chain is linked to an H chain by one covalent disulfide bond, while the two H chains are linked to each other by one or more disulfide bonds depending on the H chain isotype. Each H and L chain also has regularly spaced intrachain disulfide bridges. Each H chain has at the N-terminus, a variable domain (VH) followed by three constant domains (CH) for each of the α and γ chains and four CH domains for μ and ε isotypes. Each L chain has at the N-terminus, a variable domain (VL) followed by a constant domain at its other end. The VL is aligned with the VH and the CL is aligned with the first constant domain of the heavy chain (CH1). Particular amino acid residues are believed to form an interface between the light chain and heavy chain variable domains. The pairing of a VH and VL together forms a single antigen-binding site. For the structure and properties of the different classes of antibodies, see e.g., Basic and Clinical Immunology, 8th Edition, Daniel P. Sties, Abba I. Terr and Tristram G. Parsolw (eds), Appleton & Lange, Norwalk, CT, 1994, page 71 and Chapter 6.

The L chain from any vertebrate species can be assigned to one of two clearly distinct types, called kappa and lambda, based on the amino acid sequences of their constant domains. Depending on the amino acid sequence of the constant domain of their heavy chains (CH), immunoglobulins can be assigned to different classes or isotypes. There are five classes of immunoglobulins: IgA, IgD, IgE, IgG and IgM, having heavy chains designated α, δ, ε, γ and μ, respectively. The α and α classes are further divided into subclasses on the basis of relatively minor differences in the CH sequence and function, e.g., humans express the following subclasses: IgG1, IgG2, IgG3, IgG4, IgA1 and IgA2. IgG1 antibodies can exist in multiple polymorphic variants termed allotypes (reviewed in Jefferis and Lefranc 2009. mAbs Vol 1 Issue 4 1-7) any of which are suitable for use in the invention. Common allotypic variants in human populations are those designated by the letters a,f,n,z.

An "isolated" antibody is one that has been identified, separated and/or recovered from a component of its production environment (e.g., naturally or recombinantly). In some embodiments, the isolated polypeptide is free of association with all other components from its production environment. Contaminant components of its production environment, such as that resulting from recombinant transfected cells, are materials that would typically interfere with research, diagnostic or therapeutic uses for the antibody, and may include enzymes, hormones, and other proteinaceous or non-proteinaceous solutes. In some embodiments, the polypeptide is purified: (1) to greater than 95% by weight of antibody as determined by, for example, the Lowry method, and in some embodiments, to greater than 99% by weight; (1) to a degree sufficient to obtain at least 15 residues of N-terminal or internal amino acid sequence by use of a spinning cup sequenator, or (3) to homogeneity by SDS-PAGE under non-reducing or reducing conditions using Coomassie blue or silver stain. Isolated antibody includes the antibody in situ within recombinant cells since at least one component of the antibody's natural environment will not be present. Ordinarily, however, an isolated polypeptide or antibody is prepared by at least one purification step.

The term "monoclonal antibody" as used herein refers to an antibody obtained from a population of substantially homogeneous antibodies, i.e., the individual antibodies comprising the population are identical except for possible naturally occurring mutations and/or post-translation modifications (e.g., isomerizations, amidations) that may be present in minor amounts. In some embodiments, monoclonal antibodies have a C-terminal cleavage at the heavy chain and/or light chain. For example, 1, 2, 3, 4, or 5 amino acid residues are cleaved at the C-terminus of heavy chain and/or light chain. In some embodiments, the C-terminal cleavage removes a C-terminal lysine from the heavy chain. In some embodiments, monoclonal antibodies have an N-terminal cleavage at the heavy chain and/or light chain. For example, 1, 2, 3, 4, or 5 amino acid residues are cleaved at the N-terminus of heavy chain and/or light chain. In some embodiments truncated forms of monoclonal antibodies can be made by recombinant techniques. In some embodiments, monoclonal antibodies are highly specific, being directed against a single antigenic site. In some embodiments, monoclonal antibodies are highly specific, being directed against multiple antigenic sites (such as a bispecific antibody or a multispecific antibody). The modifier "monoclonal" indicates the character of the antibody as being obtained from a substantially homogeneous population of antibodies, and is not to be construed as requiring production of the antibody by any particular method. For example, the monoclonal antibodies to be used in accordance with the present invention may be made by a variety of techniques, including, for example, the hybridoma method, recombinant DNA methods, phage-display technologies, and technologies for producing human or human-like antibodies in animals that have parts or all of the human immunoglobulin loci or genes encoding human immunoglobulin sequences.

The term "naked antibody" refers to an antibody that is not conjugated to a cytotoxic moiety or radiolabel.

The term "parental antibody" refers to an antibody prior to modification.

An "antibody-drug conjugate" or "ADC" refers to an antibody conjugated to one or more heterologous molecule(s), including but not limited to a cytotoxic agent.

The terms "full-length antibody," "intact antibody" or "whole antibody" are used interchangeably to refer to an antibody in its substantially intact form, as opposed to an antibody fragment. Specifically, whole antibodies include those with heavy and light chains including an Fc region. The constant domains may be native sequence constant domains (e.g., human native sequence constant domains) or amino acid sequence variants thereof. In some cases, the intact antibody may have one or more effector functions.

An "antibody fragment" comprises a portion of an intact antibody, the antigen binding and/or the variable region of the intact antibody. Examples of antigen-binding antibody fragments include domain antibodies (dAbs), Fab, Fab', F(ab')2 and Fv fragments; diabodies; linear antibodies (see U.S. Pat. No. 5,641,870, Example 2; Zapata et al., Protein Eng. 8 (10): 1057-1062 [1995]); single-chain antibody molecules, and multispecific antibodies formed from antibody fragments. Single heavy chain antibodies or single light chain antibodies can be engineered, or in the case of the heavy chain, can be isolated from camelids, shark, libraries or mice engineered to produce single heavy chain molecules.

Papain digestion of antibodies produced two identical antigen-binding fragments, called "Fab" fragments, and a residual "Fc" fragment, a designation reflecting the ability to crystallize readily. The Fab fragment consists of an entire L chain along with the variable region domain of the H chain (VH), and the first constant domain of one heavy chain (CH1). Each Fab fragment is monovalent with respect to antigen binding, i.e., it has a single antigen-binding site. Pepsin treatment of an antibody yields a single large F(ab')2 fragment which roughly corresponds to two disulfide linked Fab fragments having different antigen-binding activity and is still capable of cross-linking antigen. Fab' fragments differ from Fab fragments by having a few additional residues at the carboxy terminus of the CH1 domain including one or more cysteines from the antibody hinge region. Fab'-SH is the designation herein for Fab' in which the cysteine residue (s) of the constant domains bear a free thiol group. F(ab')2 antibody fragments originally were produced as pairs of Fab' fragments which have hinge cysteines between them. Other chemical couplings of antibody fragments are also known.

The Fc fragment comprises the carboxy-terminal portions of both H chains held together by disulfides. The effector functions of antibodies are determined by sequences and glycan in the Fc region, the region which is also recognized by Fc receptors (FcR) found on certain types of cells.

"Fv" is the minimum antibody fragment which contains a complete antigen-recognition and -binding site. This fragment consists of a dimer of one heavy- and one light-chain variable region domain in tight, non-covalent association. From the folding of these two domains emanate six hypervariable loops (3 loops each from the H and L chain) that contribute the amino acid residues for antigen binding and confer antigen binding specificity to the antibody. However, even a single variable domain (or half of an Fv comprising only three HVRs specific for an antigen) has the ability to recognize and bind antigen, although at a lower affinity than the entire binding site.

"Single-chain Fv" also abbreviated as "sFv" or "scFv" are antibody fragments that comprise the VH and VL antibody domains connected into a single polypeptide chain. In some embodiments, the sFv polypeptide further comprises a polypeptide linker between the VH and VL domains which enables the sFv to form the desired structure for antigen binding. For a review of the sFv, see Pluckthun in The Pharmacology of Monoclonal Antibodies, vol. 113, Rosenburg and Moore eds., Springer-Verlag, New York, pp. 269-315 (1994).

"Functional fragments" of the antibodies of the invention comprise a portion of an intact antibody, generally including the antigen binding or variable region of the intact antibody or the Fv region of an antibody which retains or has modified FcR binding capability. Examples of antibody fragments include linear antibody, single-chain antibody molecules and multispecific antibodies formed from antibody fragments.

The monoclonal antibodies herein specifically include "chimeric" antibodies (immunoglobulins) in which a portion of the heavy and/or light chain is identical with or homologous to corresponding sequences in antibodies derived from a particular species or belonging to a particular antibody class or subclass, while the remainder of the chain(s) is (are) identical with or homologous to corresponding sequences in antibodies derived from another species or belonging to another antibody class or subclass, as well as fragments of such antibodies, so long as they exhibit the desired biological activity (U.S. Pat. No. 4,816,567; Morrison et al., Proc. Natl. Acad. Sci. USA, 81:6851-6855 (1984)). Chimeric antibodies of interest herein include PRIMATIZED® antibodies wherein the antigen-binding region of the antibody is derived from an antibody produced by, e.g., immunizing macaque monkeys with an antigen of interest. As used herein, "humanized antibody" is used as a subset of "chimeric antibodies."

"Humanized" forms of non-human (e.g., murine) antibodies are chimeric antibodies that contain minimal sequence derived from non-human immunoglobulin. In one embodiment, a humanized antibody is a human immunoglobulin (recipient antibody) in which residues from an HVR of the recipient are replaced by residues from an HVR of a non-human species (donor antibody) such as murine, rat, rabbit or non-human primate having the desired specificity, affinity, and/or capacity. In some instances, FR residues of the human immunoglobulin are replaced by corresponding non-human residues. Furthermore, humanized antibodies may comprise residues that are not found in the recipient antibody or in the donor antibody. These modifications may be made to further refine antibody performance, such as binding affinity. In general, a humanized antibody will comprise substantially all of at least one, and typically two, variable domains, in which all or substantially all of the hypervariable loops correspond to those of a non-human immunoglobulin sequence, and all or substantially all of the FR regions are those of a human immunoglobulin sequence, although the FR regions may include one or more individual FR residue substitutions that improve antibody performance, such as binding affinity, isomerization, immunogenicity, etc. In some embodiments, the number of these amino acid substitutions in the FR are no more than 6 in the H chain, and in the L chain, no more than 3. The humanized antibody optionally will also comprise at least a portion of an immunoglobulin constant region (Fc), typically that of a human immunoglobulin. For further details, see, e.g., Jones et al., Nature 321:522-525 (1986); Riechmann et al., Nature 332: 323-329 (1988); and Presta, Curr. Op. Struct. Biol. 2:593-596 (1992). See also, for example, Vaswani and Hamilton, Ann. Allergy, Asthma & Immunol. 1:105-115 (1998); Harris, Biochem. Soc. Transactions 23:1035-1038 (1995); Hurle and Gross, Curr. Op. Biotech. 5:428-433 (1994); and U.S. Pat. Nos. 6,982,321 and 7,087,409. In some embodiments, humanized antibodies are directed against a single antigenic site. In some embodiments, humanized antibodies are directed against multiple antigenic sites. An alternative humanization method is described in U.S. Pat. No. 7,981,843 and U.S. Patent Application Publication No. 2006/0134098.

The "variable region" or "variable domain" of an antibody refers to the amino-terminal domains of the heavy or light chain of the antibody. Accordingly, the terms "variable region" and "variable domain" as used herein may be used interchangeably. The variable domains of the heavy chain and light chain may be referred to as "VH" and "VL", respectively. These domains are generally the most variable parts of the antibody (relative to other antibodies of the same class) and contain the antigen binding sites. The variable domains of the heavy chain and the light chain can be determined using any available method or numbering scheme and may include the variable domains as described, e.g., in WO 2018/207701, the contents of which are hereby incorporated by reference. In some embodiments, the variable domain of the heavy chain and/or the light chain may lack one or more amino acid residues on the carboxyl terminus of the variable domain (i.e., at the carboxyl terminus of the fourth framework domain) that may otherwise be included in descriptions of the variable domain based on certain numbering schemes. In some embodiments, the variable domain of the heavy chain and/or the light chain may include one or more amino acid residues on the carboxyl terminus of the variable domain (i.e., at the carboxyl terminus of the fourth framework domain) that may otherwise not be included in descriptions of the variable domain based on certain numbering schemes.

The term "hypervariable region," "HVR," or "HV," when used herein refers to the regions of an antibody-variable domain that are hypervariable in sequence and/or form structurally defined loops. Generally, antibodies comprise six HVRs; three in the VH (H1, H2, H3), and three in the VL (L1, L2, L3). In native antibodies, H3 and L3 display the most diversity of the six HVRs, and H3 in particular is believed to play a unique role in conferring fine specificity to antibodies. See, e.g., Xu et al. Immunity 13:37-45 (2000); Johnson and Wu in Methods in Molecular Biology 248:1-25 (Lo, ed., Human Press, Totowa, NJ, 2003)). Indeed, naturally occurring camelid antibodies consisting of a heavy chain only are functional and stable in the absence of light chain. See, e.g., Hamers-Casterman et al., Nature 363:446-448 (1993) and Sheriff et al., Nature Struct. Biol. 3:733-736 (1996).

A number of HVR delineations are in use and are encompassed herein. The HVRs that are Kabat complementarity-determining regions (CDRs) are based on sequence variability and are the most commonly used (Kabat et al., Sequences of Proteins of Immunological Interest, 5th Ed. Public Health Service, National Institute of Health, Bethesda, MD (1991)). Chothia HVRs refer instead to the location of the structural loops (Chothia and Lesk J. Mol. Biol. 196:901-917 (1987)). The "contact" HVRs are based on an analysis of the available complex crystal structures. The residues from each of these HVRs are noted below.

| Loop | Kabat | Chothia | Contact | |
|------|---------|---------|----------|---|
| L1 | L24-L34 | L26-L34 | L30-L36 | |
| L2 | L50-L56 | L50-L56 | L46-L55 | |
| L3 | L89-L97 | L91-L96 | L89-L96 | |
| H1 | H31-H35B | H26-H32 | H30-H35B | (Kabat Numbering) |
| H1 | H31-H35 | H26-H32 | H30-H35 | (Chothia Numbering) |
| H2 | H50-H65 | H53-H56 | H47-H58 | |
| H3 | H95-H102 | H95-H102 | H93-H101 | |

Unless otherwise indicated, the variable-domain residues (HVR residues and framework region residues) are numbered according to Kabat et al., supra.

"Framework" or "FR" residues are those variable-domain residues other than the HVR residues as herein defined.

The expression "variable-domain residue-numbering as in Kabat" or "amino-acid-position numbering as in Kabat," and variations thereof, refers to the numbering system used for heavy-chain variable domains or light-chain variable domains of the compilation of antibodies in Kabat et al., supra. Using this numbering system, the actual linear amino acid sequence may contain fewer or additional amino acids corresponding to a shortening of, or insertion into, a FR or HVR of the variable domain. For example, a heavy-chain variable domain may include a single amino acid insert (residue 52a according to Kabat) after residue 52 of H2 and inserted residues (e.g. residues 82a, 82b, and 82c, etc. according to Kabat) after heavy-chain FR residue 82. The Kabat numbering of residues may be determined for a given antibody by alignment at regions of homology of the sequence of the antibody with a "standard" Kabat numbered sequence.

An "acceptor human framework" for the purposes herein is a framework comprising the amino acid sequence of a VL or VH framework derived from a human immunoglobulin framework or a human consensus framework. An acceptor human framework "derived from" a human immunoglobulin framework or a human consensus framework may comprise the same amino acid sequence thereof, or it may contain pre-existing amino acid sequence changes. In some embodiments, the number of pre-existing amino acid changes are 10 or less, 9 or less, 8 or less, 7 or less, 6 or less, 5 or less, 4 or less, 3 or less, or 2 or less.

"Percent (%) amino acid sequence identity" with respect to a reference polypeptide sequence is defined as the percentage of amino acid residues in a candidate sequence that are identical with the amino acid residues in the reference polypeptide sequence, after aligning the sequences and introducing gaps, if necessary, to achieve the maximum percent sequence identity, and not considering any conservative substitutions as part of the sequence identity. Alignment for purposes of determining percent amino acid sequence identity can be achieved in various ways that are within the skill in the art, for instance, using publicly available computer software such as BLAST, BLAST-2, ALIGN or Megalign (DNASTAR) software. Those skilled in the art can determine appropriate parameters for aligning sequences, including any algorithms needed to achieve maximal alignment over the full length of the sequences being compared. For example, the % amino acid sequence identity of a given amino acid sequence A to, with, or against a given amino acid sequence B (which can alternatively be phrased as a given amino acid sequence A that has or comprises a certain % amino acid sequence identity to, with, or against a given amino acid sequence B) is calculated as follows:

100 times the fraction $X/Y$ where X is the number of amino acid residues scored as identical matches by the sequence in that program's alignment of A and B, and where Y is the total number of amino acid residues in B. It will be appreciated that where the length of amino acid sequence A is not equal to the length of amino acid sequence B, the % amino acid sequence identity of A to B will not equal the % amino acid sequence identity of B to A.

An antibody that "binds to," "specifically binds to" or is "specific for" a particular a polypeptide or an epitope on a particular polypeptide is one that binds to that particular polypeptide or epitope on a particular polypeptide without substantially binding to any other polypeptide or polypeptide epitope. In some embodiments, binding of an anti-CTLA4 binding protein described herein (e.g., anti-CTLA4 antibody or antigen-binding fragment thereof) to an unrelated, non-CTLA4 polypeptide is less than about 10% of the antibody binding to CTLA4 as measured by methods known in the art (e.g., enzyme-linked immunosorbent assay (ELISA)). In some embodiments, the binding protein (e.g., antibody) that binds to a CTLA4 (e.g., a murine CTLA4 and/or a human CTLA4) has an equilibrium dissociation constant ($K_D$) of ≤1 μM, ≤100 nM, ≤10 nM, ≤2 nM, ≤1 nM, ≤0.7 nM, ≤0.6 nM, ≤0.5 nM, ≤0.1 nM, ≤0.01 nM, or ≤0.001 nM (e.g. 10-8 M or less, e.g. from 10-8 M to 10-13 M, e.g., from 10-9 M to 10-13 M).

The term "CTLA4" or "CTLA4 protein" as provided herein includes any of the recombinant or naturally-occurring forms of the cytotoxic T-lymphocyte-associated protein 4 (CTLA4) or variants or homologs thereof that maintain CTLA4 protein activity (e.g. within at least 50%, 80%, 90%, 95%, 96%, 97%, 98%, 99% or 100% activity compared to CTLA4). In some aspects, the variants or homologs have at least 90%, 95%, 96%, 97%, 98%, 99% or 100% amino acid sequence identity across the whole sequence or a portion of the sequence (e.g. a 50, 100, 150 or 200 continuous amino acid portion) compared to a naturally occurring CTLA4 polypeptide. In some embodiments, CTLA4 is the protein as identified by the NCBI sequence reference GI: 83700231, homolog or functional fragment thereof. In some embodiments, CTLA4 is a human CTLA4. In some embodiments, CTLA4 is a murine CTLA4.

Antibody "effector functions" refer to those biological activities attributable to the Fc region (a native sequence Fc region or amino acid sequence variant Fc region) of an antibody, and vary with the antibody isotype. Examples of antibody effector functions include: C1q binding and complement dependent cytotoxicity; Fc receptor binding; antibody-dependent cell-mediated cytotoxicity (ADCC); phagocytosis; down regulation of cell surface receptors (e.g., B cell receptors); and B cell activation.

"Antibody-dependent cell-mediated cytotoxicity" or "ADCC" refers to a form of cytotoxicity in which secreted Ig bound onto Fc receptors (FcRs) present on certain cytotoxic cells (e.g., natural killer (NK) cells, neutrophils and macrophages) enable these cytotoxic effector cells to bind specifically to an antigen-bearing target cell and subsequently kill the target cell with cytotoxins. The antibodies "arm" the cytotoxic cells and are required for killing of the target cell by this mechanism. The primary cells for mediating ADCC, NK cells, express FcγRIII only, whereas monocytes express FcγRI, FcγRII and FcγRIII. Fc expression on hematopoietic cells is summarized in Table 3 on page 464 of Ravetch and Kinet, Annu. Rev. Immunol. 9:457-92 (1991). In some embodiments, an anti-CTLA4 binding protein described herein (e.g., anti-CTLA4 antibody or antigen-binding fragment thereof) is engineered or expressed in cells that lack the ability to fucosylate the Fc glycan to have enhanced ADCC. To assess ADCC activity of a molecule of interest, an in vitro ADCC assay, such as that described in U.S. Pat. No. 5,500,362 or 5,821,337 may be performed. Useful effector cells for such assays include peripheral blood mononuclear cells (PBMC) and natural killer (NK) cells. Alternatively, or additionally, ADCC activity of the molecule of interest may be assessed in vivo, e.g., in an animal model such as that disclosed in Clynes et al., PNAS USA 95:652-656 (1998). Other Fc variants that alter ADCC activity and other antibody properties include those disclosed by Ghetie et al., Nat Biotech. 15:637-40, 1997; Duncan et al, Nature 332:563-564, 1988; Lund et al., J. Immunol 147:2657-2662, 1991; Lund et al, Mol Immunol 29:53-59, 1992; Alegre et al, Transplantation 57:1537-1543, 1994; Hutchins et al., Proc Natl. Acad Sci USA 92:11980-11984, 1995; Jefferis et al, Immunol Lett. 44:111-117, 1995; Lund et al., FASEB J9: 115-119, 1995; Jefferis et al, Immunol Lett 54:101-104, 1996; Lund et al, J Immunol 157:4963-4969, 1996; Armour et al., Eur J Immunol 29:2613-2624, 1999; Idusogie et al, J Immunol 164:4178-4184, 200; Reddy et al, J Immunol 164:1925-1933, 2000; Xu et al., Cell Immunol 200:16-26, 2000; Idusogie et al, J Immunol 166:2571-2575, 2001; Shields et al., J Biol Chem 276:6591-6604, 2001; Jefferis et al, Immunol Lett 82:57-65. 2002; Presta et al., Biochem Soc Trans 30:487-490, 2002; Lazar et al., Proc. Natl. Acad. Sci. USA 103:4005-4010, 2006; U.S. Pat. Nos. 5,624,821; 5,885,573; 5,677,425; 6,165,745; 6,277,375; 5,869,046; 6,121,022; 5,624,821; 5,648,260; 6,194,551; 6,737,056; 6,821,505; 6,277,375; 7,335,742; and 7,317,091.

The term "Fc region" herein is used to define a C-terminal region of an immunoglobulin heavy chain, including native-sequence Fc regions and variant Fc regions. Although the boundaries of the Fc region of an immunoglobulin heavy chain might vary, the human IgG heavy-chain Fc region is usually defined to stretch from an amino acid residue at position Cys226, or from Pro230, to the carboxyl-terminus thereof. Suitable native-sequence Fc regions for use in the antibodies of the invention include human IgG1, IgG2, IgG3 and IgG4.

"Binding affinity" as used herein refers to the strength of the non-covalent interactions between a single binding site of a molecule (e.g., an antibody) and its binding partner (e.g., an antigen). In some embodiments, the affinity of a binding protein (e.g., antibody) for a CTLA4 can generally be represented by an equilibrium dissociation constant ($K_D$). Affinity can be measured by common methods known in the art, including those described herein.

"Binding avidity" as used herein refers to the binding strength of multiple binding sites of a molecule (e.g., an antibody) and its binding partner (e.g., an antigen).

An "isolated" nucleic acid molecule encoding the antibodies herein is a nucleic acid molecule that is identified and separated from at least one contaminant nucleic acid molecule with which it is ordinarily associated in the environment in which it was produced. In some embodiments, the isolated nucleic acid is free of association with all components associated with the production environment. The isolated nucleic acid molecules encoding the polypeptides and antibodies herein is in a form other than in the form or setting in which it is found in nature. Isolated nucleic acid molecules therefore are distinguished from nucleic acid encoding the polypeptides and antibodies herein existing naturally in cells.

The term "pharmaceutical formulation" refers to a preparation that is in such form as to permit the biological activity of the active ingredient to be effective, and that contains no additional components that are unacceptably toxic to a subject to which the formulation would be administered. Such formulations are sterile.

"Carriers" as used herein include pharmaceutically acceptable carriers, excipients, or stabilizers that are non-toxic to the cell or mammal being exposed thereto at the dosages and concentrations employed. Often the physiologically acceptable carrier is an aqueous pH buffered solution. Examples of physiologically acceptable carriers include buffers such as phosphate, citrate, and other organic acids; antioxidants including ascorbic acid; low molecular weight (less than about 10 residues) polypeptide; proteins, such as serum albumin, gelatin, or immunoglobulins; hydrophilic polymers such as polyvinylpyrrolidone; amino acids such as glycine, glutamine, asparagine, arginine or lysine; monosaccharides, disaccharides, and other carbohydrates including glucose, mannose, or dextrins; chelating agents such as EDTA; sugar alcohols such as mannitol or sorbitol; salt-forming counterions such as sodium; and/or nonionic surfactants such as TWEEN™, polyethylene glycol (PEG), and PLURONICS™.

As used herein, the term "treatment" refers to clinical intervention designed to alter the natural course of the individual or cell being treated during the course of clinical pathology. Desirable effects of treatment include decreasing the rate of disease progression, ameliorating or palliating the disease state, and remission or improved prognosis. An individual is successfully "treated", for example, if one or more symptoms associated with a disorder (e.g., a neoplastic disease) are mitigated or eliminated. For example, an individual is successfully "treated" if treatment results in increasing the quality of life of those suffering from a disease, decreasing the dose of other medications required for treating the disease, reducing the frequency of recurrence of the disease, lessening severity of the disease, delaying the development or progression of the disease, and/or prolonging survival of individuals.

As used herein, "in conjunction with" or "in combination with" refers to administration of one treatment modality in addition to another treatment modality. As such, "in conjunction with" or "in combination with" refers to administration of one treatment modality before, during or after administration of the other treatment modality to the individual.

As used herein, the term "prevention" includes providing prophylaxis with respect to occurrence or recurrence of a disease in an individual. An individual may be predisposed to, susceptible to a disorder, or at risk of developing a disorder, but has not yet been diagnosed with the disorder. In some embodiments, anti-CTLA4 binding proteins (e.g., anti-CTLA4 antibodies) described herein are used to delay development of a disorder.

As used herein, an individual "at risk" of developing a disorder may or may not have detectable disease or symptoms of disease, and may or may not have displayed detectable disease or symptoms of disease prior to the treatment methods described herein. "At risk" denotes that an individual has one or more risk factors, which are measurable parameters that correlate with development of the disease, as known in the art. An individual having one or more of these risk factors has a higher probability of developing the disorder than an individual without one or more of these risk factors.

An "effective amount" refers to at least an amount effective, at dosages and for periods of time necessary, to achieve the desired or indicated effect, including a therapeutic or prophylactic result. An effective amount can be provided in one or more administrations. A "therapeutically effective amount" is at least the minimum concentration required to affect a measurable improvement of a particular disorder. A therapeutically effective amount herein may vary according to factors such as the disease state, age, sex, and weight of the patient, and the ability of the antibody to elicit a desired response in the individual. A therapeutically effective amount may also be one in which any toxic or detrimental effects of the antibody are outweighed by the therapeutically beneficial effects. A "prophylactically effective amount" refers to an amount effective, at the dosages and for periods of time necessary, to achieve the desired prophylactic result. Typically but not necessarily, since a prophylactic dose is used in subjects prior to or at the earlier stage of disease, the prophylactically effective amount can be less than the therapeutically effective amount.

"Chronic" administration refers to administration of the medicament(s) in a continuous as opposed to acute mode, so as to main the initial therapeutic effect (activity) for an extended period of time. "Intermittent" administration is treatment that is not consecutively done without interruption, but rather is cyclic in nature.

As used herein, an "individual" or a "subject" is a mammal. A "mammal" for purposes of treatment includes humans, domestic and farm animals, and zoo, sports, or pet animals, such as dogs, horses, rabbits, cattle, pigs, hamsters, gerbils, mice, ferrets, rats, cats, etc. In some embodiments, the individual or subject is human.

II. Anti-CTLA4 Binding Proteins

Provided herein are proteins that bind cytotoxic T-lymphocyte-associated protein 4 (CTLA4). In some embodiments, the provided CTLA4 binding protein is an antibody or an antigen-binding fragment thereof, or is a protein that comprises a CTLA4 binding domain. In some embodiments, the CTLA4 binding protein is an anti-CTLA4 antibody or antigen-binding fragment thereof. In some embodiments, the CTLA4 binding protein is a bispecific antibody, or an antigen-binding fragment thereof, that binds to CTLA4. For example, the bispecific antibody that contains a CTLA binding domain. In one aspect, there is provided a CTLA4 binding protein comprising a CTLA4 binding domain, such as a fusion protein that comprises a CTLA4 binding domain described herein. In some embodiments, the CTLA4 binding protein is a chimeric receptor that binds to CTLA4, for example, by virtue of an antigen-binding domain that can bind CTLA4.

The CTLA4 binding proteins provided herein can bind to CTLA4 from various species, for example, some bind to a human CTLA4 and/or murine CTLA4, or cynomolgus CTLA4. In some embodiments, an anti-CTLA4 binding protein described herein has one or more of the following characteristics: (1) binds a CTLA4 (e.g. a human CTLA4); and (2) binds a CTLA4 in vivo at a tumor site.

In one aspect, provided herein are CTLA4 binding proteins useful, inter alia, for the treatment of a neoplastic disease in which CTLA4 plays a role. An CTLA4 binding protein as provided herein includes a binding domain capable of interacting with (e.g., binding to) a CTLA4 protein expressed on the surface of a cell (e.g., a cancer cell or T cell).

Also provided herein, in some embodiments, is a CTLA4 binding protein (e.g., an anti-CTLA4 antibody or antigen-binding fragment thereof) comprising a CTLA4 binding protein (e.g., an anti-CTLA4 antibody or antigen-binding fragment thereof comprising a first chain and a second chain). In some embodiments, the CTLA4 binding protein is a dimer. In some embodiments, the CTLA4 binding protein is a homodimer. In some embodiments, the CTLA4 binding protein is a heterodimer. In some embodiments, the CTLA4 binding protein is a heterodimer comprising a first chain and a second chain, such as a heterodimer comprising a heavy chain and a light chain. In some embodiments, the CTLA4 binding protein is an anti-CTLA4 antibody or antigen-binding fragment thereof comprising a first chain and a second chain. In some embodiments, the first chain is or comprises a heavy chain, and the second chain is or comprises a light chain; or the first chain is or comprises a light chain, and the second chain is or comprises a heavy chain. In some embodiments, the first chain is or comprises a heavy chain variable region, and the second chain is or comprises a light chain variable region; or the first chain is or comprises a light chain variable region, and the second chain is or comprises a heavy chain variable region. In some embodiments, the CTLA4 binding protein is a single chain protein, such as a single chain protein that comprises both a heavy chain and a light chain.

Also provided is a nucleic acid encoding the antibodies, the bispecific antibodies, or any antigen-binding fragments thereof, or the chimeric receptor of any one the aforementioned embodiments. Also provided is a vector comprising the nucleic acid of the aforementioned embodiments. In some embodiments, the vector is an expression vector. Also provided is a host cell comprising the aforementioned nucleic acid embodiments.

Also provided is a method of producing an antibody, a bispecific antibody, or any antigen-binding fragment thereof, or a chimeric receptor comprising culturing the aforementioned host cells under a condition that produces the antibody, bispecific antibody or chimeric receptor. In some embodiments, the host cell has an alpha1,6-fucosyltransferase (Fut8) knockout. In some embodiments, wherein the host cell overexpresses β1,4-N-acetylglycosminyltransferase III (GnT-III). In some embodiments, the host cell additionally overexpresses Golgi μ-mannosidase II (ManII). Some of any such embodiments, further include recovering the antibody, bispecific antibody or any antigen-binding fragments thereof or chimeric receptor produced by the host cell. In some embodiments, bispecific antibody or chimeric receptor produced by the aforementioned methods.

Also provided is a composition containing an antibody, a bispecific antibody or any antigen-binding fragments thereof, or a chimeric receptor of any one of aforementioned embodiments. Some embodiments encompass a composition comprising the antibody, bispecific antibody or any antigen-binding fragments thereof or chimeric receptor of the aforementioned embodiments. In some embodiments, the composition is a pharmaceutical composition.

Also provided is a kit containing the antibody, the bispecific antibody or any antigen-binding fragments thereof, the chimeric receptor, or the composition of any one of aforementioned embodiments.

Also provided is a method of treating or preventing a neoplastic disease in a subject, the method comprising administering to the subject an effective amount of the antibody, the bispecific antibody or any antigen-binding fragments thereof, the chimeric receptor, or the composition of any one of aforementioned embodiments. In one embodiment, the neoplastic disease is a cancer. In some embodiments, the cancer is leukemia, lymphoma, head and neck cancer, colorectal cancer, prostate cancer, pancreatic cancer, melanoma, breast cancer, neuroblastoma, lung cancer, ovarian cancer, osteosarcoma, bladder cancer, cervical cancer, liver cancer, kidney cancer, skin cancer or testicular cancer.

CTLA4 Binding Protein

The term "CTLA4 binding protein" as provided herein refers to a polypeptide comprising a CTLA4 binding domain that is capable of binding to, or otherwise exhibiting an affinity for, a CTLA4 protein. In some embodiments, the CTLA4 binding protein is an anti-CTLA4 antibody or antigen-binding fragment thereof, a bispecific antibody, an antigen binding fragment, a single chain antibody, etc. In some embodiments, the CTLA4 binding protein is an antibody or antigen-binding fragment thereof that binds to CTLA4. In some embodiments, an antibody or antigen-binding fragment thereof that binds to CTLA4 is an anti-CTLA4 antibody or antigen-binding fragment thereof. Accordingly, in some embodiments, the CTLA4 binding protein is an anti-CTLA4 antibody or antigen-binding fragment thereof. In some embodiments, the CTLA4 binding protein is a component of a chimeric antigen receptor that binds CTLA4.

The term "CTLA4 binding domain" refers to a recombinantly expressed polypeptide domain capable of binding to, or otherwise exhibiting an affinity for, a CTLA4 protein found in or on a cell. Methods for determining the extent of binding of a CTLA4 binding domain to CTLA4 are well known in the art.

In some embodiments, the CTLA4 binding domain provided herein is an antibody capable of binding to CTLA4. In some embodiments, the CTLA4 is a human CTLA4. In some embodiments, the CTLA4 is a murine CTLA4. In some embodiments, the antibody is a murine antibody.

In some embodiments, the antibody is a humanized antibody, a chimeric antibody, or a human antibody. In some embodiments, an anti-CTLA4 antibody or antigen-binding fragment thereof described herein is a monoclonal antibody. In some embodiments, an anti-CTLA4 antibody or antigen-binding fragment thereof described herein is an antibody fragment (including antigen-binding fragment), e.g., a dAb, Fab, Fab'-SH, Fv, scFv, or (Fab')2 fragment. In some embodiments, the antibody or antigen-binding fragment thereof is a dimer. In some embodiments, the antibody or antigen-binding fragment thereof is a homodimer. In some embodiments, the antibody or antigen-binding fragment thereof is a heterodimer. In some embodiments, the antibody or antigen-binding fragment thereof is a heterodimer comprising a first chain and a second chain, such as a heterodimer comprising a heavy chain and a light chain. In some embodiments, the antibody or antigen-binding fragment comprises a first chain and a second chain. In some embodiments, the first chain is or comprises a heavy chain, and the second chain is or comprises a light chain; or the first chain is or comprises a light chain, and the second chain is or comprises a heavy chain. In some embodiments, the first chain is or comprises a heavy chain variable region, and the second chain is or comprises a light chain variable region; or the first chain is or comprises a light chain variable region, and the second chain is or comprises a heavy chain variable region. In some embodiments, the antibody or antigen-binding fragment thereof comprises a first chain and a second chain (e.g., a light chain and a heavy chain). In some embodiments, the antibody or antigen-binding fragment thereof comprises two first chains and two second chains (e.g., two light chains and two heavy chains). In some embodiments, the antibody or antigen-binding fragment thereof comprises a light chain variable region and a heavy chain variable region, wherein the light chain variable region comprises (i) a CDR-L1 comprising the amino acid sequence of SEQ ID NO:1 or 13, (ii) a CDR-L2 comprising the amino acid sequence of SEQ ID NO:2 or 14, and (iii) a CDR-L3 comprising the amino acid sequence of SEQ ID NO:3 or 15; and/or wherein the heavy chain variable region comprises (i) a CDR-H1 comprising the amino acid sequence of SEQ ID NO:4 or 16, (ii) a CDR-H2 comprising the amino acid sequence of SEQ ID NO:5 or 17, and (iii) a CDR-H3 comprising the amino acid sequence of SEQ ID NO:6 or 18.

In some embodiments, the antibody or antigen-binding fragment comprises a light chain variable region and a heavy chain variable region, wherein the light chain variable region comprises (i) a CDR-L1 comprising the amino acid sequence of SEQ ID NO:1, (ii) a CDR-L2 comprising the amino acid sequence of SEQ ID NO:2, and (iii) a CDR-L3 comprising the amino acid sequence of SEQ ID NO:3; and/or wherein the heavy chain variable region comprises (i) a CDR-H1 comprising the amino acid sequence of SEQ ID NO:4, (ii) a CDR-H2 comprising the amino acid sequence of SEQ ID NO:5, and (iii) a CDR-H3 comprising the amino acid sequence of SEQ ID NO:6. In some embodiments, the antibody or antigen-binding fragment comprises a light chain variable region and a heavy chain variable region, wherein the light chain variable region comprises (i) a CDR-L1 comprising the amino acid sequence of SEQ ID NO:1, (ii) a CDR-L2 comprising the amino acid sequence of SEQ ID NO:2, and (iii) a CDR-L3 comprising the amino acid sequence of SEQ ID NO:3; and the heavy chain variable region comprises (i) a CDR-H1 comprising the amino acid sequence of SEQ ID NO:4, (ii) a CDR-H2 comprising the amino acid sequence of SEQ ID NO:5, and (iii) a CDR-H3 comprising the amino acid sequence of SEQ ID NO:6.

In some embodiments, the antibody or antigen-binding fragment comprises a light chain variable region and a heavy chain variable region, wherein the light chain variable region comprises (i) a CDR-L1 comprising the amino acid sequence of SEQ ID NO:7, (ii) a CDR-L2 comprising the amino acid sequence of SEQ ID NO:8, and (iii) a CDR-L3 comprising the amino acid sequence of SEQ ID NO:9; and/or wherein the heavy chain variable region comprises (i) a CDR-H1 comprising the amino acid sequence of SEQ ID NO:10, (ii) a CDR-H2 comprising the amino acid sequence of SEQ ID NO:11, and (iii) a CDR-H3 comprising the amino acid sequence of SEQ ID NO:12. In some embodiments, the antibody or antigen-binding fragment comprises a light chain variable region and a heavy chain variable region, wherein the light chain variable region comprises (i) a CDR-L1 comprising the amino acid sequence of SEQ ID NO: 7, (ii) a CDR-L2 comprising the amino acid sequence of SEQ ID NO:8, and (iii) a CDR-L3 comprising the amino acid sequence of SEQ ID NO:9; and the heavy chain variable region comprises (i) a CDR-H1 comprising the amino acid sequence of SEQ ID NO:10, (ii) a CDR-H2 comprising the amino acid sequence of SEQ ID NO:11, and (iii) a CDR-H3 comprising the amino acid sequence of SEQ ID NO:12.

In some embodiments, the antibody or antigen-binding fragment comprises a light chain variable region and a heavy chain variable region, wherein the light chain variable region comprises (i) a CDR-L1 comprising the amino acid sequence of SEQ ID NO:13, (ii) a CDR-L2 comprising the amino acid sequence of SEQ ID NO:14, and (iii) a CDR-L3 comprising the amino acid sequence of SEQ ID NO:15; and/or wherein the heavy chain variable region comprises (i) a CDR-H1 comprising the amino acid sequence of SEQ ID NO:16, (ii) a CDR-H2 comprising the amino acid sequence of SEQ ID NO:17, and (iii) a CDR-H3 comprising the amino acid sequence of SEQ ID NO:18. In some embodiments, the antibody or antigen-binding fragment comprises a light chain variable region and a heavy chain variable region, wherein the light chain variable region comprises (i) a CDR-L1 comprising the amino acid sequence of SEQ ID NO: 13, (ii) a CDR-L2 comprising the amino acid sequence of SEQ ID NO:14, and (iii) a CDR-L3 comprising the amino acid sequence of SEQ ID NO:15; and the heavy chain variable region comprises (i) a CDR-H1 comprising the amino acid sequence of SEQ ID NO:16, (ii) a CDR-H2 comprising the amino acid sequence of SEQ ID NO:17, and (iii) a CDR-H3 comprising the amino acid sequence of SEQ ID NO:18.

In some embodiments, the antibody or antigen-binding fragment comprises a light chain variable region and a heavy chain variable region, wherein the light chain variable region comprises (i) a CDR-L1 comprising the amino acid sequence of SEQ ID NO:19, (ii) a CDR-L2 comprising the amino acid sequence of SEQ ID NO:20, and (iii) a CDR-L3 comprising the amino acid sequence of SEQ ID NO:21; and/or wherein the heavy chain variable region comprises (i) a CDR-H1 comprising the amino acid sequence of SEQ ID NO:22, (ii) a CDR-H2 comprising the amino acid sequence of SEQ ID NO:23, and (iii) a CDR-H3 comprising the amino acid sequence of SEQ ID NO:24. In some embodiments, the antibody or antigen-binding fragment comprises a light chain variable region and a heavy chain variable region, wherein the light chain variable region comprises (i) a CDR-L1 comprising the amino acid sequence of SEQ ID NO: 19, (ii) a CDR-L2 comprising the amino acid sequence of SEQ ID NO:20, and (iii) a CDR-L3 comprising the amino acid sequence of SEQ ID NO:21; and the heavy chain variable region comprises (i) a CDR-H1 comprising the amino acid sequence of SEQ ID NO:22, (ii) a CDR-H2 comprising the amino acid sequence of SEQ ID NO:23, and (iii) a CDR-H3 comprising the amino acid sequence of SEQ ID NO:24.

In some embodiments, the VL domain comprises a CDR-L1, a CDR-L2 and a CDR-L3 contained within the amino acid sequence of SEQ ID NO: 25 and the VH domain comprises a CDR-H1, a CDR-H2 and a CDR-H3 contained within the amino acid sequence of SEQ ID NO: 26. In some embodiments, the VL domain comprises a CDR-L1, a CDR-L2 and a CDR-L3 contained within the amino acid sequence of SEQ ID NO: 30 and the VH domain comprises a CDR-H1, a CDR-H2 and a CDR-H3 contained within the amino acid sequence of SEQ ID NO: 31.

In some embodiments, the first chain is a light chain; and the second chain is a heavy chain. In some embodiments, the antibody or antigen-binding fragment thereof containing two first chains and two second chains. In some embodiments, the first chain is a light chain variable domain; and the second chain is a heavy chain variable domain. In some of any such embodiments, the antigen-binding fragment is a dAb, Fab, Fab'-SH, Fv, scFv, or (Fab')2 fragment.

In some of any such embodiments, the antibody is a murine antibody.

In some of any such embodiments, the antibody is a humanized antibody, a chimeric antibody, or a human antibody. In some of any such embodiments, the antibody has an IgG1, IgG2, IgG3 or IgG4 isotype. In some of any such embodiments, the IgG1 contain the amino acid substitutions, S298A, E333A, and K334A; S239D and I332E; S239D, A330L, and I332E; P247I and A339D or A339Q; D280H, K290S with or without S298D or S298V; F243L, R292P, and Y300L; F243L, R292P, Y300L, and P396L; F243L, R292P, Y300L, V305I, and P396L; G236A, S239D, and I332E; K326A and E333A; K326W and E333S; or K290E or K290N, S298G, T299A, and/or K326E; wherein the amino acid residues are numbered according to the EU index as in Kabat.

In some of any such embodiments, the antibody or antigen-binding fragment containing a light chain variable region comprising the amino acid sequence of SEQ ID NO:25 or 30; and/or a heavy chain variable region comprising the amino acid sequence of SEQ ID NO: 26 or 31.

In some of any embodiments, the VL domain comprises an amino acid sequence that has at least about 90% sequence identity to the amino acid sequence of SEQ ID NO: 25, and the VH domain comprises an amino acid sequence that has at least about 90% sequence identity to the amino acid sequence of SEQ ID NO: 26. In some of any such embodiments, the antibody or antigen-binding fragment containing a light chain variable region comprising the amino acid sequence of SEQ ID NO:25 and a heavy chain variable region comprising the amino acid sequence of SEQ ID NO:26.

In some of any embodiments, the VL domain comprises an amino acid sequence that has at least about 90% sequence identity to the amino acid sequence of SEQ ID NO: 30, and the VH domain comprises an amino acid sequence that has at least about 90% sequence identity to the amino acid sequence of SEQ ID NO: 31. In some of any such embodiments, the antibody or antigen-binding fragment containing a light chain variable region comprising the amino acid sequence of SEQ ID NO:30 and a heavy chain variable region comprising the amino acid sequence of SEQ ID NO:31.

In some embodiments, the antibody or antigen-binding fragment thereof comprises a light chain comprising an amino acid sequence having or having about 70%, 75%, 80%, 85%, 90%, 91%, 92%, 93%, 94%, 95%, 96%, 97%, 98%, 99% or 100% homology to the amino acid sequence of SEQ ID NO: 27; and/or comprises a heavy chain comprising an amino acid sequence having or having about 70%, 75%, 80%, 85%, 90%, 91%, 92%, 93%, 94%, 95%, 96%, 97%, 98%, 99% or 100% homology to the amino acid sequence of SEQ ID NO: 28. In some embodiments, the antibody or antigen-binding fragment thereof comprises a light chain comprising an amino acid sequence having or having about 70%, 75%, 80%, 85%, 90%, 91%, 92%, 93%, 94%, 95%, 96%, 97%, 98%, 99% or 100% homology to the amino acid sequence of SEQ ID NO: 27; and comprises a heavy chain comprising an amino acid sequence having or having about 70%, 75%, 80%, 85%, 90%, 91%, 92%, 93%, 94%, 95%, 96%, 97%, 98%, 99% or 100% homology to the amino acid sequence of SEQ ID NO: 28. In some embodiments, the antibody or antigen-binding fragment thereof comprises a light chain comprising the amino acid sequence of SEQ ID NO: 27; and/or comprises a heavy chain comprising the amino acid sequence of SEQ ID NO: 28. In some embodiments, the antibody or antigen-binding fragment thereof comprises a light chain comprising the amino acid sequence of SEQ ID NO: 27; and comprises a heavy chain comprising the amino acid sequence of SEQ ID NO: 28.

In some embodiments, the antibody or antigen-binding fragment thereof comprises a light chain comprising an amino acid sequence having or having about 70%, 75%, 80%, 85%, 90%, 91%, 92%, 93%, 94%, 95%, 96%, 97%, 98%, 99% or 100% homology to the amino acid sequence of SEQ ID NO: 27; and/or comprises a heavy chain comprising an amino acid sequence having or having about 70%, 75%, 80%, 85%, 90%, 91%, 92%, 93%, 94%, 95%, 96%, 97%, 98%, 99% or 100% homology to the amino acid sequence of SEQ ID NO: 29. In some embodiments, the antibody or antigen-binding fragment thereof comprises a light chain comprising an amino acid sequence having or having about 70%, 75%, 80%, 85%, 90%, 91%, 92%, 93%, 94%, 95%, 96%, 97%, 98%, 99% or 100% homology to the amino acid sequence of SEQ ID NO: 27; and comprises a heavy chain comprising an amino acid sequence having or having about 70%, 75%, 80%, 85%, 90%, 91%, 92%, 93%, 94%, 95%, 96%, 97%, 98%, 99% or 100% homology to the amino acid sequence of SEQ ID NO: 29. In some embodiments, the antibody or antigen-binding fragment thereof comprises a light chain comprising the amino acid sequence of SEQ ID NO: 27; and/or comprises a heavy chain comprising the amino acid sequence of SEQ ID NO: 29. In some embodiments, the antibody or antigen-binding fragment thereof comprises a light chain comprising the amino acid sequence of SEQ ID NO: 27; and comprises a heavy chain comprising the amino acid sequence of SEQ ID NO: 29.

In some embodiments, the antibody or antigen-binding fragment thereof comprises a light chain comprising an amino acid sequence having or having about 70%, 75%, 80%, 85%, 90%, 91%, 92%, 93%, 94%, 95%, 96%, 97%, 98%, 99% or 100% homology to the amino acid sequence of SEQ ID NO: 32; and/or comprises a heavy chain comprising an amino acid sequence having or having about 70%, 75%, 80%, 85%, 90%, 91%, 92%, 93%, 94%, 95%, 96%, 97%, 98%, 99% or 100% homology to the amino acid sequence of SEQ ID NO: 33. In some embodiments, the antibody or antigen-binding fragment thereof comprises a light chain comprising an amino acid sequence having or having about 70%, 75%, 80%, 85%, 90%, 91%, 92%, 93%, 94%, 95%, 96%, 97%, 98%, 99% or 100% homology to the amino acid sequence of SEQ ID NO: 32; and comprises a heavy chain comprising an amino acid sequence having or having about 70%, 75%, 80%, 85%, 90%, 91%, 92%, 93%, 94%, 95%, 96%, 97%, 98%, 99% or 100% homology to the amino acid sequence of SEQ ID NO: 33. In some embodiments, the antibody or antigen-binding fragment thereof comprises a light chain comprising the amino acid sequence of SEQ ID NO: 32; and/or comprises a heavy chain comprising the amino acid sequence of SEQ ID NO: 33. In some embodiments, the antibody or antigen-binding fragment thereof comprises a light chain comprising the amino acid sequence of SEQ ID NO: 32; and comprises a heavy chain comprising the amino acid sequence of SEQ ID NO: 33.

In some embodiments, the antibody or antigen-binding fragment thereof comprises a light chain comprising an amino acid sequence having or having about 70%, 75%, 80%, 85%, 90%, 91%, 92%, 93%, 94%, 95%, 96%, 97%, 98%, 99% or 100% homology to the amino acid sequence of SEQ ID NO: 32; and/or comprises a heavy chain comprising an amino acid sequence having or having about 70%, 75%, 80%, 85%, 90%, 91%, 92%, 93%, 94%, 95%, 96%, 97%, 98%, 99% or 100% homology to the amino acid sequence of SEQ ID NO: 34. In some embodiments, the antibody or antigen-binding fragment thereof comprises a light chain comprising an amino acid sequence having or having about 70%, 75%, 80%, 85%, 90%, 91%, 92%, 93%, 94%, 95%, 96%, 97%, 98%, 99% or 100% homology to the amino acid sequence of SEQ ID NO: 32; and comprises a heavy chain comprising an amino acid sequence having or having about 70%, 75%, 80%, 85%, 90%, 91%, 92%, 93%, 94%, 95%, 96%, 97%, 98%, 99% or 100% homology to the amino acid sequence of SEQ ID NO: 34. In some embodiments, the antibody or antigen-binding fragment thereof comprises a light chain comprising the amino acid sequence of SEQ ID NO: 32; and/or comprises a heavy chain comprising the amino acid sequence of SEQ ID NO: 34. In some embodiments, the antibody or antigen-binding fragment thereof comprises a light chain comprising the amino acid sequence of SEQ ID NO: 32; and comprises a heavy chain comprising the amino acid sequence of SEQ ID NO: 34.

In some embodiments, the antibody or antigen-binding fragment thereof comprises a light chain comprising the amino acid sequence selected from SEQ ID NOs: 27 and 32; and/or a heavy chain comprising the amino acid sequence selected from SEQ ID NOs: 28, 29, 33 and 34.

In some of any such embodiments, the antibody or antigen-binding fragment thereof contains a light chain comprising the amino acid sequence of SEQ ID NO:27; and/or a heavy chain comprising the amino acid sequence of SEQ ID NO:28. In some of any such embodiments, the antibody or antigen-binding fragment thereof contains a light chain comprising the amino acid sequence of SEQ ID NO:27; and/or a heavy chain comprising the amino acid sequence of SEQ ID NO:29. In some of any such embodiments, the antibody or antigen-binding fragment thereof contains a light chain comprising the amino acid sequence of SEQ ID NO:27; and a heavy chain comprising the amino acid sequence of SEQ ID NO:28. In some of any such embodiments, the antibody or antigen-binding fragment thereof contains a light chain comprising the amino acid sequence of SEQ ID NO:27; and a heavy chain comprising the amino acid sequence of SEQ ID NO:29.

In some of any such embodiments, the antibody or antigen-binding fragment thereof contains a light chain comprising the amino acid sequence of SEQ ID NO:32; and/or a heavy chain comprising the amino acid sequence of SEQ ID NO:33. In some of any such embodiments, the antibody or antigen-binding fragment thereof contains a light chain comprising the amino acid sequence of SEQ ID NO:32; and/or a heavy chain comprising the amino acid sequence of SEQ ID NO:34. In some of any such embodiments, the antibody or antigen-binding fragment thereof contains a light chain comprising the amino acid sequence of SEQ ID NO:32; and a heavy chain comprising the amino acid sequence of SEQ ID NO:33. In some of any such embodiments, the antibody or antigen-binding fragment thereof contains a light chain comprising the amino acid sequence of SEQ ID NO:32; and a heavy chain comprising the amino acid sequence of SEQ ID NO:34.

Also provide herein is a bispecific antibody containing a light chain and a heavy chain of a first pair that specifically binds to CTLA4 and light chain and a heavy chain of a second pair that specifically binds to an antigen, for example, an antigen that is a tumor antigen.

In some of any such embodiments, the bispecific antibody is a murine antibody.

In some of any such embodiments, the bispecific antibody is a humanized antibody, a chimeric antibody, or a human antibody. In some of any such embodiments, the bispecific antibody has an IgG1, IgG2, IgG3 or IgG4 isotype. In some of any such embodiments, the IgG1 contain the amino acid substitutions, such as S298A, E333A, and K334A; S239D and I332E; S239D, A330L, and I332E; P247I and A339D or A339Q; D280H, K290S with or without S298D or S298V; F243L, R292P, and Y300L; F243L, R292P, Y300L, and P396L; F243L, R292P, Y300L, V305I, and P396L; G236A, S239D, and I332E; K326A and E333A; K326W and E333S; or K290E or K290N, S298G, T299A, and/or K326E, wherein the amino acid residues are numbered according to the EU index as in Kabat.

In some of any such embodiments, the first pair contains a light chain variable region and a heavy chain variable region, wherein the light chain variable region containing (i) CDR-L1 comprising the amino acid sequence of SEQ ID NO:1 or 13, (ii) CDR-L2 comprising the amino acid sequence of SEQ ID NO:2 or 14, and (iii) CDR-L3 comprising the amino acid sequence of SEQ ID NO:3 or 15; and/or wherein the heavy chain variable region containing (i) CDR-H1 comprising the amino acid sequence of SEQ ID NO:4 or 16, (ii) CDR-H2 comprising the amino acid sequence of SEQ ID NO:5 or 17, and (iii) CDR-H3 comprising the amino acid sequence of SEQ ID NO:6 or 18.

In some of any such embodiments, the first pair contains a light chain variable region comprising the amino acid sequence of SEQ ID NO:25 or 30; and/or a heavy chain variable region comprising the amino acid sequence of SEQ ID NO:26 or 31.

In some of any such embodiments, the first pair contains a VL domain comprising an amino acid sequence that has at least about 90% sequence identity to the amino acid sequence of SEQ ID NO: 25, and a VH domain comprising an amino acid sequence that has at least about 90% sequence identity to the amino acid sequence of SEQ ID NO: 26. In some of any such embodiments, the first pair contains a light chain variable region comprising the amino acid sequence of SEQ ID NO:25 and a heavy chain variable region comprising the amino acid sequence of SEQ ID NO:26.

In some of any such embodiments, the first pair contains a VL domain comprising an amino acid sequence that has at least about 90% sequence identity to the amino acid sequence of SEQ ID NO: 30, and a VH domain comprising an amino acid sequence that has at least about 90% sequence identity to the amino acid sequence of SEQ ID NO: 31. In some of any such embodiments, the first pair contains a light chain variable region comprising the amino acid sequence of SEQ ID NO:30 and a heavy chain variable region comprising the amino acid sequence of SEQ ID NO:31.

In some of any such embodiments, the first pair contains a light chain comprising the amino acid sequence selected from SEQ ID NOs: 27 and 32; and/or a heavy chain comprising the amino acid sequence selected from SEQ ID NOs: 28, 29, 33 and 34.

In some of any such embodiments, the first pair contains a light chain comprising the amino acid sequence of SEQ ID NO:27; and/or a heavy chain comprising the amino acid sequence of SEQ ID NO:28. In some of any such embodiments, the first pair contains a light chain comprising the amino acid sequence of SEQ ID NO:27; and/or a heavy chain comprising the amino acid sequence of SEQ ID NO:29. In some of any such embodiments, the first pair contains a light chain comprising the amino acid sequence of SEQ ID NO:27; and a heavy chain comprising the amino acid sequence of SEQ ID NO:28. In some of any such embodiments, the first pair contains a light chain comprising the amino acid sequence of SEQ ID NO:27; and a heavy chain comprising the amino acid sequence of SEQ ID NO:29.

In some of any such embodiments, the first pair contains a light chain comprising the amino acid sequence of SEQ ID NO:32; and/or a heavy chain comprising the amino acid sequence of SEQ ID NO:33. In some of any such embodiments, the first pair contains a light chain comprising the amino acid sequence of SEQ ID NO:32; and/or a heavy chain comprising the amino acid sequence of SEQ ID NO:34. In some of any such embodiments, the first pair contains a light chain comprising the amino acid sequence of SEQ ID NO:32; and a heavy chain comprising the amino acid sequence of SEQ ID NO:33. In some of any such embodiments, the first pair contains a light chain comprising the amino acid sequence of SEQ ID NO:32; and a heavy chain comprising the amino acid sequence of SEQ ID NO:34.

In some of any such embodiments, the bispecific antibody contains a first chain and a second chain, wherein the first chain containing (i) CDR-L1 comprising the amino acid sequence of SEQ ID NO:1 or 13, (ii) CDR-L2 comprising the amino acid sequence of SEQ ID NO: 2 or 14, and (iii) CDR-L3 comprising the amino acid sequence of SEQ ID NO:3 or 15; and/or wherein the second chain containing (i) CDR-H1 comprising the amino acid sequence of SEQ ID NO:4 or 16, (ii) CDR-H2 comprising the amino acid sequence of SEQ ID NO:5 or 17, and (iii) CDR-H3 comprising the amino acid sequence of SEQ ID NO:6 or 18.

In some of any such embodiments, the first chain contains a light chain variable region comprising the amino acid sequence of SEQ ID NO:25 or 30; and/or a heavy chain variable region comprising the amino acid sequence of SEQ ID NO:26 or 31.

In some of any such embodiments, the first chain contains a VL domain comprising an amino acid sequence that has at least about 90% sequence identity to the amino acid sequence of SEQ ID NO: 25, and a VH domain comprising an amino acid sequence that has at least about 90% sequence identity to the amino acid sequence of SEQ ID NO: 26. In some of any such embodiments, the first chain contains a light chain variable region comprising the amino acid sequence of SEQ ID NO:25 and a heavy chain variable region comprising the amino acid sequence of SEQ ID NO:26.

In some of any such embodiments, the first chain contains a VL domain comprising an amino acid sequence that has at least about 90% sequence identity to the amino acid sequence of SEQ ID NO: 30, and a VH domain comprising an amino acid sequence that has at least about 90% sequence identity to the amino acid sequence of SEQ ID NO: 31. In some of any such embodiments, the first chain contains a light chain variable region comprising the amino acid sequence of SEQ ID NO:30 and a heavy chain variable region comprising the amino acid sequence of SEQ ID NO:31.

In some embodiments, the antibody or antigen-binding fragment comprises a light chain variable region comprising the amino acid sequence of SEQ ID NO:25 or 30; and/or a heavy chain variable region comprising the amino acid sequence of SEQ ID NO:26 or 31. In some embodiments, the antibody or antigen-binding fragment comprises a light chain variable region comprising an amino acid sequence having or having about 70%, 75%, 80%, 85%, 90%, 91%, 92%, 93%, 94%, 95%, 96%, 97%, 98%, 99% or 100% homology to the amino acid sequence of SEQ ID NO: 25; and/or comprises a heavy chain variable region comprising an amino acid sequence having or having about 70%, 75%, 80%, 85%, 90%, 91%, 92%, 93%, 94%, 95%, 96%, 97%, 98%, 99% or 100% homology to the amino acid sequence of SEQ ID NO: 26. In some embodiments, the antibody or antigen-binding fragment comprises a light chain variable region comprising an amino acid sequence having or having about 70%, 75%, 80%, 85%, 90%, 91%, 92%, 93%, 94%, 95%, 96%, 97%, 98%, 99% or 100% homology to the amino acid sequence of SEQ ID NO: 25; and comprises a heavy chain variable region comprising an amino acid sequence having or having about 70%, 75%, 80%, 85%, 90%, 91%, 92%, 93%, 94%, 95%, 96%, 97%, 98%, 99% or 100% homology to the amino acid sequence of SEQ ID NO: 26. In some embodiments, the antibody or antigen-binding fragment comprises a light chain variable region comprising an amino acid sequence having or having about 70%, 75%, 80%, 85%, 90%, 91%, 92%, 93%, 94%, 95%, 96%, 97%, 98%, 99% or 100% homology to the amino acid sequence of SEQ ID NO: 30; and/or comprises a heavy chain variable region comprising an amino acid sequence having or having about 70%, 75%, 80%, 85%, 90%, 91%, 92%, 93%, 94%, 95%, 96%, 97%, 98%, 99% or 100% homology to the amino acid sequence of SEQ ID NO: 31. In some embodiments, the antibody or antigen-binding fragment comprises a light chain variable region comprising an amino acid sequence having or having about 70%, 75%, 80%, 85%, 90%, 91%, 92%, 93%, 94%, 95%, 96%, 97%, 98%, 99% or 100% homology to the amino acid sequence of SEQ ID NO: 30; and comprises a heavy chain variable region comprising an amino acid sequence having or having about 70%, 75%, 80%, 85%, 90%, 91%, 92%, 93%, 94%, 95%, 96%, 97%, 98%, 99% or 100% homology to the amino acid sequence of SEQ ID NO: 31. In some embodiments, the antibody or antigen-binding fragment comprises a light chain variable region comprising the amino acid sequence of SEQ ID NO: 30; and/or comprises a heavy chain variable region comprising the amino acid sequence of SEQ ID NO: 31. In some embodiments, the antibody or antigen-binding fragment comprises a light chain variable region comprising the amino acid sequence of SEQ ID NO: 30; and comprises a heavy chain variable region comprising the amino acid sequence of SEQ ID NO: 31.

In some embodiments, the antibody or antigen-binding fragment thereof has an IgG1, IgG2, IgG3 or IgG4 isotype. In some embodiments, the antibody or antigen-binding fragment thereof has an IgG1 isotype comprising amino acid substitutions that enhance effector function as described herein.

In some embodiments, the CTLA4 binding domain comprises a light chain and a heavy chain of an antigen-binding arm of a bispecific antibody. In some embodiments of the bispecific antibody, the light chain comprises (i) CDR-L1 comprising the amino acid sequence of SEQ ID NO:1 or 13, (ii) CDR-L2 comprising the amino acid sequence of SEQ ID NO:2 or 14, and (iii) CDR-L3 comprising the amino acid sequence of SEQ ID NO:3 or 15; and/or wherein the heavy chain comprises (i) CDR-H1 comprising the amino acid sequence of SEQ ID NO: 4 or 16, (ii) CDR-H2 comprising the amino acid sequence of SEQ ID NO:5 or 17, and (iii) CDR-H3 comprising the amino acid sequence of SEQ ID NO:6 or 18. In some embodiments of the bispecific antibody, the light chain comprises (i) a CDR-L1 comprising the amino acid sequence of SEQ ID NO:1, (ii) a CDR-L2 comprising the amino acid sequence of SEQ ID NO: 2, and (iii) a CDR-L3 comprising the amino acid sequence of SEQ ID NO:3; and the heavy chain comprises (i) a CDR-H1 comprising the amino acid sequence of SEQ ID NO:4, (ii) a CDR-H2 comprising the amino acid sequence of SEQ ID NO:5, and (iii) a CDR-H3 comprising the amino acid sequence of SEQ ID NO:6. In some embodiments of the bispecific antibody, the light chain comprises (i) a CDR-L1 comprising the amino acid sequence of SEQ ID NO:7, (ii) a CDR-L2 comprising the amino acid sequence of SEQ ID NO:8, and (iii) a CDR-L3 comprising the amino acid sequence of SEQ ID NO:9; and the heavy chain comprises (i) a CDR-H1 comprising the amino acid sequence of SEQ ID NO:10, (ii) a CDR-H2 comprising the amino acid sequence of SEQ ID NO:11, and (iii) a CDR-H3 comprising the amino acid sequence of SEQ ID NO:12. In some embodiments of the bispecific antibody, the light chain comprises (i) a CDR-L1 comprising the amino acid sequence of SEQ ID NO:13, (ii) a CDR-L2 comprising the amino acid sequence of SEQ ID NO:14, and (iii) a CDR-L3 comprising the amino acid sequence of SEQ ID NO:15; and the heavy chain comprises (i) a CDR-H1 comprising the amino acid sequence of SEQ ID NO:16, (ii) a CDR-H2 comprising the amino acid sequence of SEQ ID NO: 17, and (iii) a CDR-H3 comprising the amino acid sequence of SEQ ID NO:18. In some embodiments of the bispecific antibody, the light chain comprises (i) a CDR-L1 comprising the amino acid sequence of SEQ ID NO:19, (ii) a CDR-L2 comprising the amino acid sequence of SEQ ID NO:20, and (iii) a CDR-L3 comprising the amino acid sequence of SEQ ID NO:21; and the heavy chain comprises (i) a CDR-H1 comprising the amino acid sequence of SEQ ID NO: 22, (ii) a CDR-H2 comprising the amino acid sequence of SEQ ID NO:23, and (iii) a CDR-H3 comprising the amino acid sequence of SEQ ID NO:24.

In some embodiments of the bispecific antibody, the VL domain comprises a CDR-L1, a CDR-L2 and a CDR-L3 contained within the amino acid sequence of SEQ ID NO: 25 and the VH domain comprises a CDR-H1, a CDR-H2 and a CDR-H3 contained within the amino acid sequence of SEQ ID NO: 26. In some embodiments of the bispecific antibody, the VL domain comprises a CDR-L1, a CDR-L2 and a CDR-L3 contained within the amino acid sequence of SEQ ID NO: 30 and the VH domain comprises a CDR-H1, a CDR-H2 and a CDR-H3 contained within the amino acid sequence of SEQ ID NO: 31.

In some embodiments of the bispecific antibody, the light chain comprises an amino acid sequence having or having about 70%, 75%, 80%, 85%, 90%, 91%, 92%, 93%, 94%, 95%, 96%, 97%, 98%, 99% or 100% homology to the amino acid sequence of SEQ ID NO: 25; and/or the heavy chain comprises an amino acid sequence having or having about 70%, 75%, 80%, 85%, 90%, 91%, 92%, 93%, 94%, 95%, 96%, 97%, 98%, 99% or 100% homology to the amino acid sequence of SEQ ID NO: 26. In some embodiments of the bispecific antibody, the light chain comprises an amino acid sequence having or having about 70%, 75%, 80%, 85%, 90%, 91%, 92%, 93%, 94%, 95%, 96%, 97%, 98%, 99% or 100% homology to the amino acid sequence of SEQ ID NO: 30; and/or the heavy chain comprises an amino acid sequence having or having about 70%, 75%, 80%, 85%, 90%, 91%, 92%, 93%, 94%, 95%, 96%, 97%, 98%, 99% or 100% homology to the amino acid sequence of SEQ ID NO: 31.

In some embodiments of the bispecific antibody, the light chain variable region comprising the amino acid sequence of SEQ ID NO:25 or 30; and/or the heavy chain variable region comprising the amino acid sequence of SEQ ID NO:26 or 31.

In some of any embodiments of the bispecific antibody, the VL domain comprises an amino acid sequence that has at least about 90% sequence identity to the amino acid sequence of SEQ ID NO: 25, and the VH domain comprises an amino acid sequence that has at least about 90% sequence identity to the amino acid sequence of SEQ ID NO: 26. In some of any such embodiments of the bispecific antibody, the antibody or antigen-binding fragment containing a light chain variable region comprising the amino acid sequence of SEQ ID NO:25 and a heavy chain variable region comprising the amino acid sequence of SEQ ID NO:26.

In some of any embodiments of the bispecific antibody, the VL domain comprises an amino acid sequence that has at least about 90% sequence identity to the amino acid sequence of SEQ ID NO: 30, and the VH domain comprises an amino acid sequence that has at least about 90% sequence identity to the amino acid sequence of SEQ ID NO: 31. In some of any such embodiments of the bispecific antibody, the antibody or antigen-binding fragment containing a light chain variable region comprising the amino acid sequence of SEQ ID NO:30 and a heavy chain variable region comprising the amino acid sequence of SEQ ID NO:31.

In some embodiments of the bispecific antibody, the light chain comprises an amino acid sequence having or having about 70%, 75%, 80%, 85%, 90%, 91%, 92%, 93%, 94%, 95%, 96%, 97%, 98%, 99% or 100% homology to an amino acid sequence selected from the group consisting of SEQ ID NOs: 27 and 32; and/or the heavy chain comprises an amino acid sequence having or having about 70%, 75%, 80%, 85%, 90%, 91%, 92%, 93%, 94%, 95%, 96%, 97%, 98%, 99% or 100% homology to an amino acid sequence selected from the group consisting of SEQ ID NOs: 28, 29, 33 and 34. In some embodiments of the bispecific antibody, the light chain comprises the amino acid sequence selected from SEQ ID NOs: 27 and 32; and/or the heavy chain comprises the amino acid sequence selected from SEQ ID NOs: 28, 29, 33 and 34.

In some embodiments of the bispecific antibody, the light chain comprises an amino acid sequence having or having about 70%, 75%, 80%, 85%, 90%, 91%, 92%, 93%, 94%, 95%, 96%, 97%, 98%, 99% or 100% homology to the amino acid sequence of SEQ ID NO: 27; and/or the heavy chain comprises an amino acid sequence having or having about 70%, 75%, 80%, 85%, 90%, 91%, 92%, 93%, 94%, 95%, 96%, 97%, 98%, 99% or 100% homology to the amino acid sequence of SEQ ID NO: 28. In some embodiments of the bispecific antibody, the light chain comprises the amino acid sequence of SEQ ID NO: 27, and the heavy chain comprises the amino acid sequence of SEQ ID NO: 28.

In some embodiments of the bispecific antibody, the light chain comprises an amino acid sequence having or having about 70%, 75%, 80%, 85%, 90%, 91%, 92%, 93%, 94%, 95%, 96%, 97%, 98%, 99% or 100% homology to the amino acid sequence of SEQ ID NO: 27; and/or the heavy chain comprises an amino acid sequence having or having about 70%, 75%, 80%, 85%, 90%, 91%, 92%, 93%, 94%, 95%, 96%, 97%, 98%, 99% or 100% homology to the amino acid sequence of SEQ ID NO: 29. In some embodiments of the bispecific antibody, the light chain comprises the amino acid sequence of SEQ ID NO: 27, and the heavy chain comprises the amino acid sequence of SEQ ID NO: 29.

In some embodiments of the bispecific antibody, the light chain comprises an amino acid sequence having or having about 70%, 75%, 80%, 85%, 90%, 91%, 92%, 93%, 94%, 95%, 96%, 97%, 98%, 99% or 100% homology to the amino acid sequence of SEQ ID NO: 32; and/or the heavy chain comprises an amino acid sequence having or having about 70%, 75%, 80%, 85%, 90%, 91%, 92%, 93%, 94%, 95%, 96%, 97%, 98%, 99% or 100% homology to the amino acid sequence of SEQ ID NO: 33. In some embodiments of the bispecific antibody, the light chain comprises the amino acid sequence of SEQ ID NO: 32, and the heavy chain comprises the amino acid sequence of SEQ ID NO: 33.

In some embodiments of the bispecific antibody, the light chain comprises an amino acid sequence having or having about 70%, 75%, 80%, 85%, 90%, 91%, 92%, 93%, 94%, 95%, 96%, 97%, 98%, 99% or 100% homology to the amino acid sequence of SEQ ID NO: 32; and/or the heavy chain comprises an amino acid sequence having or having about 70%, 75%, 80%, 85%, 90%, 91%, 92%, 93%, 94%, 95%, 96%, 97%, 98%, 99% or 100% homology to the amino acid sequence of SEQ ID NO: 34. In some embodiments of the bispecific antibody, the light chain comprises the amino acid sequence of SEQ ID NO: 32, and the heavy chain comprises the amino acid sequence of SEQ ID NO: 34.

In some embodiments of the bispecific antibody, the CTLA4 is a human CTLA4. In some embodiments of the bispecific antibody, the CTLA4 is a murine CTLA4. In some embodiments, the bispecific antibody is a murine antibody.

In some embodiments, the bispecific antibody is a humanized antibody, a chimeric antibody, or a human antibody. In some embodiments, the bispecific antibody has an IgG1, IgG2, IgG3 or IgG4 isotype. In some embodiments, the bispecific antibody has an IgG1 isotype comprising amino acid substitutions that enhance effector function as described herein.

In some embodiments, the bispecific antibody or antingen-binding fragment thereof is a dimer. In some embodiments, the bispecific antibody or antingen-binding fragment thereof is a homodimer. In some embodiments, the bispecific antibody or antingen-binding fragment thereof is a heterodimer. In some embodiments, the bispecific antibody or antingen-binding fragment thereof is a heterodimer comprising a first chain and a second chain, such as a heterodimer comprising a heavy chain and a light chain. In some embodiments, the bispecific antibody or antingen-binding fragment comprises a first chain and a second chain. In some embodiments, the first chain is or comprises a heavy chain, and the second chain is or comprises a light chain; or the first chain is or comprises a light chain, and the second chain is or comprises a heavy chain. In some embodiments, the first chain is or comprises a heavy chain variable region, and the second chain is or comprises a light chain variable region; or the first chain is or comprises a light chain variable region, and the second chain is or comprises a heavy chain variable region.

In some embodiments, the CTLA4 binding domain comprises a first chain and a second chain that binds to CTLA4, such as part of a ligand-binding domain for use in a chimeric receptor. In some embodiments of the chimeric receptor, the first chain is a light chain variable domain. In some embodiments, the second chain is a heavy chain variable domain. In some embodiments of the chimeric receptor, the first chain comprises (i) CDR-L1 comprising the amino acid sequence of SEQ ID NO:1 or 13, (ii) CDR-L2 comprising the amino acid sequence of SEQ ID NO:2 or 14, and (iii) CDR-L3 comprising the amino acid sequence of SEQ ID NO:3 or 15; and/or wherein the second chain comprises (i) CDR-H1 comprising the amino acid sequence of SEQ ID NO:4 or 16, (ii) CDR-H2 comprising the amino acid sequence of SEQ ID NO: 5 or 17, and (iii) CDR-H3 comprising the amino acid sequence of SEQ ID NO:6 or 18. In some embodiments of the chimeric receptor, the first chain comprises (i) a CDR-L1 comprising the amino acid sequence of SEQ ID NO:1, (ii) a CDR-L2 comprising the amino acid sequence of SEQ ID NO:2, and (iii) a CDR-L3 comprising the amino acid sequence of SEQ ID NO:3; and the second chain comprises (i) a CDR-H1 comprising the amino acid sequence of SEQ ID NO:4, (ii) a CDR-H2 comprising the amino acid sequence of SEQ ID NO:5, and (iii) a CDR-H3 comprising the amino acid sequence of SEQ ID NO:6. In some embodiments of the chimeric receptor, the first chain comprises (i) a CDR-L1 comprising the amino acid sequence of SEQ ID NO: 7, (ii) a CDR-L2 comprising the amino acid sequence of SEQ ID NO:8, and (iii) a CDR-L3 comprising the amino acid sequence of SEQ ID NO:9; and the second chain comprises (i) a CDR-H1 comprising the amino acid sequence of SEQ ID NO:10, (ii) a CDR-H2 comprising the amino acid sequence of SEQ ID NO:11, and (iii) a CDR-H3 comprising the amino acid sequence of SEQ ID NO:12. In some embodiments of the chimeric receptor, the first chain comprises (i) a CDR-L1 comprising the amino acid sequence of SEQ ID NO:13, (ii) a CDR-L2 comprising the amino acid sequence of SEQ ID NO:14, and (iii) a CDR-L3 comprising the amino acid sequence of SEQ ID NO:15; and the second chain comprises (i) a CDR-H1 comprising the amino acid sequence of SEQ ID NO:16, (ii) a CDR-H2 comprising the amino acid sequence of SEQ ID NO:17, and (iii) a CDR-H3 comprising the amino acid sequence of SEQ ID NO:18. In some embodiments of the chimeric receptor, the first chain comprises (i) a CDR-L1 comprising the amino acid sequence of SEQ ID NO:19, (ii) a CDR-L2 comprising the amino acid sequence of SEQ ID NO:20, and (iii) a CDR-L3 comprising the amino acid sequence of SEQ ID NO:21; and the second chain comprises (i) a CDR-H1 comprising the amino acid sequence of SEQ ID NO:22, (ii) a CDR-H2 comprising the amino acid sequence of SEQ ID NO: 23, and (iii) a CDR-H3 comprising the amino acid sequence of SEQ ID NO:24.

In some embodiments of the chimeric receptor, the first chain comprises an amino acid sequence having or having about 70%, 75%, 80%, 85%, 90%, 91%, 92%, 93%, 94%, 95%, 96%, 97%, 98%, 99% or 100% homology to the amino acid sequence of SEQ ID NO: 30; and/or the second chain comprises an amino acid sequence having or having about 70%, 75%, 80%, 85%, 90%, 91%, 92%, 93%, 94%, 95%, 96%, 97%, 98%, 99% or 100% homology to the amino acid sequence of SEQ ID NO: 31. In some embodiments of the chimeric receptor, the first chain comprises the amino acid sequence of SEQ ID NO:25 or 30; and/or the second chain comprises the amino acid sequence of SEQ ID NO:26 or 31. In some embodiments of the chimeric receptor, the first chain comprises the amino acid sequence of SEQ ID NO: 30, and the second chain comprises the amino acid sequence of SEQ ID NO: 31.

The CTLA4 binding protein can be conjugated to an additional molecule, by a variety of methods well known in the art. The terms "conjugate" and "conjugate chemistry" refer to reactions with known reactive groups which proceed under relatively mild conditions. These include, but are not limited to nucleophilic substitutions (e.g., reactions of amines and alcohols with acyl halides, active esters), electrophilic substitutions (e.g., enamine reactions) and additions to carbon-carbon and carbon-heteroatom multiple bonds (e.g., Michael reaction, Diels-Alder addition). These and other useful reactions are discussed in, for example, March, Advanced Organic Chemistry, 3rd Ed., John Wiley & Sons, New York, 1985; Hermanson, Bioconjugate Techniques, Academic Press, San Diego, 1996; and Feeney et al., Modification of Proteins; Advances in Chemistry Series, Vol. 198, American Chemical Society, Washington, D.C., 1982.

Useful reactive functional groups used for conjugate chemistries herein include, for example: (a) carboxyl groups and various derivatives thereof including, but not limited to, N-hydroxysuccinimide esters, N-hydroxybenztriazole esters, acid halides, acyl imidazoles, thioesters, p-nitrophenyl esters, alkyl, alkenyl, alkynyl and aromatic esters; (b) hydroxyl groups which can be converted to esters, ethers, aldehydes, etc. (c) haloalkyl groups wherein the halide can be later displaced with a nucleophilic group such as, for example, an amine, a carboxylate anion, thiol anion, carbanion, or an alkoxide ion, thereby resulting in the covalent attachment of a new group at the site of the halogen atom; (d) dienophile groups which are capable of participating in Diels-Alder reactions such as, for example, maleimido groups; (e) aldehyde or ketone groups such that subsequent derivatization is possible via formation of carbonyl derivatives such as, for example, imines, hydrazones, semicarbazones or oximes, or via such mechanisms as Grignard addition or alkyllithium addition; (f) sulfonyl halide groups for subsequent reaction with amines, for example, to form sulfonamides; (g) thiol groups, which can be converted to disulfides, reacted with acyl halides, or bonded to metals such as gold; (h) amine or sulfhydryl groups, which can be, for example, acylated, alkylated or oxidized; (i) alkenes, which can undergo, for example, cycloadditions, acylation, Michael addition, etc; (j) epoxides, which can react with, for example, amines and hydroxyl compounds; (k) phosphoramidites and other standard functional groups useful in nucleic acid synthesis; (i) metal silicon oxide bonding; and (1) metal bonding to reactive phosphorus groups (e.g. phosphines) to form, for example, phosphate diester bonds.

The reactive functional groups can be chosen such that they do not participate in, or interfere with, the chemical stability of the compositions described herein. Alternatively, a reactive functional group can be protected from participating in the crosslinking reaction by the presence of a protecting group.

In some embodiments, linkers can be engineered to be fused to the additional molecule and/or the CTLA4 binding protein by a variety of methods well known in the art. For example, a nucleic acid can be engineered to encode a linker with an additional molecule and/or a CTLA4 binding protein to produce a fusion protein when recombinantly expressed from a host cell.

Exemplary CTLA4 Binding Proteins

The following describes certain exemplary embodiments of CTLA4 binding proteins containing certain features as described above. These embodiments are merely exemplary and are not to be construed as being limiting.

Provided herein, in some embodiments, is an antibody or antigen-binding fragment thereof that binds to CTLA4 (e.g., human CTLA4), wherein the antibody or antigen-binding fragment thereof comprises a first chain and a second chain. In some embodiments, the antibody or antigen-binding fragment thereof that binds to CTLA4 is any anti-CTLA4 antibody or antigen-binding fragment thereof described herein. In some embodiments, the antibody or antigen-binding fragment thereof comprises two first chains and two second chains. In some embodiments, the first chain is a light chain and the second chain is a heavy chain. In some embodiments, the first chain is a light chain variable domain and the second chain is a heavy chain variable domain. In some embodiments, the a) the first chain of the antibody is a light chain and the second chain of the antibody is a light chain; b) the first chain of the antibody is a heavy chain and the second chain of the antibody is a heavy chain; or c) the first chain of the antibody is a light chain and the second chain of the antibody is a heavy chain.

Also provided herein, in some embodiments, is an anti-CTLA4 antibody or antigen-binding fragment thereof comprising a light chain variable region comprising a CDR-L1 comprising the amino acid sequence of SEQ ID NO:19, a CDR-L2 comprising the amino acid sequence of SEQ ID NO:20, and a CDR-L3 comprising the amino acid sequence of SEQ ID NO: 21; and a heavy chain variable region comprising a CDR-H1 comprising the amino acid sequence of SEQ ID NO:22, a CDR-H2 comprising the amino acid sequence of SEQ ID NO:23, and a CDR-H3 comprising the amino acid sequence of SEQ ID NO:24.

In some embodiments, the light chain variable region comprises the amino acid sequence of SEQ ID NO: 30, and the heavy chain variable region comprises the amino acid sequence of SEQ ID NO: 31. In some embodiments, the anti-CTLA4 antibody or antigen-binding fragment thereof comprises a heavy chain comprising the amino acid sequence of SEQ ID NO: 34 and a light chain comprising the amino acid sequence of SEQ ID NO: 32.

In one aspect, provided herein is an anti-CTLA4 antibody or antigen-binding fragment thereof comprising a light chain variable region comprising the amino acid sequence of SEQ ID NO:25 or 30 and/or a heavy chain variable region comprising the amino acid sequence of SEQ ID NO:26 or 31. In some embodiments, provided herein is an anti-CTLA4 antibody or antigen-binding fragment thereof comprising a light chain variable region comprising the amino acid sequence of SEQ ID NO: 30, and a heavy chain variable region comprising the amino acid sequence of SEQ ID NO: 31.

In a further aspect, provided herein is an anti-CTLA4 antibody or antigen-binding fragment thereof comprising a light chain comprising the amino acid sequence selected from SEQ ID NOs: 27 and 32 and/or comprising a heavy chain comprising the amino acid sequence selected from SEQ ID NOs: 28, 29, 33 and 34. In some embodiments, provided herein is an anti-CTLA4 antibody or antigen-binding fragment thereof comprising a light chain comprising the amino acid sequence of SEQ ID NO: 27, and a heavy chain comprising the amino acid sequence of SEQ ID NO: 29. In some embodiments, provided herein is an anti-CTLA4 antibody or antigen-binding fragment thereof comprising a light chain comprising the amino acid sequence of SEQ ID NO: 27, and a heavy chain comprising the amino acid sequence of SEQ ID NO: 28. In some embodiments, provided herein is an anti-CTLA4 antibody or antigen-binding fragment thereof comprising a light chain comprising the amino acid sequence of SEQ ID NO: 32, and a heavy chain comprising the amino acid sequence of SEQ ID NO: 33. In some embodiments, provided herein is an anti-CTLA4 antibody or antigen-binding fragment thereof comprising a light chain comprising the amino acid sequence of SEQ ID NO: 32, and a heavy chain comprising the amino acid sequence of SEQ ID NO: 34.

In some embodiments, provided herein is an anti-CTLA4 antibody or antigen-binding fragment thereof comprising a heavy chain variable domain comprising an amino acid sequence having at least 90%, 91%, 92%, 93%, 94%, 95%, 96%, 97%, 98%, or 99% sequence identity to an amino acid sequence selected from SEQ ID NOs: 26 and 31. In some embodiments, provided herein is an anti-CTLA4 antibody or antigen-binding fragment thereof comprising a heavy chain variable domain comprising an amino acid sequence having at least 90%, 91%, 92%, 93%, 94%, 95%, 96%, 97%, 98%, or 99% sequence identity to an amino acid sequence of SEQ ID NO:26. In some embodiments, provided herein is an anti-CTLA4 antibody or antigen-binding fragment thereof comprising a heavy chain variable domain comprising an amino acid sequence having at least 90%, 91%, 92%, 93%, 94%, 95%, 96%, 97%, 98%, or 99% sequence identity to an amino acid sequence of SEQ ID NO:31. In some embodiments, an amino acid sequence having at least 90%, 91%, 92%, 93%, 94%, 95%, 96%, 97%, 98%, or 99% sequence identity contains substitutions, insertions, or deletions relative to the reference sequence, but an antibody comprising that amino acid sequence retains the ability to bind to CTLA4 (e.g., human CTLA4). In some embodiments, the substitutions, insertions, or deletions (e.g., 1, 2, 3, 4, or 5 amino acids) occur in regions outside the HVRs (i.e., in the FRs). In some embodiments, an anti-CTLA4 antibody or antigen-binding fragment thereof comprises a heavy chain variable domain comprising an amino acid sequence of SEQ ID NO:26 or 31. In some embodiments, an anti-CTLA4 antibody or antigen-binding fragment thereof comprises a heavy chain variable domain comprising an amino acid sequence of SEQ ID NO:26. In some embodiments, an anti-CTLA4 antibody or antigen-binding fragment thereof comprises a heavy chain variable domain comprising an amino acid sequence of SEQ ID NO:31.

In some embodiments, provided herein is an anti-CTLA4 antibody or antigen-binding fragment thereof comprising a heavy chain variable domain comprising an amino acid sequence having at least 90%, 91%, 92%, 93%, 94%, 95%, 96%, 97%, 98%, or 99% sequence identity to an amino acid sequence of SEQ ID NO:25 or 30. In some embodiments, provided herein is an anti-CTLA4 antibody or antigen-binding fragment thereof comprising a heavy chain variable domain comprising an amino acid sequence having at least 90%, 91%, 92%, 93%, 94%, 95%, 96%, 97%, 98%, or 99% sequence identity to an amino acid sequence of SEQ ID NO:25. In some embodiments, provided herein is an anti-CTLA4 antibody or antigen-binding fragment thereof comprising a heavy chain variable domain comprising an amino acid sequence having at least 90%, 91%, 92%, 93%, 94%, 95%, 96%, 97%, 98%, or 99% sequence identity to an amino acid sequence of SEQ ID NO:30. In some embodiments, an amino acid sequence having at least 90%, 91%, 92%, 93%, 94%, 95%, 96%, 97%, 98%, or 99% sequence identity contains substitutions, insertions, or deletions relative to the reference sequence, but an antibody comprising that amino acid sequence retains the ability to bind to CTLA4 (e.g., human CTLA4). In some embodiments, the substitutions, insertions, or deletions (e.g., 1, 2, 3, 4, or 5 amino acids) occur in regions outside the HVRs (i.e., in the FRs). In some embodiments, an anti-CTLA4 antibody or antigen-binding fragment thereof comprises a heavy chain variable domain comprising an amino acid sequence of SEQ ID NO:25 or 30. In some embodiments, an anti-CTLA4 antibody or antigen-binding fragment thereof comprises a heavy chain variable domain comprising an amino acid sequence of SEQ ID NO:25. In some embodiments, an anti-CTLA4 antibody or antigen-binding fragment thereof comprises a heavy chain variable domain comprising an amino acid sequence of SEQ ID NO:30.

There are five classes of immunoglobulins: IgA, IgD, IgE, IgG and IgM, having heavy chains designated α, δ, ε, γ and μ, respectively. The α and α classes are further divided into subclasses e.g., humans express the following subclasses: IgG1, IgG2, IgG3, IgG4, IgA1 and IgA2. IgG1 antibodies can exist in multiple polymorphic variants termed allotypes (reviewed in Jefferis and Lefranc 2009. mAbs Vol 1 Issue 4 1-7) any of which are suitable for use in some of the embodiments herein. Common allotypic variants in human populations are those designated by the letters a,f,n,z or combinations thereof. In some of the embodiments herein, the antibody has an IgG1, IgG2, IgG3, or IgG4 isotype. In some embodiments, an anti-CTLA4 antibody or antigen-binding fragment thereof provided herein has an IgG1 isotype (e.g., a human IgG1 isotype). In some embodiments, the antibody provided herein comprises a heavy chain constant domain comprising the amino acid sequence of SEQ ID NO:35. In some embodiments, the antibody provided herein comprises a heavy chain constant domain comprising the amino acid sequence of SEQ ID NO: 38.

In one aspect of the invention, polynucleotides encoding anti-CTLA4 antibodies or antigen-binding fragments thereof are provided. In certain embodiments, vectors comprising polynucleotides encoding anti-CTLA4 antibodies or antigen-binding fragments thereof are provided. In certain embodiments, host cells comprising such vectors are provided. In another aspect of the invention, compositions comprising anti-CTLA4 antibodies described herein or polynucleotides encoding anti-CTLA4 antibodies described herein are provided. In certain embodiments, a composition of the invention is a pharmaceutical formulation for the treatment of a neoplastic disease in which CTLA4 plays a role, such as those enumerated herein.

In some embodiments, the CTLA4 binding protein provided herein is a bispecific antibody capable of binding to CTLA4. Bispecific antibodies are monoclonal antibodies that have binding specificities for at least two different antigens. In some embodiments, one of the binding specificities is for CTLA4 and the other is for any other antigen. In certain embodiments, bispecific antibodies may bind to two different epitopes of CTLA4.

In some aspects, provided herein is a bispecific antibody comprising a) a light chain and a heavy chain of a first pair that specifically binds to CTLA4 and b) a light chain and a heavy chain of a second pair that specifically binds to an antigen. In some aspects, provided herein is a bispecific antibody comprising a) a light chain and a heavy chain of a first pair that specifically binds to CTLA4; and b) a light chain and a heavy chain of a second pair that specifically binds to an antigen. In some embodiments, the antigen is an antigen different from CTLA4. In some embodiments, the light chain of the first pair or the second pair is any light chain described herein. In some embodiments, the heavy chain of the first pair or the second pair is any light chain described herein. In some embodiments, the light chain of the first pair comprises a CDR-L1 comprising the amino acid sequence of SEQ ID NO:19, a CDR-L2 comprising the amino acid sequence of SEQ ID NO:20, and a CDR-L3 comprising the amino acid sequence of SEQ ID NO:21; and the heavy chain of the first pair comprises a CDR-H1 comprising the amino acid sequence of SEQ ID NO:22, a CDR-H2 comprising the amino acid sequence of SEQ ID NO:23, and a CDR-H3 comprising the amino acid sequence of SEQ ID NO: 24. In some embodiments, the light chain of the second pair comprises a CDR-L1 comprising the amino acid sequence of SEQ ID NO:19, a CDR-L2 comprising the amino acid sequence of SEQ ID NO:20, and a CDR-L3 comprising the amino acid sequence of SEQ ID NO: 21; and the heavy chain of the second pair comprises a CDR-H1 comprising the amino acid sequence of SEQ ID NO:22, a CDR-H2 comprising the amino acid sequence of SEQ ID NO:23, and a CDR-H3 comprising the amino acid sequence of SEQ ID NO:24. In some embodiments, the antigen is to a different epitope of CTLA4.

Bispecific antibodies contemplated herein for use in the bispecific antibodies include murine bispecific antibodies, humanized bispecific antibodies, chimeric bispecific antibodies, and human bispecific antibodies. In some of the embodiments herein, the bispecific antibody has an IgG1, IgG2, IgG3, or IgG4 isotype. In some embodiments, a bispecific antibody provided herein has an IgG1 isotype (e.g., a human IgG1 isotype). In some embodiments, the antibody has an IgG1 isotype comprising amino acid substitutions or is expressed by cells that have no ability to a reduced ability to fucosylate the Fc glycan. that enhance effector function as described herein. In some embodiments, the bispecific antibody provided herein comprises a heavy chain constant domain comprising the amino acid sequence of SEQ ID NO:35. In some embodiments, the bispecific antibody provided herein comprises a heavy chain constant domain comprising the amino acid sequence of SEQ ID NO:38.

In one aspect, provided herein is an anti-CTLA4 bispecific antibody comprising a light chain variable region comprising the amino acid sequence selected from SEQ ID NOs: 25 and 30 and/or a heavy chain variable region comprising the amino acid sequence selected from SEQ ID NOs: 26 and 31. In a further aspect, provided herein is an anti-CTLA4 bispecific antibody comprising a light chain comprising the amino acid sequence selected from SEQ ID NOs: 27 and 32 and/or comprising a heavy chain comprising the amino acid sequence selected from SEQ ID NOs: 28, 29, 33 and 34. In some embodiments, provided herein is an anti-CTLA4 bispecific antibody or antigen-binding fragment thereof comprising a light chain comprising the amino acid sequence of SEQ ID NO: 27, and a heavy chain comprising the amino acid sequence of SEQ ID NO: 29. In some embodiments, provided herein is an anti-CTLA4 bispecific antibody or antigen-binding fragment thereof comprising a light chain comprising the amino acid sequence of SEQ ID NO: 27, and a heavy chain comprising the amino acid sequence of SEQ ID NO: 28. In some embodiments, provided herein is an anti-CTLA4 bispecific antibody or antigen-binding fragment thereof comprising a light chain comprising the amino acid sequence of SEQ ID NO: 32, and a heavy chain comprising the amino acid sequence of SEQ ID NO: 33. In some embodiments, provided herein is an anti-CTLA4 bispecific antibody or antigen-binding fragment thereof comprising a light chain comprising the amino acid sequence of SEQ ID NO: 32, and a heavy chain comprising the amino acid sequence of SEQ ID NO: 34.

In some embodiments, provided herein is an anti-CTLA4 bispecific antibody or antigen-binding fragment thereof comprising a heavy chain variable domain comprising an amino acid sequence having at least 90%, 91%, 92%, 93%, 94%, 95%, 96%, 97%, 98%, or 99% sequence identity to an amino acid sequence selected from SEQ ID NOs: 26 and 31. In some embodiments, provided herein is an anti-CTLA4 bispecific antibody or antigen-binding fragment thereof comprising a heavy chain variable domain comprising an amino acid sequence having at least 90%, 91%, 92%, 93%, 94%, 95%, 96%, 97%, 98%, or 99% sequence identity to an amino acid sequence of SEQ ID NO:26. In some embodiments, provided herein is an anti-CTLA4 bispecific antibody or antigen-binding fragment thereof comprising a heavy chain variable domain comprising an amino acid sequence having at least 90%, 91%, 92%, 93%, 94%, 95%, 96%, 97%, 98%, or 99% sequence identity to an amino acid sequence of SEQ ID NO:31. In some embodiments, an amino acid sequence having at least 90%, 91%, 92%, 93%, 94%, 95%, 96%, 97%, 98%, or 99% sequence identity contains substitutions, insertions, or deletions relative to the reference sequence, but an antibody comprising that amino acid sequence retains the ability to bind to CTLA4 (e.g., human CTLA4). In some embodiments, the substitutions, insertions, or deletions (e.g., 1, 2, 3, 4, or 5 amino acids) occur in regions outside the HVRs (i.e., in the FRs). In some embodiments, an anti-CTLA4 bispecific antibody or antigen-binding fragment thereof comprises a heavy chain variable domain comprising an amino acid sequence selected from SEQ ID NOs: 26 and 31. In some embodiments, an anti-CTLA4 bispecific antibody or antigen-binding fragment thereof comprises a heavy chain variable domain comprising an amino acid sequence of SEQ ID NO:26. In some embodiments, an anti-CTLA4 bispecific antibody or antigen-binding fragment thereof comprises a heavy chain variable domain comprising an amino acid sequence of SEQ ID NO:31.

In some embodiments, provided herein is an anti-CTLA4 bispecific antibody or antigen-binding fragment thereof comprising a heavy chain variable domain comprising an amino acid sequence having at least 90%, 91%, 92%, 93%, 94%, 95%, 96%, 97%, 98%, or 99% sequence identity to an amino acid sequence selected from SEQ ID NOs: 25 and 30. In some embodiments, provided herein is an anti-CTLA4 bispecific antibody or antigen-binding fragment thereof comprising a heavy chain variable domain comprising an amino acid sequence having at least 90%, 91%, 92%, 93%, 94%, 95%, 96%, 97%, 98%, or 99% sequence identity to an amino acid sequence of SEQ ID NO:25. In some embodiments, provided herein is an anti-CTLA4 bispecific antibody or antigen-binding fragment thereof comprising a heavy chain variable domain comprising an amino acid sequence having at least 90%, 91%, 92%, 93%, 94%, 95%, 96%, 97%, 98%, or 99% sequence identity to an amino acid sequence of SEQ ID NO:30. In some embodiments, an amino acid sequence having at least 90%, 91%, 92%, 93%, 94%, 95%, 96%, 97%, 98%, or 99% sequence identity contains substitutions, insertions, or deletions relative to the reference sequence, but an antibody comprising that amino acid sequence retains the ability to bind to CTLA4 (e.g., human CTLA4). In some embodiments, the substitutions, insertions, or deletions (e.g., 1, 2, 3, 4, or 5 amino acids) occur in regions outside the HVRs (i.e., in the FRs). In some embodiments, an anti-CTLA4 bispecific antibody or antigen-binding fragment thereof comprises a heavy chain variable domain comprising an amino acid sequence selected from SEQ ID NOs: 25 and 30. In some embodiments, an anti-CTLA4 bispecific antibody or antigen-binding fragment thereof comprises a heavy chain variable domain comprising an amino acid sequence of SEQ ID NO:25. In some embodiments, an anti-CTLA4 bispecific antibody or antigen-binding fragment thereof comprises a heavy chain variable domain comprising an amino acid sequence of SEQ ID NO:30.

In some embodiments, the CTLA4 binding protein provided herein is a chimeric receptor (e.g., chimeric antigen receptor (CAR)) capable of binding to CTLA4. CARs are molecules that combine antibody-based specificity for a desired antigen (e.g., CTLA4) with a T cell receptor-activating intracellular domain to generate a chimeric protein that exhibits a specific anti-tumor cellular activity. In one embodiment, provided herein is a chimeric receptor engineered to comprise an extracellular domain having a CTLA4 binding domain described herein fused to an intracellular signaling domain of the T cell antigen receptor complex zeta chain (e.g., CD3 zeta). The chimeric receptor provide herein, when expressed in a T cell is able to redirect antigen recognition based on the antigen binding specificity by virtue of the extracellular domain. In some embodiments, the CTLA4 binding domain is preferably fused with an intracellular domain from one or more of a costimulatory molecule and a zeta chain. In some embodiments, the CTLA4 binding domain is fused with one or more intracellular domains selected from the group of a CD137 (4-1BB) signaling domain, a CD28 signaling domain, a CD3zeta signal domain, and any combination thereof.

In some aspects, provided herein is a chimeric receptor comprising a) a ligand-binding domain comprising a first chain and a second chain that binds to CTLA4; b) a transmembrane domain; and c) an intracellular signaling domain comprising a signaling domain. In some embodiments the first chain is a light chain variable domain and the second chain is a heavy chain variable domain. In some embodiments, the first chain comprises the amino acid sequence selected from SEQ ID NOs: 25 and 30; and/or the second chain comprises the amino acid sequence selected from SEQ ID NOs: 26 and 31.

In some aspects, provided herein is a chimeric receptor comprising a) a ligand-binding domain comprising a first chain and a second chain that binds to CTLA4; b) a transmembrane domain; and d) an intracellular signaling domain comprising a signaling domain. In some embodiments the first chain is a light chain variable domain and the second chain is a heavy chain variable domain. In some embodiments, the first chain comprises the amino acid sequence selected from SEQ ID NOs: 25 and 30; and/or the second chain comprises the amino acid sequence selected from SEQ ID NOs: 26 and 31.

In some aspects, provided herein is a chimeric receptor comprising 1) a ligand-binding domain comprising a VL domain and a VH domain that bind to CTLA4, wherein: a) the VL domain comprises a CDR-L1, a CDR-L2 and a CDR-L3 contained within the amino acid sequence of SEQ ID NO: 25 and the VH domain comprises a CDR-H1, a CDR-H2 and a CDR-H3 contained within the amino acid sequence of SEQ ID NO: 26; or b) the VL domain comprises a CDR-L1, a CDR-L2 and a CDR-L3 contained within the amino acid sequence of SEQ ID NO: 30 and the VH domain comprises a CDR-H1, a CDR-H2 and a CDR-H3 contained within the amino acid sequence of SEQ ID NO: 31; 2) a transmembrane domain; and 3) an intracellular signaling domain comprising a signaling domain.

In some aspects, provided herein is a chimeric receptor comprising 1) a ligand-binding domain comprising a VL domain and a VH domain that bind to CTLA4, wherein: a) the VL domain comprises (i) a CDR-L1 comprising the amino acid sequence of SEQ ID NO: 1, (ii) a CDR-L2 comprising the amino acid sequence of SEQ ID NO: 2, and (iii) a CDR-L3 comprising the amino acid sequence of SEQ ID NO: 3; and/or the VH domain comprises (i) a CDR-H1 comprising the amino acid sequence of SEQ ID NO: 4, (ii) a CDR-H2 comprising the amino acid sequence of SEQ ID NO: 5, and (iii) a CDR-H3 comprising the amino acid sequence of SEQ ID NO: 6; or b) the VL domain comprises (i) a CDR-L1 comprising the amino acid sequence of SEQ ID NO: 13, (ii) a CDR-L2 comprising the amino acid sequence of SEQ ID NO: 14, and (iii) a CDR-L3 comprising the amino acid sequence of SEQ ID NO: 15; and/or the VH domain comprises (i) a CDR-H1 comprising the amino acid sequence of SEQ ID NO: 16, (ii) a CDR-H2 comprising the amino acid sequence of SEQ ID NO: 17, and (iii) a CDR-H3 comprising the amino acid sequence of SEQ ID NO: 18; or c) the VL domain comprises (i) a CDR-L1 comprising the amino acid sequence of SEQ ID NO: 7, (ii) a CDR-L2 comprising the amino acid sequence of SEQ ID NO: 8, and (iii) a CDR-L3 comprising the amino acid sequence of SEQ ID NO: 9; and/or the VH domain comprises (i) a CDR-H1 comprising the amino acid sequence of SEQ ID NO: 10, (ii) a CDR-H2 comprising the amino acid sequence of SEQ ID NO: 11, and (iii) a CDR-H3 comprising the amino acid sequence of SEQ ID NO: 12; or d) the VL domain comprises (i) a CDR-L1 comprising the amino acid sequence of SEQ ID NO: 19, (ii) a CDR-L2 comprising the amino acid sequence of SEQ ID NO: 20, and (iii) a CDR-L3 comprising the amino acid sequence of SEQ ID NO: 21; and/or the VH domain comprises (i) a CDR-H1 comprising the amino acid sequence of SEQ ID NO: 22, (ii) a CDR-H2 comprising the amino acid sequence of SEQ ID NO: 23, and (iii) a CDR-H3 comprising the amino acid sequence of SEQ ID NO: 24; 2) a transmembrane domain; and 3) an intracellular signaling domain comprising a signaling domain.

In some aspects, in any of the provided chimeric receptors, a) the VL domain comprises an amino acid sequence that has at least about 90% sequence identity to the amino acid sequence of SEQ ID NO: 25, and the VH domain comprises an amino acid sequence that has at least about 90% sequence identity to the amino acid sequence of SEQ ID NO: 26; or b) the VL domain comprises an amino acid sequence that has at least about 90% sequence identity to the amino acid sequence of SEQ ID NO: 30, and the VH domain comprises an amino acid sequence that has at least about 90% sequence identity to the amino acid sequence of SEQ ID NO: 31.

In some aspects, in any of the provided chimeric receptors, a) the VL domain comprises the amino acid sequence of SEQ ID NO: 25, and the VH domain comprises the amino acid sequence of SEQ ID NO: 26; or b) the VL domain comprises the amino acid sequence of SEQ ID NO: 30, and the VH domain comprises the amino acid sequence of SEQ ID NO: 31.

1. Binding Affinity

The strength, or affinity of immunological binding interactions, such as between an antibody and an antigen for which the antibody is specific, can be expressed in terms of the equilibrium dissociation constant ($K_D$) of the interaction, wherein a smaller Kd represents a greater affinity. Immunological binding properties of proteins can be quantified using methods well known in the art. For example, one method comprises measuring the rates of antigen-binding protein (e.g., antibody)/antigen complex formation and dissociation, wherein those rates depend on the concentrations of the complex partners, the affinity of the interaction, and geometric parameters that equally influence the rate in both directions. Both the "on rate constant" (Kon) and the "off rate constant" (Koff) can be determined by calculation of the concentrations and the actual rates of association and dissociation. The ratio of Koff/Kon enables the cancelation of all parameters not related to affinity, and is equal to the equilibrium dissociation constant $K_D$. See Davies et al., Annual Rev Biochem. 59:439-473, (1990).

In some aspects, an anti-CTLA4 binding protein (e.g., anti-CTLA4 antibody or antigen-binding fragment thereof) described herein binds to CTLA4 with about the same or higher affinity compared to a different anti-CTLA4 binding protein. In certain embodiments, an anti-CTLA4 binding protein provided herein has an equilibrium dissociation constant ($K_D$) of ≤1 µM, ≤150 nM, ≤100 nM, ≤50 nM, ≤10 nM, ≤1 nM, ≤0.1 nM, ≤0.01 nM, or ≤0.001 nM (e.g. 10-8 M or less, e.g. from 10-8 M to 10-13 M, e.g., from 10-9 M to 10-13 M). In some embodiments, an anti-CTLA4 binding protein (e.g., an anti-CTLA4 antibody or antigen-binding fragment thereof) provided herein binds to a target protein (e.g., CTLA4 protein) with an equilibrium dissociation constant ($K_D$) of about 50 pM to about 5 nM. Assays for assessing binding affinity are well known in the art, for example such as in in assays described in Example 1 herein.

2. Biological Activity Assays

In some aspects, an anti-CTLA4 binding protein described herein reduces tumor volume in an in vivo murine tumor model. Assays for assessing reduction of tumor volume are well known in the art, for example such as in in the assay described in Example 1 herein.

III. Anti-CTLA4 Binding Protein Preparation

The anti-CTLA4 binding proteins described herein are prepared using techniques available in the art, exemplary methods of which are described in more detail in the following sections.

1. Anti-CTLA4 Binding Protein: Antibody Fragments

The present invention encompasses antibody fragments as anti-CTLA4 binding proteins. Antibody fragments may be generated by traditional means, such as enzymatic digestion, or by recombinant techniques. In certain circumstances there are advantages of using antibody fragments, rather than whole antibodies. For a review of certain antibody fragments, see Hudson et al. (2003) Nat. Med. 9:129-134.

Various techniques have been developed for the production of antibody fragments. Traditionally, these fragments were derived via proteolytic digestion of intact antibodies (see, e.g., Morimoto et al., Journal of Biochemical and Biophysical Methods 24:107-117 (1992); and Brennan et al., Science, 229:81 (1985)). However, these fragments can now be produced directly by recombinant host cells. Fab, Fv and ScFv antibody fragments can all be expressed in and secreted from E. coli and other cell types, thus allowing the facile production of large amounts of these fragments. Alternatively, Fab'-SH fragments can be directly recovered from culture media and chemically coupled to form F(ab')2 fragments (Carter et al., Bio/Technology 10:163-167 (1992)). According to another approach, F(ab')2 fragments can be isolated directly from recombinant host cell culture. Fab and F(ab')2 fragment with increased in vivo half-life comprising FcRN/salvage receptor binding epitope residues are described in U.S. Pat. No. 5,869,046. Other techniques for the production of antibody fragments will be apparent to the skilled practitioner. In certain embodiments, an antibody is a single chain Fv fragment (scFv). See WO 93/16185; U.S. Pat. Nos. 5,571,894; and 5,587,458. Fv and scFv are the only species with intact combining sites that are devoid of constant regions; thus, they may be suitable for reduced nonspecific binding during in vivo use. scFv fusion proteins may be constructed to yield fusion of an effector protein at either the amino or the carboxy terminus of an scFv. See Antibody Engineering, ed. Borrebaeck, supra. Also, bi-scFv comprising two scFvs linked via a polypeptide linker can be used as a bispecific antibody. Alternatively, multi-scFv comprising three or more scFvs may be used as a multispecific antibody.

The present invention includes a linear antibody (e.g., as described in U.S. Pat. No. 5,641,870) or a single chain immunoglobulin comprising heavy and light chain sequences of the antibody linked via an appropriate linker. Such linear antibodies or immunoglobulins may be monospecific or bispecific. Such a single chain immunoglobulin can be dimerized to thereby maintain a structure and activities similar to those of the antibody, which is originally a tetramer. Also, the antibody of the present invention may be an antibody that has a single heavy chain variable region and has no light chain sequence. Such an antibody, called a single domain antibody (sdAb) or a nanobody. These antibodies are also encompassed in the meaning of the functional fragment of the antibody according to the present invention.

2. Anti-CTLA4 Binding Protein: Humanized Antibodies

The invention encompasses humanized antibodies. Humanized antibodies are generated according to the guidance provided herein. Various methods for humanizing non-human antibodies are known in the art. For example, a humanized antibody can have one or more amino acid residues introduced into it from a source which is non-human. These non-human amino acid residues are often referred to as "import" residues, which are typically taken from an "import" variable domain. Humanization can be essentially performed following the method of Winter (Jones et al. (1986) Nature 321:522-525; Riechmann et al. (1988) Nature 332:323-327; Verhoeyen et al. (1988) Science 239:1534-1536), by substituting hypervariable region sequences for the corresponding sequences of a human antibody. Accordingly, such "humanized" antibodies are chimeric antibodies (U.S. Pat. No. 4,816,567) wherein substantially less than an intact human variable domain has been substituted by the corresponding sequence from a non-human species. In practice, humanized antibodies are typically human antibodies in which some hypervariable region residues and possibly some FR residues are substituted by residues from analogous sites in rodent antibodies.

3. Anti-CTLA4 Binding Protein: Human Antibodies

Human anti-CTLA4 antibodies of the invention can be constructed by combining Fv clone variable domain sequence(s) selected from human-derived phage display libraries with known human constant domain sequences(s). Alternatively, human monoclonal anti-CTLA4 antibodies of the invention can be made by the hybridoma method. Human myeloma and murine-human heteromyeloma cell lines for the production of human monoclonal antibodies have been described, for example, by Kozbor J. Immunol., 133:3001 (1984); Brodeur et al., Monoclonal Antibody Production Techniques and Applications, pp. 51-63 (Marcel Dekker, Inc., New York, 1987); and Boerner et al., J. Immunol., 147:86 (1991). Human antibodies are generated according to the guidance provided herein.

4. Anti-CTLA4 Binding Protein: Bispecific Antibodies

Bispecific antibodies are monoclonal antibodies that have binding specificities for at least two different antigens. In certain embodiments, bispecific antibodies are human or humanized antibodies. In certain embodiments, one of the binding specificities is for CTLA4 and the other is for any other antigen. In certain embodiments, bispecific antibodies may bind to two different epitopes of CTLA4. Bispecific antibodies may also be used to localize cytotoxic agents to cells which express CTLA4. Bispecific antibodies can be prepared as full length antibodies or antibody fragments (e.g. F(ab')2 bispecific antibodies). Bispecific antibodies are generated according to the guidance provided herein.

Methods for making bispecific antibodies are known in the art. See Milstein and Cuello, Nature, 305:537 (1983), WO 93/08829 published May 13, 1993, Traunecker et al., EMBO J., 10:3655 (1991); Kontermann and Brinkmann, Drug Discovery Today, 20 (7): 838-847. For further details of generating bispecific antibodies see, for example, Suresh et al., Methods in Enzymology, 121:210 (1986). Bispecific antibodies include cross-linked or "heteroconjugate" antibodies. For example, one of the antibodies in the heteroconjugate can be coupled to avidin, the other to biotin. Heteroconjugate antibodies may be made using any convenient cross-linking method. Suitable cross-linking agents are well known in the art, and are disclosed in U.S. Pat. No. 4,676,980, along with a number of cross-linking techniques.

5. Anti-CTLA4 Binding Protein: Single-Domain Antibodies

In some embodiments, a single-domain antibody is generated in accordance with the guidance provided herein. A single-domain antibody is a single polypeptide chain comprising all or a portion of the heavy chain variable domain or all or a portion of the light chain variable domain of an antibody. In certain embodiments, a single-domain antibody is a human single-domain antibody (Domantis, Inc., Waltham, Mass.; see, e.g., U.S. Pat. No. 6,248,516 B1). In one embodiment, a single-domain antibody consists of all or a portion of the heavy chain variable domain of an antibody.

6. Anti-CTLA4 Binding Protein: Antibody Variants

In some embodiments, amino acid sequence modification(s) of the antibodies described herein are contemplated. For example, it may be desirable to improve the binding affinity and/or other biological properties of the antibody. Amino acid sequence variants of the antibody may be prepared by introducing appropriate changes into the nucleotide sequence encoding the antibody, or by peptide synthesis. Such modifications include, for example, deletions from, and/or insertions into and/or substitutions of, residues within the amino acid sequences of the antibody. Any combination of deletion, insertion, and substitution can be made to arrive at the final construct, provided that the final construct possesses the desired characteristics. The amino acid alterations may be introduced in the subject antibody amino acid sequence at the time that sequence is made.

A useful method for identification of certain residues or regions of the antibody that are preferred locations for mutagenesis is called "alanine scanning mutagenesis" as described by Cunningham and Wells (1989) Science, 244: 1081-1085. Here, a residue or group of target residues are identified (e.g., charged residues such as Arg, Asp, His, Lys, and Glu) and replaced by a neutral or negatively charged amino acid (e.g., alanine or polyalanine) to affect the interaction of the amino acids with antigen. Those amino acid locations demonstrating functional sensitivity to the substitutions then are refined by introducing further or other variants at, or for, the sites of substitution. Thus, while the site for introducing an amino acid sequence variation is predetermined, the nature of the mutation per se need not be predetermined. For example, to analyze the performance of a mutation at a given site, Ala scanning or random mutagenesis is conducted at the target codon or region and the expressed immunoglobulins are screened for the desired activity.

Amino acid sequence insertions include amino- and/or carboxyl-terminal fusions ranging in length from one residue to polypeptides containing a hundred or more residues, as well as intrasequence insertions of single or multiple amino acid residues. Examples of terminal insertions include an antibody with an N-terminal methionyl residue. Other insertional variants of the antibody molecule include the fusion to the N- or C-terminus of the antibody to an enzyme or a polypeptide which increases the serum half-life of the antibody.

In some embodiments, FcRn mutations that improve pharmacokinetics include, but are not limited to, M428L, T250Q/M428L, M252Y/S254T/T256E, P257I/N434H, D376V/N434H, P257I/Q311I, N434A, N434W, M428L/N434S, V259I/V308F, M252Y/S254T/T256E, V259I/V308F/M428L, T307Q/N434A, T307Q/N434S, T307Q/E380A/N434A, V308P/N434A, N434H, V308P. In some embodiments, such mutations enhance antibody binding to FcRn at low pH but do not change the antibody affinity at neutral pH.

In certain embodiments, an antibody of the invention is altered to increase or decrease the extent to which the antibody is glycosylated. Glycosylation of polypeptides is typically either N-linked or O-linked. N-linked refers to the attachment of a carbohydrate moiety to the side chain of an asparagine residue. The tripeptide sequences asparagine-X-serine and asparagine-X-threonine, where X is any amino acid except proline, are the recognition sequences for enzymatic attachment of the carbohydrate moiety to the asparagine side chain. Thus, the presence of either of these tripeptide sequences in a polypeptide creates a potential glycosylation site. O-linked glycosylation refers to the attachment of one of the sugars N-aceylgalactosamine, galactose, or xylose to a hydroxyamino acid, most commonly serine or threonine, although 5-hydroxyproline or 5-hydroxylysine may also be used.

Addition or deletion of glycosylation sites to the antibody is conveniently accomplished by altering the amino acid sequence such that one or more of the above-described tripeptide sequences (for N-linked glycosylation sites) is created or removed. The alteration may also be made by the addition, deletion, or substitution of one or more serine or threonine residues to the sequence of the original antibody (for O-linked glycosylation sites).

Where the antibody comprises an Fc region, the carbohydrate attached thereto may be altered. For example, antibodies with a mature carbohydrate structure that lacks fucose attached to an Fc region of the antibody are described in US Pat Appl No US 2003/0157108 (Presta, L.). See also US 2004/0093621 (Kyowa Hakko Kogyo Co., Ltd). Antibodies with a bisecting N-acetylglucosamine (GlcNAc) in the carbohydrate attached to an Fc region of the antibody are referenced in WO 2003/011878, Jean-Mairet et al. and U.S. Pat. No. 6,602,684, Umana et al. Antibodies with at least one galactose residue in the oligosaccharide attached to an Fc region of the antibody are reported in WO 1997/30087, Patel et al. See, also, WO 1998/58964 (Raju, S.) and WO 1999/22764 (Raju, S.) concerning antibodies with altered carbohydrate attached to the Fc region thereof. See also US 2005/0123546 (Umana et al.) on antigen-binding molecules with modified glycosylation.

In certain embodiments, a glycosylation variant comprises an Fc region, wherein a carbohydrate structure attached to the Fc region lacks fucose or has reduced fucose. Such variants have improved ADCC function. Optionally, the Fc region further comprises one or more amino acid substitutions therein which further improve ADCC, for example, substitutions at positions 298, 333, and/or 334 of the Fc region (EU numbering of residues). Examples of publications related to "afucosylated," "defucosylated" or "fucose-deficient" antibodies include: US 2003/0157108; WO 2000/61739; WO 2001/29246; US 2003/0115614; US 2002/0164328; US 2004/0093621; US 2004/0132140; US 2004/0110704; US 2004/0110282; US 2004/0109865; WO 2003/085119; WO 2003/084570; WO 2005/035586; WO 2005/035778; WO2005/053742; Okazaki et al. J. Mol. Biol. 336:1239-1249 (2004); Yamane-Ohnuki et al. Biotech. Bioeng. 87:614 (2004). Examples of cell lines producing defucosylated antibodies include Lec13 CHO cells deficient in protein fucosylation (Ripka et al. Arch. Biochem. Biophys. 249:533-545 (1986); US Pat Appl No US 2003/0157108 A1, Presta, L; and WO 2004/056312 A1, Adams et al., especially at Example 11), and knockout cell lines, such as alpha-1,6-fucosyltransferase gene, FUT8, knockout CHO cells (Yamane-Ohnuki et al. Biotech. Bioeng. 87:614 (2004)), and cells overexpressing β1,4-N-acetylglycosminyltransferase III (GnT-III) and Golgi μ-mannosidase II (ManII).

In any of the embodiments herein, the anti-CTLA4 binding proteins can be engineered to improve antibody-dependent cell-mediated cytotoxicity (ADCC) activity. In some embodiments, the anti-CTLA4 binding protein may be produced in a cell line having an alpha1,6-fucosyltransferase (Fut8) knockout. In some further embodiments, the anti-CTLA4 binding protein may be produced in a cell line overexpressing β1,4-N-acetylglycosminyltransferase III (GnT-III). In further embodiments, the cell line additionally overexpresses Golgi μ-mannosidase II (ManII). In some of the embodiments herein, the anti-CTLA4 binding protein may comprise at least one amino acid substitution in the Fc region that improves ADCC activity.

In one embodiment, the antibody is altered to improve its serum half-life. To increase the serum half-life of the antibody, one may incorporate a FcRN/salvage receptor binding epitope into the antibody (especially an antibody fragment) as described in U.S. Pat. No. 5,739,277, for example. As used herein, the term "salvage receptor binding epitope" refers to an epitope of the Fc region of an IgG molecule (e.g., IgG1, IgG2, IgG3, or IgG4) that is responsible for increasing the in vivo serum half-life of the IgG molecule (US 2003/

0190311, U.S. Pat. Nos. 6,821,505; 6,165,745; 5,624,821; 5,648,260; 6,165,745; 5,834,597).

Another type of variant is an amino acid substitution variant. These variants have at least one amino acid residue in the antibody molecule replaced by a different residue. Sites of interest for substitutional mutagenesis include the hypervariable regions, but FR alterations are also contemplated. Conservative substitutions are shown in Table 1 under the heading of "preferred substitutions." If such substitutions result in a desirable change in biological activity, then more substantial changes, denominated "exemplary substitutions" in Table 1, or as further described below in reference to amino acid classes, may be introduced and the products screened.

TABLE 1

| Original Residue | Exemplary Substitutions | Preferred Substitutions |
| --- | --- | --- |
| Ala (A) | Val; Leu; Ile | Val |
| Arg (R) | Lys; Gln; Asn | Lys |
| Asn (N) | Gln; His; Asp, Lys; Arg | Gln |
| Asp (D) | Glu; Asn | Glu |
| Cys (C) | Ser; Ala | Ser |
| Gln (Q) | Asn; Glu | Asn |
| Glu (E) | Asp; Gln | Asp |
| Gly (G) | Ala | Ala |
| His (H) | Asn; Gln; Lys; Arg | Arg |
| Ile (I) | Leu; Val; Met; Ala; Phe; Norleucine | Leu |
| Leu (L) | Norleucine; Ile; Val; Met; Ala; Phe | Ile |
| Lys (K) | Arg; Gln; Asn | Arg |
| Met (M) | Leu; Phe; Ile | Leu |
| Phe (F) | Trp; Leu; Val; Ile; Ala; Tyr | Tyr |
| Pro (P) | Ala | Ala |
| Ser (S) | Thr | Thr |
| Thr (T) | Val; Ser | Ser |
| Trp (W) | Tyr; Phe | Tyr |
| Tyr (Y) | Trp; Phe; Thr; Ser | Phe |
| Val (V) | Ile; Leu; Met; Phe; Ala; Norleucine | Leu |

Substantial modifications in the biological properties of the antibody are accomplished by selecting substitutions that differ significantly in their effect on maintaining (a) the structure of the polypeptide backbone in the area of the substitution, for example, as a sheet or helical conformation, (b) the charge or hydrophobicity of the molecule at the target site, or c) the bulk of the side chain. Amino acids may be grouped according to similarities in the properties of their side chains (in A. L. Lehninger, in Biochemistry, second ed., pp. 73-75, Worth Publishers, New York (1975)):

(1) non-polar: Ala (A), Val (V), Leu (L), Ile (I), Pro (P), Phe (F), Trp (W), Met (M)
(2) uncharged polar: Gly (G), Ser(S), Thr (T), Cys (C), Tyr (Y), Asn (N), Gln (Q)
(3) acidic: Asp (D), Glu (E)
(4) basic: Lys (K), Arg (R), His (H)

Alternatively, naturally occurring residues may be divided into groups based on common side-chain properties:

(1) hydrophobic: Norleucine, Met, Ala, Val, Leu, Ile;
(2) neutral hydrophilic: Cys, Ser, Thr, Asn, Gln;
(3) acidic: Asp, Glu;
(4) basic: His, Lys, Arg;
(5) residues that influence chain orientation: Gly, Pro;
(6) aromatic: Trp, Tyr, Phe.

Non-conservative substitutions will entail exchanging a member of one of these classes for another class. Such substituted residues also may be introduced into the conservative substitution sites or, into the remaining (non-conserved) sites.

One type of substitutional variant involves substituting one or more hypervariable region residues of a parent antibody (e.g., a humanized or human antibody). Generally, the resulting variant(s) selected for further development will have modified (e.g., improved) biological properties relative to the parent antibody from which they are generated. A convenient way for generating such substitutional variants involves affinity maturation using phage display. Briefly, several hypervariable region sites (e.g., 6-7 sites) are mutated to generate all possible amino acid substitutions at each site. The antibodies thus generated are displayed from filamentous phage particles as fusions to at least part of a phage coat protein (e.g., the gene III product of M13) packaged within each particle. The phage-displayed variants are then screened for their biological activity (e.g., binding affinity). In order to identify candidate hypervariable region sites for modification, scanning mutagenesis (e.g., alanine scanning) can be performed to identify hypervariable region residues contributing significantly to antigen binding. Alternatively, or additionally, it may be beneficial to analyze a crystal structure of the antigen-antibody complex to identify contact points between the antibody and antigen. Such contact residues and neighboring residues are candidates for substitution according to techniques known in the art, including those elaborated herein. Once such variants are generated, the panel of variants is subjected to screening using techniques known in the art, including those described herein, and antibodies with superior properties in one or more relevant assays may be selected for further development.

Nucleic acid molecules encoding amino acid sequence variants of the antibody are prepared by a variety of methods known in the art. These methods include, but are not limited to, isolation from a natural source (in the case of naturally occurring amino acid sequence variants) or preparation by oligonucleotide-mediated (or site-directed) mutagenesis, PCR mutagenesis, and cassette mutagenesis of an earlier prepared variant or a non-variant version of the antibody.

It may be desirable to introduce one or more amino acid modifications in an Fc region of antibodies of the invention, thereby generating an Fc region variant. The Fc region variant may comprise a human Fc region sequence (e.g., a human IgG1, IgG2, IgG3 or IgG4 Fc region) comprising an amino acid modification (e.g. a substitution) at one or more amino acid positions including that of a hinge cysteine.

In some embodiments, an anti-CTLA4 binding protein (e.g., anti-CTLA4 antibody or antigen-binding fragment thereof, or anti-CTLA4 bispecific antibody) provided herein has an IgG1 isotype with enhanced effector function. In some embodiments, the anti-CTLA4 antibody or antigen-binding fragment thereof is afucosylated. In some embodiments, the anti-CTLA4 bispecific antibody is afucosylated. In some embodiments, the anti-CTLA4 antibody or antigen-binding fragment thereof has increased levels of mannose moieties. In some embodiments, the anti-CTLA4 antibody or antigen-binding fragment thereof has increased levels of bisecting glycan moieties. In some embodiments, the anti-CTLA4 bispecific antibody has increased levels of mannose moieties. In some embodiments, the IgG1 comprises amino acid mutations.

In some embodiments, an anti-CTLA4 antibody or antigen-binding fragment thereof, or anti-CTLA4 bispecific antibody provided herein has an IgG1 isotype (e.g., a human IgG1 isotype). In one embodiment, the IgG1 comprises the amino acid substitutions S298A, E333A, and K334A wherein the amino acid residues are numbered according to the EU index as in Kabat. In one embodiment, the IgG1 comprises the amino acid substitutions S239D and I332E wherein the amino acid residues are numbered according to the EU index as in Kabat. In one embodiment, the IgG1 comprises the amino acid substitutions S239D, A330L, and I332E wherein the amino acid residues are numbered according to the EU index as in Kabat. In one embodiment, the IgG1 comprises the amino acid substitutions P247I and A339D or A339Q wherein the amino acid residues are numbered according to the EU index as in Kabat. In one embodiment, the IgG1 comprises the amino acid substitutions D280H, K290S with or without S298D or S298V wherein the amino acid residues are numbered according to the EU index as in Kabat. In one embodiment, the IgG1 comprises the amino acid substitutions F243L, R292P, and Y300L wherein the amino acid residues are numbered according to the EU index as in Kabat. In one embodiment, the IgG1 comprises the amino acid substitutions F243L, R292P, Y300L, and P396L wherein the amino acid residues are numbered according to the EU index as in Kabat. In one embodiment, the IgG1 comprises the amino acid substitutions F243L, R292P, Y300L, V305I, and P396L wherein the amino acid residues are numbered according to the EU index as in Kabat. In one embodiment, the IgG1 comprises the amino acid substitutions G236A, S239D, and I332E wherein the amino acid residues are numbered according to the EU index as in Kabat. In one embodiment, the IgG1 comprises the amino acid substitutions K326A and E333A wherein the amino acid residues are numbered according to the EU index as in Kabat. In one embodiment, the IgG1 comprises the amino acid substitutions K326W and E333S wherein the amino acid residues are numbered according to the EU index as in Kabat. In one embodiment, the IgG1 comprises the amino acid substitutions K290E or K290N, S298G, T299A, and/or K326E wherein the amino acid residues are numbered according to the EU index as in Kabat. In some aspects, exemplary heavy chain constant region comprised in the provided CTLA4 binding proteins, such as antibodies or antigen-binding fragments thereof, include the heavy chain constant region sequence set forth in SEQ ID NO: 35-38. In some aspects, exemplary light chain constant region comprised in the provided CTLA4 binding proteins, such as antibodies or antigen-binding fragments thereof, include the light chain constant region sequence set forth in SEQ ID NO: 39.

In some aspects, the provided CTLA4 binding proteins, such as antibodies or antigen-binding fragments thereof, include a heavy chain constant region comprising the sequence set forth in SEQ ID NO:38. In some aspects, the provided CTLA4 binding proteins, such as antibodies or antigen-binding fragments thereof, include a heavy chain constant region comprising the sequence set forth in SEQ ID NO:35. In some aspects, the provided CTLA4 binding proteins, such as antibodies or antigen-binding fragments thereof, include a light chain constant region comprising the sequence set forth in SEQ ID NO:39.

In some aspects, the provided CTLA4 binding proteins, such as antibodies or antigen-binding fragments thereof, include a heavy chain constant region comprising the sequence set forth in SEQ ID NO:38 and a light chain constant region comprising the sequence set forth in SEQ ID NO:39. In some aspects, the provided CTLA4 binding proteins, such as antibodies or antigen-binding fragments thereof, include a heavy chain constant region comprising the sequence set forth in SEQ ID NO:35 and a light chain constant region comprising the sequence set forth in SEQ ID NO:39.

In accordance with this description and the teachings of the art, it is contemplated that in some embodiments, an antibody of the invention may comprise one or more alterations as compared to the wild type counterpart antibody, e.g. in the Fc region. These antibodies would nonetheless retain substantially the same characteristics required for therapeutic utility as compared to their wild type counterpart. For example, it is thought that certain alterations can be made in the Fc region that would result in altered (i.e., either improved or diminished) C1q binding and/or Complement Dependent Cytotoxicity (CDC), e.g., as described in WO99/51642. See also Duncan & Winter Nature 322:738-40 (1988); U.S. Pat. Nos. 5,648,260; 5,624,821; and WO94/29351 concerning other examples of Fc region variants. WO00/42072 (Presta) and WO 2004/056312 (Lowman) describe antibody variants with improved or diminished binding to FcRs. The content of these patent publications are specifically incorporated herein by reference. See, also, Shields et al. J. Biol. Chem. 9 (2): 6591-6604 (2001). Antibodies with increased half-lives and improved binding to the neonatal Fc receptor (FcRn), which is responsible for the transfer of maternal IgGs to the fetus (Guyer et al., J. Immunol. 117:587 (1976) and Kim et al., J. Immunol. 24:249 (1994)), are described in US2005/0014934A1 (Hinton et al.). These antibodies comprise an Fc region with one or more substitutions therein which improve binding of the Fc region to FcRn. Polypeptide variants with altered Fc region amino acid sequences and increased or decreased C1q binding capability are described in U.S. Pat. No. 6,194,551B1, WO99/51642. The contents of those patent publications are specifically incorporated herein by reference. See, also, Idusogie et al. J. Immunol. 164:4178-4184 (2000).

7. Antibody-Drug Conjugates

The invention also provides antibody-drug conjugates (ADCs) comprising an anti-CTLA4 binding protein provided herein conjugated to one or more cytotoxic agents, such as chemotherapeutic agents or drugs, growth inhibitory agents, toxins (e.g., protein toxins, enzymatically active toxins of bacterial, fungal, plant, or animal origin, or fragments thereof), or radioactive isotopes.

In one embodiment, the one or more drugs conjugated to the antibody-drug conjugate, includes but is not limited to a maytansinoid (see U.S. Pat. Nos. 5,208,020, 5,416,064 and European Patent EP 0 425 235 B1); an auristatin such as monomethylauristatin drug moieties DE and DF (MMAE and MMAF) (see U.S. Pat. Nos. 5,635,483 and 5,780,588, and 7,498,298); a dolastatin; a calicheamicin or derivative thereof (see U.S. Pat. Nos. 5,712,374, 5,714,586, 5,739,116, 5,767,285, 5,770,701, 5,770,710, 5,773,001, and 5,877,296; Hinman et al., Cancer Res. 53:3336-3342 (1993); and Lode et al., Cancer Res. 58:2925-2928 (1998)); an anthracycline such as daunomycin or doxorubicin (see Kratz et al., Current Med. Chem. 13:477-523 (2006); Jeffrey et al., Bioorganic & Med. Chem. Letters 16:358-362 (2006); Torgov et al., Bioconj. Chem. 16:717-721 (2005); Nagy et al., Proc. Natl. Acad. Sci. USA 97:829-834 (2000); Dubowchik et al., Bioorg. & Med. Chem. Letters 12:1529-1532 (2002); King et al., J. Med. Chem. 45:4336-4343 (2002); and U.S. Pat. No. 6,630,579); methotrexate; vindesine; a taxane such as docetaxel, paclitaxel, larotaxel, tesetaxel, and ortataxel; a trichothecene; and CC1065.

In another embodiment the one or more drugs conjugated to the antibody-drug conjugate, includes but is not limited to an inhibitor of tubulin polymerization (e.g., maytansinoids and auristatins), DNA damaging agents (e.g., pyrrolobenzodiazepine (PBD) dimers, calicheamicins, duocarmycins and indo-linobenzodiazepine dimers), and DNA synthesis inhibitors (e.g., exatecan derivative Dxd).

In another embodiment, an antibody-drug conjugate comprises an antibody as described herein conjugated to an enzymatically active toxin or fragment thereof, including but not limited to diphtheria A chain, nonbinding active fragments of diphtheria toxin, exotoxin A chain (from *Pseudomonas aeruginosa*), ricin A chain, abrin A chain, modeccin A chain, alpha-sarcin, *Aleurites fordii* proteins, dianthin proteins, *Phytolaca americana* proteins (PAPI, PAPII, and PAP-S), *Momordica charantia* inhibitor, curcin, crotin, *Sapaonaria officinalis* inhibitor, gelonin, mitogellin, restrictocin, phenomycin, enomycin, and the tricothecenes.

In another embodiment, an antibody-drug conjugate comprises an antibody as described herein conjugated to a radioactive atom to form a radioconjugate. A variety of radioactive isotopes are available for the production of radioconjugates. Examples include $At^{211}$, $I^{131}$, $I^{125}$, $Y^{90}$, $Re^{186}$, $Re^{188}$, $Sm^{153}$, $Bi^{212}$, $P^{32}$, $Pb^{212}$ and radioactive isotopes of Lu. When the radioconjugate is used for detection, it may comprise a radioactive atom for scintigraphic studies, for example $tc^{99m}$ or $I^{123}$, or a spin label for nuclear magnetic resonance (NMR) imaging (also known as magnetic resonance imaging, MRI), such as iodine-123 again, iodine-131, indium-111, fluorine-19, carbon-13, nitrogen-15, oxygen-17, gadolinium, manganese or iron.

Conjugates of an anti-CTLA4 binding protein (e.g., anti-CTLA4 antibody or antigen-binding fragment thereof) and cytotoxic agent may be made using a variety of bifunctional protein coupling agents such as N-succinimidyl-3-(2-pyridyldithio) propionate (SPDP), succinimidyl-4-(N-maleimidomethyl) cyclohexane-1-carboxylate (SMCC), iminothiolane (IT), bifunctional derivatives of imidoesters (such as dimethyl adipimidate HCl), active esters (such as disuccinimidyl suberate), aldehydes (such as glutaraldehyde), bis-azido compounds (such as bis (p-azidobenzoyl) hexanediamine), bis-diazonium derivatives (such as bis-(p-diazoniumbenzoyl)-ethylenediamine), diisocyanates (such as toluene 2,6-diisocyanate), and bis-active fluorine compounds (such as 1,5-difluoro-2,4-dinitrobenzene). For example, a ricin immunotoxin can be prepared as described in Vitetta et al., Science 238:1098 (1987). Carbon-14-labeled 1-isothiocyanatobenzyl-3-methyldiethylene triaminepentaacetic acid (MX-DTPA) is an exemplary chelating agent for conjugation of radionucleotide to the antibody. See WO94/11026. The linker may be a "cleavable linker" facilitating release of a cytotoxic drug in the cell. For example, an acid-labile linker, peptidase-sensitive linker, photolabile linker, dimethyl linker or disulfide-containing linker (Chari et al., Cancer Res. 52:127-131 (1992); U.S. Pat. No. 5,208,020) may be used.

The ADCs herein expressly contemplate, but are not limited to such conjugates prepared with cross-linker reagents including, but not limited to, BMPS, EMCS, GMBS, HBVS, LC-SMCC, MBS, MPBH, SBAP, SIA, SIAB, SMCC, SMPB, SMPH, sulfo-EMCS, sulfo-GMBS, sulfo-KMUS, sulfo-MBS, sulfo-SIAB, sulfo-SMCC, and sulfo-SMPB, and SVSB (succinimidyl-(4-vinylsulfone) benzoate) which are commercially available (e.g., from Pierce Biotechnology, Inc., Rockford, IL., U.S.A).

8. Vectors, Host Cells, and Recombinant Methods

For recombinant production of an anti-CTLA4 binding proteins of the invention, the nucleic acid encoding it is isolated and inserted into a replicable vector for further cloning (amplification of the DNA) or for expression. DNA encoding the antibody is readily isolated and sequenced using conventional procedures (e.g., by using oligonucleotide probes that are capable of binding specifically to genes encoding the heavy and light chains of the antibody). Many vectors are available. The choice of vector depends in part on the host cell to be used. Generally, host cells are of either prokaryotic or eukaryotic (generally mammalian) origin. It will be appreciated that constant regions of any isotype can be used for this purpose, including IgG, IgM, IgA, IgD, and IgE constant regions, and that such constant regions can be obtained from any human or animal species.

9. Generating Binding Proteins Using Prokaryotic Host Cells a) Vector Construction Polynucleotide sequences encoding polypeptide components of the anti-CTLA4 binding proteins of the invention can be obtained using standard recombinant techniques. Desired polynucleotide sequences may be isolated and sequenced from antibody producing cells such as hybridoma cells. Alternatively, polynucleotides can be synthesized using nucleotide synthesizer or PCR techniques. Once obtained, sequences encoding the polypeptides are inserted into a recombinant vector capable of replicating and expressing heterologous polynucleotides in prokaryotic hosts. Many vectors that are available and known in the art can be used for the purpose of the present invention. Selection of an appropriate vector will depend mainly on the size of the nucleic acids to be inserted into the vector and the particular host cell to be transformed with the vector. Each vector contains various components, depending on its function (amplification or expression of heterologous polynucleotide, or both) and its compatibility with the particular host cell in which it resides. The vector components generally include, but are not limited to: an origin of replication, a selection marker gene, a promoter, a ribosome binding site (RBS), a signal sequence, the heterologous nucleic acid insert and a transcription termination sequence.

In general, plasmid vectors containing replicon and control sequences which are derived from species compatible with the host cell are used in connection with these hosts. The vector ordinarily carries a replication site, as well as marking sequences which are capable of providing phenotypic selection in transformed cells. For example, *E. coli* is typically transformed using pBR322, a plasmid derived from an *E. coli* species. pBR322 contains genes-encoding ampicillin (Amp) and tetracycline (Tet) resistance and thus provides easy means for identifying transformed cells. pBR322, its derivatives, or other microbial plasmids or bacteriophage may also contain, or be modified to contain, promoters which can be used by the microbial organism for expression of endogenous proteins. Examples of pBR322 derivatives used for expression of particular antibodies are described in detail in Carter et al., U.S. Pat. No. 5,648,237.

In addition, phage vectors containing replicon and control sequences that are compatible with the host microorganism can be used as transforming vectors in connection with these hosts. For example, bacteriophage such as λGEM.TM.-11 may be utilized in making a recombinant vector which can be used to transform susceptible host cells such as *E. coli* LE392.

The expression vector of the invention may comprise two or more promoter-cistron pairs, encoding each of the polypeptide components. A promoter is an untranslated regulatory sequence located upstream (5') to a cistron that modulates its expression. Prokaryotic promoters typically fall into two classes, inducible and constitutive. Inducible promoter is a promoter that initiates increased levels of transcription of the cistron under its control in response to changes in the culture condition, e.g. the presence or absence of a nutrient or a change in temperature.

A large number of promoters recognized by a variety of potential host cells are well known. The selected promoter can be operably linked to cistron DNA encoding the light or heavy chain by removing the promoter from the source DNA via restriction enzyme digestion and inserting the isolated promoter sequence into the vector of the invention. Both the native promoter sequence and many heterologous promoters may be used to direct amplification and/or expression of the target genes. In some embodiments, heterologous promoters are utilized, as they generally permit greater transcription and higher yields of expressed target gene as compared to the native target polypeptide promoter.

Promoters suitable for use with prokaryotic hosts include the PhoA promoter, the β-galactamase and lactose promoter systems, a tryptophan (trp) promoter system and hybrid promoters such as the tac or the tre promoter. However, other promoters that are functional in bacteria (such as other known bacterial or phage promoters) are suitable as well. Their nucleotide sequences have been published, thereby enabling a skilled worker operably to ligate them to cistrons encoding the target light and heavy chains (Siebenlist et al. (1980) Cell 20:269) using linkers or adaptors to supply any required restriction sites.

In one aspect of the invention, each cistron within the recombinant vector comprises a secretion signal sequence component that directs translocation of the expressed polypeptides across a membrane. In general, the signal sequence may be a component of the vector, or it may be a part of the target polypeptide DNA that is inserted into the vector. The signal sequence selected for the purpose of this invention should be one that is recognized and processed (i.e. cleaved by a signal peptidase) by the host cell. For prokaryotic host cells that do not recognize and process the signal sequences native to the heterologous polypeptides, the signal sequence is substituted by a prokaryotic signal sequence selected, for example, from the group consisting of the alkaline phosphatase, penicillinase, Ipp, or heat-stable enterotoxin II (STII) leaders, LamB, PhoE, PelB, OmpA and MBP. In one embodiment of the invention, the signal sequences used in both cistrons of the expression system are STII signal sequences or variants thereof.

In another aspect, the production of the immunoglobulins according to the invention can occur in the cytoplasm of the host cell, and therefore does not require the presence of secretion signal sequences within each cistron. In that regard, immunoglobulin light and heavy chains are expressed with or without the sequences for the additional molecule, etc., folded and assembled to form functional immunoglobulins within the cytoplasm. Certain host strains (e.g., the *E. coli* trxB-strains) provide cytoplasm conditions that are favorable for disulfide bond formation, thereby permitting proper folding and assembly of expressed protein subunits. Proba and Pluckthun Gene, 159:203 (1995).

Anti-CTLA4 binding proteins of the invention can also be produced by using an expression system in which the quantitative ratio of expressed polypeptide components can be modulated in order to maximize the yield of secreted and properly assembled antibodies of the invention. Such modulation is accomplished at least in part by simultaneously modulating translational strengths for the polypeptide components.

Prokaryotic host cells suitable for expressing anti-CTLA4 binding protein of the invention include Archaebacteria and Eubacteria, such as Gram-negative or Gram-positive organisms. Examples of useful bacteria include *Escherichia* (e.g., *E. coli*), Bacilli (e.g., *B. subtilis*), Enterobacteria, *Pseudomonas* species (e.g., *P. aeruginosa*), *Salmonella typhimurium*, *Serratia marcescans*, *Klebsiella*, *Proteus*, *Shigella*, *Rhizobia*, *Vitreoscilla*, or *Paracoccus*. In one embodiment, gram-negative cells are used. In one embodiment, *E. coli* cells are used as hosts for the invention. Examples of *E. coli* strains include strain W3110 (Bachmann, Cellular and Molecular Biology, vol. 2 (Washington, D.C.: American Society for Microbiology, 1987), pp. 1190-1219; ATCC Deposit No. 27,325) and derivatives thereof, including strain 33D3 having genotype W3110 ΔfhuA (ΔtonA) ptr3 lac Iq lacL8 ΔompTΔ (nmpc-fepE) degP41 kanR (U.S. Pat. No. 5,639, 635). Other strains and derivatives thereof, such as *E. coli* 294 (ATCC 31,446), *E. coli* B, *E. coli*λ 1776 (ATCC 31,537) and *E. coli* RV308 (ATCC 31,608) are also suitable. These examples are illustrative rather than limiting. Methods for constructing derivatives of any of the above-mentioned bacteria having defined genotypes are known in the art and described in, for example, Bass et al., Proteins, 8:309-314 (1990). It is generally necessary to select the appropriate bacteria taking into consideration replicability of the replicon in the cells of a bacterium. For example, *E. coli, Serratia*, or *Salmonella* species can be suitably used as the host when well-known plasmids such as pBR322, pBR325, pACYC177, or pKN410 are used to supply the replicon. Typically the host cell should secrete minimal amounts of proteolytic enzymes, and additional protease inhibitors may desirably be incorporated in the cell culture.

b) Binding Protein Production

Host cells are transformed with the above-described expression vectors and cultured in conventional nutrient media modified as appropriate for inducing promoters, selecting transformants, or amplifying the genes encoding the desired sequences.

Transformation means introducing DNA into the prokaryotic host so that the DNA is replicable, either as an extra-chromosomal element or by chromosomal integrant. Depending on the host cell used, transformation is done using standard techniques appropriate to such cells. The calcium treatment employing calcium chloride is generally used for bacterial cells that contain substantial cell-wall barriers. Another method for transformation employs polyethylene glycol/DMSO. Yet another technique used is electroporation.

Prokaryotic cells used to produce the anti-CTLA4 binding proteins of the invention are grown in media known in the art and suitable for culture of the selected host cells. Examples of suitable media include luria broth (LB) plus necessary nutrient supplements. In some embodiments, the media also contains a selection agent, chosen based on the construction of the expression vector, to selectively permit growth of prokaryotic cells containing the expression vector. For example, ampicillin is added to media for growth of cells expressing ampicillin resistant gene.

Any necessary supplements besides carbon, nitrogen, and inorganic phosphate sources may also be included at appropriate concentrations introduced alone or as a mixture with another supplement or medium such as a complex nitrogen source. Optionally the culture medium may contain one or more reducing agents selected from the group consisting of glutathione, cysteine, cystamine, thioglycollate, dithioerythritol and dithiothreitol.

The prokaryotic host cells are cultured at suitable temperatures. In certain embodiments, for *E. coli* growth, growth temperatures range from about 20° C. to about 39° C.; from about 25° C. to about 37° C.; or about 30° C. The pH of the medium may be any pH ranging from about 5 to about 9, depending mainly on the host organism. In certain embodiments, for *E. coli*, the pH is from about 6.8 to about 7.4, or about 7.0.

If an inducible promoter is used in the expression vector of the invention, protein expression is induced under conditions suitable for the activation of the promoter. In one aspect of the invention, PhoA promoters are used for controlling transcription of the polypeptides. Accordingly, the transformed host cells are cultured in a phosphate-limiting medium for induction. In certain embodiments, the phosphate-limiting medium is the C.R.A.P. medium (see, e.g., Simmons et al., J. Immunol. Methods (2002), 263:133-147). A variety of other inducers may be used, according to the vector construct employed, as is known in the art.

In one embodiment, the expressed anti-CTLA4 binding proteins of the present invention are secreted into and recovered from the periplasm of the host cells. Protein recovery typically involves disrupting the microorganism, generally by such means as osmotic shock, sonication or lysis. Once cells are disrupted, cell debris or whole cells may be removed by centrifugation or filtration. The proteins may be further purified, for example, by affinity resin chromatography. Alternatively, proteins can be transported into the culture media and isolated therein. Cells may be removed from the culture and the culture supernatant being filtered and concentrated for further purification of the proteins produced. The expressed polypeptides can be further isolated and identified using commonly known methods such as polyacrylamide gel electrophoresis (PAGE) and Western blot assay.

In one aspect of the invention, anti-CTLA4 binding protein production is conducted in large quantity by a fermentation process. Various large-scale fed-batch fermentation procedures are available for production of recombinant proteins. Large-scale fermentations have at least 1000 liters of capacity, and in certain embodiments, about 1,000 to 100,000 liters of capacity. These fermenters use agitator impellers to distribute oxygen and nutrients, especially glucose. Small scale fermentation refers generally to fermentation in a fermenter that is no more than approximately 100 liters in volumetric capacity, and can range from about 1 liter to about 100 liters.

In a fermentation process, induction of protein expression is typically initiated after the cells have been grown under suitable conditions to a desired density, e.g., an OD550 of about 180-220, at which stage the cells are in the early stationary phase. A variety of inducers may be used, according to the vector construct employed, as is known in the art and described above. Cells may be grown for shorter periods prior to induction. Cells are usually induced for about 12-50 hours, although longer or shorter induction time may be used.

To improve the production yield and quality of the polypeptides of the invention, various fermentation conditions can be modified. For example, to improve the proper assembly and folding of the secreted antibody polypeptides, additional vectors overexpressing chaperone proteins, such as Dsb proteins (DsbA, DsbB, DsbC, DsbD and or DsbG) or FkpA (a peptidylprolyl cis,trans-isomerase with chaperone activity) can be used to co-transform the host prokaryotic cells. The chaperone proteins have been demonstrated to facilitate the proper folding and solubility of heterologous proteins produced in bacterial host cells. Chen et al. (1999) J. Biol. Chem. 274:19601-19605; Georgiou et al., U.S. Pat. No. 6,083,715; Georgiou et al., U.S. Pat. No. 6,027,888; Bothmann and Pluckthun (2000) J. Biol. Chem. 275:17100-17105; Ramm and Pluckthun (2000) J. Biol. Chem. 275: 17106-17113; Arie et al. (2001) Mol. Microbiol. 39:199-210.

To minimize proteolysis of expressed heterologous proteins (especially those that are proteolytically sensitive), certain host strains deficient for proteolytic enzymes can be used for the present invention. For example, host cell strains may be modified to effect genetic mutation(s) in the genes encoding known bacterial proteases such as Protease III, OmpT, DegP, Tsp, Protease I, Protease Mi, Protease V, Protease VI and combinations thereof. Some *E. coli* protease-deficient strains are available and described in, for example, Joly et al. (1998), supra; Georgiou et al., U.S. Pat. No. 5,264,365; Georgiou et al., U.S. Pat. No. 5,508,192; Hara et al., Microbial Drug Resistance, 2:63-72 (1996).

In one embodiment, *E. coli* strains deficient for proteolytic enzymes and transformed with plasmids overexpressing one or more chaperone proteins are used as host cells in the expression system of the invention.

c) Binding Protein Purification

In one embodiment, the antibody protein produced herein is further purified to obtain preparations that are substantially homogeneous for further assays and uses. Standard protein purification methods known in the art can be employed. The following procedures are exemplary of suitable purification procedures: fractionation on immunoaffinity or ion-exchange columns, ethanol precipitation, reverse phase HPLC, chromatography on silica or on a cation-exchange resin such as DEAE, chromatofocusing, SDS-PAGE, ammonium sulfate precipitation, and gel filtration using, for example, Sephadex G-75.

In one aspect, Protein A immobilized on a solid phase is used for immunoaffinity purification of the antibody products of the invention. Protein A is a 41 kD cell wall protein from *Staphylococcus aureus* which binds with a high affinity to the Fc region of antibodies. Lindmark et al (1983) J. Immunol. Meth. 62:1-13. The solid phase to which Protein A is immobilized can be a column comprising a glass or silica surface, or a controlled pore glass column or a silicic acid column. In some applications, the column is coated with a reagent, such as glycerol, to possibly prevent non-specific adherence of contaminants.

As the first step of purification, a preparation derived from the cell culture as described above can be applied onto a Protein A immobilized solid phase to allow specific binding of the antibody of interest to Protein A. The solid phase would then be washed to remove contaminants non-specifically bound to the solid phase. Finally the antibody of interest is recovered from the solid phase by elution.

10. Generating Binding Proteins Using Eukaryotic Host Cells

A vector for use in a eukaryotic host cell generally includes one or more of the following non-limiting components: a signal sequence, an origin of replication, one or more marker genes, an enhancer element, a promoter, and a transcription termination sequence.

a) Signal Sequence Component

A vector for use in a eukaryotic host cell may also contain a signal sequence or other polypeptide having a specific cleavage site at the N-terminus of the mature protein or polypeptide of interest. The heterologous signal sequence selected may be one that is recognized and processed (i.e., cleaved by a signal peptidase) by the host cell. In mammalian cell expression, mammalian signal sequences as well as viral secretory leaders, for example, the herpes simplex gD signal, are available. The DNA for such a precursor region is ligated in reading frame to DNA encoding the antibody.

b) Origin of Replication

Generally, an origin of replication component is not needed for mammalian expression vectors. For example, the SV40 origin may typically be used only because it contains the early promoter.

c) Selection Gene Component

Expression and cloning vectors may contain a selection gene, also termed a selectable marker. Typical selection genes encode proteins that (a) confer resistance to antibiotics or other toxins, e.g., ampicillin, neomycin, methotrexate, or tetracycline, (b) complement auxotrophic deficiencies, where relevant, or (c) supply critical nutrients not available from complex media.

One example of a selection scheme utilizes a drug to arrest growth of a host cell. Those cells that are successfully transformed with a heterologous gene produce a protein conferring drug resistance and thus survive the selection regimen. Examples of such dominant selection use the drugs neomycin, mycophenolic acid and hygromycin.

Another example of suitable selectable markers for mammalian cells are those that enable the identification of cells competent to take up the anti-CTLA4 binding protein encoding nucleic acid, such as DHFR, thymidine kinase, metallothionein-I and -II, primate metallothionein genes, adenosine deaminase, ornithine decarboxylase, etc.

For example, in some embodiments, cells transformed with the DHFR selection gene are first identified by culturing all of the transformants in a culture medium that contains methotrexate (Mtx), a competitive antagonist of DHFR. In some embodiments, an appropriate host cell when wild-type DHFR is employed is the Chinese hamster ovary (CHO) cell line deficient in DHFR activity (e.g., ATCC CRL-9096).

Alternatively, host cells (particularly wild-type hosts that contain endogenous DHFR) transformed or co-transformed with DNA sequences encoding an anti-CTLA4 binding protein, wild-type DHFR protein, and another selectable marker such as aminoglycoside 3'-phosphotransferase (APH) can be selected by cell growth in medium containing a selection agent for the selectable marker such as an aminoglycosidic antibiotic, e.g., kanamycin, neomycin, or G418. See U.S. Pat. No. 4,965,199. Host cells may include NSO, including cell lines deficient in glutamine synthetase (GS). Methods for the use of GS as a selectable marker for mammalian cells are described in U.S. Pat. Nos. 5,122,464 and 5,891,693.

d) Promoter Component

Expression and cloning vectors usually contain a promoter that is recognized by the host organism and is operably linked to nucleic acid encoding an anti-CTLA4 binding protein of interest. Promoter sequences are known for eukaryotes. For example, virtually all eukaryotic genes have an AT-rich region located approximately 25 to 30 bases upstream from the site where transcription is initiated. Another sequence found 70 to 80 bases upstream from the start of transcription of many genes is a CNCAAT region where N may be any nucleotide. At the 3' end of most eukaryotic genes is an AATAAA sequence that may be the signal for addition of the poly A tail to the 3' end of the coding sequence. In certain embodiments, any or all of these sequences may be suitably inserted into eukaryotic expression vectors.

Transcription from vectors in mammalian host cells is controlled, for example, by promoters obtained from the genomes of viruses such as polyoma virus, fowlpox virus, adenovirus (such as Adenovirus 2), bovine papilloma virus, avian sarcoma virus, cytomegalovirus, a retrovirus, hepatitis-B virus and Simian Virus 40 (SV40), from heterologous mammalian promoters, e.g., the actin promoter or an immunoglobulin promoter, from heat-shock promoters, provided such promoters are compatible with the host cell systems.

The early and late promoters of the SV40 virus are conveniently obtained as an SV40 restriction fragment that also contains the SV40 viral origin of replication. The immediate early promoter of the human cytomegalovirus is conveniently obtained as a HindIII E restriction fragment. A system for expressing DNA in mammalian hosts using the bovine papilloma virus as a vector is disclosed in U.S. Pat. No. 4,419,446. A modification of this system is described in U.S. Pat. No. 4,601,978. See also Reyes et al., Nature 297:598-601 (1982), describing expression of human β-interferon cDNA in murine cells under the control of a thymidine kinase promoter from herpes simplex virus. Alternatively, the Rous Sarcoma Virus long terminal repeat can be used as the promoter.

e) Enhancer Element Component

Transcription of DNA encoding an antibody of this invention by higher eukaryotes is often increased by inserting an enhancer sequence into the vector. Many enhancer sequences are now known from mammalian genes (globin, elastase, albumin, α-fetoprotein, and insulin). Typically, however, one will use an enhancer from a eukaryotic cell virus. Examples include the SV40 enhancer on the late side of the replication origin (bp 100-270), the human cytomegalovirus early promoter enhancer, the murine cytomegalovirus early promoter enhancer, the polyoma enhancer on the late side of the replication origin, and adenovirus enhancers. See also Yaniv, Nature 297:17-18 (1982) describing enhancer elements for activation of eukaryotic promoters. The enhancer may be spliced into the vector at a position 5' or 3' to the antibody polypeptide-encoding sequence, but is generally located at a site 5' from the promoter.

f) Transcription Termination Component

Expression vectors used in eukaryotic host cells may also contain sequences necessary for the termination of transcription and for stabilizing the mRNA. Such sequences are commonly available from the 5' and, occasionally 3', untranslated regions of eukaryotic or viral DNAs or cDNAs. These regions contain nucleotide segments transcribed as polyadenylated fragments in the untranslated portion of the mRNA encoding an antibody. One useful transcription termination component is the bovine growth hormone polyadenylation region. See WO94/11026 and the expression vector disclosed therein.

g) Selection and Transformation of Host Cells

Suitable host cells for cloning or expressing the DNA in the vectors herein include higher eukaryote cells described herein, including vertebrate host cells. Propagation of vertebrate cells in culture (tissue culture) has become a routine procedure. Examples of useful mammalian host cell lines are monkey kidney CV1 line transformed by SV40 (COS-7, ATCC CRL 1651); human embryonic kidney line (293 or 293 cells subcloned for growth in suspension culture, Graham et al., J. Gen Virol. 36:59 (1977)); baby hamster kidney cells (BHK, ATCC CCL 10); Chinese hamster ovary cells/-DHFR (CHO, Urlaub et al., Proc. Natl. Acad. Sci. USA 77:4216 (1980)); murine sertoli cells (TM4, Mather, Biol. Reprod. 23:243-251 (1980)); monkey kidney cells (CV1 ATCC CCL 70); African green monkey kidney cells (VERO-76, ATCC CRL-1587); human cervical carcinoma cells (HELA, ATCC CCL 2); canine kidney cells (MDCK, ATCC CCL 34); buffalo rat liver cells (BRL 3A, ATCC CRL 1442); human lung cells (W138, ATCC CCL 75); human liver cells (Hep G2, HB 8065); murine mammary tumor (MMT 060562, ATCC CCL51); TRI cells (Mather et al., Annals N.Y. Acad. Sci. 383:44-68 (1982)); MRC 5 cells; FS4 cells; and a human hepatoma line (Hep G2).

Host cells are transformed with the above-described-expression or cloning vectors for anti-CTLA4 binding protein production and cultured in conventional nutrient media modified as appropriate for inducing promoters, selecting transformants, or amplifying the genes encoding the desired sequences.

h) Culturing the Host Cells

The host cells used to produce anti-CTLA4 binding proteins of this invention may be cultured in a variety of media. Commercially available media such as Ham's F10 (Sigma), Minimal Essential Medium ((MEM), Sigma), RPMI-1640 (Sigma), and Dulbecco's Modified Eagle's Medium ((DMEM), Sigma) are suitable for culturing the host cells. In addition, any of the media described in Ham et al., Meth. Enz. 58:44 (1979), Barnes et al., Anal. Biochem. 102:255 (1980), U.S. Pat. Nos. 4,767,704; 4,657,866; 4,927,762; 4,560,655; or 5,122,469; WO 90/03430; WO 87/00195; or U.S. Pat. Re. 30,985 may be used as culture media for the host cells. Any of these media may be supplemented as necessary with hormones and/or other growth factors (such as insulin, transferrin, or epidermal growth factor), salts (such as sodium chloride, calcium, magnesium, and phosphate), buffers (such as HEPES), nucleotides (such as adenosine and thymidine), antibiotics (such as GENTAMYCIN™ drug), trace elements (defined as inorganic compounds usually present at final concentrations in the micromolar range), and glucose or an equivalent energy source. Any other supplements may also be included at appropriate concentrations that would be known to those skilled in the art. The culture conditions, such as temperature, pH, and the like, are those previously used with the host cell selected for expression, and will be apparent to the ordinarily skilled artisan.

i) Purification of Binding Protein

When using recombinant techniques, the anti-CTLA4 binding proteins can be produced intracellularly, or directly secreted into the medium. If the antibody is produced intracellularly, as a first step, the particulate debris, either host cells or lysed fragments, may be removed, for example, by centrifugation or ultrafiltration. Where the anti-CTLA4 binding protein is secreted into the medium, supernatants from such expression systems may be first concentrated using a commercially available protein concentration filter, for example, an Amicon or Millipore Pellicon ultrafiltration unit. A protease inhibitor such as PMSF may be included in any of the foregoing steps to inhibit proteolysis, and antibiotics may be included to prevent the growth of adventitious contaminants.

The antibody composition prepared from the cells can be purified using, for example, hydroxylapatite chromatography, gel electrophoresis, dialysis, and affinity chromatography, with affinity chromatography being a convenient technique. The suitability of protein A as an affinity ligand depends on the species and isotype of any immunoglobulin Fc domain that is present in the antibody. Protein A can be used to purify antibodies that are based on human γ1, γ2, or γ4 heavy chains (Lindmark et al., J. Immunol. Methods 62:1-13 (1983)). Protein G is recommended for all murine isotypes and for human γ3 (Guss et al., EMBO J. 5:15671575 (1986)). The matrix to which the affinity ligand is attached may be agarose, but other matrices are available. Mechanically stable matrices such as controlled pore glass or poly(styrenedivinyl)benzene allow for faster flow rates and shorter processing times than can be achieved with agarose. Where the antibody comprises a CH3 domain, the Bakerbond ABX™ resin (J. T. Baker, Phillipsburg, N.J.) is useful for purification. Other techniques for protein purification such as fractionation on an ion-exchange column, ethanol precipitation, Reverse Phase HPLC, chromatography on silica, chromatography on heparin SEPHAROSE™ chromatography on an anion or cation exchange resin (such as a polyaspartic acid column), chromatofocusing, SDS-PAGE, and ammonium sulfate precipitation are also available depending on the antibody to be recovered.

Following any preliminary purification step(s), the mixture comprising the binding protein of interest and contaminants may be subjected to further purification, for example, by low pH hydrophobic interaction chromatography using an elution buffer at a pH between about 2.5-4.5, performed at low salt concentrations (e.g., from about 0-0.25M salt).

In general, various methodologies for preparing antibodies for use in research, testing, and clinical use are well-established in the art, consistent with the above-described methodologies and/or as deemed appropriate by one skilled in the art for a particular antibody of interest.

IV. Compositions

In some aspects, also provided herein are compositions (e.g., pharmaceutical composition) comprising any of the anti-CTLA4 binding proteins described herein.

Therapeutic formulations are prepared for storage by mixing the active ingredient having the desired degree of purity with optional pharmaceutically acceptable carriers, excipients or stabilizers (Remington: The Science and Practice of Pharmacy, 20th Ed., Lippincott Williams & Wiklins, Pub., Gennaro Ed., Philadelphia, Pa. 2000). Acceptable carriers, excipients, or stabilizers are nontoxic to recipients at the dosages and concentrations employed, and include buffers, antioxidants including ascorbic acid, methionine, Vitamin E, sodium metabisulfite; preservatives, isotonicifiers, stabilizers, metal complexes (e.g. Zn-protein complexes); chelating agents such as EDTA and/or non-ionic surfactants.

Buffers can be used to control the pH in a range which optimizes the therapeutic effectiveness, especially if stability is pH dependent. Buffers can be present at concentrations ranging from about 20 mM to about 250 mM. Suitable buffering agents for use with the present invention include both organic and inorganic acids and salts thereof. For example, citrate, phosphate, succinate, tartrate, fumarate, gluconate, oxalate, lactate, acetate. Additionally, buffers may be comprised of histidine and trimethylamine salts such as Tris.

Preservatives can be added to prevent microbial growth, and are typically present in a range from about 0.2%-1.0% (w/v). Suitable preservatives for use with the present invention include octadecyldimethylbenzyl ammonium chloride; hexamethonium chloride; benzalkonium halides (e.g., chloride, bromide, iodide), benzethonium chloride; thimerosal, phenol, butyl or benzyl alcohol; alkyl parabens such as methyl or propyl paraben; catechol; resorcinol; cyclohexanol, 3-pentanol, and m-cresol.

Tonicity agents, sometimes known as "stabilizers" can be present to adjust or maintain the tonicity of liquid in a composition. When used with large, charged biomolecules such as proteins and antibodies, they are often termed "stabilizers" because they can interact with the charged groups of the amino acid side chains, thereby lessening the potential for inter and intra-molecular interactions. Tonicity agents can be present in any amount between about 0.1% to about 25% by weight or between about 1 to about 5% by weight, taking into account the relative amounts of the other ingredients. In some embodiments, tonicity agents include polyhydric sugar alcohols, trihydric or higher sugar alcohols, such as glycerin, erythritol, arabitol, xylitol, sorbitol and mannitol.

Additional excipients include agents which can serve as one or more of the following: (1) bulking agents, (2) solubility enhancers, (3) stabilizers and (4) and agents preventing denaturation or adherence to the container wall. Such excipients include: polyhydric sugar alcohols (enumerated above); amino acids such as alanine, glycine, glutamine, asparagine, histidine, arginine, lysine, ornithine, leucine, 2-phenylalanine, glutamic acid, threonine, etc.; organic sugars or sugar alcohols such as sucrose, lactose, lactitol, trehalose, stachyose, mannose, sorbose, xylose, ribose, ribitol, myoinisitose, myoinisitol, galactose, galactitol, glycerol, cyclitols (e.g., inositol), polyethylene glycol; sulfur containing reducing agents, such as urea, glutathione, thioctic acid, sodium thioglycolate, thioglycerol, $\alpha$-monothioglycerol and sodium thio sulfate; low molecular weight proteins such as human serum albumin, bovine serum albumin, gelatin or other immunoglobulins; hydrophilic polymers such as polyvinylpyrrolidone; monosaccharides (e.g., xylose, mannose, fructose, glucose; disaccharides (e.g., lactose, maltose, sucrose); trisaccharides such as raffinose; and polysaccharides such as dextrin or dextran.

Non-ionic surfactants or detergents (also known as "wetting agents") can be present to help solubilize the therapeutic agent as well as to protect the therapeutic protein against agitation-induced aggregation, which also permits the formulation to be exposed to shear surface stress without causing denaturation of the active therapeutic protein or antibody. Non-ionic surfactants are present in a range of about 0.05 mg/ml to about 1.0 mg/ml or about 0.07 mg/ml to about 0.2 mg/ml. In some embodiments, non-ionic surfactants are present in a range of about 0.001% to about 0.1% w/v or about 0.01% to about 0.1% w/v or about 0.01% to about 0.025% w/v.

Suitable non-ionic surfactants include polysorbates (20, 40, 60, 65, 80, etc.), polyoxamers (184, 188, etc.), PLURONIC® polyols, TRITON®, polyoxyethylene sorbitan monoethers (TWEEN®-20, TWEEN®-80, etc.), lauromacrogol 400, polyoxyl 40 stearate, polyoxyethylene hydrogenated castor oil 10, 50 and 60, glycerol monostearate, sucrose fatty acid ester, methyl celluose and carboxymethyl cellulose. Anionic detergents that can be used include sodium lauryl sulfate, dioctyle sodium sulfosuccinate and dioctyl sodium sulfonate. Cationic detergents include benzalkonium chloride or benzethonium chloride.

In order for the formulations to be used for in vivo administration, they must be sterile. The formulation may be rendered sterile by filtration through sterile filtration membranes. The therapeutic compositions herein generally are placed into a container having a sterile access port, for example, an intravenous solution bag or vial having a stopper pierceable by a hypodermic injection needle.

The route of administration is in accordance with known and accepted methods, such as by single or multiple bolus or infusion over a long period of time in a suitable manner, e.g., injection or infusion by subcutaneous, intravenous, intraperitoneal, intramuscular, intraarterial, intralesional or intraarticular routes, topical administration, inhalation or by sustained release or extended-release means.

An anti-CTLA4 binding protein described herein (e.g., anti-CTLA4 antibody or antigen-binding fragment thereof) can be used alone or in combination with other therapeutic agents such as in the methods described herein. The term "in combination with" encompasses two or more therapeutic agents (e.g., an anti-CTLA4 binding protein and a therapeutic agent) that are included in the same or separate formulations. In some embodiments, "in combination with" refers to "simultaneous" administration, in which case administration of the anti-CTLA4 binding protein of the invention occurs simultaneously to the administration of the one or more additional therapeutic agents (e.g., at the same time or within one hour between administration(s) of the anti-CTLA4 binding protein and administration of the one or more additional therapeutic agents). In some embodiments, "in combination with" refers to sequential administration, in which case administration of the anti-CTLA4 binding protein of the invention occurs prior to and/or following, administration of the one or more additional therapeutic agents (e.g., greater than one hour between administration(s) of the anti-CTLA4 binding protein and administration of the one or more additional therapeutic agents). Agents contemplated herein include, but are not limited to, a cytotoxic agent, a cytokine, an agent targeting an immune checkpoint molecule, an agent targeting an immune stimulatory molecule, or a growth inhibitory agent.

The formulation herein may also contain more than one active compound as necessary for the particular indication being treated, preferably those with complementary activities that do not adversely affect each other. Alternatively, or in addition, the composition may comprise a cytotoxic agent, cytokine, agent targeting an immune checkpoint molecule or stimulatory molecule, or growth inhibitory agent. Such molecules are suitably present in combination in amounts that are effective for the purpose intended.

V. Methods of Treatment

Provided herein are methods for treating or preventing a disease in a subject comprising administering to the subject an effective amount of an anti-CTLA4 binding protein described herein (e.g., anti-CTLA4 antibody or antigen-binding fragment thereof) or compositions thereof. In some embodiments, the subject (e.g., a human patient) has been diagnosed with a neoplastic disorder (e.g., cancer) or is at risk of developing such a disorder.

For the prevention or treatment of disease, the appropriate dosage of an active agent, will depend on the type of disease to be treated, as defined above, the severity and course of the disease, whether the agent is administered for preventive or therapeutic purposes, previous therapy, the subject's clinical history and response to the agent, and the discretion of the attending physician. The agent is suitably administered to the subject at one time or over a series of treatments. In some embodiments of the methods described herein, an interval between administrations of an anti-CTLA4 binding protein (e.g., anti-CTLA4 antibody or antigen-binding fragment thereof) described is about one month or longer. In some embodiments, the interval between administrations is about two months, about three months, about four months, about five months, about six months or longer. As used herein, an interval between administrations refers to the time period between one administration of the antibody and the next administration of the antibody. As used herein, an interval of about one month includes four weeks. In some embodiments, the interval between administrations is about one week, two weeks, about three weeks, about four weeks, about eight weeks, about twelve weeks, about sixteen weeks, about twenty weeks, about twenty four weeks, or longer. In some embodiments, the treatment includes multiple administrations of the antibody, wherein the interval between administrations may vary. For example, the interval between the first administration and the second administration is about one month, and the intervals between the subsequent administrations are about three months. In some embodiments, the interval between the first administration and the second administration is about one month, the interval between the second administration and the third administration is about two months, and the intervals between the subsequent administrations are about three months. In some embodiments, an anti-CTLA4 binding protein (e.g., anti-CTLA4 antibody or antigen-binding fragment thereof) described herein is administered at a flat dose. Depending on the type and severity of the disease, about 1 µg/kg to 15 mg/kg (e.g. 0.1 mg/kg-10 mg/kg) of antibody can be an initial candidate dosage for administration to the patient, whether, for example, by one or more separate administrations, or by continuous infusion. One typical daily dosage might range from about 1 µg/kg to 100 mg/kg or more, depending on the factors mentioned above. For repeated administrations over several days or longer, depending on the condition, the treatment would generally be sustained until a desired suppression of disease symptoms occurs. One exemplary dosage of the antibody would be in the range from about 0.05 mg/kg to about 10 mg/kg. Thus, one or more doses of about 0.5 mg/kg, 2.0 mg/kg, 4.0 mg/kg or 10 mg/kg (or any combination thereof) may be administered to the patient. In some embodiments, an anti-CTLA4 binding protein (e.g., anti-CTLA4 antibody or antigen-binding fragment thereof) described herein is administered to a subject at a dosage from about 25 mg to about 500 mg per dose. In some embodiments, an anti-CTLA4 binding protein (e.g., anti-CTLA4 antibody or antigen-binding fragment thereof) described herein is administered to a subject at a dosage from about 0.1 mg/kg to about 10 mg/kg or about 1.0 mg/kg to about 10 mg/kg. In some embodiments, an anti-CTLA4 binding protein (e.g., anti-CTLA4 antibody or antigen-binding fragment thereof) described herein is administered to a subject at a dosage of about any of 0.1 mg/kg, 0.5 mg/kg, 1.0 mg/kg, 1.5 mg/kg, 2.0 mg/kg, 2.5 mg/kg, 3.0 mg/kg, 3.5 mg/kg, 4.0 mg/kg, 4.5 mg/kg, 5.0 mg/kg, 5.5 mg/kg, 6.0 mg/kg, 6.5 mg/kg, 7.0 mg/kg, 7.5 mg/kg, 8.0 mg/kg, 8.5 mg/kg, 9.0 mg/kg, 9.5 mg/kg, or 10.0 mg/kg. Any of the dosing frequency described above may be used.

A method of treatment contemplated herein is the treatment of a disorder or disease with an anti-CTLA4 binding protein (e.g., anti-CTLA4 antibody or antigen-binding fragment thereof) described herein. Disorders or diseases that are treatable with the formulations of this present invention include leukemia, lymphoma, head and neck cancer, colorectal cancer, prostate cancer, pancreatic cancer, melanoma, breast cancer, neuroblastoma, lung cancer, ovarian cancer, osteosarcoma, bladder cancer, cervical cancer, liver cancer, kidney cancer, skin cancer (e.g., Merkel cell carcinoma) or testicular cancer.

In some embodiments, provided herein is a method of treatment or prevention of a cancer by administration of an anti-CTLA4 binding protein (e.g., anti-CTLA4 antibody or antigen-binding fragment thereof) described herein. As used herein, the term "cancer" refers to all types of cancer, neoplasm or malignant tumors found in mammals, including leukemias, lymphomas, melanomas, neuroendocrine tumors, carcinomas and sarcomas. Exemplary cancers that may be treated with an anti-CTLA4 binding protein (e.g., anti-CTLA4 antibody or antigen-binding fragment thereof), pharmaceutical composition, or method provided herein include lymphoma, sarcoma, bladder cancer, bone cancer, brain tumor, cervical cancer, colon cancer, esophageal cancer, gastric cancer, head and neck cancer, kidney cancer, myeloma, thyroid cancer, leukemia, prostate cancer, breast cancer (e.g. triple negative, ER positive, ER negative, chemotherapy resistant, Herceptin resistant, HER2 positive, doxorubicin resistant, tamoxifen resistant, ductal carcinoma, lobular carcinoma, primary, metastatic), ovarian cancer, pancreatic cancer, liver cancer (e.g. hepatocellular carcinoma), lung cancer (e.g. non-small cell lung carcinoma, squamous cell lung carcinoma, adenocarcinoma, large cell lung carcinoma, small cell lung carcinoma, carcinoid, sarcoma), glioblastoma multiforme, glioma, melanoma, prostate cancer, castration-resistant prostate cancer, breast cancer, triple negative breast cancer, glioblastoma, ovarian cancer, lung cancer, squamous cell carcinoma (e.g., head, neck, or esophagus), colorectal cancer, leukemia, acute myeloid leukemia, lymphoma, B cell lymphoma, or multiple myeloma. Additional examples include, cancer of the thyroid, endocrine system, brain, breast, cervix, colon, head & neck, esophagus, liver, kidney, lung, non-small cell lung, melanoma, mesothelioma, ovary, sarcoma, stomach, uterus or Medulloblastoma, Hodgkin's Disease, Non-Hodgkin's Lymphoma, multiple myeloma, neuroblastoma, glioma, glioblastoma multiforme, ovarian cancer, rhabdomyosarcoma, primary thrombocytosis, primary macroglobulinemia, primary brain tumors, cancer, malignant pancreatic insulanoma, malignant carcinoid, urinary bladder cancer, premalignant skin lesions, testicular cancer, lymphomas, thyroid cancer, neuroblastoma, esophageal cancer, genitourinary tract cancer, malignant hypercalcemia, endometrial cancer, adrenal cortical cancer, neoplasms of the endocrine or exocrine pancreas, medullary thyroid cancer, medullary thyroid carcinoma, melanoma, colorectal cancer, papillary thyroid cancer, hepatocellular carcinoma, Paget's Disease of the Nipple, Phyllodes Tumors, Lobular Carcinoma, Ductal Carcinoma, cancer of the pancreatic stellate cells, cancer of the hepatic stellate cells, or prostate cancer.

In some embodiments, provided herein is a method of treatment or prevention of a leukemia by administration of an anti-CTLA4 binding protein (e.g., anti-CTLA4 antibody or antigen-binding fragment thereof) described herein. The term "leukemia" refers broadly to progressive, malignant diseases of the blood-forming organs and is generally characterized by a distorted proliferation and development of leukocytes and their precursors in the blood and bone marrow. Leukemia is generally clinically classified on the basis of (1) the duration and character of the disease-acute or chronic; (2) the type of cell involved; myeloid (myelogenous), lymphoid (lymphogenous), or monocytic; and (3) the increase or non-increase in the number abnormal cells in the blood-leukemic or aleukemic (subleukemic). Exemplary leukemias that may be treated with a compound, pharmaceutical composition, or method provided herein include, for example, acute nonlymphocytic leukemia, chronic lymphocytic leukemia, acute granulocytic leukemia, chronic granulocytic leukemia, acute promyelocytic leukemia, adult T-cell leukemia, aleukemic leukemia, a leukocythemic leukemia, basophylic leukemia, blast cell leukemia, bovine leukemia, chronic myelocytic leukemia, leukemia cutis, embryonal leukemia, eosinophilic leukemia, Gross' leukemia, hairy-cell leukemia, hemoblastic leukemia, hemocytoblastic leukemia, histiocytic leukemia, stem cell leukemia, acute monocytic leukemia, leukopenic leukemia, lymphatic leukemia, lymphoblastic leukemia, lymphocytic leukemia, lymphogenous leukemia, lymphoid leukemia, lymphosarcoma cell leukemia, mast cell leukemia, megakaryocytic leukemia, micromyeloblastic leukemia, monocytic leukemia, myeloblastic leukemia, myelocytic leukemia, myeloid granulocytic leukemia, myelomonocytic leukemia, Naegeli leukemia, plasma cell leukemia, multiple myeloma, plasmacytic leukemia, promyelocytic leukemia, Rieder cell leukemia, Schilling's leukemia, stem cell leukemia, subleukemic leukemia, or undifferentiated cell leukemia.

In some embodiments, provided herein is a method of treatment or prevention of a sarcoma by administration of an anti-CTLA4 binding protein (e.g., anti-CTLA4 antibody or antigen-binding fragment thereof) described herein. The term "sarcoma" generally refers to a tumor which is made up of a substance like the embryonic connective tissue and is generally composed of closely packed cells embedded in a fibrillar or homogeneous substance. Sarcomas that may be treated with a compound, pharmaceutical composition, or method provided herein include a chondrosarcoma, fibrosarcoma, lymphosarcoma, melanosarcoma, myxosarcoma, osteosarcoma, Abemethy's sarcoma, adipose sarcoma, liposarcoma, alveolar soft part sarcoma, ameloblastic sarcoma, botryoid sarcoma, chloroma sarcoma, chorio carcinoma, embryonal sarcoma, Wilms' tumor sarcoma, endometrial sarcoma, stromal sarcoma, Ewing's sarcoma, fascial sarcoma, fibroblastic sarcoma, giant cell sarcoma, granulocytic sarcoma, Hodgkin's sarcoma, idiopathic multiple pigmented hemorrhagic sarcoma, immunoblastic sarcoma of B cells, lymphoma, immunoblastic sarcoma of T-cells, Jensen's sarcoma, Kaposi's sarcoma, Kupffer cell sarcoma, angiosarcoma, leukosarcoma, malignant mesenchymoma sarcoma, parosteal sarcoma, reticulocytic sarcoma, Rous sarcoma, serocystic sarcoma, synovial sarcoma, or telangiectaltic sarcoma.

In some embodiments, provided herein is a method of treatment or prevention of a melanoma by administration of an anti-CTLA4 binding protein (e.g., anti-CTLA4 antibody or antigen-binding fragment thereof) described herein. The term "melanoma" is taken to mean a tumor arising from the melanocytic system of the skin and other organs. Melanomas that may be treated with a compound, pharmaceutical composition, or method provided herein include, for example, acral-lentiginous melanoma, amelanotic melanoma, benign juvenile melanoma, Cloudman's melanoma, S91 melanoma, Harding-Passey melanoma, juvenile melanoma, lentigo maligna melanoma, malignant melanoma, nodular melanoma, subungal melanoma, or superficial spreading melanoma.

In some embodiments, provided herein is a method of treatment or prevention of a carcinoma by administration of an anti-CTLA4 binding protein (e.g., anti-CTLA4 antibody or antigen-binding fragment thereof) described herein. The term "carcinoma" refers to a malignant new growth made up of epithelial cells tending to infiltrate the surrounding tissues and give rise to metastases. Exemplary carcinomas that may be treated with a compound, pharmaceutical composition, or method provided herein include, for example, medullary thyroid carcinoma, familial medullary thyroid carcinoma, acinar carcinoma, acinous carcinoma, adenocystic carcinoma, adenoid cystic carcinoma, carcinoma adenomatosum, carcinoma of adrenal cortex, alveolar carcinoma, alveolar cell carcinoma, basal cell carcinoma, carcinoma basocellulare, basaloid carcinoma, basosquamous cell carcinoma, bronchioalveolar carcinoma, bronchiolar carcinoma, bronchogenic carcinoma, cerebriform carcinoma, cholangiocellular carcinoma, chorionic carcinoma, colloid carcinoma, comedo carcinoma, corpus carcinoma, cribriform carcinoma, carcinoma en cuirasse, carcinoma *cutaneum*, cylindrical carcinoma, cylindrical cell carcinoma, duct carcinoma, ductal carcinoma, carcinoma durum, embryonal carcinoma, encephaloid carcinoma, epiermoid carcinoma, carcinoma epitheliale adenoides, exophytic carcinoma, carcinoma ex ulcere, carcinoma fibrosum, gelatiniforni carcinoma, gelatinous carcinoma, giant cell carcinoma, carcinoma gigantocellulare, glandular carcinoma, granulosa cell carcinoma, hair-matrix carcinoma, hematoid carcinoma, hepatocellular carcinoma, Hurthle cell carcinoma, hyaline carcinoma, hypernephroid carcinoma, infantile embryonal carcinoma, carcinoma in situ, intraepidermal carcinoma, intraepithelial carcinoma, Krompecher's carcinoma, Kulchitzky-cell carcinoma, large-cell carcinoma, lenticular carcinoma, carcinoma lenticulare, lipomatous carcinoma, lobular carcinoma, lymphoepithelial carcinoma, carcinoma medullare, medullary carcinoma, melanotic carcinoma, carcinoma molle, mucinous carcinoma, carcinoma muciparum, carcinoma mucocellulare, mucoepidermoid carcinoma, carcinoma *mucosum*, mucous carcinoma, carcinoma myxomatodes, nasopharyngeal carcinoma, oat cell carcinoma, carcinoma ossificans, osteoid carcinoma, papillary carcinoma, periportal carcinoma, preinvasive carcinoma, prickle cell carcinoma, pultaceous carcinoma, renal cell carcinoma of kidney, reserve cell carcinoma, carcinoma sarcomatodes, schneiderian carcinoma, scirrhous carcinoma, carcinoma scroti, signet-ring cell carcinoma, carcinoma simplex, small-cell carcinoma, solanoid carcinoma, spheroidal cell carcinoma, spindle cell carcinoma, carcinoma spongiosum, squamous carcinoma, squamous cell carcinoma, string carcinoma, carcinoma telangiectaticum, carcinoma telangiectodes, transitional cell carcinoma, carcinoma *tuberosum*, tubular carcinoma, tuberous carcinoma, verrucous carcinoma, or carcinoma *villosum*.

In some embodiments, provided herein is a method of treatment or prevention of metastatic cancer by administration of an anti-CTLA4 binding protein (e.g., anti-CTLA4 antibody or antigen-binding fragment thereof) described herein. As used herein, the terms "metastasis," "metastatic," and "metastatic cancer" can be used interchangeably and refer to the spread of a neoplastic disease or disorder, e.g., cancer, from one organ or another non-adjacent organ or body part. Cancer occurs at an originating site, e.g., breast, which site is referred to as a primary tumor, e.g., primary breast cancer. Some cancer cells in the primary tumor or originating site acquire the ability to penetrate and infiltrate surrounding normal tissue in the local area and/or the ability to penetrate the walls of the lymphatic system or vascular system circulating through the system to other sites and tissues in the body. A second clinically detectable tumor formed from cancer cells of a primary tumor is referred to as a metastatic or secondary tumor. When cancer cells metastasize, the metastatic tumor and its cells are presumed to be similar to those of the original tumor. Thus, if lung cancer metastasizes to the breast, the secondary tumor at the site of the breast consists of abnormal lung cells and not abnormal breast cells. The secondary tumor in the breast is referred to a metastatic lung cancer. Thus, the phrase metastatic cancer refers to a disease in which a subject has or had a primary tumor and has one or more secondary tumors. The phrases non-metastatic cancer or subjects with cancer that is not metastatic refers to diseases in which subjects have a primary tumor but not one or more secondary tumors. For example, metastatic lung cancer refers to a disease in a subject with or with a history of a primary lung tumor and with one or more secondary tumors at a second location or multiple locations, e.g., in the breast In some embodiments, diseases or disorders that may benefit by the CTLA4 binding proteins described herein include a disease (e.g., diabetes, cancer (e.g. prostate cancer, renal cancer, metastatic cancer, melanoma, castration-resistant prostate cancer, breast cancer, triple negative breast cancer, glioblastoma, ovarian cancer, lung cancer, squamous cell carcinoma (e.g., head, neck, or esophagus), colorectal cancer, leukemia, acute myeloid leukemia, lymphoma, B cell lymphoma, or multiple myeloma)) caused by (in whole or in part), or a symptom of the disease is caused by (in whole or in part) CTLA4 or CTLA4 activity or function.

VI. Articles of Manufacture or Kits

In another aspect, an article of manufacture or kit is provided which comprises an anti-CTLA4 binding protein (e.g., anti-CTLA4 antibody or antigen-binding fragment thereof) described herein. The article of manufacture or kit may further comprise instructions for use of the binding proteins in the methods of the invention. Thus, in certain embodiments, the article of manufacture or kit comprises instructions for the use of an anti-CTLA4 binding protein (e.g., anti-CTLA4 antibody or antigen-binding fragment thereof) in methods for treating or preventing a disorder (e.g., a cancer) in an individual comprising administering to the individual an effective amount of an anti-CTLA4 binding protein (e.g., anti-CTLA4 antibody or antigen-binding fragment thereof). In certain embodiments, the individual is a human. In some embodiments, the individual has a disease selected from the group consisting of include leukemia, lymphoma, head and neck cancer, colorectal cancer, prostate cancer, pancreatic cancer, melanoma, breast cancer, neuroblastoma, lung cancer, ovarian cancer, osteosarcoma, bladder cancer, cervical cancer, liver cancer, kidney cancer, skin cancer or testicular cancer.

The article of manufacture or kit may further comprise a container. Suitable containers include, for example, bottles, vials (e.g., dual chamber vials), syringes (such as single or dual chamber syringes) and test tubes. The container may be formed from a variety of materials such as glass or plastic. The container holds the formulation. In some embodiments, the formulation is a lyophilized formulation.

The article of manufacture or kit may further comprise a label or a package insert, which is on or associated with the container, may indicate directions for reconstitution and/or use of the formulation. The label or package insert may further indicate that the formulation is useful or intended for subcutaneous, intravenous, or other modes of administration for treating or preventing a disorder (e.g., a cancer) in an individual. The container holding the formulation may be a single-use vial or a multi-use vial, which allows for repeat administrations of the reconstituted formulation. The article of manufacture or kit may further comprise a second container comprising a suitable diluent. The article of manufacture or kit may further include other materials desirable from a commercial, therapeutic, and user standpoint, including other buffers, diluents, filters, needles, syringes, and package inserts with instructions for use.

In a specific embodiment, the present invention provides kits for a single dose-administration unit. Such kits comprise a container of an aqueous formulation of therapeutic antibody, including both single or multi-chambered pre-filled syringes. Exemplary pre-filled syringes are available from Vetter GmbH, Ravensburg, Germany.

The article of manufacture or kit herein optionally further comprises a container comprising a second medicament, wherein the anti-CTLA4 binding protein (e.g., anti-CTLA4 antibody or antigen-binding fragment thereof) is a first medicament, and which article or kit further comprises instructions on the label or package insert for treating the subject with the second medicament, in an effective amount.

In another embodiment, provided herein is an article of manufacture or kit comprising the formulations described herein for administration in an auto-injector device. An auto-injector can be described as an injection device that upon activation, will deliver its contents without additional necessary action from the patient or administrator. They are particularly suited for self-medication of therapeutic formulations when the delivery rate must be constant and the time of delivery is greater than a few moments.

Exemplary Embodiments

Among the provided exemplary embodiments are:

1. An anti-CTLA4 antibody or antigen-binding fragment thereof comprising a light chain variable (VL) domain and a heavy chain variable (VH) domain, wherein:
   a) the VL domain comprises (i) a CDR-L1 comprising the amino acid sequence of SEQ ID NO: 1, (ii) a CDR-L2 comprising the amino acid sequence of SEQ ID NO: 2, and (iii) a CDR-L3 comprising the amino acid sequence of SEQ ID NO: 3; and/or the VH domain comprises (i) a CDR-H1 comprising the amino acid sequence of SEQ ID NO: 4, (ii) a CDR-H2 comprising the amino acid sequence of SEQ ID NO: 5, and (iii) a CDR-H3 comprising the amino acid sequence of SEQ ID NO: 6; or
   b) the VL domain comprises (i) a CDR-L1 comprising the amino acid sequence of SEQ ID NO: 13, (ii) a CDR-L2 comprising the amino acid sequence of SEQ ID NO: 14, and (iii) a CDR-L3 comprising the amino acid sequence of SEQ ID NO: 15; and/or the VH domain comprises (i) a CDR-H1 comprising the amino acid sequence of SEQ ID NO: 16, (ii) a CDR-H2 comprising the amino acid sequence of SEQ ID NO: 17, and (iii) a CDR-H3 comprising the amino acid sequence of SEQ ID NO: 18; or
   c) the VL domain comprises (i) a CDR-L1 comprising the amino acid sequence of SEQ ID NO: 7, (ii) a CDR-L2 comprising the amino acid sequence of SEQ ID NO: 8, and (iii) a CDR-L3 comprising the amino acid sequence of SEQ ID NO: 9; and/or the VH domain comprises (i) a CDR-H1 comprising the amino acid sequence of SEQ ID NO: 10, (ii) a CDR-H2 comprising the amino acid sequence of SEQ ID NO: 11, and (iii) a CDR-H3 comprising the amino acid sequence of SEQ ID NO: 12; or
   d) the VL domain comprises (i) a CDR-L1 comprising the amino acid sequence of SEQ ID NO: 19, (ii) a CDR-L2 comprising the amino acid sequence of SEQ ID NO: 20, and (iii) a CDR-L3 comprising the amino acid sequence of SEQ ID NO: 21; and/or the VH domain comprises (i) a CDR-H1 comprising the amino acid sequence of SEQ ID NO: 22, (ii) a CDR-H2 comprising the amino acid sequence of SEQ ID NO: 23, and (iii) a CDR-H3 comprising the amino acid sequence of SEQ ID NO: 24.

2. The anti-CTLA4 antibody or antigen-binding fragment thereof embodiment 1, wherein:
   a) the VL domain comprises an amino acid sequence that has at least about 90% sequence identity to the amino acid sequence of SEQ ID NO: 25, and the VH domain comprises an amino acid sequence that has at least about 90% sequence identity to the amino acid sequence of SEQ ID NO: 26; or
   b) the VL domain comprises an amino acid sequence that has at least about 90% sequence identity to the amino acid sequence of SEQ ID NO: 30, and the VH domain comprises an amino acid sequence that has at least about 90% sequence identity to the amino acid sequence of SEQ ID NO: 31.

3. The anti-CTLA4 antibody or antigen-binding fragment thereof of embodiment 1 or 2, wherein:

a) the VL domain comprises the amino acid sequence of SEQ ID NO: 25, and the VH domain comprises the amino acid sequence of SEQ ID NO: 26; or
b) the VL domain comprises the amino acid sequence of SEQ ID NO: 30, and the VH domain comprises the amino acid sequence of SEQ ID NO: 31.

4. An anti-CTLA4 antibody or antigen-binding fragment thereof comprising a light chain variable (VL) domain and a heavy chain variable (VH) domain, wherein:
a) the VL domain comprises the amino acid sequence of SEQ ID NO: 25 and/or the VH domain comprises the amino acid sequence of SEQ ID NO: 26; or
b) the VL domain comprises the amino acid sequence of SEQ ID NO: 30 and/or the VH domain comprises the amino acid sequence of SEQ ID NO: 31.

5. The anti-CTLA4 antibody or antigen-binding fragment thereof of any one of embodiments 1-4, wherein the VL domain comprises the amino acid sequence of SEQ ID NO: 25, and the VH domain comprises the amino acid sequence of SEQ ID NO: 26.

6. The anti-CTLA4 antibody or antigen-binding fragment thereof of any one of embodiments 1-4, wherein the VL domain comprises the amino acid sequence of SEQ ID NO: 30, and the VH domain comprises the amino acid sequence of SEQ ID NO: 31.

7. The anti-CTLA4 antibody or antigen-binding fragment thereof of any one of embodiments 1-6, wherein the antibody or antigen-binding fragment thereof comprises a heavy chain constant domain (CH).

8. The anti-CTLA4 antibody or antigen-binding fragment thereof any one of embodiments 1-7, wherein the antibody or antigen-binding fragment thereof comprises a CH sequence selected from the group consisting of SEQ ID NOS: 35-38.

9. The anti-CTLA4 antibody or antigen-binding fragment thereof of embodiment 7 or 8, wherein the CH comprises amino acid substitutions S239D or I332E or both, wherein the amino acid residues are numbered according to the EU index as in Kabat.

10. The anti-CTLA4 antibody or antigen-binding fragment thereof any one of embodiments 1-9, wherein the antibody or antigen-binding fragment thereof comprises a CH sequence of SEQ ID NO: 38.

11. The anti-CTLA4 antibody or antigen-binding fragment thereof of any one of embodiments 1-10, wherein the antibody or antigen-binding fragment thereof comprises a light chain constant domain (CL).

12. The anti-CTLA4 antibody or antigen-binding fragment thereof any one of embodiments 1-11, wherein the antibody or antigen-binding fragment thereof comprises a CL sequence of SEQ ID NO:39.

13. The anti-CTLA4 antibody or antigen-binding fragment thereof of any one of embodiments 1-12, wherein:
a) the light chain comprises the amino acid sequence of SEQ ID NO: 27, and the heavy chain comprises the amino acid sequence of SEQ ID NO: 29; or
b) the light chain comprises the amino acid sequence of SEQ ID NO: 32, and the heavy chain comprises the amino acid sequence of SEQ ID NO: 34.

14. An anti-CTLA4 antibody or antigen-binding fragment thereof comprising a light chain comprising the amino acid sequence of SEQ ID NO: 27 and a heavy chain comprising the amino acid sequence of SEQ ID NO: 29.

15. An anti-CTLA4 antibody or antigen-binding fragment thereof comprising a light chain comprising the amino acid sequence of SEQ ID NO: 32 and a heavy chain comprising the amino acid sequence of SEQ ID NO: 34.

16. The anti-CTLA4 antibody or antigen-binding fragment thereof any one of embodiments 1-15, wherein the antibody or antigen-binding fragment thereof is afucosylated or fucose-deficient.

17. The anti-CTLA4 antibody or antigen-binding fragment thereof any one of embodiments 1-16, wherein the anti-CTLA4 antibody or antigen-binding fragment thereof is conjugated to an agent.

18. The anti-CTLA4 antibody or antigen-binding fragment thereof embodiment 17, wherein the agent is an inhibitor of tubulin polymerization, a DNA damaging agent, or a DNA synthesis inhibitor.

19. The anti-CTLA4 antibody or antigen-binding fragment thereof embodiment 17, wherein the agent is a maytansinoid, an auristatin, a pyrrolobenzodiazepine (PBD) dimer, a calicheamicin, a duocarmycin, an indo-linobenzodiazepine dimer, or exatecan derivative Dxd.

20. A bispecific antibody or an antigen-binding fragment thereof, comprising
1) a light chain and a heavy chain of a first pair that specifically binds to CTLA4;
2) a light chain and a heavy chain of a second pair that specifically binds to an antigen; wherein the light chain of the first pair comprises a VL domain, and the heavy chain of the first pair comprises a VH domain and wherein:
a) the VL domain comprises (i) a CDR-L1 comprising the amino acid sequence of SEQ ID NO: 1, (ii) a CDR-L2 comprising the amino acid sequence of SEQ ID NO: 2, and (iii) a CDR-L3 comprising the amino acid sequence of SEQ ID NO: 3; and/or the VH domain comprises (i) a CDR-H1 comprising the amino acid sequence of SEQ ID NO: 4, (ii) a CDR-H2 comprising the amino acid sequence of SEQ ID NO: 5, and (iii) a CDR-H3 comprising the amino acid sequence of SEQ ID NO: 6; or
b) the VL domain comprises (i) a CDR-L1 comprising the amino acid sequence of SEQ ID NO: 13, (ii) a CDR-L2 comprising the amino acid sequence of SEQ ID NO: 14, and (iii) a CDR-L3 comprising the amino acid sequence of SEQ ID NO: 15; and/or the VH domain comprises (i) a CDR-H1 comprising the amino acid sequence of SEQ ID NO: 16, (ii) a CDR-H2 comprising the amino acid sequence of SEQ ID NO: 17, and (iii) a CDR-H3 comprising the amino acid sequence of SEQ ID NO: 18; or
c) the VL domain comprises (i) a CDR-L1 comprising the amino acid sequence of SEQ ID NO: 7, (ii) a CDR-L2 comprising the amino acid sequence of SEQ ID NO: 8, and (iii) a CDR-L3 comprising the amino acid sequence of SEQ ID NO: 9; and/or the VH domain comprises (i) a CDR-H1 comprising the amino acid sequence of SEQ ID NO: 10, (ii) a CDR-H2 comprising the amino acid sequence of SEQ ID NO: 11, and (iii) a CDR-H3 comprising the amino acid sequence of SEQ ID NO: 12; or
d) the VL domain comprises (i) a CDR-L1 comprising the amino acid sequence of SEQ ID NO: 19, (ii) a CDR-L2 comprising the amino acid sequence of SEQ ID NO: 20, and (iii) a CDR-L3 comprising the amino acid sequence of SEQ ID NO: 21; and/or the VH domain comprises (i) a CDR-H1 comprising the amino acid sequence of SEQ ID NO: 22, (ii) a CDR-H2 comprising the amino acid sequence of SEQ ID NO: 23, and (iii) a CDR-H3 comprising the amino acid sequence of SEQ ID NO: 24.

21. The bispecific antibody or antigen-binding fragment thereof embodiment 20, wherein:
   a) the VL domain comprises an amino acid sequence that has at least about 90% sequence identity to the amino acid sequence of SEQ ID NO: 25, and the VH domain comprises an amino acid sequence that has at least about 90% sequence identity to the amino acid sequence of SEQ ID NO: 26; or
   b) the VL domain comprises an amino acid sequence that has at least about 90% sequence identity to the amino acid sequence of SEQ ID NO: 30, and the VH domain comprises an amino acid sequence that has at least about 90% sequence identity to the amino acid sequence of SEQ ID NO: 31.

22. The bispecific antibody or antigen-binding fragment thereof embodiment 20 or 21, wherein:
   a) the VL domain comprises the amino acid sequence of SEQ ID NO: 25, and the VH domain comprises the amino acid sequence of SEQ ID NO: 26; or
   b) the VL domain comprises the amino acid sequence of SEQ ID NO: 30, and the VH domain comprises the amino acid sequence of SEQ ID NO: 31.

23. A bispecific antibody or an antigen-binding fragment thereof, comprising
   1) a light chain and a heavy chain of a first pair that specifically binds to CTLA4;
   2) a light chain and a heavy chain of a second pair that specifically binds to an antigen; wherein the light chain of the first pair comprises a VL domain, and the heavy chain of the first pair comprises a VH domain and wherein:
      a) the VL domain comprises the amino acid sequence of SEQ ID NO: 25 and/or the VH domain comprises the amino acid sequence of SEQ ID NO: 26; or
      b) the VL domain comprises the amino acid sequence of SEQ ID NO: 30 and/or the VH domain comprises the amino acid sequence of SEQ ID NO: 31.

24. The bispecific antibody or antigen-binding fragment thereof of any one of embodiments 20-23, wherein the VL domain comprises the amino acid sequence of SEQ ID NO: 25, and the VH domain comprises the amino acid sequence of SEQ ID NO: 26.

25. The bispecific antibody or antigen-binding fragment thereof of any one of embodiments 20-23, wherein the VL domain comprises the amino acid sequence of SEQ ID NO: 30, and the VH domain comprises the amino acid sequence of SEQ ID NO: 31.

26. The bispecific antibody or antigen-binding fragment thereof of any one of embodiments 20-25, wherein the bispecific antibody or antigen-binding fragment thereof comprises a heavy chain constant domain (CH).

27. The bispecific antibody or antigen-binding fragment thereof any one of embodiments 20-26, wherein the bispecific antibody or antigen-binding fragment thereof comprises a CH sequence selected from the group consisting of SEQ ID NOS: 35-38.

28. The bispecific antibody or antigen-binding fragment thereof of embodiment 26 or 27, wherein the CH comprises amino acid substitutions S239D or I332E or both, wherein the amino acid residues are numbered according to the EU index as in Kabat.

29. The bispecific antibody or antigen-binding fragment thereof any one of embodiments 20-28, wherein the bispecific antibody or antigen-binding fragment thereof comprises a CH sequence of SEQ ID NO: 38.

30. The bispecific antibody or antigen-binding fragment thereof of any one of embodiments 20-29, wherein the bispecific antibody or antigen-binding fragment thereof comprises a light chain constant domain (CL).

31. The bispecific antibody or antigen-binding fragment thereof any one of embodiments 20-30, wherein the bispecific antibody or antigen-binding fragment thereof comprises a CL sequence of SEQ ID NO:39.

32. The bispecific antibody or antigen-binding fragment thereof of any one of embodiments 20-31, wherein:
   a) the light chain comprises the amino acid sequence of SEQ ID NO: 27, and the heavy chain comprises the amino acid sequence of SEQ ID NO: 29; or
   b) the light chain comprises the amino acid sequence of SEQ ID NO: 32, and the heavy chain comprises the amino acid sequence of SEQ ID NO: 34.

33. A bispecific antibody or an antigen-binding fragment thereof, comprising
   1) a light chain and a heavy chain of a first pair that specifically binds to CTLA4;
   2) a light chain and a heavy chain of a second pair that specifically binds to an antigen; wherein the first pair comprises a light chain comprising the amino acid sequence of SEQ ID NO: 27 and a heavy chain comprising the amino acid sequence of SEQ ID NO: 29.

34. A bispecific antibody or an antigen-binding fragment thereof, comprising
   1) a light chain and a heavy chain of a first pair that specifically binds to CTLA4;
   2) a light chain and a heavy chain of a second pair that specifically binds to an antigen; wherein the first pair comprises a light chain comprising the amino acid sequence of SEQ ID NO: 32 and a heavy chain comprising the amino acid sequence of SEQ ID NO: 34.

35. The bispecific antibody or antigen-binding fragment thereof any one of embodiments 20-34, wherein the bispecific antibody or antigen-binding fragment thereof is afucosylated or fucose-deficient.

36. The bispecific antibody or antigen-binding fragment thereof any one of embodiments 20-35, wherein the bispecific antibody or antigen-binding fragment thereof is conjugated to an agent.

37. The bispecific antibody or antigen-binding fragment thereof embodiment 36, wherein the agent is an inhibitor of tubulin polymerization, a DNA damaging agent, or a DNA synthesis inhibitor.

38. The bispecific antibody or antigen-binding fragment thereof embodiment 36, wherein the agent is a maytansinoid, an auristatin, a pyrrolobenzodiazepine (PBD) dimer, a calicheamicin, a duocarmycin, a indo-linobenzodiazepine dimer, or exatecan derivative Dxd.

39. A nucleic acid encoding the anti-CTLA4 antibody or antigen-binding fragment thereof of any one of embodiments 1-19 or the bispecific antibody or antigen-binding fragment thereof of any one of embodiments 20-38.

40. A vector comprising the nucleic acid of embodiment 39.

41. A host cell comprising the anti-CTLA4 antibody or antigen-binding fragment thereof of any one of embodiments 1-19, the bispecific antibody or antigen-binding fragment thereof of any one of embodiments 20-38, or the nucleic acid of embodiment 39.

42. The host cell of embodiment 41, wherein the host cell is capable of producing an antibody or antigen-binding fragment thereof that is afucosylated or fucose-deficient.

43. The host cell of embodiment 41 or 42, wherein the host cell has an alpha1,6-fucosyltransferase (Fut8) knockout.

44. The host cell of any one of embodiments 41-43, wherein the host cell overexpresses β1,4-N-acetylglycosminyltransferase III (GnT-III).

45. The host cell of any one of embodiments 41-44, wherein the host cell overexpresses Golgi µ-mannosidase I (ManII).

46. A method of producing an antibody or antigen-binding fragment thereof, comprising culturing the host cell of any one of embodiments 41-45 under conditions that produce the antibody or antigen-binding fragment thereof.

47. A method of producing an afucosylated or fucose-deficient antibody or antigen-binding fragment thereof, comprising culturing the host cell of any one of embodiments 42-45 under conditions that produce the antibody or antigen-binding fragment thereof.

48. The method of any one of embodiments 43-45, further comprising recovering the antibody or antigen-binding fragment thereof produced by the host cell.

49. An antibody or antigen-binding fragment thereof produced by the method of any one of embodiments 46-48.

50. A composition comprising the anti-CTLA4 antibody or antigen-binding fragment thereof of any one of embodiments 1-19, the bispecific antibody or antigen-binding fragment thereof of any one of embodiments 20-38 or the antibody or antigen-binding fragment thereof of embodiment 49.

51. A pharmaceutical composition comprising the anti-CTLA4 antibody or antigen-binding fragment thereof of any one of embodiments 1-19, the bispecific antibody or antigen-binding fragment thereof of any one of embodiments 20-38 or the antibody or antigen-binding fragment thereof of embodiment 49 and a pharmaceutically acceptable carrier.

52. A pharmaceutical composition comprising the anti-CTLA4 antibody or antigen-binding fragment thereof of any one of embodiments 1-19, the bispecific antibody or antigen-binding fragment thereof of any one of embodiments 20-38 or the antibody or antigen-binding fragment thereof of embodiment 49 and a pharmaceutically acceptable carrier, for use in treating or preventing a neoplastic disease in a subject.

53. Use of a pharmaceutical composition comprising the anti-CTLA4 antibody or antigen-binding fragment thereof of any one of embodiments 1-19, the bispecific antibody or antigen-binding fragment thereof of any one of embodiments 20-38 or the antibody or antigen-binding fragment thereof of embodiment 49 and a pharmaceutically acceptable carrier, in the manufacture of a medicament for treating or preventing a neoplastic disease in a subject.

54. A kit comprising the anti-CTLA4 antibody or antigen-binding fragment thereof of any one of embodiments 1-19, the bispecific antibody or antigen-binding fragment thereof of any one of embodiments 20-38 or the antibody or antigen-binding fragment thereof of embodiment 49.

55. A method of treating or preventing a neoplastic disease in a subject, the method comprising administering to a subject an effective amount the anti-CTLA4 antibody or antigen-binding fragment thereof of any one of embodiments 1-19, the bispecific antibody or antigen-binding fragment thereof of any one of embodiments 20-38, the antibody or antigen-binding fragment thereof of embodiment 49 or the composition of any one of embodiments 50-52.

EXAMPLES

The invention will be more fully understood by reference to the following examples. They should not, however, be construed as limiting the scope of the invention. It is understood that the examples and embodiments described herein are for illustrative purposes only and that various modifications or changes in light thereof will be suggested to persons skilled in the art and are to be included within the spirit and purview of this application and scope of the appended claims.

Example 1: In Vitro Characterization of Anti-CTLA4 Antibodies Binding to CTLA4: Low Density Antigen Binding ELISA and SPR The binding between exemplary anti-CTLA4 antibodies and variants to CTLA4 or FcγRIIIa (CD16a), were assessed by enzyme-linked immunosorbent assay (ELISA) or Surface Plasmon Resonance (SPR).

Methods

Antibodies

Antibodies tested include humanized anti-CTLA4 antibodies termed Antibody 1 and Antibody 2, and variants/forms/versions thereof. In accordance with a particular numbering scheme, Antibody 1 comprises a light chain variable region with a CDR-L1 comprising the amino acid sequence of SEQ ID NO: 1, a CDR-L2 comprising the amino acid sequence of SEQ ID NO: 2, and a CDR-L3 comprising the amino acid sequence of SEQ ID NO: 3, and comprises a heavy chain variable region comprising a CDR-H1 comprising the amino acid sequence of SEQ ID NO: 4, a CDR-H2 comprising the amino acid sequence of SEQ ID NO: 5, and a CDR-H3 comprising the amino acid sequence of SEQ ID NO: 6. In accordance with the Kabat numbering scheme, Antibody 1 comprises a light chain variable region with a CDR-L1 comprising the amino acid sequence of SEQ ID NO: 7, a CDR-L2 comprising the amino acid sequence of SEQ ID NO: 8, and a CDR-L3 comprising the amino acid sequence of SEQ ID NO: 9, and comprises a heavy chain variable region comprising a CDR-H1 comprising the amino acid sequence of SEQ ID NO: 10, a CDR-H2 comprising the amino acid sequence of SEQ ID NO: 11, and a CDR-H3 comprising the amino acid sequence of SEQ ID NO: 12. In accordance with a particular numbering scheme, Antibody 2 comprises a light chain variable region with a CDR-L1 comprising the amino acid sequence of SEQ ID NO: 13, a CDR-L2 comprising the amino acid sequence of SEQ ID NO: 14, and a CDR-L3 comprising the amino acid sequence of SEQ ID NO: 15, and comprises a heavy chain variable region comprising a CDR-H1 comprising the amino acid sequence of SEQ ID NO: 16, a CDR-H2 comprising the amino acid sequence of SEQ ID NO: 17, and a CDR-H3 comprising the amino acid sequence of SEQ ID NO: 18. In accordance with Kabat numbering scheme, Antibody 2 comprises a light chain variable region with a CDR-L1 comprising the amino acid sequence of SEQ ID NO: 19, a CDR-L2 comprising the amino acid sequence of SEQ ID NO: 20, and a CDR-L3 comprising the amino acid sequence of SEQ ID NO: 21, and comprises a heavy chain variable region comprising a CDR-H1 comprising the amino acid sequence of SEQ ID NO: 22, a CDR-H2 comprising the amino acid sequence of SEQ ID NO: 23, and a CDR-H3 comprising the amino acid sequence of SEQ ID NO: 24. Various forms of Antibody 1 were generated and assessed, for example, containing particular mutations in the Fc domain, or afucosylated versions, each with a nomenclature of "Antibody 1- #," and various forms of Antibody 2 were generated and assessed, for example, containing particular mutations in the Fc domain, or afucosylated versions, each with a nomenclature of "Antibody 2- #."

ELISA

All ELISA were performed in a manner substantially similar to the description below or generally consistent with methods known in the art. Polystyrene 96-well microplates (Fisher #07-200-591) were coated with 1 µg/mL of human CTLA4-Fc (R&D #7268-CT) per well and stored overnight at 4° C. Plates were washed with 0.05% Tween in TBS (TBS-T), blocked with 1% BSA (Sigma Aldrich #B4287-25G), and washed with TBS-T. Serial dilutions of samples containing anti-CTLA4 antibodies described below were made in assay buffer (PBS+0.05% Tween+1% BSA), added to plate, and shaken orbitally at 100 RPM at room temperature for one hour. After washing with TBS-T, anti-human Kappa light chain [clone: SB81a]-HRP (Abcam #ab79115) diluted to 1:8000 in assay buffer was applied to the wells and shaken at room temperature for one hour. Plates were washed with TBS-T, HRP substrate (Super Signal Pico Chemiluminescent Substrate, Thermo #37069) was applied to plate, and luminescence was recorded using a spectrophotometer (BioTek). Data was analyzed with GraphPad Prism.

SPR

All Surface Plasmon Resonance (SPR) analysis were performed in a manner substantially similar to the description below or generally consistent with methods known in the art. SPR was performed on certain antibodies to assess binding between the antibody, or fragment thereof, and a target protein, such as human CTLA4 (huCTLA4), cynomolgus CTLA4 (cynoCTLA4), or FcγRIIIa (CD16a). In some studies, SPR analysis was performed to test the binding of certain antibodies, e.g., Antibody 2-6 (a version of Antibody 2 having a S239D mutation, an I332E mutation in the Fc region) and the anti-CTLA4 antibody ipilimumab, to human CTLA4. In some studies, SPR analysis was performed to test the binding of certain antigen-binding fragments, e.g., the Fab of antibodies such as Antibody 2 and ipilimumab, to recombinant human CTLA4 (rhCTLA4). In some studies, SPR analysis was performed to test binding of certain antigen-binding fragments, e.g., the Fab of antibodies such as Antibody 2 and ipilimumab, to cynoCTLA4-Fc. SPR analysis was performed on a GE Biacore T200 instrument at 37° C. The antibody and isotype control (reference channel) were coupled at 100 RU immobilization level to CM5 chip (GE Healthcare). Peptides were synthesized and diluted into HBS-EP+running buffer (GE Healthcare). The binding data were analyzed using Biacore Evaluation Software, version 3.0.

Results

ELISA

Figure 1B:
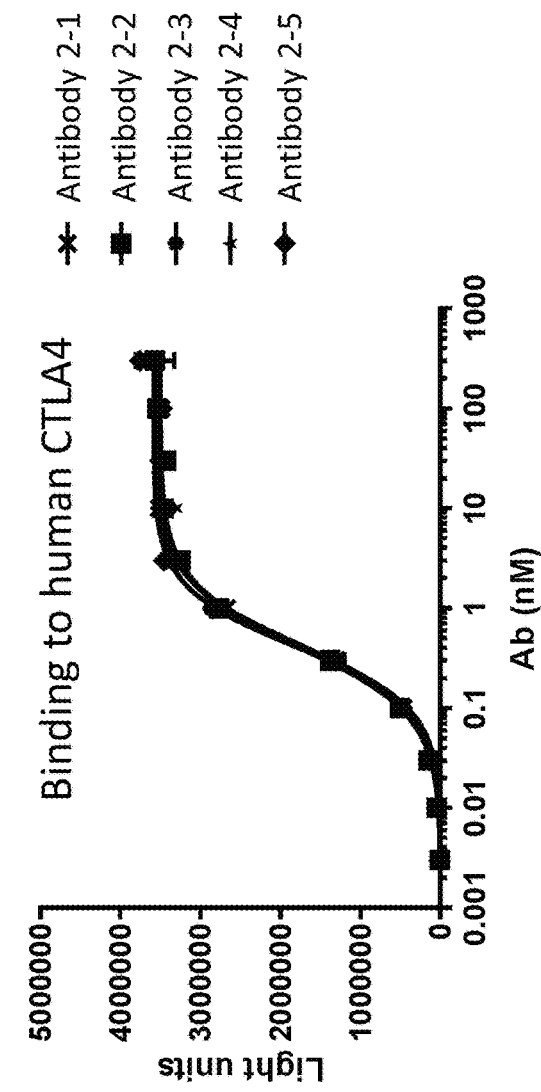

FIG. 1A and FIG. 1B show the results of binding studies, as assessed by ELISA, with the humanized anti-CTLA4 antibodies Antibody 1 and Antibody 2, or variants thereof, as described above, to human CTLA-Fc. FIG. 1A shows no detectable difference between the binding of a version of Antibody 1 having a wild-type Fc region (Antibody 1-1) and a version of Antibody 1 having a S239D mutation and an I332E mutation in the Fc region (Antibody 1-2) to human CTLA4-Fc. FIG. 1B compares the CTLA4 binding of various forms of Antibody 2, including a version of Antibody 2 having a wild-type Fc region (Antibody 2-1), a version of Antibody 2 having a S239D mutation and an I332E mutation in the Fc region (Antibody 2-2), a version of Antibody 2 having a S239D mutation, an I332E mutation in the Fc region, and two hinge region mutations (Antibody 2-3), a version of Antibody 2 having S239D, I332E, and A330L mutations in the Fc region (Antibody 2-4), and a version of Antibody 2 having S239D, I332E, A330L mutations in the Fc region, and two hinge region mutations (Antibody 2-5). As shown in FIG. 1B, all forms of the antibodies bound to the human CTLA4-Fc similarly. The average $EC_{50}$ values for the antibodies tested are provided in Table 2 below.

TABLE 2

Antibody Binding to human CTLA4-Fc

| Antibody | $EC_{50}$ (nM) | $R^2$ |
|---|---|---|
| Antibody 1-1 | 0.32 ± 0.01 | 0.9984 |
| Antibody 1-2 | 0.32 ± 0.01 | 0.998 |
| Antibody 2-1 | 0.44 ± 0.02 | 0.9978 |
| Antibody 2-2 | 0.39 ± 0.01 | 0.9979 |
| Antibody 2-3 | 0.40 ± 0.02 | 0.9967 |
| Antibody 2-4 | 0.40 ± 0.02 | 0.9962 |
| Antibody 2-5 | 0.41 ± 0.02 | 0.9968 |

Figure 1C:
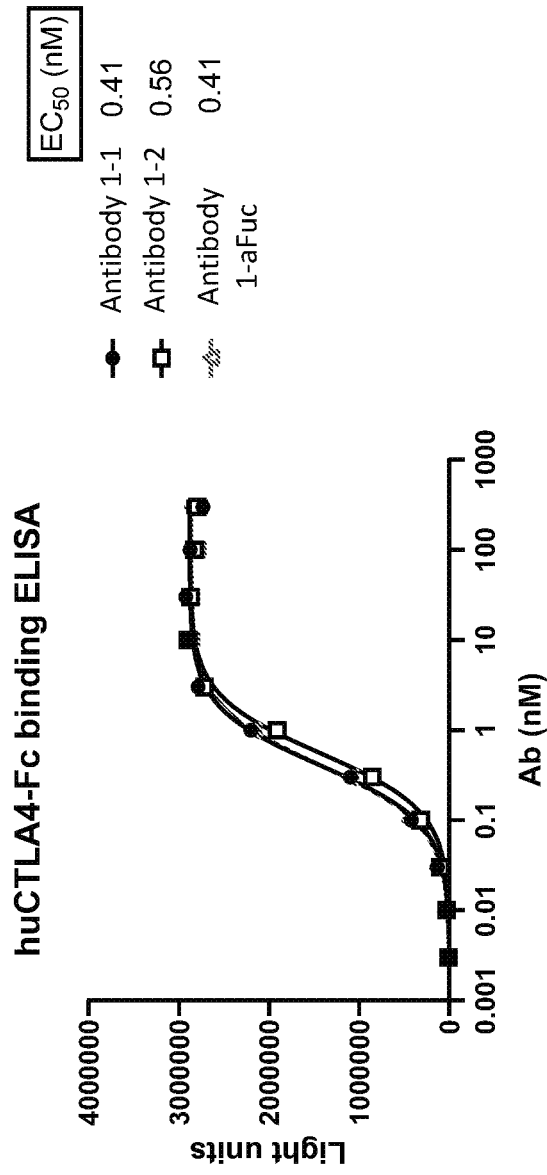
FIGS. 1C-1E show the results of binding of human CTLA-Fc and the humanized anti-CTLA4 antibodies and variants (e.g., containing mutations in the Fc region or afucosylated versions) of Antibody 1 (FIG. 1C), Antibody 2 (FIG. 1D), or ipilimumab (FIG. 1E), as assessed by ELISA. As shown, all variants of each of the antibodies bound to the human CTLA4-Fc similarly.
Figure 1D:
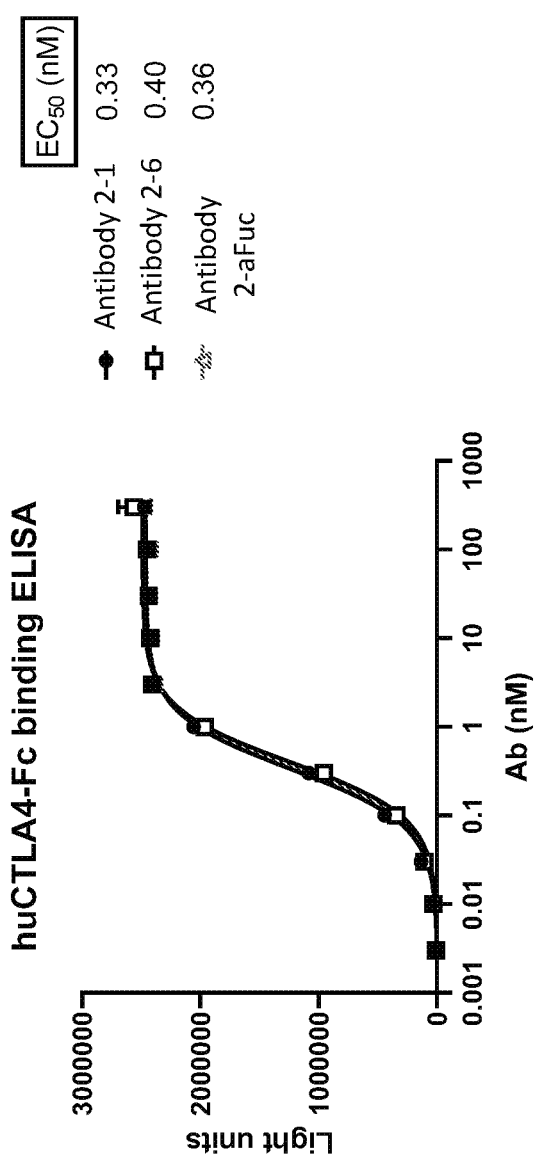
Figure 1E:
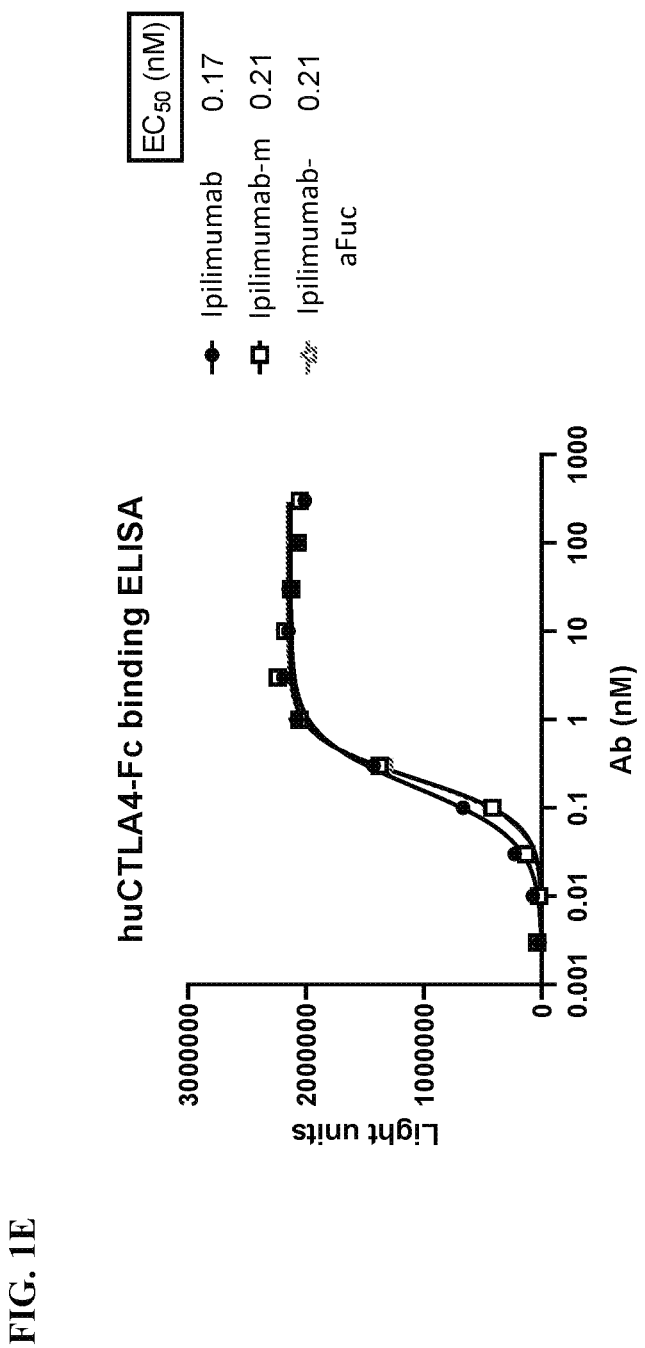

FIGS. 1C-1E show the results of binding studies, as assessed by ELISA, with the humanized anti-CTLA4 antibodies Antibody 1, Antibody 2 or ipilimumab, or variants thereof containing mutations in the Fc region or afucosylated versions, to human CTLA-Fc. The average $EC_{50}$ values for the antibodies tested are provided in the respective figures. FIG. 1C shows no detectable difference between the binding of a version of Antibody 1 having a wild-type Fc region (Antibody 1-1), a version of Antibody 1 having a S239D mutation and an I332E mutation in the Fc region (Antibody 1-2) and an afucosylated version of Antibody 1 (Antibody 1-aFuc), to human CTLA4-Fc. FIG. 1D shows no detectable difference between the binding of a version of Antibody 2 having a wild-type Fc region (Antibody 2-1), a version of Antibody 2 having a S239D mutation and an I332E mutation in the Fc region (Antibody 2-6) and an afucosylated version of Antibody 2 (Antibody 2-aFuc), to human CTLA4-Fc. FIG. 1E shows no detectable difference between the binding of a version of ipilimumab having a wild-type Fc (ipilimumab), a version of ipilimumab having a S239D mutation and an I332E mutation in the Fc region (ipilimumab-m) and an afucosylated version of ipilimumab (ipilimumab-aFuc), to human CTLA4-Fc. As shown in FIGS. 1C-1E, all variants of each of the antibodies bound to the human CTLA4-Fc similarly.

SPR

Figures 2A, 2B:
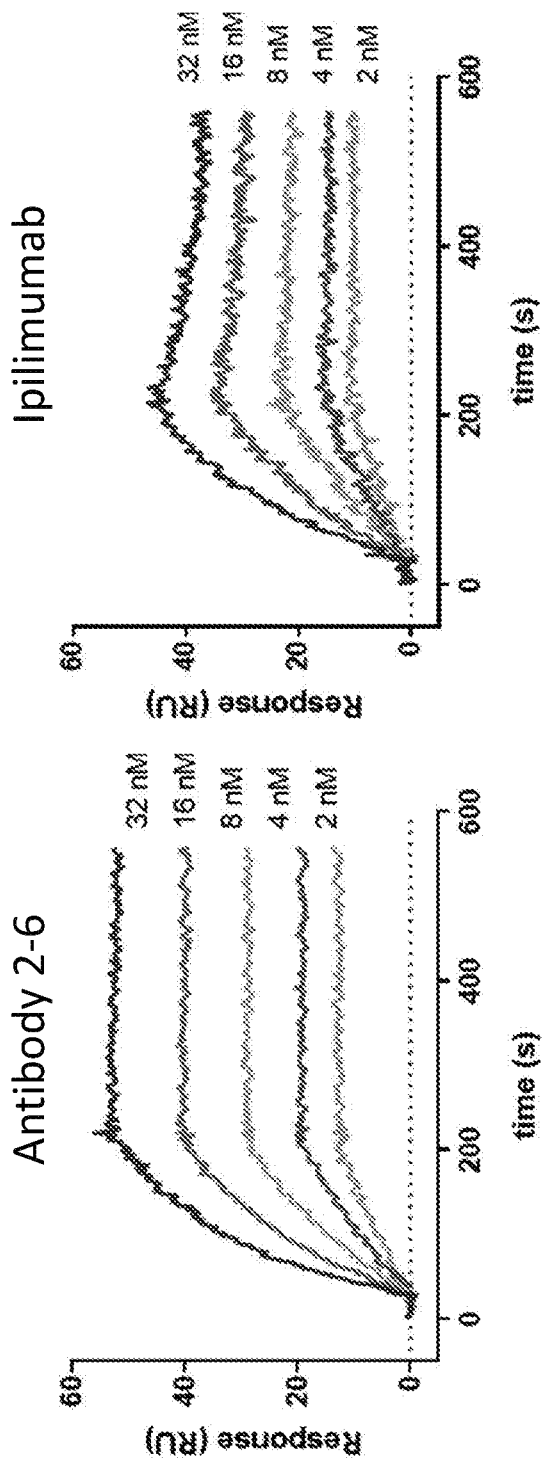
FIG. 2A shows results from an SPR analysis demonstrating binding between Antibody 2-6 (a version of Antibody 2 having a S239D mutation, an I332E mutation in the Fc region) or ipilimumab and human CTLA4 (huCTLA4) at 32 nM, 16 nM, 8 nM, 4 nM, and 2 nM.
FIG. 2B provides the association rate constant (ka), the dissociation rate constant (kd), and the equilibrium dissociation constant ($K_D$), and the fold difference between Antibody 2-6 and ipilimumab, for the results shown in FIG. 2A.

FIG. 2A shows results from an SPR analysis demonstrating binding between Antibody 2-6 (a version of Antibody 2 having a S239D mutation, an I332E mutation in the Fc region) or ipilimumab and human CTLA4 (huCTLA4) at 32 nM, 16 nM, 8 nM, 4 nM, and 2 nM. FIG. 2B summarizes the binding results shown in FIG. 2A with respect to the association rate constant (ka), the dissociation rate constant (kd), and the equilibrium dissociation constant ($K_D$), and the fold difference between Antibody 2-6 and ipilimumab. As shown in FIG. 2B, Antibody 2-6 has a $K_D$ of 91 pM while ipilimumab has a $K_D$ of 1640 pM, which demonstrates that Antibody 2-6 has an approximately 18-fold greater binding affinity to huCTLA4 than ipilimumab as measured by $K_D$. SPR analysis of binding between Antibody 2-6 and cynoCTLA4 showed a $K_D$ of 131 pM.

Figures 2C, 2D:
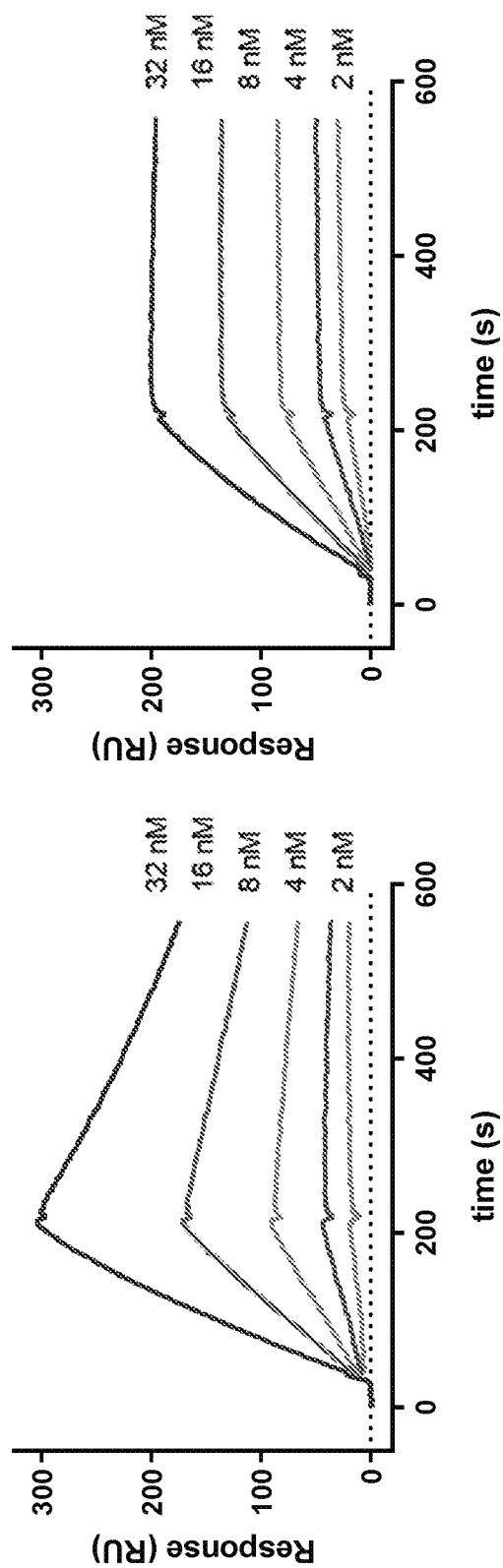
FIG. 2C shows results from an SPR analysis demonstrating binding between a Fab of ipilimumab (ipilimumab-Fab) or a Fab of Antibody 2 (Antibody 2-Fab) and rhCTLA4-Fc at 32 nM, 16 nM, 8 nM, 4 nM, and 2 nM.
FIG. 2D provides the association rate constant (ka), the dissociation rate constant (kd), the equilibrium dissociation constant ($K_D$), and the $Chi^2$ value, for the results shown in FIG. 2C.

FIG. 2C shows results from an SPR analysis demonstrating binding between a Fab of ipilimumab (ipilimumab-Fab) or a Fab of Antibody 2 (Antibody 2-Fab) and rhCTLA4-Fc at 32 nM, 16 nM, 8 nM, 4 nM, and 2 nM. FIG. 2D summarizes the binding results shown in FIG. 2C with respect to the association rate constant (ka), the dissociation rate constant (kd), the equilibrium dissociation constant ($K_D$), and the Chi$^2$ value. As shown in FIG. 2D, ipilimumab- Fab has a $K_D$ value of 4.74 nM while Antibody 2-Fab has a $K_D$ value of 4.53 pM, which demonstrates that Antibody 2-Fab has a much greater binding affinity to rhCTLA4-Fc than ipilimumab-Fab as measured by of $K_D$. Additional binding affinity data between rhCTLA4-Fc and either ipilimumab-Fab or Antibody 2-Fab is provided below in Table 3, which shows an average $K_D$ of 5.71+/−0.87 nM for ipilimumab-Fab, and an average $K_D$ of 3.86+/−2.1 pM for Antibody 2-Fab.

TABLE 3

| Channel | Sample | ka (1/(M*s)) | kd (1/s) | $K_D$ | Chi$^2$ |
|---|---|---|---|---|---|
| Ch1 | Ipilimumab-Fab | 2.45e+5 | 1.40e−3 | 4.74 nM | 1.40 |
| Ch2 | Ipilimumab-Fab | 2.17e+5 | 1.40e−3 | 6.43 nM | 4.83 |
| Ch3 | Ipilimumab-Fab | 2.18e+5 | 1.30e−3 | 5.97 nM | 5.48 |
| | Ipilimumab-Fab | | | 5.71 +/− 0.87 nM (average) | |
| Ch1 | Antibody 2-Fab | 3.61e+5 | 1.63e−6 | 4.53 pM | 2.85 |
| Ch2 | Antibody 2-Fab | 3.45e+5 | 5.19e−7 | 1.51 pM | 1.66 |
| Ch3 | Antibody 2-Fab | 3.31e+5 | 1.84e−6 | 5.55 pM | 3.03 |
| | Antibody 2-Fab | | | 3.86 +/− 2.1 pM (average) | |

Figures 2E, 2F:
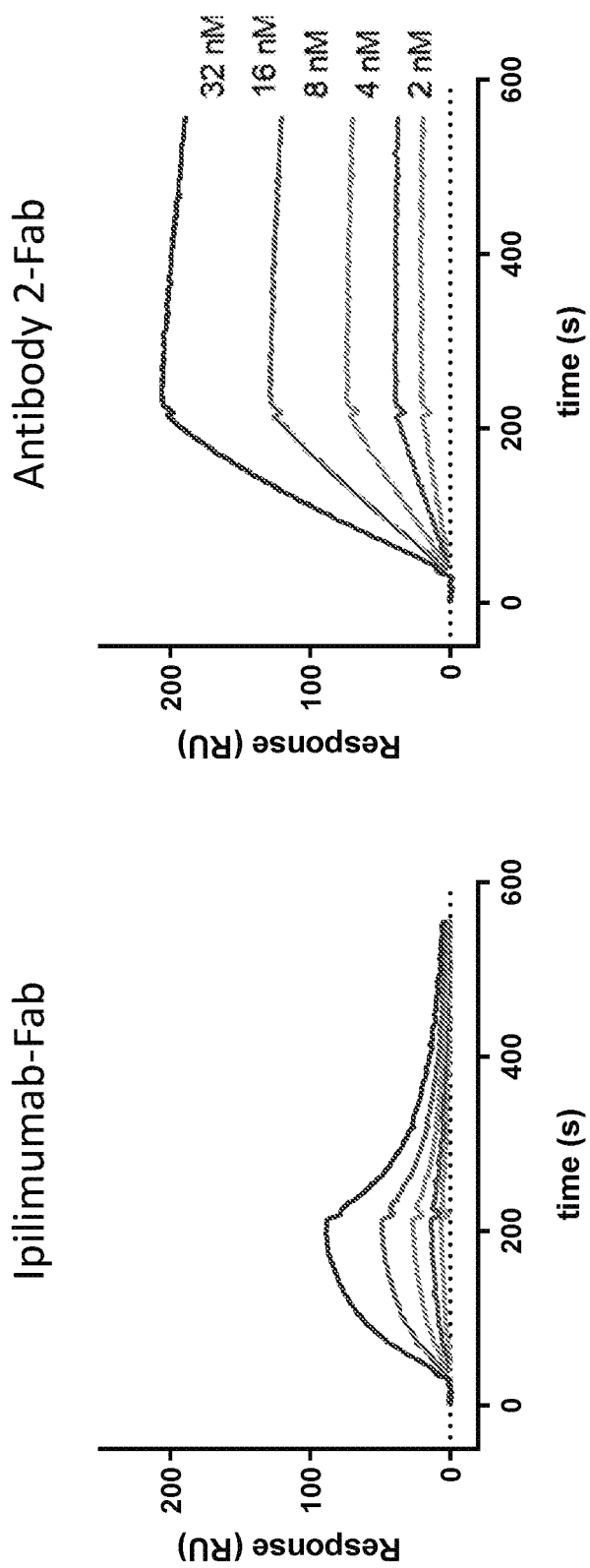
FIG. 2E shows results from an SPR analysis demonstrating binding between a Fab of ipilimumab (ipilimumab-Fab) or a Fab of Antibody 2 (Antibody 2-Fab) and cynoCTLA4-Fc at 32 nM, 16 nM, 8 nM, 4 nM, and 2 nM.
FIG. 2F provides the association rate constant (ka), the dissociation rate constant (kd), the equilibrium dissociation constant ($K_D$), and the $Chi^2$ value, for the results shown in FIG. 2E.

FIG. 2E shows results from an SPR analysis demonstrating binding between a Fab of ipilimumab (ipilimumab-Fab) or a Fab of Antibody 2 (Antibody 2-Fab) and cynoCTLA4-Fc at 32 nM, 16 nM, 8 nM, 4 nM, and 2 nM. FIG. 2F summarizes the binding results shown in FIG. 2E with respect to the association rate constant (ka), the dissociation rate constant (kd), the equilibrium dissociation constant ($K_D$), and the Chi$^2$ value. As shown in FIG. 2F, ipilimumab-Fab has a $K_D$ value of 28.6 nM while Antibody 2-Fab has a $K_D$ value of 0.623 nM, which demonstrates that Antibody 2-Fab has a much greater binding affinity to cynoCTLA4-Fc than ipilimumab-Fab in terms of $K_D$. Additional binding affinity data between cynoCTLA4-Fc and either ipilimumab-Fab or Antibody 2-Fab is provided below in Table 4, which shows an average $K_D$ of 23.1+/−6.3 nM for ipilimumab-Fab, and an average $K_D$ of 0.779+/−0.15 nM for Antibody 2-Fab.

TABLE 4

| Channel | Sample | ka (1/(M*s)) | kd (1/s) | $K_D$ | Chi$^2$ |
|---|---|---|---|---|---|
| Ch1 | Ipilimumab-Fab | 3.33e+5 | 9.51e−3 | 28.6 nM | 1.97 |
| Ch2 | Ipilimumab-Fab | 3.66e+5 | 8.93e−3 | 24.4 nM | 1.70 |
| Ch3 | Ipilimumab-Fab | 5.15e+5 | 8.37e−3 | 16.2 nM | 1.61 |
| | Ipilimumab-Fab | | | 23.1 +/− 6.3 nM (average) | |
| Ch1 | Antibody 2-Fab | 3.63e+5 | 2.26e−4 | 0.623 nM | 2.30 |
| Ch2 | Antibody 2-Fab | 2.89e+5 | 2.29e−4 | 0.794 nM | 2.10 |
| Ch3 | Antibody 2-Fab | 2.54e+5 | 2.34e−4 | 0.920 nM | 1.49 |
| | Antibody 2-Fab | | | 0.779 +/− 0.15 nM (average) | |

Figure 3:
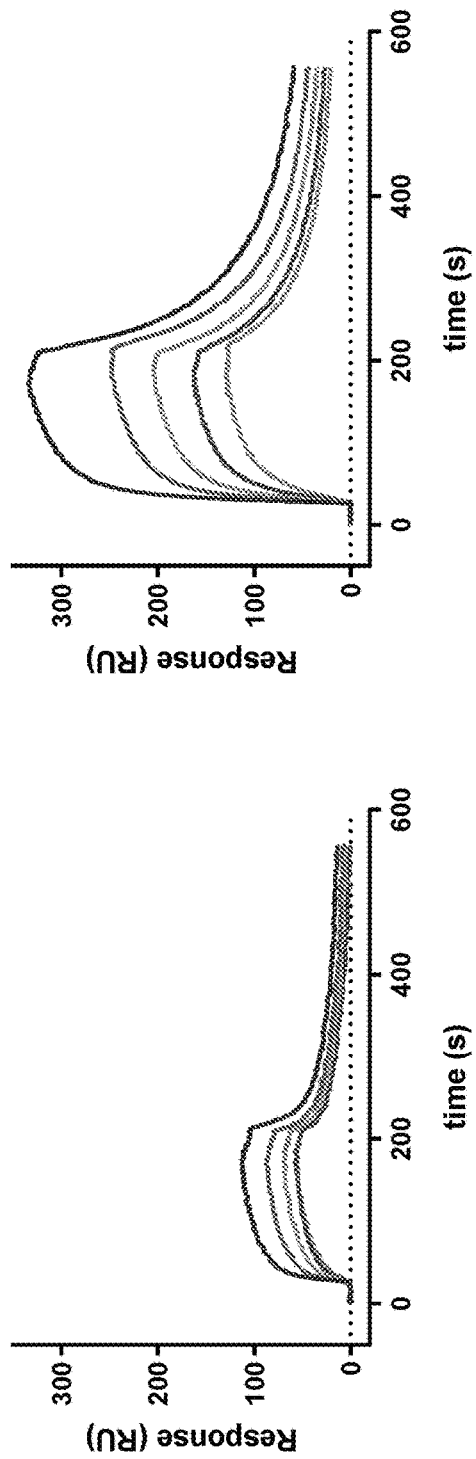
FIG. 3 shows results from an SPR analysis demonstrating binding between Antibody 2-1 (a version of Antibody 2 having a wild-type Fc region), Antibody 2-6 (a version of Antibody 2 having a S239D mutation, an I332E mutation in the Fc region) or ipilimumab and human FcγRIIIa (CD16a), at various concentrations.
Figure 3:
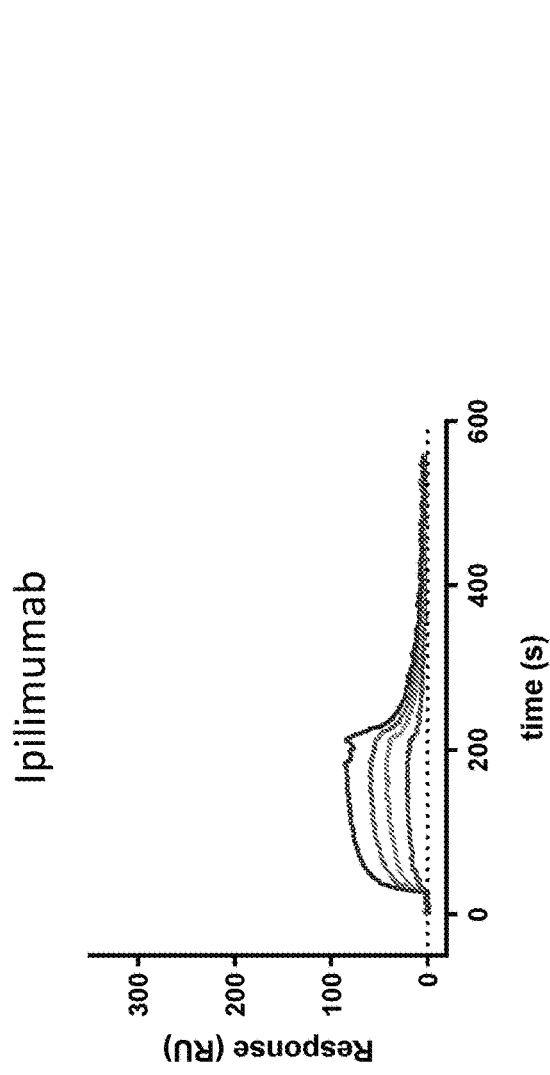

FIG. 3 shows results from an SPR analysis demonstrating binding between Antibody 2-1 (a version of Antibody 2 having a wild-type Fc region), Antibody 2-6 (a version of Antibody 2 having a S239D mutation, an I332E mutation in the Fc region) or ipilimumab and human FcγRIIIa (CD16a), at various concentrations. Kinetics and affinities were unable to be calculated based on the results.

Example 2: Enterotoxin Analysis

A Staphylococcal enterotoxin B (SEB) assay was used to examine the ability of various antibodies to promote IL-2 production from peripheral blood mononuclear cells (PBMCs).

Methods
SEB Assay

For the SEB Assay, dilutions of selected antibodies were prepared in pre-warmed media (RPMI+10% heat-inactivated FBS+1% HEPES+1% MEM NEAA+1% Na-pyruvate). Antibody solution was plated in triplicate and media only was added to "PBMC+SEB" wells, "PBMC only" wells, and outside border walls. SEB solution was prepared in pre-warmed media and added to all experimental wells except "PBMC only." PBMCs (BioIVT) were thawed in a water bath at 37° C. Cells were transferred, dropwise, to a conical tube and 20× pre-warmed medium was added to wash the cells. The cells were centrifuged and the media was aspirated. Cells were resuspended in 20 mL of pre-warmed media and an aliquot was taken for counting. The remaining cells were centrifuged and resuspended in volume to make the cells 1×10$^6$ cells/mL. The cells were plated 100 µL per well and the plate was incubated in 37° C., 5% $CO_2$ incubator for five days. On day five, the plate was spun for five minutes at 1000 RPM. From each well, 250 µL of cells were transferred to a new 96 well plate. The plate was spun again and 225 µL of cells were transferred to PCR strips. The samples were stored at −80° C. until analyzed by ELISA.

IL-2 ELISA

IL-2 levels of cell supernatant produced using the protocol described above was determined by analysis with Human IL-2 ELISA MAX Deluxe sets (BioLegend, Cat. #431806). Cell supernatant samples were diluted with assay buffer to fall within the standard curve. Samples were analyzed using GraphPad Prism and with Tukey's multiple comparisons test (one-way ANOVA) to determine the statistical significance between the treatment groups.

Results

Figure 4C:
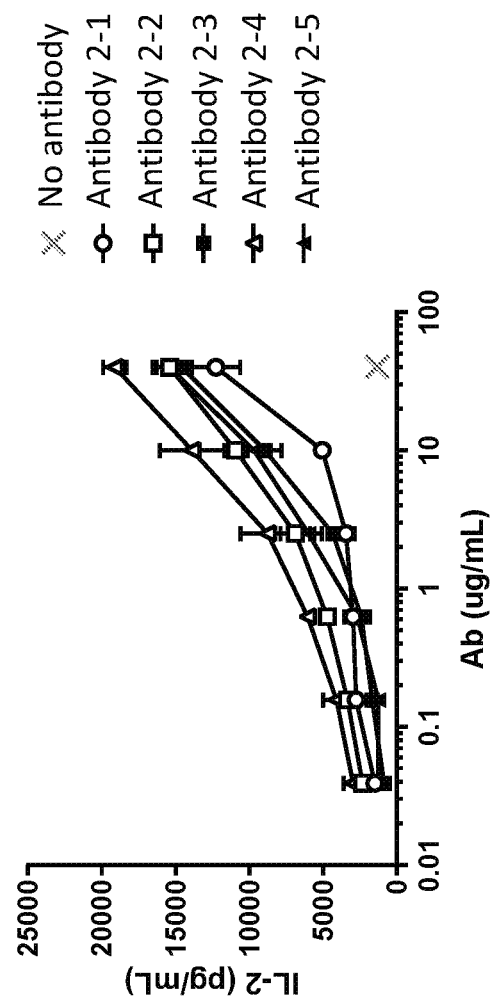
Figure 4D:
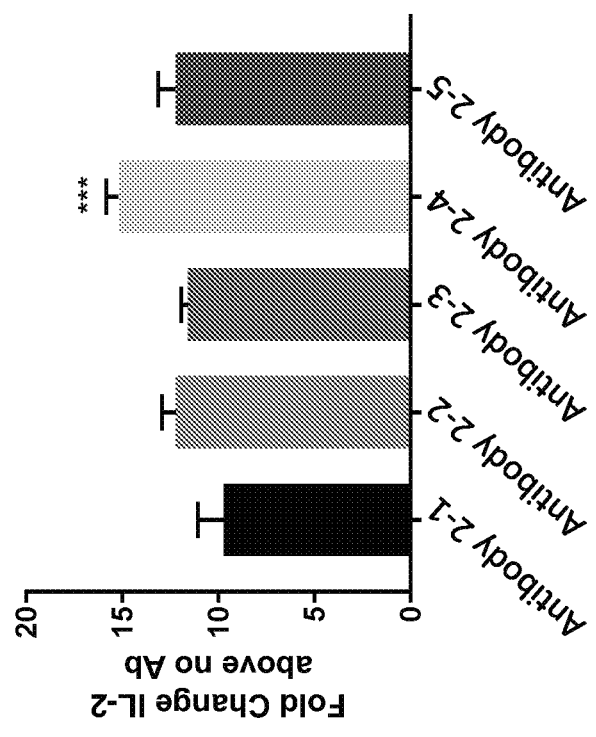

Various forms of Antibody 1 and Antibody 2 were tested in the SEB assay. Data showing the levels of IL-2 produced in the presence of Antibody 1-1 or Antibody 1-2, as described in Example 1, or no antibody, are shown in FIG. 4A. Data showing the levels of IL-2 produced in the presence of Antibody 2-1, Antibody 2-2, Antibody 2-3, Antibody 2-4, and Antibody 2-5, as described in Example 1, or no antibody, are shown in FIG. 4C. All tested antibodies demonstrated the ability to increase IL-2 levels as compared to a no-antibody control. Fold increases in IL-2 levels above the no antibody control for each antibody are shown in FIG. 4B (for Antibody 1 and variants) and FIG. 4D (for Antibody 2 and variants), along with comparison to an isotype control.

Figure 4E:
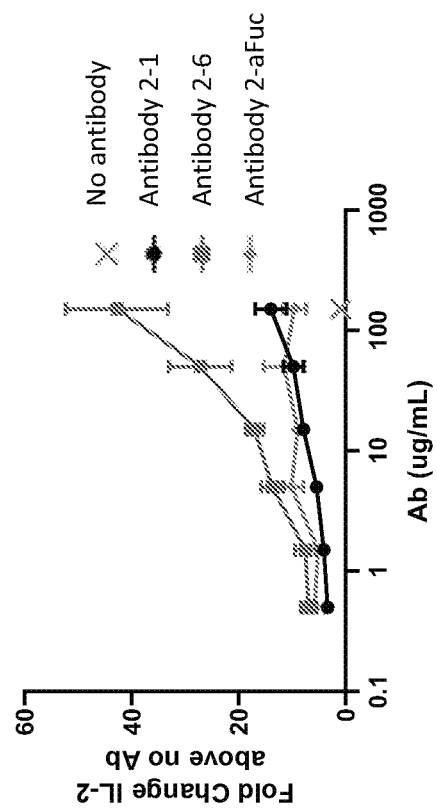
FIG. 4E shows the results of a SEB assay with various versions of anti-CTLA4 Antibody 1 [having a wild-type Fc region (Antibody 1-1), having a S239D mutation and an I332E mutation in the Fc region (Antibody 1-2) and an afucosylated version of Antibody 1 (Antibody 1-aFuc)], Antibody 2 [having a wild-type Fc region (Antibody 2-1), having a S239D mutation and an I332E mutation in the Fc region (Antibody 2-6) and an afucosylated version of Antibody 2 (Antibody 2-aFuc)] or ipilimumab [having a wild-type Fc (ipilimumab), having a S239D mutation and an I332E mutation in the Fc region (ipilimumab-m) and an afucosylated version of ipilimumab (ipilimumab-aFuc)].
Figure 4E:
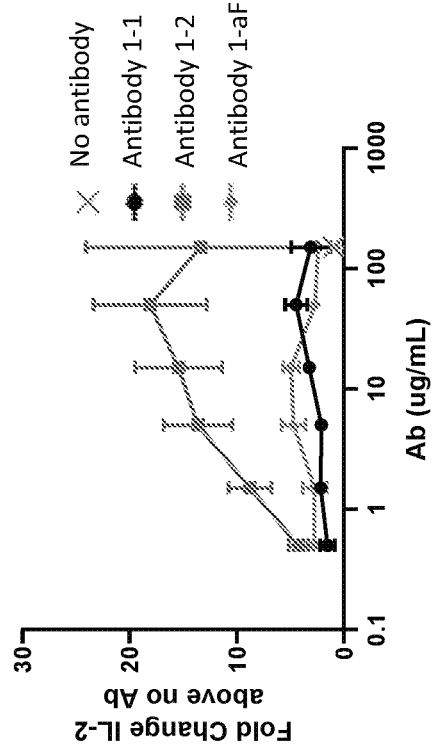
Figure 4E:
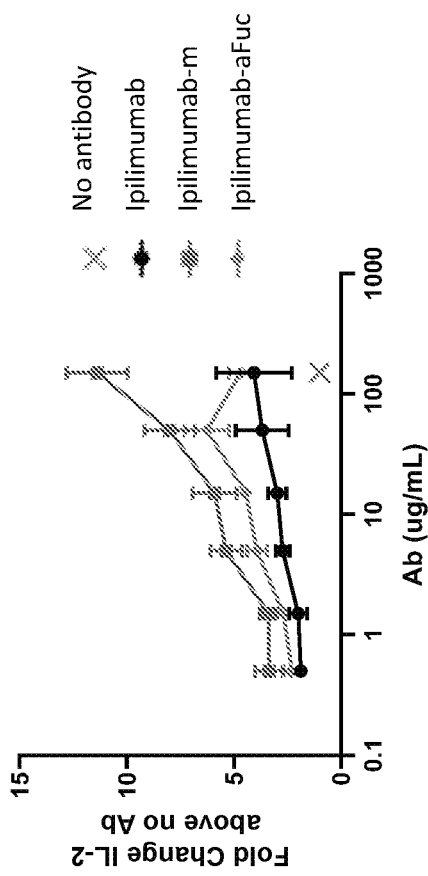

The results of a similar assessment by the SEB assay with various versions of anti-CTLA4 Antibody 1 [having a wild-type Fc region (Antibody 1-1), having a S239D mutation and an I332E mutation in the Fc region (Antibody 1-2) and an afucosylated version of Antibody 1 (Antibody 1-aFuc)], Antibody 2 [having a wild-type Fc region (Antibody 2-1), having a S239D mutation and an I332E mutation in the Fc region (Antibody 2-6) and an afucosylated version of Antibody 2 (Antibody 2-aFuc)] or ipilimumab [having a wild-type Fc (ipilimumab), having a S239D mutation and an I332E mutation in the Fc region (ipilimumab-m) and an afucosylated version of ipilimumab (ipilimumab-aFuc)] are shown in FIG. 4E. The results showed that antibodies with a S239D mutation and an I332E mutation in the Fc region led to higher IL-2 production.

Example 3: ADCC activity by anti-CTLA4 antibodies

The ability of anti-CTLA4 antibodies to result in antibody-dependent cellular cytotoxicity (ADCC) was assessed using an FcγRIIIa reporter bioassay.

Methods
FcγRIIIa Reporter Bioassay

An FcγRIIIa reporter bioassay was performed using various anti-CTLA4 antibodies. Antibodies were diluted in pre-warmed complete medium (FBS with RPMI1640). CTLA4 effector cells (target cells: Promega J158A) were thawed and transferred to a conical tube containing complete medium. Cells were mixed and counted, and the density of the cells was adjusted to $1\times10^6$ cells/mL. Target cells were added to each well of a 96 well plate (Corning, Cat: #3917). Diluted antibodies were added to the appropriate wells and tested in duplicate. The content of each well was gently mixed and the plate was incubated at 37° C. for fifteen minutes. Effector cells (FcγRIIIa expressing Jurkat cells) were thawed and transferred to a conical tube containing complete medium. Cells were mixed and counted, and the density of the cells was adjusted to $3\times10^6$ cells/mL. Immediately, effector cells were dispensed into each well and mixed gently. The plate was covered with a lid and kept at 37° C. for six hours. One hour prior to measurement, Bio-Glo substrate and Bio-Glo buffer were removed from 4° C. Bio-Glo buffer was transferred to the bottle of Bio-Glo substrate to make Bio-Glo reagent, and was gently mixed by inversion. The bottle was kept at room temperature. After incubation, the assay plate was removed from the incubator and kept at room temperature for ten minutes. Bio-Glo reagent was added to each well, and the plate was incubated at room temperature for five-fifteen minute. The plate was then read with a luminometer.

The antibodies tested included anti-CTLA4 Antibody 1 [having a wild-type Fc region (Antibody 1-1), having a S239D mutation and an I332E mutation in the Fc region (Antibody 1-2) and an afucosylated version of Antibody 1 (Antibody 1-aFuc)], Antibody 2 [having a wild-type Fc region (Antibody 2-1), having a S239D mutation and an I332E mutation in the Fc region (Antibody 2-6) and an afucosylated version of Antibody 2 (Antibody 2-aFuc)] or ipilimumab [having a wild-type Fc (ipilimumab), having a S239D mutation and an I332E mutation in the Fc region (ipilimumab-m) and an afucosylated version of ipilimumab (ipilimumab-aFuc)].

Results

Figure 5A:
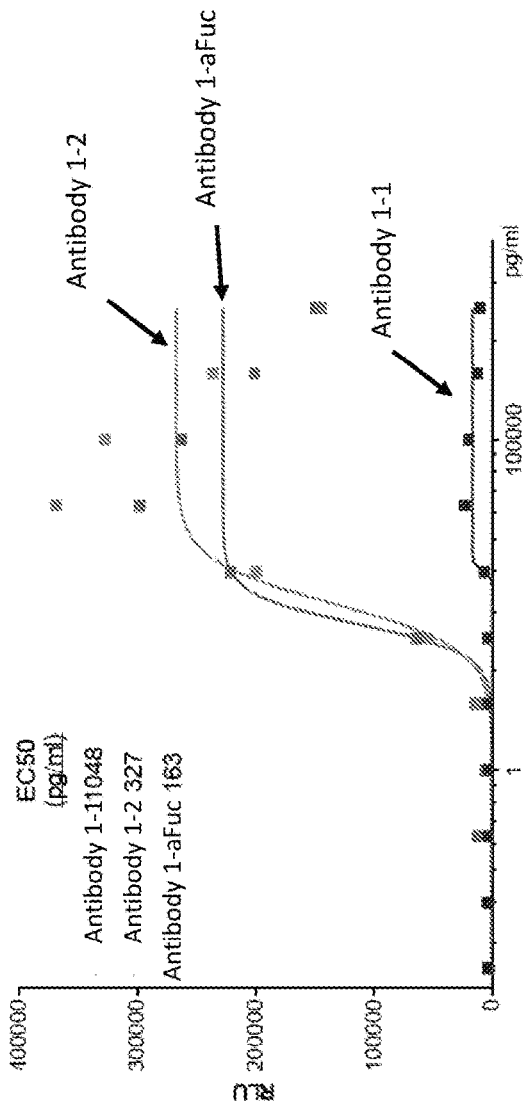
FIGS. 5A-5D show the curve of reporter activation and $EC_{50}$ values from the ADCC, FcγRIIIa reporter bioassay for Antibody 1 variants (FIG. 5A), Antibody 2 variants (FIG. 5B), ipilimumab variants (FIG. 5C) and afucosylated variants of all 3 antibodies (FIG. 5D).
Figure 5B:
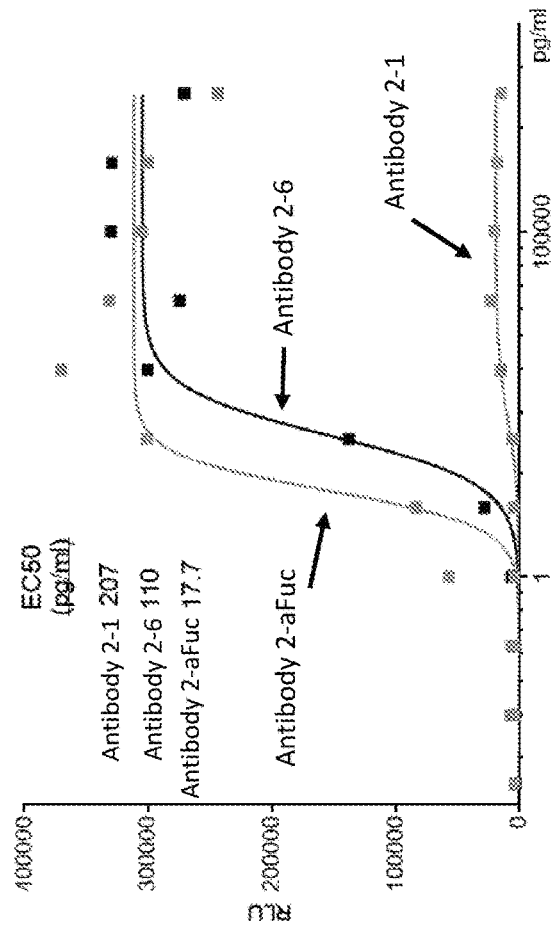
Figure 5C:
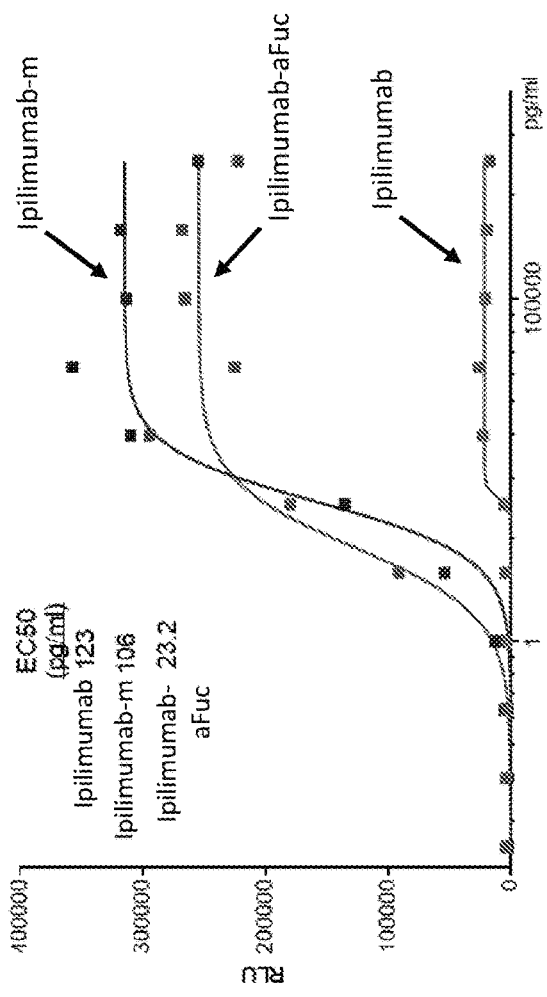
Figure 5D:
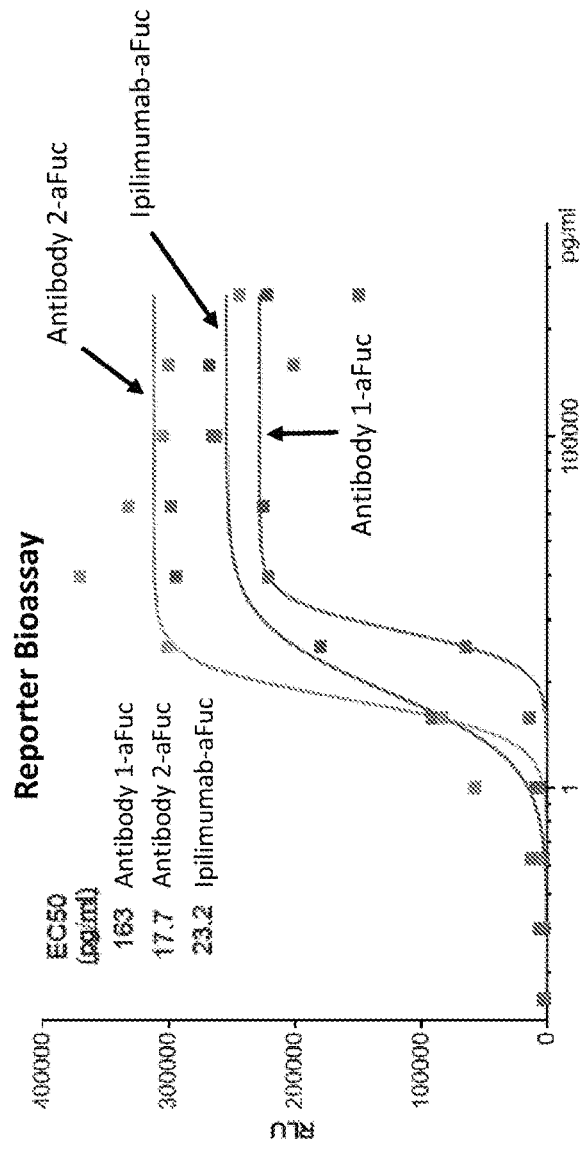
Figure 6A:
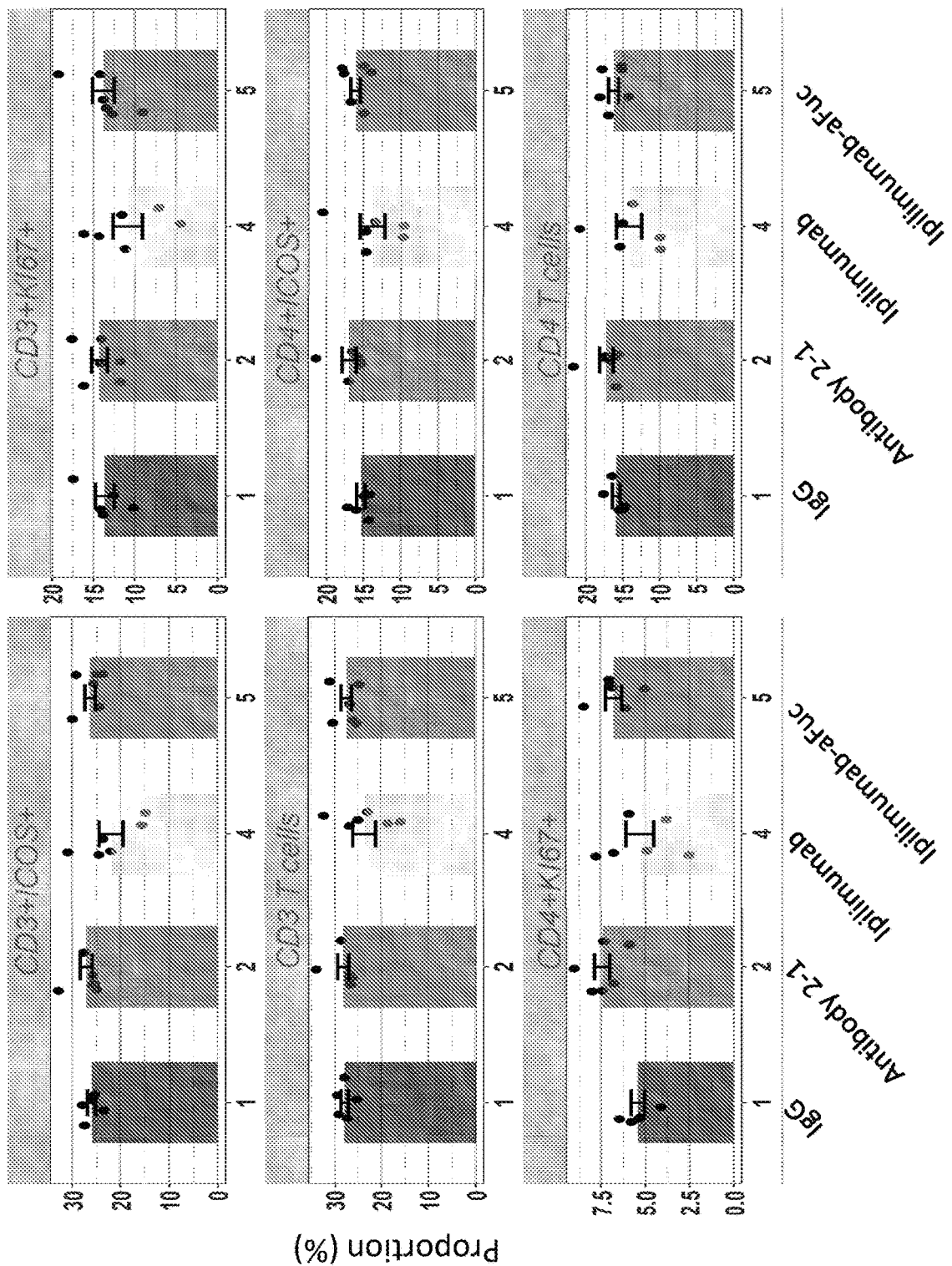
FIGS. 6A-6D depict the results from immunophenotyping studies that assessed the proportion of CD45+ cells that express markers including the following: CD3+/ICOS+, CD3+ T cells, CD4+/Ki67+, CD3+/Ki67+, CD4+/ICOS+, CD4+ T cells, CD8+/ICOS+, CD8+ T cells, Tregs+/ICOS+, CD8+/Ki67+, Tregs, Tregs+/Ki67+. The antibodies tested are: Group 1: IgG, Group 2: Antibody 2-1; Group 4: Ipilimumab; Group 5: Ipilimumab-aFuc.
Figure 6B:
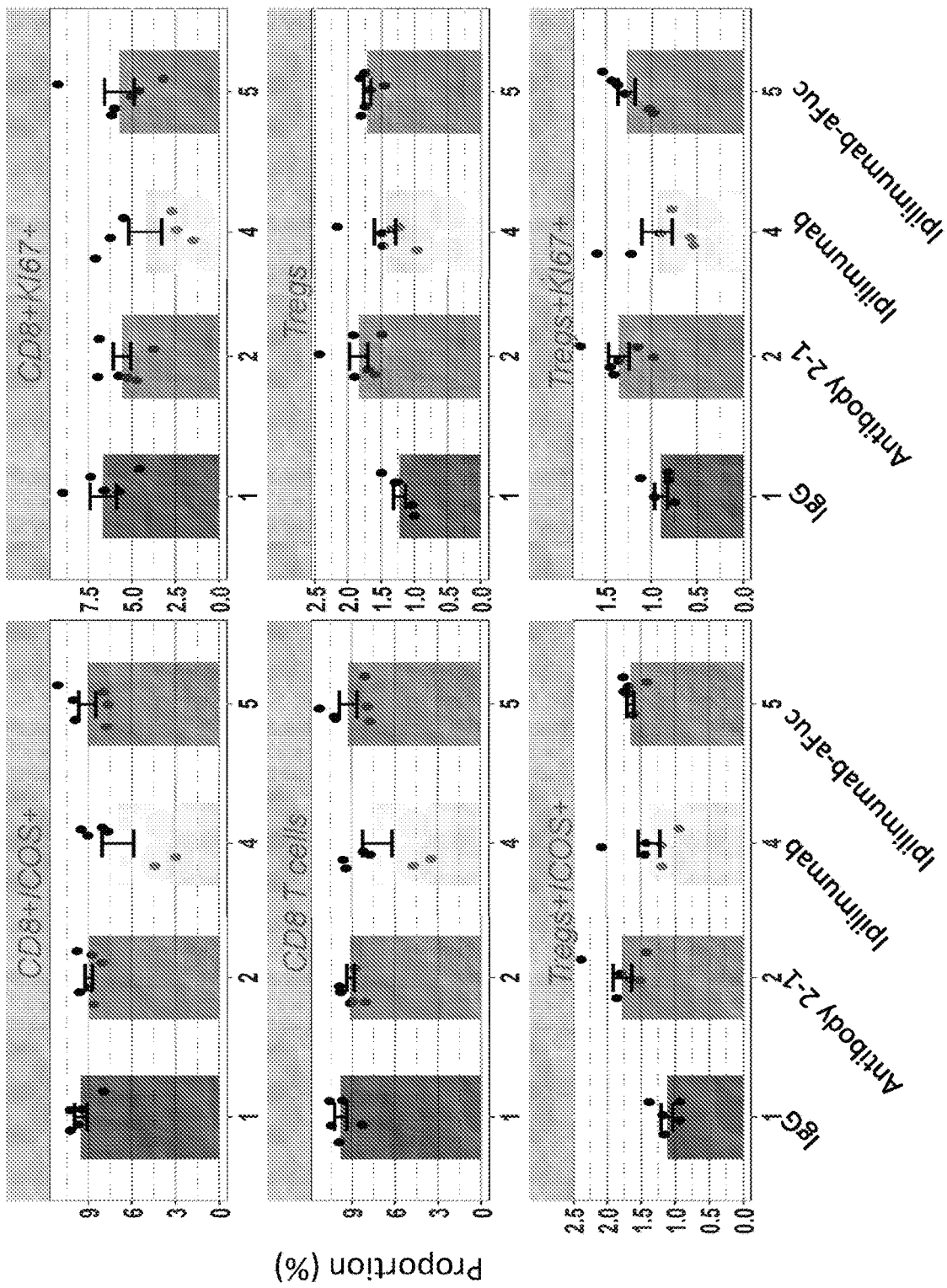
Figure 6C:
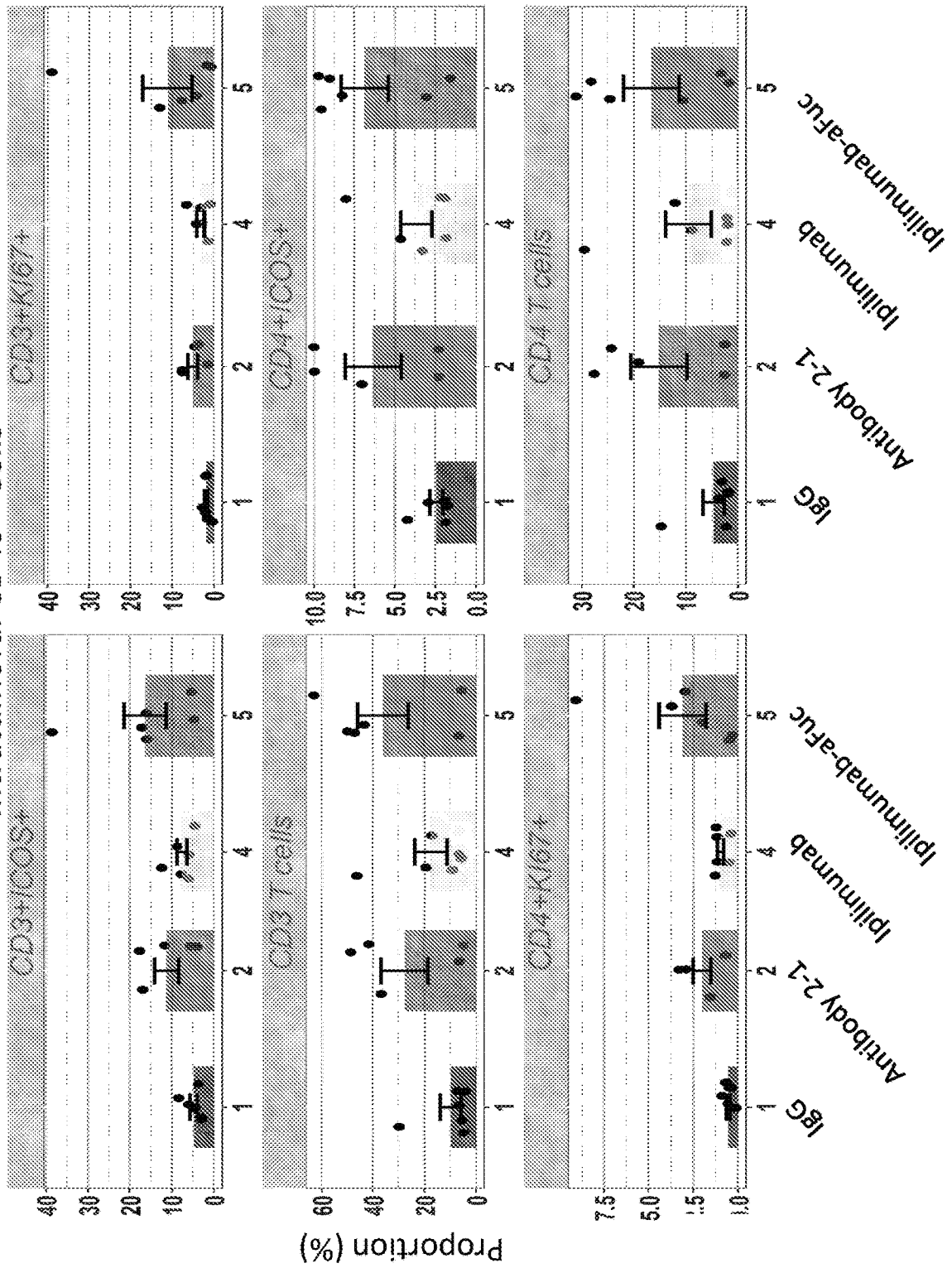
Figure 6D:
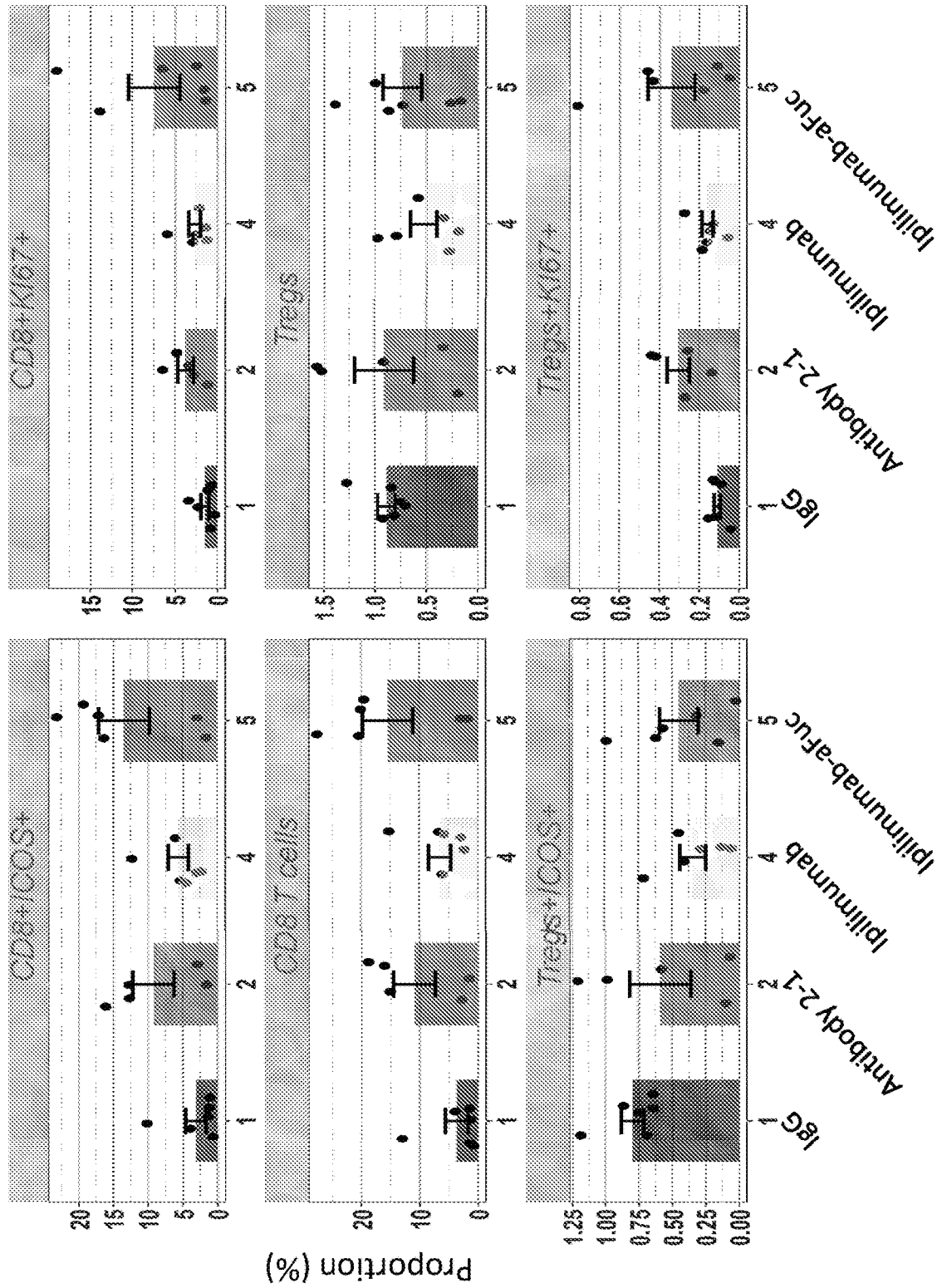

FIGS. 5A-5D show the curve of reporter activation and $EC_{50}$ values from the ADCC reporter bioassay for Antibody 1 variants (FIG. 5A), Antibody 2 variants (FIG. 5B), ipilimumab variants (FIG. 5C) and afucosylated variants of all 3 antibodies (FIG. 5D). The results showed that antibodies with a S239D mutation and an I332E mutation in the Fc region and afucosylated antibodies resulted in higher activation compared to respective version with a wild-type Fc region for each antibody.

Example 4: In Vivo Immunophenotyping of Immune Cells in Tumor-Bearing Mouse Model Expressing Human CTLA4 after Administration of Anti-CTLA4 Antibodies The immunophenotypes of immune cells were determined in MC38 tumor-bearing genetically engineered mouse model with a human CTLA4 knock-in that had been administered various anti-CTLA4 antibodies.

Methods

MC38 cells ($1\times10^6$) were injected subcutaneously into a mouse model with a knock-in with human CTLA4. On day 0, the mice were randomized based on tumor volume measurements and injected intraperitoneally with a single injection of 200 μg of a test antibody (Antibody 2-1, ipilimumab, an afucosylated form of ipilimumab (ipilimumab-aFuc), or an IgG control. Immunophenotyping was performed on CD45+ splenic cells and CD45+ intratumoral cells five days after injection. CD45+ cells were assessed for expression of markers including CD3+/ICOS+, CD3+ T cells, CD4+/Ki67+, CD3+/Ki67+, CD4+/ICOS+, CD4+ T cells, CD8+/ICOS+, CD8+ T cells, Tregs+/ICOS+, CD8+/Ki67+, Tregs, Tregs+/Ki67+, with relative proportions of CD45+ cells expressing those markers assessed.

Results

Results from immunophenotyping from MC38 tumor-bearing human CTLA4 knock-in mice are depicted in FIGS. 6A-6D, where relative proportion of CD45+ splenic (FIGS. 6A and 6B) or CD45+ intratumoral (FIGS. 6C and 6D) are provided for markers for CD3+/ICOS+, CD3+ T cells, CD4+/Ki67+, CD3+/Ki67+, CD4+/ICOS+, CD4+ T cells, CD8+/ICOS+, CD8+T cells, Tregs+/ICOS+, CD8+/Ki67+, Tregs, Tregs+/Ki67+. Statistics are provided in Table 5 (splenic cells) and Table 6 (intratumoral cells): Group 1: IgG, Group 2: Antibody 2-1; Group 4: Ipilimumab; Group 5: Ipilimumab-aFuc.

TABLE 5

|  | Bartlett | ANOVA/ Kruskal | 1 VS 2 | 1 VS 4 | 1 VS 5 | 2 VS 4 | 2 VS 5 | 4 VS 5 |
| --- | --- | --- | --- | --- | --- | --- | --- | --- |
| CD3+ICOS+ | 0.11 | 0.10 | 0.48 | 0.16 | 0.82 | 0.10 | 0.65 | 0.14 |
| CD3+KI67+ | 0.25 | 0.18 | 0.70 | 0.23 | 0.94 | 0.13 | 0.78 | 0.22 |
| CD3Tcells | 0.09 | 0.16 | 0.83 | 0.14 | 0.76 | 0.13 | 0.66 | 0.19 |
| CD4+ICOS+ | 0.14 | 0.19 | 0.18 | 0.41 | 0.41 | 0.14 | 0.48 | 0.24 |
| CD4+KI67+ | 0.13 | 0.00 | 0.01 | 0.88 | 0.05 | 0.05 | 0.31 | 0.15 |
| CD4Tcells | 0.10 | 0.25 | 0.25 | 0.38 | 0.62 | 0.16 | 0.45 | 0.28 |
| CD8+ICOS+ | 0.01 | 0.22 | 0.33 | 0.05 | 0.54 | 0.18 | 1.00 | 0.24 |
| CD8+KI67+ | 0.50 | 0.29 | 0.27 | 0.08 | 0.44 | 0.26 | 0.87 | 0.27 |
| CD8Tcells | 0.01 | 0.16 | 0.18 | 0.02 | 0.54 | 0.18 | 0.94 | 0.24 |
| Tregs | 0.02 | 0.00 | 0.01 | 0.54 | 0.01 | 0.06 | 0.59 | 0.13 |
| Tregs+ICOS+ | 0.03 | 0.00 | 0.00 | 0.08 | 0.00 | 0.06 | 0.59 | 0.13 |
| Tregs+KI67+ | 0.04 | 0.01 | 0.01 | 0.93 | 0.02 | 0.09 | 0.82 | 0.13 |

TABLE 6

|  | Bartlett | ANOVA/ Kruskal | 1 VS 2 | 1 VS 4 | 1 VS 5 | 2 VS 4 | 2 VS 5 | 4 VS 5 |
| --- | --- | --- | --- | --- | --- | --- | --- | --- |
| CD3+ICOS+ | 0.00 | 0.03 | 0.08 | 0.09 | 0.03 | 0.66 | 0.79 | 0.24 |
| CD3+KI67+ | 0.00 | 0.10 | 0.08 | 0.31 | 0.24 | 0.18 | 0.66 | 0.31 |
| CD3Tcells | 0.26 | 0.08 | 0.13 | 0.32 | 0.04 | 0.38 | 0.55 | 0.15 |
| CD4+ICOS+ | 0.02 | 0.05 | 0.05 | 0.18 | 0.09 | 0.18 | 0.93 | 0.18 |
| CD4+KI67+ | 0.00 | 0.02 | 0.01 | 0.18 | 0.18 | 0.05 | 0.79 | 0.31 |
| CD4Tcells | 0.17 | 0.19 | 0.12 | 0.35 | 0.08 | 0.43 | 0.86 | 0.33 |
| CD8+ICOS+ | 0.14 | 0.03 | 0.11 | 0.26 | 0.04 | 0.31 | 0.39 | 0.09 |
| CD8+KI67+ | 0.00 | 0.09 | 0.05 | 0.13 | 0.04 | 0.43 | 0.79 | 0.39 |
| CD8Tcells | 0.24 | 0.05 | 0.12 | 0.31 | 0.04 | 0.32 | 0.44 | 0.10 |
| Tregs | 0.03 | 0.11 | 0.93 | 0.09 | 0.82 | 0.43 | 0.54 | 0.59 |
| Tregs+ICOS+ | 0.03 | 0.02 | 0.54 | 0.02 | 0.04 | 0.54 | 0.79 | 0.70 |
| Tregs+KI67+ | 0.00 | 0.06 | 0.01 | 0.09 | 0.18 | 0.13 | 1.00 | 0.48 |

Example 5: In Vivo Tumor Growth Inhibition of Anti-CTLA4 Antibodies in Tumor-Bearing Mouse Model Expressing Human CTLA4

The tumor growth inhibition activity of various anti-CTLA4 antibodies after administration in MC38 tumor-bearing genetically engineered mouse model with a human CTLA4 knock-in was assessed.

MC38 cells ($1 \times 10^6$) were injected subcutaneously into a mouse model containing a knock-in of the human CTLA4 extracellular domain coding region. Mice were injected intraperitoneally with a single injection of 20 µg, 7 µg, or 2 µg of a test antibody [Antibody 2-6, ipilimumab, an afucosylated form of ipilimumab (ipilimumab-aFuc), or an RSV antibody having S239D and I332E mutations in the Fc domain (RSV-m)]. Tumor volume was measured over time following a single injection of the test antibody.

Figure 7A:
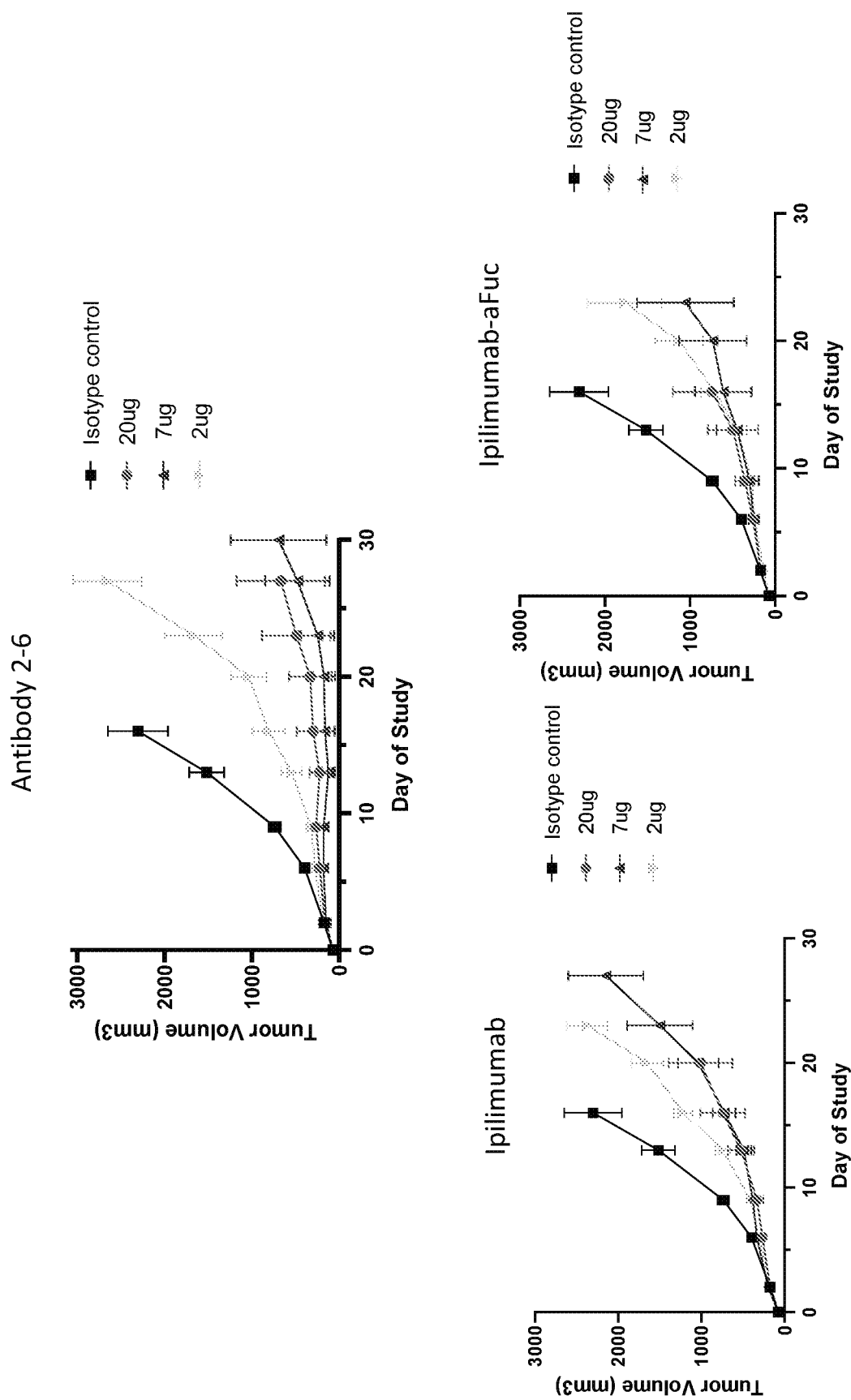
FIGS. 7A-7D depict graphs showing tumor volume over time following administration of a single injection of 20 μg, 7 μg, or 2 μg of the test antibody, as follows.
Figure 7B:
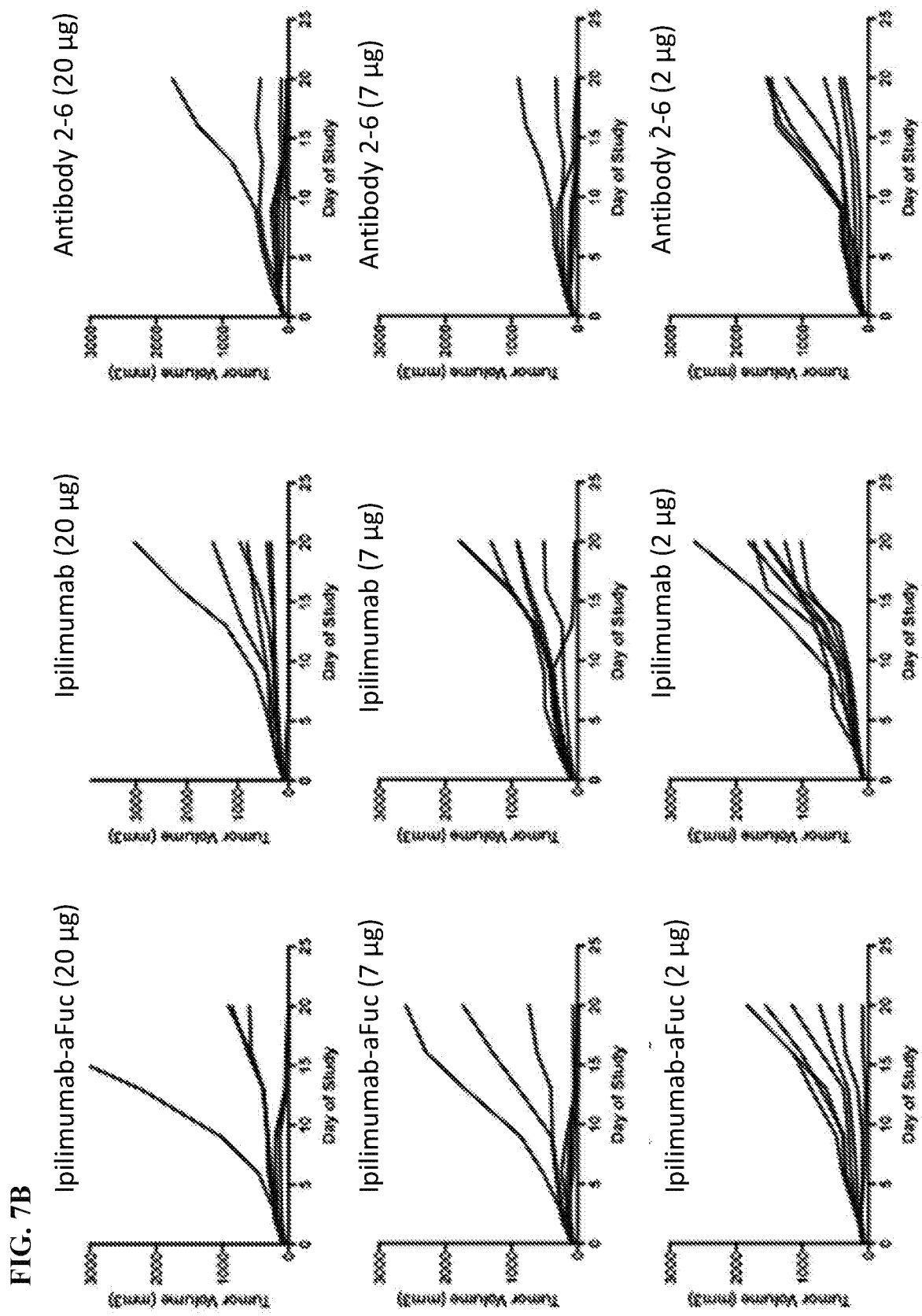
Figure 7C:
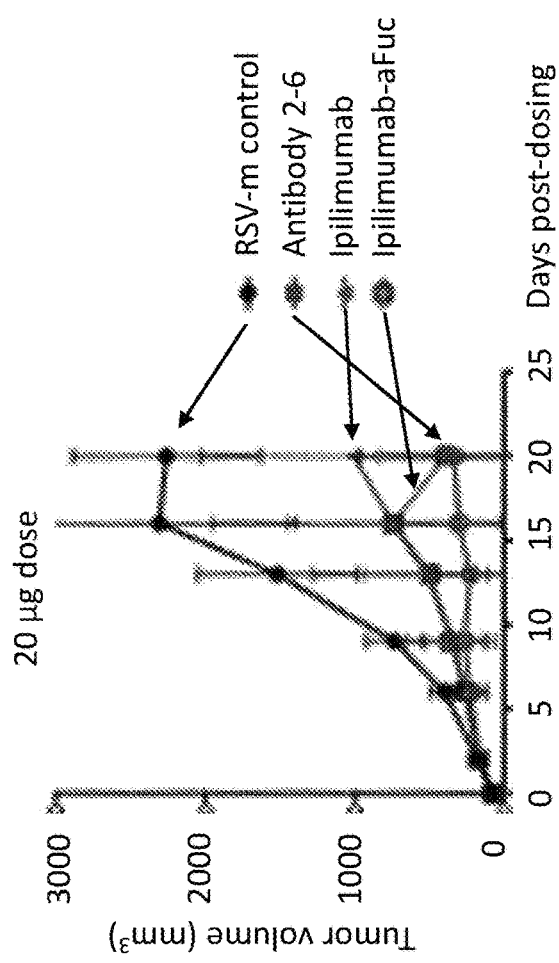
Figure 7D:
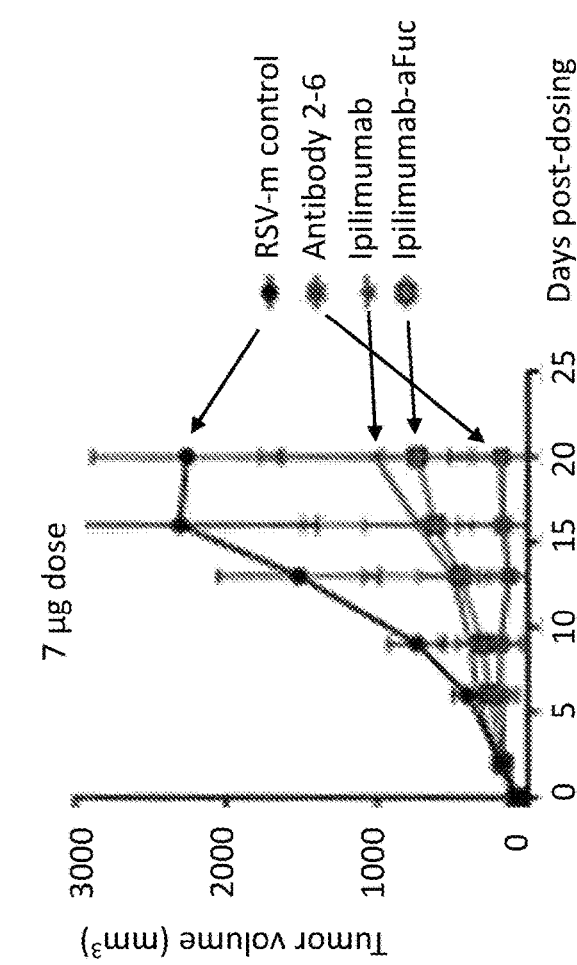
Figure 7E:
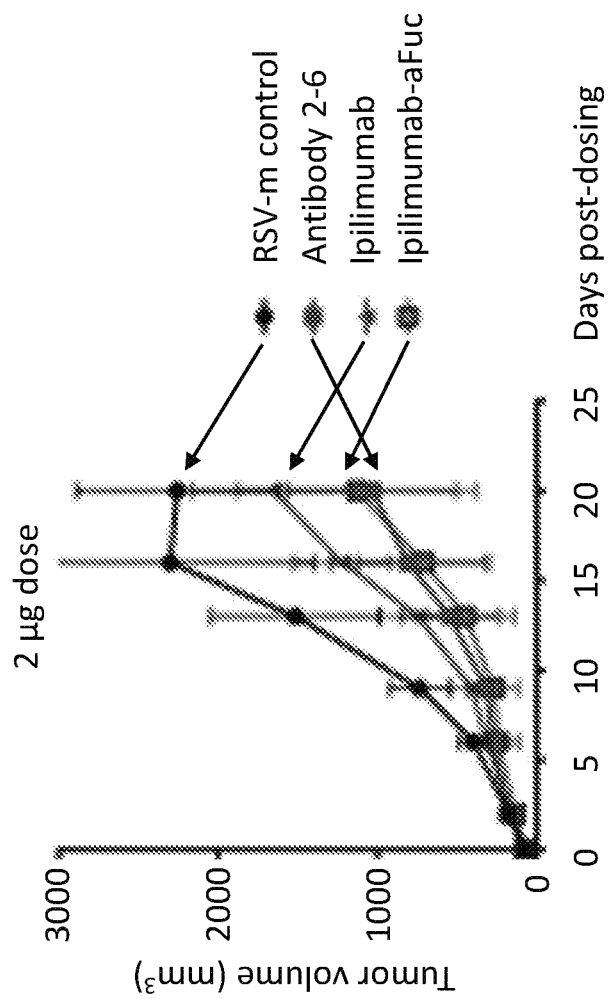

Results are depicted in FIGS. 7A-7D. FIG. 7A (group average) and FIG. 7B (individual mice) shows tumor volume ($mm^3$) over time for mice injected with Antibody 2-6, ipilimumab, or an afucosylated form of ipilimumab (ipilimumab-aFuc), and the results showed that all of the tested antibodies show tumor growth inhibition. FIG. 7C (20 µg), FIG. 7D (7 µg) and FIG. 7E (2 µg) show a comparison of tumor volume ($mm^3$) over time at each dose of the different antibodies. The results showed that Antibody 2-6 demonstrated best tumor growth inhibition at 2 µg and 7 µg doses, and similar tumor growth inhibition as the ipilimumab antibodies at the 20 µg dose.

Example 6: Efficacy and Pharmacodynamics of Anti-CTLA4 Antibodies in the MB49 Murine Bladder Tumor Model Methods Efficacy and pharmacodynamics (PD) of anti-CTLA4 antibodies were assessed using the MB49 murine bladder tumor model. Efficacy was assessed by administering each test antibody (RSV-m control antibody, ipilimumab and Antibody 2-6) and then assessing tumor volume and body weight. The anti-RSV control antibody contains S239D and I332E mutations (RSV-m control antibody). Peripheral immunophenotyping was also carried out on day 5, which assessed the percentage of CD4+Ki67+ cells and the percentage of CD4+ICOS+ cells in the peripheral blood on day 5 following administration. Mice were assessed for the efficacy studies, with dosing in mg/kg as shown in Table 7. As used herein, dosing in mg/kg is also referred to as "mpk." MB49 cells were inoculated subcutaneously into C57/BL6-huCTLA4 mice. Treatment started when the tumors reached approximately 350 $mm^3$. A One-way ANOVA with Dunnett's post-test was performed to determine the statistical significance of treatment vs control (RSV-m control). * $P<0.05$;  $P<0.01$; * $P<0.001$; **** $P<0.0001$.

TABLE 7

| Cohort | Antibody | Dosing (mg/kg) |
| --- | --- | --- |
| 1 | RSV-m control | 10 |
| 2 | Ipilimumab | 0.3 |
| 3 | Ipilimumab | 1 |
| 4 | Ipilimumab | 3 |
| 5 | Antibody 2-6 | 0.3 |
| 6 | Antibody 2-6 | 1 |
| 7 | Antibody 2-6 | 3 |
| 8 | Antibody 2-6 | 10 |

Pharmacodynamics is assessed by administering antibody to each of five cohorts of mice, with dosing (mg/kg) as shown in Table 8. Immunophenotyping among other readouts are performed in the tumor, liver, spleen, and blood. T cells are assessed by measuring Foxp3+CD25+ cells as a percentage of CD4+ cells, and CD8+ cells are measured as a percentage of CD45+ cells.

TABLE 8

| Cohort | Antibody | Dosing (mg/kg) |
| --- | --- | --- |
| 1 | RSV-M CONTROL | 10 |
| 2 | IPILIMUMAB | 3 |
| 3 | ANTIBODY 2-6 | 3 |

Results

Figure 8A:
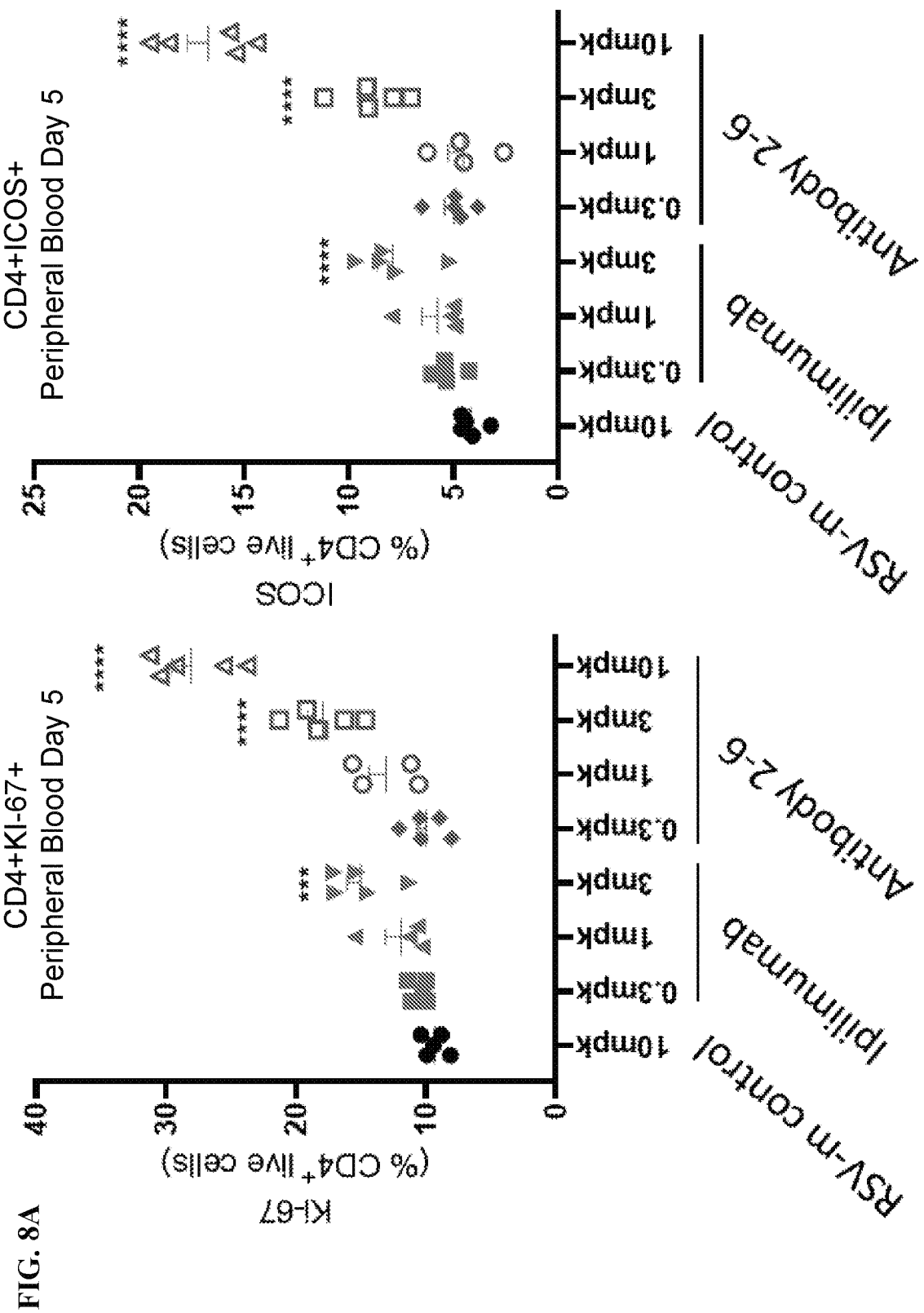
FIG. 8A depicts graphs with results from an efficacy study on the percentage of CD4+Ki67+ cells (left) and CD4+ICOS+ cells (right) in the peripheral blood on day 5 following administration, which represents the level of T-cell activation.

FIG. 8A shows results from efficacy studies on the percentage of CD4+Ki67+ cells (left) and CD4+ICOS+ cells (right) in the peripheral blood on day 5 following administration, which represents the level of T-cell activation.

Figure 8B:
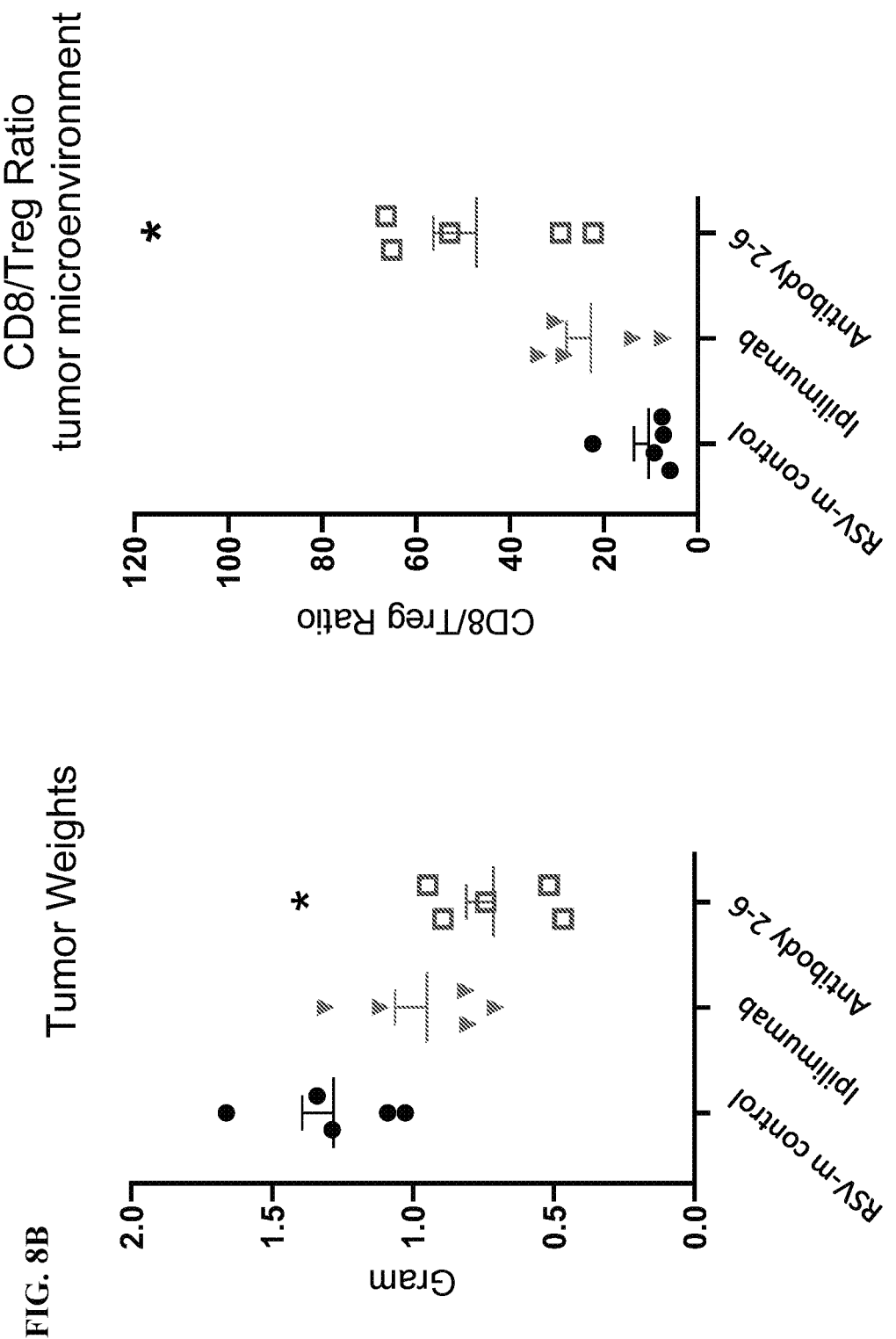
FIG. 8B depicts graphs showing tumor weight (left) and CD8/Treg ratios (right) as assessed on day 7 in mice treated with 10 mg/kg (RSV-m control) or 3 mg/kg (ipilimumab or Antibody 2-6).

As shown in FIG. 8B, tumor weight and CD8/Treg ratios were assessed on day 7 in mice treated with 10 mg/kg (RSV-m control) or 3 mg/kg (ipilimumab or Antibody 2-6). Mice treated with Antibody 2-6 exhibited the lowest tumor weights and the higher CD8/Treg ratios in tumors at 3 mg/kg on day 7. No change in body weight, spleen weight, kidney weight, or liver weight was observed with any of the treatment groups (data not shown).

Figure 8C:
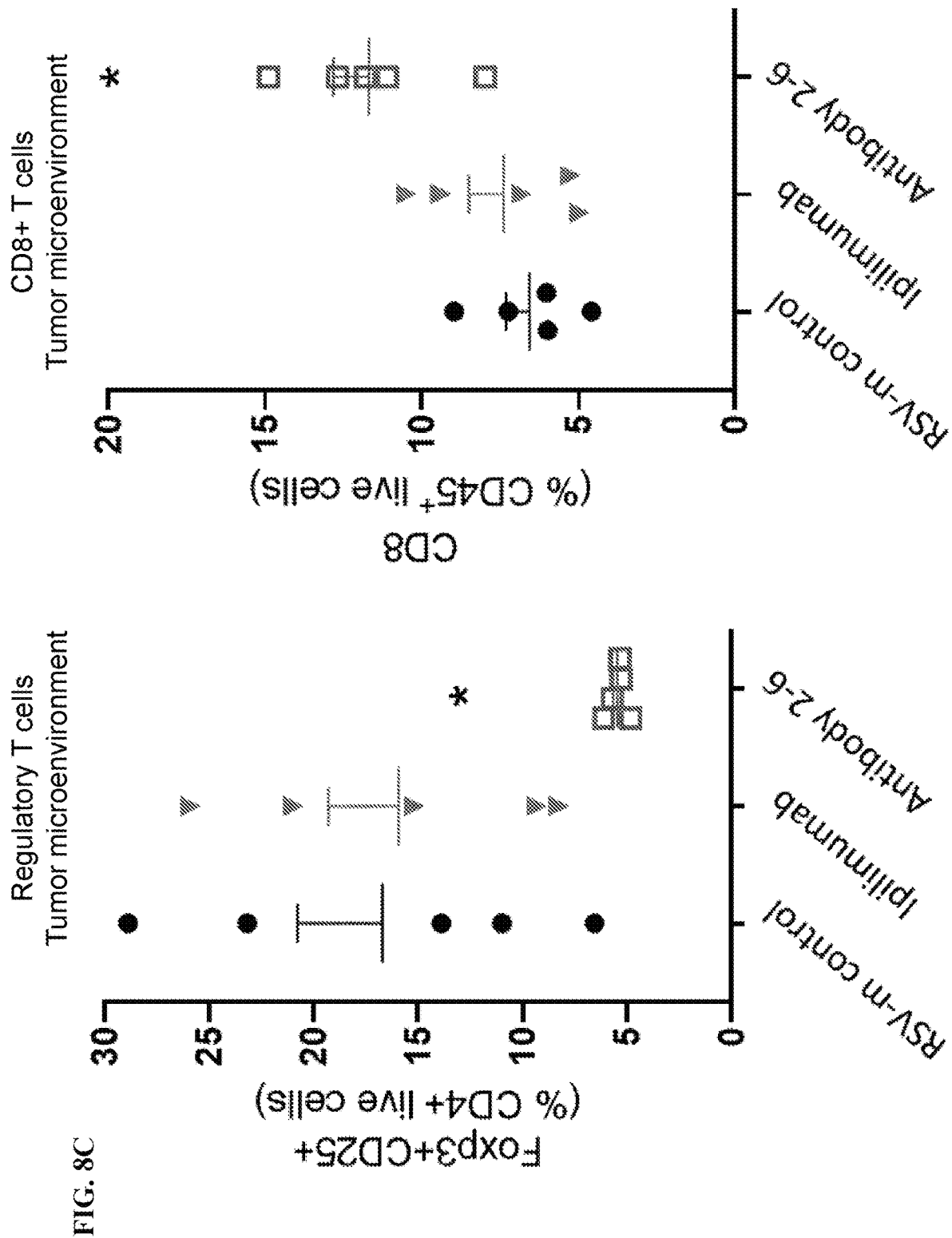
FIG. 8C depicts graphs showing regulatory T cells in the tumor microenvironment (left) and CD8+ T cells in the tumor microenvironment (right) following administration of RSV-m control, ipilimumab or Antibody 2-6, in mice.

As shown in FIG. 8C, regulatory T cell depletion and CD8+ T cell activation is observed with Antibody 2-6, but not with ipilimumab.

Figure 8D:
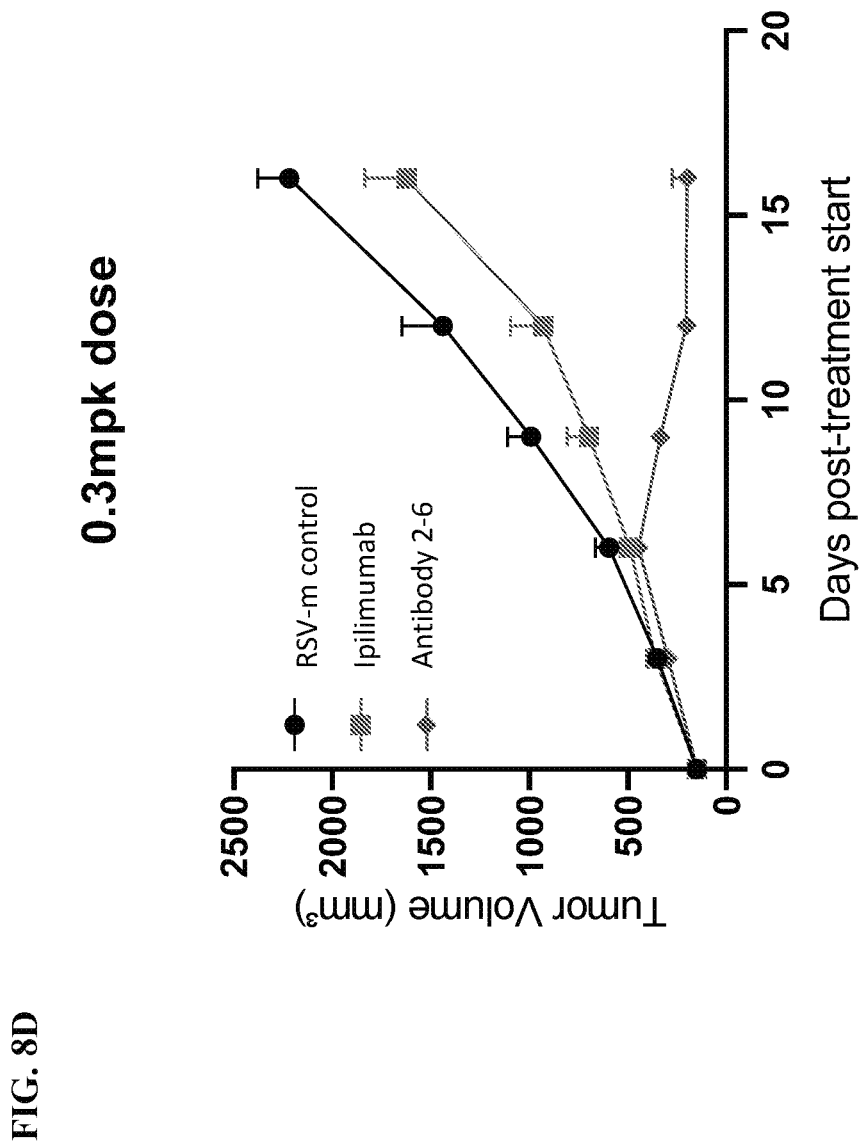
FIG. 8D depicts graphs showing tumor volume ($mm^3$) in mice over time following administration of 0.3 mg/kg for antibodies including RSV-m control, ipilimumab or Antibody 2-6.

As shown in FIG. 8D, strong anti-tumor activity was observed following treatment with anti-CTLA4 antibodies.

At a 0.3 mg/kg dose, Antibody 2-6 demonstrated superior anti-tumor activity as compared to ipilimumab.

Example 7: In Vivo Assessment of Anti-CTLA4 Antibodies in Cynomolgus Monkeys

Pharmacodynamic (PD) effects of the anti-CTLA4 antibody was assessed in cylomolgus monkeys. In two different sets of experiments, cynomolgus monkeys were administered ipilimumab, Antibody 2-6 or an isotype control, and pharmacodynamic (PD) effects were assessed by measuring the percentage (%) of Ki67+ cells in CD4+ cells.

Figure 9:
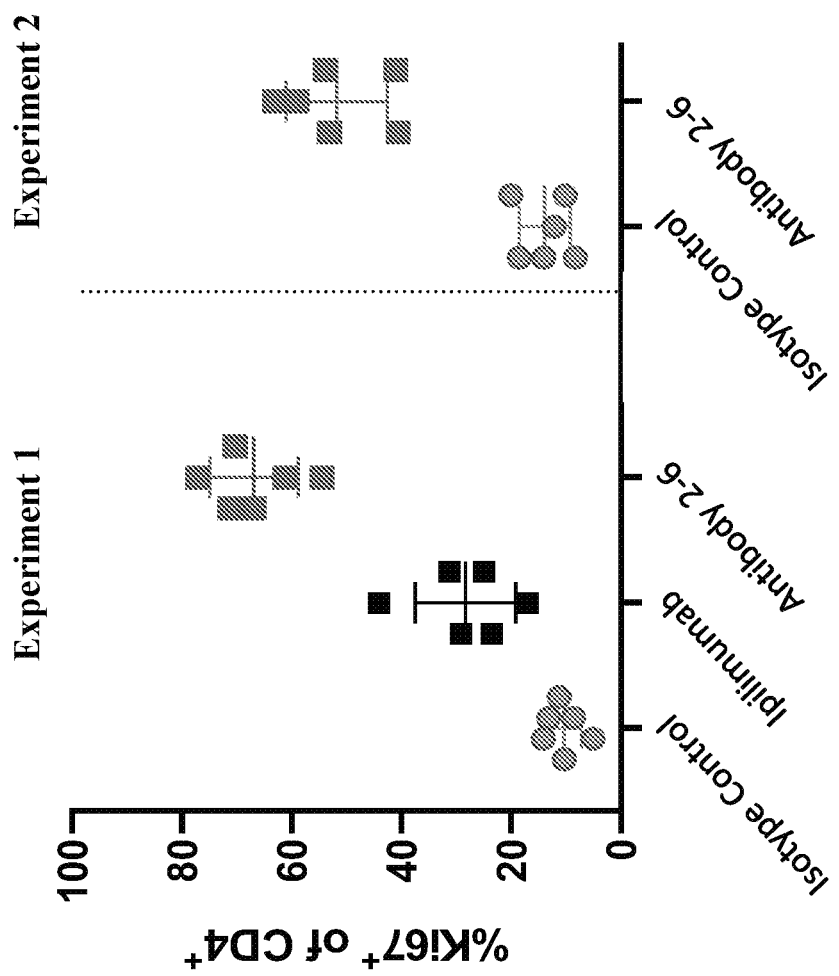
FIG. 9 depicts a graph showing the results from two sets of experiments (Experiment 1 and Experiment 2) that assessed pharmacodynamics effects in cynomolgus monkeys by evaluating the percentage of Ki67+ cells of total CD4+ cells following administration of Antibody 2-6, ipilimumab, or an isotype control.

Results from the first and second set of PD experiments are shown in FIG. 9. The Antibody 2-6 is more potent at inducing peripheral PD effects than ipilimumab as shown by an elevated percentage of Ki67+ cells in CD4+ cells as compared to ipilimumab Pharmacokinetics were also assessed using cynomolgus monkeys following a 10 mg/kg intravenous dose of a test antibody (RSV-m control, ipilimumab or Antibody 2-6). Levels of each antibody in plasma was measured, and half-life (days), Cmax (μg/mL), and area under the curve (AUC) (Day* μg/mL) were determined in two studies. The half-life (days), Cmax (μg/mL), and area under the curve (AUC) (Day* μg/mL) results from the pharmacokinetic studies for each tested antibody were calculated. Ipilimumab had the longest half-life and greatest AUC. Antibody 2-6 had approximately the same Cmax as ipilimumab.

The invention claimed is:

1. An anti-CTLA4 antibody comprising a light chain variable (VL) domain and a heavy chain variable (VH) domain, wherein:

the VL domain comprises (i) a CDR-L1 comprising the amino acid sequence of SEQ ID NO: 19, (ii) a CDR-L2 comprising the amino acid sequence of SEQ ID NO: 20, and (iii) a CDR-L3 comprising the amino acid sequence of SEQ ID NO: 21; and the VH domain comprises (1) a CDR-H1 comprising the amino acid sequence of SEQ ID NO: 22, (ii) a CDR-H2 comprising the amino acid sequence of SEQ ID NO: 23, and (iii) a CDR-H3 comprising the amino acid sequence of SEQ ID NO: 24; and wherein the antibody comprises a heavy chain constant region (CH) comprising substitutions S239D and I332E, wherein the amino acid residues are numbered according to EU index as in Kabat.

2. The anti-CTLA4 antibody of claim 1, wherein the VL domain comprises the amino acid sequence of SEQ ID NO: 30, and the VH domain comprises the amino acid sequence of SEQ ID NO: 31.

3. The anti-CTLA4 antibody of claim 1, wherein the antibody comprises a CH sequence of SEQ ID NO: 38.

4. The anti-CTLA4 antibody claim 1, wherein the antibody comprises a CL sequence of SEQ ID NO: 39.

5. The anti-CTLA4 antibody of claim 1, wherein the light chain comprises the amino acid sequence of SEQ ID NO: 32, and the heavy chain comprises the amino acid sequence of SEQ ID NO: 34.

6. The anti-CTLA4 antibody of claim 1, wherein the antibody is afucosylated or fucose-deficient.

7. A bispecific antibody comprising:
1) a light chain and a heavy chain of a first pair that specifically binds to CTLA4;
2) a light chain and a heavy chain of a second pair that specifically binds to an antigen; wherein the light chain of the first pair comprises a VL domain, and the heavy chain of the first pair comprises a VH domain and wherein:
the VL domain comprises (1) a CDR-L1 comprising the amino acid sequence of SEQ ID NO: 19, (ii) a CDR-L2 comprising the amino acid sequence of SEQ ID NO: 20, and (iii) a CDR-L3 comprising the amino acid sequence of SEQ ID NO: 21; and the VH domain comprises (i) a CDR-H1 comprising the amino acid sequence of SEQ ID NO: 22, (ii) a CDR-H2 comprising the amino acid sequence of SEQ ID NO: 23, and (iii) a CDR-H3 comprising the amino acid sequence of SEQ ID NO: 24 wherein the heavy chain of the first pair comprises a heavy chain constant region (CH) comprising substitutions S239D and I332E, wherein the amino acid residues are numbered according to EU index as in Kabat.

8. The bispecific antibody of claim 7, wherein:
the VL domain comprises the amino acid sequence of SEQ ID NO: 30, and the VH domain comprises the amino acid sequence of SEQ ID NO: 31.

9. The bispecific antibody of claim 7, wherein the VL domain comprises the amino acid sequence of SEQ ID NO: 25, and the VH domain comprises the amino acid sequence of SEQ ID NO: 26.

10. The bispecific antibody of claim 7, wherein the bispecific antibody comprises a CH sequence of SEQ ID NO: 38.

11. The bispecific antibody of claim 7, wherein the bispecific antibody comprises a CL sequence of SEQ ID NO: 39.

12. The bispecific antibody of claim 7, wherein:
the light chain of the first pair comprises the amino acid sequence of SEQ ID NO: 32, and the heavy chain of the first pair comprises the amino acid sequence of SEQ ID NO: 34.

13. A nucleic acid encoding the anti-CTLA4 antibody of claim 1.

14. A host cell comprising the anti-CTLA4 antibody of the nucleic acid of claim 13.

15. The host cell of claim 14, wherein the host cell has an alpha 1,6-fucosyltransferase (Fut8) knockout.

16. A method of treating or preventing a neoplastic disease in a subject, the method comprising administering to a subject an effective amount of the anti-CTLA4 antibody or antigen-binding fragment thereof of claim 1.

* * * * *

SEQUENCE LISTING

```
<160> NUMBER OF SEQ ID NOS: 39

<210> SEQ ID NO 1
<211> LENGTH: 11
<212> TYPE: PRT
<213> ORGANISM: Artificial Sequence
<220> FEATURE:
<223> OTHER INFORMATION: CDR-L1 Antibody 1

<400> SEQUENCE: 1

Gln Ser Leu Leu Asn Ser Asp Gly Asn Thr Tyr
1               5                   10

<210> SEQ ID NO 2
<211> LENGTH: 3
<212> TYPE: PRT
<213> ORGANISM: Artificial Sequence
<220> FEATURE:
<223> OTHER INFORMATION: CDR-L2 Antibody 1

<400> SEQUENCE: 2

Leu Val Ser
1

<210> SEQ ID NO 3
<211> LENGTH: 7
<212> TYPE: PRT
<213> ORGANISM: Artificial Sequence
<220> FEATURE:
<223> OTHER INFORMATION: CDR-L3 Antibody 1

<400> SEQUENCE: 3

Val Gln Gly Thr His Asp Pro
1               5

<210> SEQ ID NO 4
<211> LENGTH: 8
<212> TYPE: PRT
<213> ORGANISM: Artificial Sequence
<220> FEATURE:
<223> OTHER INFORMATION: CDR-H1 Antibody 1

<400> SEQUENCE: 4

Tyr His Thr Ile Thr Ser Gly Tyr
1               5

<210> SEQ ID NO 5
<211> LENGTH: 7
<212> TYPE: PRT
<213> ORGANISM: Artificial Sequence
<220> FEATURE:
<223> OTHER INFORMATION: CDR-H2 Antibody 1
```

```
<400> SEQUENCE: 5

Ile Ser Tyr Ser Gly Asn Thr
1               5

<210> SEQ ID NO 6
<211> LENGTH: 13
<212> TYPE: PRT
<213> ORGANISM: Artificial Sequence
<220> FEATURE:
<223> OTHER INFORMATION: CDR-H3 Antibody 1

<400> SEQUENCE: 6

Ala Ser Met Met Val Pro His Tyr Tyr Val Met Asp Ala
1               5                   10

<210> SEQ ID NO 7
<211> LENGTH: 16
<212> TYPE: PRT
<213> ORGANISM: Artificial Sequence
<220> FEATURE:
<223> OTHER INFORMATION: CDR-L1 (Kabat) Antibody 1

<400> SEQUENCE: 7

Arg Ser Ser Gln Ser Leu Leu Asn Ser Asp Gly Asn Thr Tyr Leu Tyr
1               5                   10                  15

<210> SEQ ID NO 8
<211> LENGTH: 7
<212> TYPE: PRT
<213> ORGANISM: Artificial Sequence
<220> FEATURE:
<223> OTHER INFORMATION: CDR-L2 (Kabat) Antibody 1

<400> SEQUENCE: 8

Leu Val Ser Lys Leu Gly Ser
1               5

<210> SEQ ID NO 9
<211> LENGTH: 9
<212> TYPE: PRT
<213> ORGANISM: Artificial Sequence
<220> FEATURE:
<223> OTHER INFORMATION: CDR-L3 (Kabat) Antibody 1

<400> SEQUENCE: 9

Val Gln Gly Thr His Asp Pro Trp Thr
1               5

<210> SEQ ID NO 10
<211> LENGTH: 6
<212> TYPE: PRT
<213> ORGANISM: Artificial Sequence
<220> FEATURE:
<223> OTHER INFORMATION: CDR-H1 (Kabat) Antibody 1

<400> SEQUENCE: 10

Ser Gly Tyr Asp Trp Thr
1               5

<210> SEQ ID NO 11
<211> LENGTH: 16
<212> TYPE: PRT
<213> ORGANISM: Artificial Sequence
<220> FEATURE:
<223> OTHER INFORMATION: CDR-H2 (Kabat) Antibody 1
```

-continued

```
<400> SEQUENCE: 11

Tyr Ile Ser Tyr Ser Gly Asn Thr Asn Tyr Asn Pro Ser Leu Lys Ser
1               5                   10                  15

<210> SEQ ID NO 12
<211> LENGTH: 11
<212> TYPE: PRT
<213> ORGANISM: Artificial Sequence
<220> FEATURE:
<223> OTHER INFORMATION: CDR-H3(Kabat) Antibody 1

<400> SEQUENCE: 12

Met Met Val Pro His Tyr Tyr Val Met Asp Ala
1               5                   10

<210> SEQ ID NO 13
<211> LENGTH: 6
<212> TYPE: PRT
<213> ORGANISM: Artificial Sequence
<220> FEATURE:
<223> OTHER INFORMATION: CDR-L1 Antibody 2

<400> SEQUENCE: 13

Ser Ala Leu Ser Tyr Met
1               5

<210> SEQ ID NO 14
<211> LENGTH: 3
<212> TYPE: PRT
<213> ORGANISM: Artificial Sequence
<220> FEATURE:
<223> OTHER INFORMATION: CDR-L2 Antibody 2

<400> SEQUENCE: 14

Gly Thr Ser
1

<210> SEQ ID NO 15
<211> LENGTH: 7
<212> TYPE: PRT
<213> ORGANISM: Artificial Sequence
<220> FEATURE:
<223> OTHER INFORMATION: CDR-L3 Antibody 2

<400> SEQUENCE: 15

His His Trp Ser Asn Thr Gln
1               5

<210> SEQ ID NO 16
<211> LENGTH: 8
<212> TYPE: PRT
<213> ORGANISM: Artificial Sequence
<220> FEATURE:
<223> OTHER INFORMATION: CDR-H1 Antibody 2

<400> SEQUENCE: 16

Gly Tyr Thr Phe Thr Asn Tyr Phe
1               5

<210> SEQ ID NO 17
<211> LENGTH: 9
<212> TYPE: PRT
<213> ORGANISM: Artificial Sequence
<220> FEATURE:
<223> OTHER INFORMATION: CDR-H2 Antibody 2

<400> SEQUENCE: 17
```

Val Asp Pro Glu Gln Gly Arg Ala Asp
1               5

<210> SEQ ID NO 18
<211> LENGTH: 11
<212> TYPE: PRT
<213> ORGANISM: Artificial Sequence
<220> FEATURE:
<223> OTHER INFORMATION: CDR-H3 Antibody 2

<400> SEQUENCE: 18

Arg Arg Ala Met Asp Asn Tyr Gly Phe Ala Tyr
1               5                   10

<210> SEQ ID NO 19
<211> LENGTH: 10
<212> TYPE: PRT
<213> ORGANISM: Artificial Sequence
<220> FEATURE:
<223> OTHER INFORMATION: CDR-L1 (Kabat) Antibody 2

<400> SEQUENCE: 19

Ser Ala Asn Ser Ala Leu Ser Tyr Met Tyr
1               5                   10

<210> SEQ ID NO 20
<211> LENGTH: 7
<212> TYPE: PRT
<213> ORGANISM: Artificial Sequence
<220> FEATURE:
<223> OTHER INFORMATION: CDR-L2 (Kabat) Antibody 2

<400> SEQUENCE: 20

Gly Thr Ser Asn Leu Ala Ser
1               5

<210> SEQ ID NO 21
<211> LENGTH: 9
<212> TYPE: PRT
<213> ORGANISM: Artificial Sequence
<220> FEATURE:
<223> OTHER INFORMATION: CDR-L3 (Kabat) Antibody 2

<400> SEQUENCE: 21

His His Trp Ser Asn Thr Gln Trp Thr
1               5

<210> SEQ ID NO 22
<211> LENGTH: 5
<212> TYPE: PRT
<213> ORGANISM: Artificial Sequence
<220> FEATURE:
<223> OTHER INFORMATION: CDR-H1 (Kabat) Antibody 2

<400> SEQUENCE: 22

Asn Tyr Phe Met Asn
1               5

<210> SEQ ID NO 23
<211> LENGTH: 17
<212> TYPE: PRT
<213> ORGANISM: Artificial Sequence
<220> FEATURE:
<223> OTHER INFORMATION: CDR-H2 (Kabat) Antibody 2

<400> SEQUENCE: 23

```
Arg Val Asp Pro Glu Gln Gly Arg Ala Asp Tyr Ala Glu Lys Phe Lys
1               5                   10                  15

Lys

<210> SEQ ID NO 24
<211> LENGTH: 10
<212> TYPE: PRT
<213> ORGANISM: Artificial Sequence
<220> FEATURE:
<223> OTHER INFORMATION: CDR-H3 (Kabat) Antibody 2

<400> SEQUENCE: 24

Arg Ala Met Asp Asn Tyr Gly Phe Ala Tyr
1               5                   10

<210> SEQ ID NO 25
<211> LENGTH: 113
<212> TYPE: PRT
<213> ORGANISM: Artificial Sequence
<220> FEATURE:
<223> OTHER INFORMATION: VL domain
      (Antibody 1)

<400> SEQUENCE: 25

Asp Ile Val Met Thr Gln Thr Pro Leu Ser Leu Ser Val Thr Pro Gly
1               5                   10                  15

Gln Pro Ala Ser Ile Ser Cys Arg Ser Ser Gln Ser Leu Leu Asn Ser
            20                  25                  30

Asp Gly Asn Thr Tyr Leu Tyr Trp Tyr Leu Gln Lys Pro Gly Gln Ser
        35                  40                  45

Pro Gln Leu Leu Ile Tyr Leu Val Ser Lys Leu Gly Ser Gly Val Pro
    50                  55                  60

Asn Arg Phe Ser Gly Ser Gly Ser Gly Thr Asp Phe Thr Leu Lys Ile
65                  70                  75                  80

Ser Arg Val Glu Ala Glu Asp Val Gly Val Tyr Tyr Cys Val Gln Gly
                85                  90                  95

Thr His Asp Pro Trp Thr Phe Gly Gly Gly Thr Lys Val Glu Ile Lys
            100                 105                 110

Arg

<210> SEQ ID NO 26
<211> LENGTH: 121
<212> TYPE: PRT
<213> ORGANISM: Artificial Sequence
<220> FEATURE:
<223> OTHER INFORMATION: VH domain
      (Antibody 1)

<400> SEQUENCE: 26

Gln Val Gln Leu Gln Glu Ser Gly Pro Gly Leu Val Lys Pro Ser Glu
1               5                   10                  15

Thr Leu Ser Leu Thr Cys Ser Val Thr Tyr His Thr Ile Thr Ser Gly
            20                  25                  30

Tyr Asp Trp Thr Trp Ile Arg Lys Pro Pro Gly Lys Gly Met Glu Trp
        35                  40                  45

Ile Gly Tyr Ile Ser Tyr Ser Gly Asn Thr Asn Tyr Asn Pro Ser Leu
    50                  55                  60

Lys Ser Arg Val Thr Ile Ser Arg Asp Thr Ser Lys Asn Gln Phe Phe
65                  70                  75                  80

Leu Lys Leu Ser Ser Val Thr Ala Ala Asp Thr Ala Val Tyr Tyr Cys
```

```
                    85                  90                  95
Ala Ser Met Met Val Pro His Tyr Tyr Val Met Asp Ala Trp Gly Gln
                100                 105                 110
Gly Thr Leu Val Thr Val Ser Ser Ala
        115                 120

<210> SEQ ID NO 27
<211> LENGTH: 219
<212> TYPE: PRT
<213> ORGANISM: Artificial Sequence
<220> FEATURE:
<223> OTHER INFORMATION: Light chain (Antibody 1)

<400> SEQUENCE: 27

Asp Ile Val Met Thr Gln Thr Pro Leu Ser Leu Ser Val Thr Pro Gly
1               5                   10                  15

Gln Pro Ala Ser Ile Ser Cys Arg Ser Gln Ser Leu Leu Asn Ser
            20                  25                  30

Asp Gly Asn Thr Tyr Leu Tyr Trp Tyr Leu Gln Lys Pro Gly Gln Ser
        35                  40                  45

Pro Gln Leu Leu Ile Tyr Leu Val Ser Lys Leu Gly Ser Gly Val Pro
    50                  55                  60

Asn Arg Phe Ser Gly Ser Gly Ser Gly Thr Asp Phe Thr Leu Lys Ile
65                  70                  75                  80

Ser Arg Val Glu Ala Glu Asp Val Gly Val Tyr Tyr Cys Val Gln Gly
                85                  90                  95

Thr His Asp Pro Trp Thr Phe Gly Gly Gly Thr Lys Val Glu Ile Lys
                100                 105                 110

Arg Thr Val Ala Ala Pro Ser Val Phe Ile Phe Pro Pro Ser Asp Glu
            115                 120                 125

Gln Leu Lys Ser Gly Thr Ala Ser Val Val Cys Leu Leu Asn Asn Phe
    130                 135                 140

Tyr Pro Arg Glu Ala Lys Val Gln Trp Lys Val Asp Asn Ala Leu Gln
145                 150                 155                 160

Ser Gly Asn Ser Gln Glu Ser Val Thr Glu Gln Asp Ser Lys Asp Ser
                165                 170                 175

Thr Tyr Ser Leu Ser Ser Thr Leu Thr Leu Ser Lys Ala Asp Tyr Glu
            180                 185                 190

Lys His Lys Val Tyr Ala Cys Glu Val Thr His Gln Gly Leu Ser Ser
        195                 200                 205

Pro Val Thr Lys Ser Phe Asn Arg Gly Glu Cys
    210                 215

<210> SEQ ID NO 28
<211> LENGTH: 450
<212> TYPE: PRT
<213> ORGANISM: Artificial Sequence
<220> FEATURE:
<223> OTHER INFORMATION: Heavy chain
      (Antibody 1)

<400> SEQUENCE: 28

Gln Val Gln Leu Gln Glu Ser Gly Pro Gly Leu Val Lys Pro Ser Glu
1               5                   10                  15

Thr Leu Ser Leu Thr Cys Ser Val Thr Tyr His Thr Ile Thr Ser Gly
            20                  25                  30

Tyr Asp Trp Thr Trp Ile Arg Lys Pro Pro Gly Lys Gly Met Glu Trp
        35                  40                  45
```

```
Ile Gly Tyr Ile Ser Tyr Ser Gly Asn Thr Asn Tyr Asn Pro Ser Leu
    50                  55                  60
Lys Ser Arg Val Thr Ile Ser Arg Asp Thr Ser Lys Asn Gln Phe Phe
65                  70                  75                  80
Leu Lys Leu Ser Ser Val Thr Ala Ala Asp Thr Ala Val Tyr Tyr Cys
                85                  90                  95
Ala Ser Met Met Val Pro His Tyr Tyr Val Met Asp Ala Trp Gly Gln
            100                 105                 110
Gly Thr Leu Val Thr Val Ser Ser Ala Ser Thr Lys Gly Pro Ser Val
        115                 120                 125
Phe Pro Leu Ala Pro Ser Ser Lys Ser Thr Ser Gly Gly Thr Ala Ala
130                 135                 140
Leu Gly Cys Leu Val Lys Asp Tyr Phe Pro Glu Pro Val Thr Val Ser
145                 150                 155                 160
Trp Asn Ser Gly Ala Leu Thr Ser Gly Val His Thr Phe Pro Ala Val
                165                 170                 175
Leu Gln Ser Ser Gly Leu Tyr Ser Leu Ser Ser Val Val Thr Val Pro
            180                 185                 190
Ser Ser Ser Leu Gly Thr Gln Thr Tyr Ile Cys Asn Val Asn His Lys
        195                 200                 205
Pro Ser Asn Thr Lys Val Asp Lys Lys Val Glu Pro Lys Ser Cys Asp
210                 215                 220
Lys Thr His Thr Cys Pro Pro Cys Pro Ala Pro Glu Leu Leu Gly Gly
225                 230                 235                 240
Pro Ser Val Phe Leu Phe Pro Pro Lys Pro Lys Asp Thr Leu Met Ile
                245                 250                 255
Ser Arg Thr Pro Glu Val Thr Cys Val Val Val Asp Val Ser His Glu
            260                 265                 270
Asp Pro Glu Val Lys Phe Asn Trp Tyr Val Asp Gly Val Glu Val His
        275                 280                 285
Asn Ala Lys Thr Lys Pro Arg Glu Glu Gln Tyr Asn Ser Thr Tyr Arg
290                 295                 300
Val Val Ser Val Leu Thr Val Leu His Gln Asp Trp Leu Asn Gly Lys
305                 310                 315                 320
Glu Tyr Lys Cys Lys Val Ser Asn Lys Ala Leu Pro Ala Pro Ile Glu
                325                 330                 335
Lys Thr Ile Ser Lys Ala Lys Gly Gln Pro Arg Glu Pro Gln Val Tyr
            340                 345                 350
Thr Leu Pro Pro Ser Arg Asp Glu Leu Thr Lys Asn Gln Val Ser Leu
        355                 360                 365
Thr Cys Leu Val Lys Gly Phe Tyr Pro Ser Asp Ile Ala Val Glu Trp
370                 375                 380
Glu Ser Asn Gly Gln Pro Glu Asn Asn Tyr Lys Thr Thr Pro Pro Val
385                 390                 395                 400
Leu Asp Ser Asp Gly Ser Phe Phe Leu Tyr Ser Lys Leu Thr Val Asp
                405                 410                 415
Lys Ser Arg Trp Gln Gln Gly Asn Val Phe Ser Cys Ser Val Met His
            420                 425                 430
Glu Ala Leu His Asn His Tyr Thr Gln Lys Ser Leu Ser Leu Ser Pro
        435                 440                 445
Gly Lys
    450
```

<210> SEQ ID NO 29
<211> LENGTH: 450
<212> TYPE: PRT
<213> ORGANISM: Artificial Sequence
<220> FEATURE:
<223> OTHER INFORMATION: Heavy chain
   (Antibody 1-S239D, I332E)

<400> SEQUENCE: 29

```
Gln Val Gln Leu Gln Glu Ser Gly Pro Gly Leu Val Lys Pro Ser Glu
1               5                   10                  15

Thr Leu Ser Leu Thr Cys Ser Val Thr Tyr His Thr Ile Thr Ser Gly
            20                  25                  30

Tyr Asp Trp Thr Trp Ile Arg Lys Pro Pro Gly Lys Gly Met Glu Trp
        35                  40                  45

Ile Gly Tyr Ile Ser Tyr Ser Gly Asn Thr Asn Tyr Asn Pro Ser Leu
    50                  55                  60

Lys Ser Arg Val Thr Ile Ser Arg Asp Thr Ser Lys Asn Gln Phe Phe
65                  70                  75                  80

Leu Lys Leu Ser Ser Val Thr Ala Ala Asp Thr Ala Val Tyr Tyr Cys
                85                  90                  95

Ala Ser Met Met Val Pro His Tyr Tyr Val Met Asp Ala Trp Gly Gln
            100                 105                 110

Gly Thr Leu Val Thr Val Ser Ser Ala Ser Thr Lys Gly Pro Ser Val
        115                 120                 125

Phe Pro Leu Ala Pro Ser Ser Lys Ser Thr Ser Gly Gly Thr Ala Ala
    130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Ser Val Val Thr Val Pro
            180                 185                 190

Ser Ser Ser Leu Gly Thr Gln Thr Tyr Ile Cys Asn Val Asn His Lys
        195                 200                 205

Pro Ser Asn Thr Lys Val Asp Lys Lys Val Glu Pro Lys Ser Cys Asp
    210                 215                 220

Lys Thr His Thr Cys Pro Pro Cys Pro Ala Pro Glu Leu Leu Gly Gly
225                 230                 235                 240

Pro Asp Val Phe Leu Phe Pro Pro Lys Pro Lys Asp Thr Leu Met Ile
                245                 250                 255

Ser Arg Thr Pro Glu Val Thr Cys Val Val Val Asp Val Ser His Glu
            260                 265                 270

Asp Pro Glu Val Lys Phe Asn Trp Tyr Val Asp Gly Val Glu Val His
        275                 280                 285

Asn Ala Lys Thr Lys Pro Arg Glu Glu Gln Tyr Asn Ser Thr Tyr Arg
    290                 295                 300

Val Val Ser Val Leu Thr Val Leu His Gln Asp Trp Leu Asn Gly Lys
305                 310                 315                 320

Glu Tyr Lys Cys Lys Val Ser Asn Lys Ala Leu Pro Ala Pro Glu Glu
                325                 330                 335

Lys Thr Ile Ser Lys Ala Lys Gly Gln Pro Arg Glu Pro Gln Val Tyr
            340                 345                 350

Thr Leu Pro Pro Ser Arg Asp Glu Leu Thr Lys Asn Gln Val Ser Leu
        355                 360                 365
```

```
Thr Cys Leu Val Lys Gly Phe Tyr Pro Ser Asp Ile Ala Val Glu Trp
        370                 375                 380

Glu Ser Asn Gly Gln Pro Glu Asn Asn Tyr Lys Thr Thr Pro Pro Val
385                 390                 395                 400

Leu Asp Ser Asp Gly Ser Phe Phe Leu Tyr Ser Lys Leu Thr Val Asp
                405                 410                 415

Lys Ser Arg Trp Gln Gln Gly Asn Val Phe Ser Cys Ser Val Met His
        420                 425                 430

Glu Ala Leu His Asn His Tyr Thr Gln Lys Ser Leu Ser Leu Ser Pro
            435                 440                 445

Gly Lys
    450

<210> SEQ ID NO 30
<211> LENGTH: 107
<212> TYPE: PRT
<213> ORGANISM: Artificial Sequence
<220> FEATURE:
<223> OTHER INFORMATION: VL domain
      (Antibody 2)

<400> SEQUENCE: 30

Glu Ile Val Leu Thr Gln Ser Pro Asp Phe Gln Ser Val Thr Pro Lys
1               5                   10                  15

Glu Lys Val Thr Ile Thr Cys Ser Ala Asn Ser Ala Leu Ser Tyr Met
            20                  25                  30

Tyr Trp Tyr Gln Gln Lys Pro Asp Gln Ser Pro Lys Leu Trp Val His
        35                  40                  45

Gly Thr Ser Asn Leu Ala Ser Gly Val Pro Ser Arg Phe Ser Gly Ser
    50                  55                  60

Gly Ser Gly Thr Asp Phe Thr Leu Thr Ile Asn Ser Leu Glu Ala Glu
65                  70                  75                  80

Asp Ala Ala Thr Tyr Tyr Cys His His Trp Ser Asn Thr Gln Trp Thr
                85                  90                  95

Phe Gly Gly Gly Thr Lys Val Glu Ile Lys Arg
            100                 105

<210> SEQ ID NO 31
<211> LENGTH: 120
<212> TYPE: PRT
<213> ORGANISM: Artificial Sequence
<220> FEATURE:
<223> OTHER INFORMATION: VH domain
      (Antibody 2)

<400> SEQUENCE: 31

Gln Val Gln Leu Val Gln Ser Gly Ala Glu Val Lys Lys Pro Gly Ser
1               5                   10                  15

Ser Val Lys Val Ser Cys Lys Ala Ser Gly Tyr Thr Phe Thr Asn Tyr
            20                  25                  30

Phe Met Asn Trp Val Arg Gln Ala Pro Gly Gln Gly Leu Glu Trp Met
        35                  40                  45

Gly Arg Val Asp Pro Glu Gln Gly Arg Ala Asp Tyr Ala Glu Lys Phe
    50                  55                  60

Lys Lys Arg Val Thr Ile Thr Ala Asp Lys Ser Thr Ser Thr Ala Tyr
65                  70                  75                  80

Met Glu Leu Ser Ser Leu Arg Ser Glu Asp Thr Ala Val Tyr Tyr Cys
                85                  90                  95
```

Ala Arg Arg Ala Met Asp Asn Tyr Gly Phe Ala Tyr Trp Gly Gln Gly
            100                 105                 110

Thr Leu Val Thr Val Ser Ser Ala
        115                 120

<210> SEQ ID NO 32
<211> LENGTH: 213
<212> TYPE: PRT
<213> ORGANISM: Artificial Sequence
<220> FEATURE:
<223> OTHER INFORMATION: Light chain
      (Antibody 2)

<400> SEQUENCE: 32

Glu Ile Val Leu Thr Gln Ser Pro Asp Phe Gln Ser Val Thr Pro Lys
1               5                   10                  15

Glu Lys Val Thr Ile Thr Cys Ser Ala Asn Ser Ala Leu Ser Tyr Met
            20                  25                  30

Tyr Trp Tyr Gln Gln Lys Pro Asp Gln Ser Pro Lys Leu Trp Val His
        35                  40                  45

Gly Thr Ser Asn Leu Ala Ser Gly Val Pro Ser Arg Phe Ser Gly Ser
50                  55                  60

Gly Ser Gly Thr Asp Phe Thr Leu Thr Ile Asn Ser Leu Glu Ala Glu
65                  70                  75                  80

Asp Ala Ala Thr Tyr Tyr Cys His His Trp Ser Asn Thr Gln Trp Thr
                85                  90                  95

Phe Gly Gly Gly Thr Lys Val Glu Ile Lys Arg Thr Val Ala Ala Pro
            100                 105                 110

Ser Val Phe Ile Phe Pro Pro Ser Asp Glu Gln Leu Lys Ser Gly Thr
        115                 120                 125

Ala Ser Val Val Cys Leu Leu Asn Asn Phe Tyr Pro Arg Glu Ala Lys
130                 135                 140

Val Gln Trp Lys Val Asp Asn Ala Leu Gln Ser Gly Asn Ser Gln Glu
145                 150                 155                 160

Ser Val Thr Glu Gln Asp Ser Lys Asp Ser Thr Tyr Ser Leu Ser Ser
                165                 170                 175

Thr Leu Thr Leu Ser Lys Ala Asp Tyr Glu Lys His Lys Val Tyr Ala
            180                 185                 190

Cys Glu Val Thr His Gln Gly Leu Ser Ser Pro Val Thr Lys Ser Phe
        195                 200                 205

Asn Arg Gly Glu Cys
    210

<210> SEQ ID NO 33
<211> LENGTH: 449
<212> TYPE: PRT
<213> ORGANISM: Artificial Sequence
<220> FEATURE:
<223> OTHER INFORMATION: Heavy chain
      (Antibody 2)

<400> SEQUENCE: 33

Gln Val Gln Leu Val Gln Ser Gly Ala Glu Val Lys Lys Pro Gly Ser
1               5                   10                  15

Ser Val Lys Val Ser Cys Lys Ala Ser Gly Tyr Thr Phe Thr Asn Tyr
            20                  25                  30

Phe Met Asn Trp Val Arg Gln Ala Pro Gly Gln Gly Leu Glu Trp Met
        35                  40                  45

-continued

```
Gly Arg Val Asp Pro Glu Gln Gly Arg Ala Asp Tyr Ala Glu Lys Phe
 50                  55                  60

Lys Lys Arg Val Thr Ile Thr Ala Asp Lys Ser Thr Ser Thr Ala Tyr
 65                  70                  75                  80

Met Glu Leu Ser Ser Leu Arg Ser Glu Asp Thr Ala Val Tyr Tyr Cys
                 85                  90                  95

Ala Arg Arg Ala Met Asp Asn Tyr Gly Phe Ala Tyr Trp Gly Gln Gly
            100                 105                 110

Thr Leu Val Thr Val Ser Ser Ala Ser Thr Lys Gly Pro Ser Val Phe
            115                 120                 125

Pro Leu Ala Pro Ser Ser Lys Ser Thr Ser Gly Gly Thr Ala Ala Leu
            130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
            180                 185                 190

Ser Ser Leu Gly Thr Gln Thr Tyr Ile Cys Asn Val Asn His Lys Pro
            195                 200                 205

Ser Asn Thr Lys Val Asp Lys Lys Val Glu Pro Lys Ser Cys Asp Lys
210                 215                 220

Thr His Thr Cys Pro Pro Cys Pro Ala Pro Glu Leu Leu Gly Gly Pro
225                 230                 235                 240

Ser Val Phe Leu Phe Pro Pro Lys Pro Lys Asp Thr Leu Met Ile Ser
                245                 250                 255

Arg Thr Pro Glu Val Thr Cys Val Val Val Asp Val Ser His Glu Asp
            260                 265                 270

Pro Glu Val Lys Phe Asn Trp Tyr Val Asp Gly Val Glu Val His Asn
            275                 280                 285

Ala Lys Thr Lys Pro Arg Glu Glu Gln Tyr Asn Ser Thr Tyr Arg Val
            290                 295                 300

Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
                325                 330                 335

Thr Ile Ser Lys Ala Lys Gly Gln Pro Arg Glu Pro Gln Val Tyr Thr
            340                 345                 350

Leu Pro Pro Ser Arg Asp Glu Leu Thr Lys Asn Gln Val Ser Leu Thr
            355                 360                 365

Cys Leu Val Lys Gly Phe Tyr Pro Ser Asp Ile Ala Val Glu Trp Glu
370                 375                 380

Ser Asn Gly Gln Pro Glu Asn Asn Tyr Lys Thr Thr Pro Pro Val Leu
385                 390                 395                 400

Asp Ser Asp Gly Ser Phe Phe Leu Tyr Ser Lys Leu Thr Val Asp Lys
                405                 410                 415

Ser Arg Trp Gln Gln Gly Asn Val Phe Ser Cys Ser Val Met His Glu
            420                 425                 430

Ala Leu His Asn His Tyr Thr Gln Lys Ser Leu Ser Leu Ser Pro Gly
            435                 440                 445

Lys
```

```
<210> SEQ ID NO 34
<211> LENGTH: 449
<212> TYPE: PRT
<213> ORGANISM: Artificial Sequence
<220> FEATURE:
<223> OTHER INFORMATION: Heavy chain
      (Antibody 2-S239D, I332E)

<400> SEQUENCE: 34
```

| | | | | | | | | | | | | | | | |
|---|---|---|---|---|---|---|---|---|---|---|---|---|---|---|---|
| Gln | Val | Gln | Leu | Val | Gln | Ser | Gly | Ala | Glu | Val | Lys | Lys | Pro | Gly | Ser |
| 1 | | | | 5 | | | | | 10 | | | | | 15 | |
| Ser | Val | Lys | Val | Ser | Cys | Lys | Ala | Ser | Gly | Tyr | Thr | Phe | Thr | Asn | Tyr |
| | | | 20 | | | | | 25 | | | | | 30 | | |
| Phe | Met | Asn | Trp | Val | Arg | Gln | Ala | Pro | Gly | Gln | Gly | Leu | Glu | Trp | Met |
| | | 35 | | | | | 40 | | | | | 45 | | | |
| Gly | Arg | Val | Asp | Pro | Glu | Gln | Gly | Arg | Ala | Asp | Tyr | Ala | Glu | Lys | Phe |
| | 50 | | | | | 55 | | | | | 60 | | | | |
| Lys | Lys | Arg | Val | Thr | Ile | Thr | Ala | Asp | Lys | Ser | Thr | Ser | Thr | Ala | Tyr |
| 65 | | | | | 70 | | | | | 75 | | | | | 80 |
| Met | Glu | Leu | Ser | Ser | Leu | Arg | Ser | Glu | Asp | Thr | Ala | Val | Tyr | Tyr | Cys |
| | | | | 85 | | | | | 90 | | | | | 95 | |
| Ala | Arg | Arg | Ala | Met | Asp | Asn | Tyr | Gly | Phe | Ala | Tyr | Trp | Gly | Gln | Gly |
| | | | 100 | | | | | 105 | | | | | 110 | | |
| Thr | Leu | Val | Thr | Val | Ser | Ser | Ala | Ser | Thr | Lys | Gly | Pro | Ser | Val | Phe |
| | | 115 | | | | | 120 | | | | | 125 | | | |
| Pro | Leu | Ala | Pro | Ser | Ser | Lys | Ser | Thr | Ser | Gly | Gly | Thr | Ala | Ala | Leu |
| | 130 | | | | | 135 | | | | | 140 | | | | |
| Gly | Cys | Leu | Val | Lys | Asp | Tyr | Phe | Pro | Glu | Pro | Val | Thr | Val | Ser | Trp |
| 145 | | | | | 150 | | | | | 155 | | | | | 160 |
| Asn | Ser | Gly | Ala | Leu | Thr | Ser | Gly | Val | His | Thr | Phe | Pro | Ala | Val | Leu |
| | | | | 165 | | | | | 170 | | | | | 175 | |
| Gln | Ser | Ser | Gly | Leu | Tyr | Ser | Leu | Ser | Ser | Val | Val | Thr | Val | Pro | Ser |
| | | | 180 | | | | | 185 | | | | | 190 | | |
| Ser | Ser | Leu | Gly | Thr | Gln | Thr | Tyr | Ile | Cys | Asn | Val | Asn | His | Lys | Pro |
| | | 195 | | | | | 200 | | | | | 205 | | | |
| Ser | Asn | Thr | Lys | Val | Asp | Lys | Lys | Val | Glu | Pro | Lys | Ser | Cys | Asp | Lys |
| | 210 | | | | | 215 | | | | | 220 | | | | |
| Thr | His | Thr | Cys | Pro | Pro | Cys | Pro | Ala | Pro | Glu | Leu | Leu | Gly | Gly | Pro |
| 225 | | | | | 230 | | | | | 235 | | | | | 240 |
| Asp | Val | Phe | Leu | Phe | Pro | Pro | Lys | Pro | Lys | Asp | Thr | Leu | Met | Ile | Ser |
| | | | | 245 | | | | | 250 | | | | | 255 | |
| Arg | Thr | Pro | Glu | Val | Thr | Cys | Val | Val | Val | Asp | Val | Ser | His | Glu | Asp |
| | | | 260 | | | | | 265 | | | | | 270 | | |
| Pro | Glu | Val | Lys | Phe | Asn | Trp | Tyr | Val | Asp | Gly | Val | Glu | Val | His | Asn |
| | | 275 | | | | | 280 | | | | | 285 | | | |
| Ala | Lys | Thr | Lys | Pro | Arg | Glu | Glu | Gln | Tyr | Asn | Ser | Thr | Tyr | Arg | Val |
| | 290 | | | | | 295 | | | | | 300 | | | | |
| Val | Ser | Val | Leu | Thr | Val | Leu | His | Gln | Asp | Trp | Leu | Asn | Gly | Lys | Glu |
| 305 | | | | | 310 | | | | | 315 | | | | | 320 |
| Tyr | Lys | Cys | Lys | Val | Ser | Asn | Lys | Ala | Leu | Pro | Ala | Pro | Glu | Glu | Lys |
| | | | | 325 | | | | | 330 | | | | | 335 | |
| Thr | Ile | Ser | Lys | Ala | Lys | Gly | Gln | Pro | Arg | Glu | Pro | Gln | Val | Tyr | Thr |
| | | | 340 | | | | | 345 | | | | | 350 | | |
| Leu | Pro | Pro | Ser | Arg | Asp | Glu | Leu | Thr | Lys | Asn | Gln | Val | Ser | Leu | Thr |
| | | 355 | | | | | 360 | | | | | 365 | | | |

-continued

Cys Leu Val Lys Gly Phe Tyr Pro Ser Asp Ile Ala Val Glu Trp Glu
    370                 375                 380

Ser Asn Gly Gln Pro Glu Asn Asn Tyr Lys Thr Thr Pro Pro Val Leu
385                 390                 395                 400

Asp Ser Asp Gly Ser Phe Phe Leu Tyr Ser Lys Leu Thr Val Asp Lys
                405                 410                 415

Ser Arg Trp Gln Gln Gly Asn Val Phe Ser Cys Ser Val Met His Glu
                420                 425                 430

Ala Leu His Asn His Tyr Thr Gln Lys Ser Leu Ser Leu Ser Pro Gly
                435                 440                 445

Lys

<210> SEQ ID NO 35
<211> LENGTH: 329
<212> TYPE: PRT
<213> ORGANISM: Artificial Sequence
<220> FEATURE:
<223> OTHER INFORMATION: Heavy Chain Constant Domain

<400> SEQUENCE: 35

Ser Thr Lys Gly Pro Ser Val Phe Pro Leu Ala Pro Ser Ser Lys Ser
1               5                   10                  15

Thr Ser Gly Gly Thr Ala Ala Leu Gly Cys Leu Val Lys Asp Tyr Phe
                20                  25                  30

Pro Glu Pro Val Thr Val Ser Trp Asn Ser Gly Ala Leu Thr Ser Gly
            35                  40                  45

Val His Thr Phe Pro Ala Val Leu Gln Ser Ser Gly Leu Tyr Ser Leu
    50                  55                  60

Ser Ser Val Val Thr Val Pro Ser Ser Ser Leu Gly Thr Gln Thr Tyr
65                  70                  75                  80

Ile Cys Asn Val Asn His Lys Pro Ser Asn Thr Lys Val Asp Lys Lys
                85                  90                  95

Val Glu Pro Lys Ser Cys Asp Lys Thr His Thr Cys Pro Pro Cys Pro
            100                 105                 110

Ala Pro Glu Leu Leu Gly Gly Pro Ser Val Phe Leu Phe Pro Pro Lys
        115                 120                 125

Pro Lys Asp Thr Leu Met Ile Ser Arg Thr Pro Glu Val Thr Cys Val
130                 135                 140

Val Val Asp Val Ser His Glu Asp Pro Glu Val Lys Phe Asn Trp Tyr
145                 150                 155                 160

Val Asp Gly Val Glu Val His Asn Ala Lys Thr Lys Pro Arg Glu Glu
                165                 170                 175

Gln Tyr Asn Ser Thr Tyr Arg Val Val Ser Val Leu Thr Val Leu His
            180                 185                 190

Gln Asp Trp Leu Asn Gly Lys Glu Tyr Lys Cys Lys Val Ser Asn Lys
        195                 200                 205

Ala Leu Pro Ala Pro Ile Glu Lys Thr Ile Ser Lys Ala Lys Gly Gln
    210                 215                 220

Pro Arg Glu Pro Gln Val Tyr Thr Leu Pro Pro Ser Arg Asp Glu Leu
225                 230                 235                 240

Thr Lys Asn Gln Val Ser Leu Thr Cys Leu Val Lys Gly Phe Tyr Pro
                245                 250                 255

Ser Asp Ile Ala Val Glu Trp Glu Ser Asn Gly Gln Pro Glu Asn Asn
            260                 265                 270

Tyr Lys Thr Thr Pro Pro Val Leu Asp Ser Asp Gly Ser Phe Phe Leu

```
                275                 280                 285
Tyr Ser Lys Leu Thr Val Asp Lys Ser Arg Trp Gln Gln Gly Asn Val
        290                 295                 300

Phe Ser Cys Ser Val Met His Glu Ala Leu His Asn His Tyr Thr Gln
305                 310                 315                 320

Lys Ser Leu Ser Leu Ser Pro Gly Lys
                325

<210> SEQ ID NO 36
<211> LENGTH: 329
<212> TYPE: PRT
<213> ORGANISM: Artificial Sequence
<220> FEATURE:
<223> OTHER INFORMATION: Heavy Chain Constant Domain S239D

<400> SEQUENCE: 36

Ser Thr Lys Gly Pro Ser Val Phe Pro Leu Ala Pro Ser Ser Lys Ser
1               5                   10                  15

Thr Ser Gly Gly Thr Ala Ala Leu Gly Cys Leu Val Lys Asp Tyr Phe
            20                  25                  30

Pro Glu Pro Val Thr Val Ser Trp Asn Ser Gly Ala Leu Thr Ser Gly
        35                  40                  45

Val His Thr Phe Pro Ala Val Leu Gln Ser Ser Gly Leu Tyr Ser Leu
    50                  55                  60

Ser Ser Val Val Thr Val Pro Ser Ser Ser Leu Gly Thr Gln Thr Tyr
65                  70                  75                  80

Ile Cys Asn Val Asn His Lys Pro Ser Asn Thr Lys Val Asp Lys Lys
                85                  90                  95

Val Glu Pro Lys Ser Cys Asp Lys Thr His Thr Cys Pro Pro Cys Pro
            100                 105                 110

Ala Pro Glu Leu Leu Gly Gly Pro Asp Val Phe Leu Phe Pro Pro Lys
        115                 120                 125

Pro Lys Asp Thr Leu Met Ile Ser Arg Thr Pro Glu Val Thr Cys Val
    130                 135                 140

Val Val Asp Val Ser His Glu Asp Pro Glu Val Lys Phe Asn Trp Tyr
145                 150                 155                 160

Val Asp Gly Val Glu Val His Asn Ala Lys Thr Lys Pro Arg Glu Glu
                165                 170                 175

Gln Tyr Asn Ser Thr Tyr Arg Val Val Ser Val Leu Thr Val Leu His
            180                 185                 190

Gln Asp Trp Leu Asn Gly Lys Glu Tyr Lys Cys Lys Val Ser Asn Lys
        195                 200                 205

Ala Leu Pro Ala Pro Ile Glu Lys Thr Ile Ser Lys Ala Lys Gly Gln
    210                 215                 220

Pro Arg Glu Pro Gln Val Tyr Thr Leu Pro Pro Ser Arg Asp Glu Leu
225                 230                 235                 240

Thr Lys Asn Gln Val Ser Leu Thr Cys Leu Val Lys Gly Phe Tyr Pro
                245                 250                 255

Ser Asp Ile Ala Val Glu Trp Glu Ser Asn Gly Gln Pro Glu Asn Asn
            260                 265                 270

Tyr Lys Thr Thr Pro Pro Val Leu Asp Ser Asp Gly Ser Phe Phe Leu
        275                 280                 285

Tyr Ser Lys Leu Thr Val Asp Lys Ser Arg Trp Gln Gln Gly Asn Val
    290                 295                 300

Phe Ser Cys Ser Val Met His Glu Ala Leu His Asn His Tyr Thr Gln
```

```
305                 310                 315                 320
Lys Ser Leu Ser Leu Ser Pro Gly Lys
                325

<210> SEQ ID NO 37
<211> LENGTH: 329
<212> TYPE: PRT
<213> ORGANISM: Artificial Sequence
<220> FEATURE:
<223> OTHER INFORMATION: Heavy Chain Constant Domain
      I332E

<400> SEQUENCE: 37

Ser Thr Lys Gly Pro Ser Val Phe Pro Leu Ala Pro Ser Ser Lys Ser
1               5                   10                  15

Thr Ser Gly Gly Thr Ala Ala Leu Gly Cys Leu Val Lys Asp Tyr Phe
            20                  25                  30

Pro Glu Pro Val Thr Val Ser Trp Asn Ser Gly Ala Leu Thr Ser Gly
        35                  40                  45

Val His Thr Phe Pro Ala Val Leu Gln Ser Ser Gly Leu Tyr Ser Leu
    50                  55                  60

Ser Ser Val Val Thr Val Pro Ser Ser Ser Leu Gly Thr Gln Thr Tyr
65                  70                  75                  80

Ile Cys Asn Val Asn His Lys Pro Ser Asn Thr Lys Val Asp Lys Lys
                85                  90                  95

Val Glu Pro Lys Ser Cys Asp Lys Thr His Thr Cys Pro Pro Cys Pro
            100                 105                 110

Ala Pro Glu Leu Leu Gly Gly Pro Ser Val Phe Leu Phe Pro Pro Lys
        115                 120                 125

Pro Lys Asp Thr Leu Met Ile Ser Arg Thr Pro Glu Val Thr Cys Val
    130                 135                 140

Val Val Asp Val Ser His Glu Asp Pro Glu Val Lys Phe Asn Trp Tyr
145                 150                 155                 160

Val Asp Gly Val Glu Val His Asn Ala Lys Thr Lys Pro Arg Glu Glu
                165                 170                 175

Gln Tyr Asn Ser Thr Tyr Arg Val Val Ser Val Leu Thr Val Leu His
            180                 185                 190

Gln Asp Trp Leu Asn Gly Lys Glu Tyr Lys Cys Lys Val Ser Asn Lys
        195                 200                 205

Ala Leu Pro Ala Pro Glu Glu Lys Thr Ile Ser Lys Ala Lys Gly Gln
    210                 215                 220

Pro Arg Glu Pro Gln Val Tyr Thr Leu Pro Pro Ser Arg Asp Glu Leu
225                 230                 235                 240

Thr Lys Asn Gln Val Ser Leu Thr Cys Leu Val Lys Gly Phe Tyr Pro
                245                 250                 255

Ser Asp Ile Ala Val Glu Trp Glu Ser Asn Gly Gln Pro Glu Asn Asn
            260                 265                 270

Tyr Lys Thr Thr Pro Pro Val Leu Asp Ser Asp Gly Ser Phe Phe Leu
        275                 280                 285

Tyr Ser Lys Leu Thr Val Asp Lys Ser Arg Trp Gln Gln Gly Asn Val
    290                 295                 300

Phe Ser Cys Ser Val Met His Glu Ala Leu His Asn His Tyr Thr Gln
305                 310                 315                 320

Lys Ser Leu Ser Leu Ser Pro Gly Lys
                325
```

<210> SEQ ID NO 38
<211> LENGTH: 329
<212> TYPE: PRT
<213> ORGANISM: Artificial Sequence
<220> FEATURE:
<223> OTHER INFORMATION: Heavy Chain Constant Domain
    S239D, I332E

<400> SEQUENCE: 38

Ser Thr Lys Gly Pro Ser Val Phe Pro Leu Ala Pro Ser Ser Lys Ser
1               5                   10                  15

Thr Ser Gly Gly Thr Ala Ala Leu Gly Cys Leu Val Lys Asp Tyr Phe
            20                  25                  30

Pro Glu Pro Val Thr Val Ser Trp Asn Ser Gly Ala Leu Thr Ser Gly
        35                  40                  45

Val His Thr Phe Pro Ala Val Leu Gln Ser Ser Gly Leu Tyr Ser Leu
    50                  55                  60

Ser Ser Val Val Thr Val Pro Ser Ser Ser Leu Gly Thr Gln Thr Tyr
65                  70                  75                  80

Ile Cys Asn Val Asn His Lys Pro Ser Asn Thr Lys Val Asp Lys Lys
                85                  90                  95

Val Glu Pro Lys Ser Cys Asp Lys Thr His Thr Cys Pro Pro Cys Pro
            100                 105                 110

Ala Pro Glu Leu Leu Gly Gly Pro Asp Val Phe Leu Phe Pro Pro Lys
        115                 120                 125

Pro Lys Asp Thr Leu Met Ile Ser Arg Thr Pro Glu Val Thr Cys Val
130                 135                 140

Val Val Asp Val Ser His Glu Asp Pro Glu Val Lys Phe Asn Trp Tyr
145                 150                 155                 160

Val Asp Gly Val Glu Val His Asn Ala Lys Thr Lys Pro Arg Glu Glu
                165                 170                 175

Gln Tyr Asn Ser Thr Tyr Arg Val Val Ser Val Leu Thr Val Leu His
            180                 185                 190

Gln Asp Trp Leu Asn Gly Lys Glu Tyr Lys Cys Lys Val Ser Asn Lys
        195                 200                 205

Ala Leu Pro Ala Pro Glu Glu Lys Thr Ile Ser Lys Ala Lys Gly Gln
    210                 215                 220

Pro Arg Glu Pro Gln Val Tyr Thr Leu Pro Pro Ser Arg Asp Glu Leu
225                 230                 235                 240

Thr Lys Asn Gln Val Ser Leu Thr Cys Leu Val Lys Gly Phe Tyr Pro
                245                 250                 255

Ser Asp Ile Ala Val Glu Trp Glu Ser Asn Gly Gln Pro Glu Asn Asn
            260                 265                 270

Tyr Lys Thr Thr Pro Pro Val Leu Asp Ser Asp Gly Ser Phe Phe Leu
        275                 280                 285

Tyr Ser Lys Leu Thr Val Asp Lys Ser Arg Trp Gln Gln Gly Asn Val
    290                 295                 300

Phe Ser Cys Ser Val Met His Glu Ala Leu His Asn His Tyr Thr Gln
305                 310                 315                 320

Lys Ser Leu Ser Leu Ser Pro Gly Lys
                325

<210> SEQ ID NO 39
<211> LENGTH: 106
<212> TYPE: PRT
<213> ORGANISM: Artificial Sequence

```
<220> FEATURE:
<223> OTHER INFORMATION: Light chain Constant Domain

<400> SEQUENCE: 39

Thr Val Ala Ala Pro Ser Val Phe Ile Phe Pro Pro Ser Asp Glu Gln
1               5                   10                  15

Leu Lys Ser Gly Thr Ala Ser Val Val Cys Leu Leu Asn Asn Phe Tyr
                20                  25                  30

Pro Arg Glu Ala Lys Val Gln Trp Lys Val Asp Asn Ala Leu Gln Ser
            35                  40                  45

Gly Asn Ser Gln Glu Ser Val Thr Glu Gln Asp Ser Lys Asp Ser Thr
        50                  55                  60

Tyr Ser Leu Ser Ser Thr Leu Thr Leu Ser Lys Ala Asp Tyr Glu Lys
65                  70                  75                  80

His Lys Val Tyr Ala Cys Glu Val Thr His Gln Gly Leu Ser Ser Pro
                85                  90                  95

Val Thr Lys Ser Phe Asn Arg Gly Glu Cys
            100                 105
```